(12) United States Patent
Critchley et al.

(10) Patent No.: US 8,549,180 B2
(45) Date of Patent: Oct. 1, 2013

(54) OPTIMIZING ACCESS TO FEDERATION INFRASTRUCTURE-BASED RESOURCES

(75) Inventors: Craig A. Critchley, Fall City, WA (US); David A. Wortendyke, Seattle, WA (US); Michael J. Marucheck, Bellevue, WA (US); Richard L. Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/821,002

(22) Filed: Jun. 22, 2010

(65) Prior Publication Data

US 2010/0262717 A1    Oct. 14, 2010

Related U.S. Application Data

(63) Continuation-in-part of application No. 10/971,451, filed on Oct. 22, 2004, now abandoned, and a continuation-in-part of application No. 11/936,556, filed on Nov. 7, 2007, now Pat. No. 8,090,880, and a continuation-in-part of application No. 12/556,399, filed on Sep. 9, 2009.

(51) Int. Cl.
*G06F 15/16* (2006.01)

(52) U.S. Cl.
USPC .......................................................... 709/251

(58) Field of Classification Search
USPC .......................................................... 709/251
See application file for complete search history.

(56) References Cited

U.S. PATENT DOCUMENTS

| 4,747,100 | A | 5/1988 | Roach et al. |
| 5,483,652 | A | 1/1996 | Sudama |
| 5,689,701 | A | 11/1997 | Ault et al. |
| 5,692,180 | A | 11/1997 | Lee |
| 5,745,683 | A | 4/1998 | Lee et al. |
| 5,831,975 | A | 11/1998 | Chen |
| 5,893,116 | A | 4/1999 | Simmonds |
| 5,978,813 | A | 11/1999 | Foltz et al. |
| 6,061,743 | A | 5/2000 | Thatcher |

(Continued)

FOREIGN PATENT DOCUMENTS

| EP | 1052805 | 11/2000 |
| EP | 1139602 | 10/2001 |

(Continued)

OTHER PUBLICATIONS

Mobility Protocol Framework to Support Multiple Namespaces by Masahiro Ishiyama and Mitsunobu Kunishi; 2003 Symposium on Applications and the Internet Workshops (SAINT 2003), Orlando, FL, pp. 208-213.

(Continued)

*Primary Examiner* — Sulaiman Nooristany
(74) *Attorney, Agent, or Firm* — Workman Nydegger

(57) ABSTRACT

The present invention extends to methods, systems, and computer program products for optimizing access to federation infrastructure-based resources. Various different layers within a federation infrastructure can signal location change events indicating the hosting location and/or access location for a resource is to be optimized. In response to a location change event, redirection information for accessing the resource is updated within the federation infrastructure. The redirection information is used to redirect resource access requests to appropriately optimized locations within the federation infrastructure. Redirecting resource access requests reduces communication within the federation infrastructure.

21 Claims, 36 Drawing Sheets

(56) References Cited

U.S. PATENT DOCUMENTS

| | | | |
|---|---|---|---|
| 6,115,804 A | 9/2000 | Carpenter |
| 6,243,814 B1 | 6/2001 | Matena |
| 6,253,292 B1 | 6/2001 | Jhang |
| 6,269,085 B1 | 7/2001 | Provino |
| 6,279,034 B1 | 8/2001 | Jarriel et al. |
| 6,304,556 B1 | 10/2001 | Haas |
| 6,381,627 B1 | 4/2002 | Kwan |
| 6,411,966 B1 | 6/2002 | Kwan |
| 6,411,967 B1 | 6/2002 | Van Renesse |
| 6,449,641 B1 | 9/2002 | Moiin |
| 6,456,597 B1 | 9/2002 | Bare |
| 6,480,473 B1 | 11/2002 | Chambers |
| 6,505,244 B1 | 1/2003 | Natarajan |
| 6,542,513 B1 | 4/2003 | Franke |
| 6,546,415 B1 | 4/2003 | Park |
| 6,553,377 B1 | 4/2003 | Eschelbeck et al. |
| 6,553,423 B1 | 4/2003 | Chen |
| 6,615,362 B1 | 9/2003 | Daruwalla |
| 6,665,702 B1 | 12/2003 | Zisapel |
| 6,701,415 B1 | 3/2004 | Hendren, III |
| 6,708,198 B1 | 3/2004 | Simmons |
| 6,775,703 B1 | 8/2004 | Burns |
| 6,807,423 B1 | 10/2004 | Armstrong |
| 6,826,182 B1 | 11/2004 | Parthasarathy |
| 6,836,756 B1 | 12/2004 | Gruber |
| 6,848,109 B1 | 1/2005 | Kuhn |
| 6,850,987 B1 | 2/2005 | McCanne |
| 6,909,721 B2 | 6/2005 | Ekberg |
| 6,917,985 B2 | 7/2005 | Madruga |
| 6,928,578 B2 | 8/2005 | Archibald |
| 6,947,963 B1 | 9/2005 | Agarwal |
| 6,956,821 B2 | 10/2005 | Szviatovszki |
| 6,965,575 B2 | 11/2005 | Srikrishna |
| 6,980,555 B2 | 12/2005 | Mar |
| 6,983,397 B2 | 1/2006 | Fairhurst |
| 6,988,173 B2 | 1/2006 | Blake |
| 7,010,534 B2 | 3/2006 | Kraft |
| 7,016,085 B2 | 3/2006 | Gonzalez |
| 7,043,550 B2 | 5/2006 | Knop |
| 7,058,639 B1 | 6/2006 | Chatterjee |
| 7,062,563 B1 * | 6/2006 | Lewis et al. ............ 709/227 |
| 7,065,784 B2 | 6/2006 | Hopmann |
| 7,072,982 B2 | 7/2006 | Teodosiu |
| 7,076,507 B1 | 7/2006 | Tarin |
| 7,085,825 B1 | 8/2006 | Pishevar |
| 7,103,884 B2 | 9/2006 | Fellin |
| 7,117,273 B1 | 10/2006 | O'Toole et al. |
| 7,120,824 B2 | 10/2006 | Burton |
| 7,137,018 B2 | 11/2006 | Gutman et al. |
| 7,139,270 B1 | 11/2006 | Fatehi et al. |
| 7,139,930 B2 | 11/2006 | Mashayekhi |
| 7,152,180 B2 | 12/2006 | Shoab |
| 7,177,646 B2 | 2/2007 | O'Neill et al. |
| 7,181,547 B1 | 2/2007 | Millet |
| 7,188,145 B2 | 3/2007 | Lowery |
| 7,200,113 B2 | 4/2007 | Beyda |
| 7,200,657 B2 | 4/2007 | Adams |
| 7,200,675 B2 | 4/2007 | Wang |
| 7,206,934 B2 | 4/2007 | Pabla |
| 7,209,973 B2 | 4/2007 | Tormasov |
| 7,231,463 B2 | 6/2007 | Nagendra |
| 7,310,314 B1 | 12/2007 | Katz et al. |
| 7,324,440 B2 | 1/2008 | Takagi |
| 7,328,280 B2 | 2/2008 | Takeda |
| 7,334,062 B1 | 2/2008 | Agarwal et al. |
| 7,337,465 B2 | 2/2008 | Kiyoto |
| 7,353,335 B2 | 4/2008 | Kawamura |
| 7,362,718 B2 | 4/2008 | Kakivaya et al. |
| 7,373,468 B1 | 5/2008 | Gupta |
| 7,379,994 B2 | 5/2008 | Collazo |
| 7,404,006 B1 | 7/2008 | Slaughter |
| 7,453,884 B2 | 11/2008 | Ma |
| 7,463,648 B1 | 12/2008 | Eppstein |
| 7,466,662 B2 | 12/2008 | Kakivaya et al. |
| 7,467,265 B1 | 12/2008 | Tawri et al. |
| 7,478,263 B1 | 1/2009 | Kownacki |
| 7,496,602 B2 | 2/2009 | Kaler |
| 7,512,649 B2 | 3/2009 | Faybishenko |
| 7,571,290 B1 | 8/2009 | Ranade et al. |
| 7,613,703 B2 | 11/2009 | Kakivaya et al. |
| 7,617,289 B2 | 11/2009 | Srinivasan et al. |
| 7,624,194 B2 | 11/2009 | Kakivaya et al. |
| 7,730,220 B2 | 6/2010 | Hasha et al. |
| 7,778,972 B1 | 8/2010 | Cormie |
| 7,805,407 B1 | 9/2010 | Verbeke et al. |
| 7,934,118 B2 | 4/2011 | Kakivaya et al. |
| 7,958,262 B2 | 6/2011 | Hasha |
| 7,984,137 B2 | 7/2011 | O'Toole et al. |
| 8,275,823 B2 | 9/2012 | Belveze |
| 8,307,085 B2 | 11/2012 | Sinha et al. |
| 2002/0056089 A1 | 5/2002 | Houston |
| 2002/0059425 A1 | 5/2002 | Belfiore |
| 2002/0085506 A1 | 7/2002 | Hundscheidt |
| 2002/0128995 A1 | 9/2002 | Muntz et al. |
| 2002/0129086 A1 | 9/2002 | Garcia-Luna-Aceves |
| 2002/0143855 A1 | 10/2002 | Traversat |
| 2002/0150094 A1 | 10/2002 | Cheng |
| 2002/0150145 A1 | 10/2002 | Alriksson |
| 2002/0152299 A1 | 10/2002 | Traversat |
| 2002/0184310 A1 | 12/2002 | Traversat |
| 2002/0184357 A1 | 12/2002 | Traversat |
| 2002/0184368 A1 | 12/2002 | Wang |
| 2003/0009754 A1 | 1/2003 | Rowley et al. |
| 2003/0018701 A1 | 1/2003 | Kaestle |
| 2003/0055892 A1 | 3/2003 | Huitema |
| 2003/0067871 A1 | 4/2003 | Busi |
| 2003/0074413 A1 | 4/2003 | Nielsen |
| 2003/0081617 A1 | 5/2003 | Deng |
| 2003/0088620 A1 | 5/2003 | Kermarrec |
| 2003/0108050 A1 | 6/2003 | Black et al. |
| 2003/0110408 A1 | 6/2003 | Wells |
| 2003/0126304 A1 | 7/2003 | Wyatt |
| 2003/0131246 A1 * | 7/2003 | Reeves et al. ............ 713/182 |
| 2003/0145086 A1 | 7/2003 | O'Reilly |
| 2003/0152098 A1 | 8/2003 | Zhu |
| 2003/0165140 A1 | 9/2003 | Tang |
| 2003/0177183 A1 | 9/2003 | Cabrera |
| 2003/0182444 A1 | 9/2003 | Pedone |
| 2003/0195984 A1 | 10/2003 | Zisapel |
| 2003/0220993 A1 | 11/2003 | Blizniak et al. |
| 2003/0233455 A1 | 12/2003 | Leber |
| 2004/0054807 A1 | 3/2004 | Harvey |
| 2004/0064511 A1 | 4/2004 | Abdel-Aziz |
| 2004/0064548 A1 | 4/2004 | Adams et al. |
| 2004/0066741 A1 | 4/2004 | Dinker |
| 2004/0098455 A1 | 5/2004 | Ellis |
| 2004/0098502 A1 | 5/2004 | Xu et al. |
| 2004/0111651 A1 | 6/2004 | Mukherjee |
| 2004/0122927 A1 | 6/2004 | Muehl |
| 2004/0133640 A1 | 7/2004 | Yeager |
| 2004/0139150 A1 | 7/2004 | McCanne |
| 2004/0148326 A1 | 7/2004 | Nadgir |
| 2004/0162871 A1 | 8/2004 | Pabla |
| 2004/0162997 A1 | 8/2004 | Hopmann |
| 2004/0168084 A1 | 8/2004 | Owen |
| 2004/0181588 A1 | 9/2004 | Wang |
| 2004/0181689 A1 | 9/2004 | Kiyoto et al. |
| 2004/0205124 A1 | 10/2004 | Limprecht |
| 2004/0215795 A1 | 10/2004 | Poyhonen |
| 2004/0218536 A1 | 11/2004 | Yasukawa |
| 2004/0236945 A1 * | 11/2004 | Risan et al. ............ 713/165 |
| 2004/0249953 A1 | 12/2004 | Fernandez |
| 2005/0010660 A1 | 1/2005 | Vaught |
| 2005/0021617 A1 | 1/2005 | Rusitschka |
| 2005/0021725 A1 | 1/2005 | Lobbert |
| 2005/0028166 A1 | 2/2005 | Chew |
| 2005/0031119 A1 | 2/2005 | Ding |
| 2005/0044301 A1 | 2/2005 | Vasilevsky |
| 2005/0050320 A1 | 3/2005 | Wassmann et al. |
| 2005/0091399 A1 | 4/2005 | Candan |
| 2005/0091505 A1 | 4/2005 | Riley |
| 2005/0100036 A1 | 5/2005 | Davis |
| 2005/0105905 A1 | 5/2005 | Ovadia |
| 2005/0108481 A1 | 5/2005 | Iyengar |

| | | | |
|---|---|---|---|
| 2005/0111352 A1 | 5/2005 | Ho | |
| 2005/0114291 A1 | 5/2005 | Becker-Szendy | |
| 2005/0114854 A1 | 5/2005 | Padisetty | |
| 2005/0138173 A1 | 6/2005 | Ha | |
| 2005/0152318 A1 | 7/2005 | Elbatt | |
| 2005/0187946 A1 | 8/2005 | Zhang | |
| 2005/0220106 A1 | 10/2005 | Raverdy | |
| 2005/0222969 A1 | 10/2005 | Yip et al. | |
| 2005/0256909 A1 | 11/2005 | Aboulhosn | |
| 2005/0276216 A1 | 12/2005 | Vasseur | |
| 2006/0015507 A1 | 1/2006 | Butterworth | |
| 2006/0026386 A1 | 2/2006 | Freedman et al. | |
| 2006/0039371 A1 | 2/2006 | Castro | |
| 2006/0074876 A1 | 4/2006 | Kakivaya et al. | |
| 2006/0087990 A1 | 4/2006 | Kakivaya | |
| 2006/0088039 A1 | 4/2006 | Kakivaya et al. | |
| 2006/0090003 A1 | 4/2006 | Kakivaya et al. | |
| 2006/0106940 A1 | 5/2006 | Jagannathan | |
| 2006/0117025 A1 | 6/2006 | Kaler | |
| 2006/0117026 A1 | 6/2006 | Kaler | |
| 2006/0155781 A1 | 7/2006 | MacCormick | |
| 2006/0159028 A1 | 7/2006 | Curran-Gray et al. | |
| 2006/0167841 A1 | 7/2006 | Allan | |
| 2006/0182034 A1 | 8/2006 | Klinker et al. | |
| 2006/0182050 A1 | 8/2006 | Dohm | |
| 2006/0282505 A1 | 12/2006 | Hasha | |
| 2006/0282547 A1 | 12/2006 | Hasha et al. | |
| 2007/0002774 A1 | 1/2007 | Hasha | |
| 2007/0016663 A1 | 1/2007 | Weis | |
| 2007/0053285 A1 | 3/2007 | Beer | |
| 2007/0133520 A1 | 6/2007 | Kakivaya | |
| 2007/0183460 A1 | 8/2007 | Enders | |
| 2007/0204061 A1 | 8/2007 | Chen | |
| 2007/0214194 A1 | 9/2007 | Reuter | |
| 2007/0271385 A1 | 11/2007 | Davis | |
| 2008/0005624 A1 | 1/2008 | Kakivaya et al. | |
| 2008/0069124 A1 | 3/2008 | Patrick | |
| 2008/0288646 A1 | 11/2008 | Hasha | |
| 2008/0288659 A1 | 11/2008 | Hasha | |
| 2009/0213757 A1 | 8/2009 | Kakivaya et al. | |
| 2009/0268677 A1 | 10/2009 | Chou | |
| 2009/0319684 A1 | 12/2009 | Kakivaya | |
| 2010/0005071 A1 | 1/2010 | Kakivaya | |
| 2010/0046399 A1 | 2/2010 | Kakivaya | |
| 2010/0107002 A1 | 4/2010 | Kakivaya et al. | |
| 2011/0082928 A1 | 4/2011 | Hasha | |
| 2011/0235551 A1 | 9/2011 | Kakivaya | |
| 2011/0238841 A1 | 9/2011 | Kakivaya | |
| 2012/0036237 A1 | 2/2012 | Hasha | |

FOREIGN PATENT DOCUMENTS

| | | |
|---|---|---|
| EP | 1398924 | 3/2004 |
| EP | 1643730 | 4/2006 |
| EP | 1650911 | 4/2006 |
| JP | 2001005758 | 1/2001 |
| JP | 2003316636 | 11/2003 |
| JP | 2004110624 | 4/2004 |
| JP | 2004-266796 | 9/2004 |
| JP | 2005092784 | 4/2005 |
| JP | 2005223722 | 8/2005 |
| JP | 2005-323346 | 11/2005 |
| WO | WO 02056182 | 7/2002 |
| WO | WO03058537 | 7/2003 |
| WO | WO 2004039031 | 5/2004 |

OTHER PUBLICATIONS

Storage, Mutability and Naming in Pasta by Tim D. Moretown, Ian A. Pratt and Timothy L. Harris; University of Cambridge Computer Laboratory; Cambridge, UK; 2002; p. 215.
Explicit Namespaces by Franz Achermann and Oscar Nierstrasz; Software Composition Group, Univeristy of Berne; Theoretical Computer Science archive, vol. 331 , Issue 2-3 (Feb. 2005); pp. 367-396.
Cisco Systems; Configuring ATM Routing and PNNI: Dynamic Versus Static ATM Routing http://www.cisco.com/en/US/products/hw/switches/ps1893/products/configuration_guide_chapter09186a00800f6565.html, Dec. 12, 2005.
Dynamic Reconfiguration of Network Applications and Middleware Systems in the Bio-Networking Architecture; Abstract; http://www.cs.umb.edu/~jxs/pub/lartes02.pdf, 2002 IEEE Workshop on Large Scale Real-Time and Ebedded Systems.
Network Sensitive Reconfiguration of Distributed Applications, Abstract; http://www.cs.rpi.edu/research/pdf/05-03.pdf. May 1, 2003.
Performance-Responsive Middleware; Multi-domain Management; http://www.dcs.warwick.ac.uk/research/hpsg/middleware/middleware.html, Dec. 12, 2005.
Network Technologies; Approach;http://oxygen.lcs.mit.edu/Network.html, revised Jun. 2, 2004.
Sun Microsystems, Inc.: An Open-Source Peer-to-Peer Distributed Computing Project using JXTA, by Jerome Verbeke and Neelakanth Nadgir [retrieved online]. Retrieved from the Internet URL:http://www.jxta.org/JavaOne/JavaOne2003/jngi.pdf, Feb. 15, 2006.
Reliable and Secure Group Communication by Deb Agarwal [retrieved online]. Retrieved from the Internet URL: http://www.doecollaboratory.org/research2/groupcomm/rsgc_scidac_exec_summary-final.pdf, Sep. 2001.
Department of Computer Science, University of Maryland, College Park: Scalable Peer finding on the Internet, by Suman Banerjee, Christopher Kommareddy, and Bobby Bhattacharjee [retrieved online]. Retrieved from the Internet URL:http://pages.cs.wisc.edu/~suman/pubs/gi02.pdf.
Collaboration Technologies Group, Distributed Systems Department, Computational Research Division, Lawrence Berkeley National Laboratory: A Scalable and Secure Peer-to-Peer Information Sharing Tool [online][retrieved on Feb. 15, 2006].Retrieved from the Internet URL:http://dsd.lbl.gov/P2P/file-share/ Sep. 26, 2005.
Scalable Application-Level Anycast for Highly Dynamic Groups by Miguel Castro, Peter Druschel, Anne-Marie Kermarrec, and Antony Rowstron [retrieved online]. Retrieved from the Internet URL:http://project-iris.net/irisbib/papers/druschelanycast/paper.pdf Feb. 15, 2006.
Oriol, Manuel et al, "Hot-Swapping Communication Models in P2P Networks," hiccs, vol. 9, p. 1-10, 2004.
Chord: A scalable Peer-to-peer Lookup Protocol for Internet Applications Ion Stoica, Robert Morris, David Liben-Nowell, David R. Karger, M. Frans Kaashoek, Frank Dabek, Harris Balakrishnan, Member, IEEE/ACM Transactions on Networking, vol. 11, No. 1, Feb. 2003.
Pastry: Scalable, decentralized object location and routing for large-scale peer-to-peer systems Anthony Rowstron and Peter Druschel, 2001.
Kademlia: A Peer-to-peer Information System Based on the XOR Metric Peter Maymounkov and David Mazieres, p. 1-15, 2002.
Exploiting network proximity in peer-to-peer overlay networks Miguel Castro, Peter Druschel, Y. Charlie Hu, Anthony Rowstron, Technical Report MSR-TR-2002-82 pp. 1-15, 2002.
A Scalable Content-Addressable Network Sylvia Ratnasamy, Paul Francis, Mark Handley, Richard Karp, Scott Shenker p. 1-17 Written by Vladimir Eske. Saarland University, Department of Computer Science, 2001.
A Scalable Content-Addressable Network, Sylvia Ratnasamy, et al, Copyright 2001, Aug. 27-31, 2001, San Diego, CA p. 161-172.
Tapestry: An Infrastructure for Fault-tolerant Wide-area Location and Routing, Ben Y. Zhao, et al., Computer Science Division, p. 1-27.
Conti, Marco, et al. "Towards Scalable P2P Computing for Mobile Ad Hoc Networks" Pervasive Computing and Communications Workshops, 2004. Proceedings of the Second IEEE Annual Conference on, Piscataway, NJ, Mar. 14, 2002, pp. 109-113.
Ganesan, Prasanna, et al. Canon in Go Major: Designing DHT's with Hierarchical Structure, Distributed Computing Systems, 2004 Proceedings, 24th International Conference on Hachioji, Tokyo, Japan, Mar. 24, 2004, pp. 263-272.
Cai, Min, et al. "MAAN: A Multi-Attributed Addressable Network for Grid Information Services" Grid Computing, 2003, Proceedings, Fourth International Workshop on Nov. 17, 2003, Piscataway, NJ, pp. 184-191.
Liu, Huaiyu, et al. "Neighbor Table Construction and Update in a Dynamic Peer-to-Peer Network" Proceedings of the 23rd International Conference on Distributed Computing Systems, ICDCS 2003. Providence, RI, May 19-22, vol. Conf. 23, May 19, 2003, pp. 509-518.
Seshadri, Mukund, "A Scalable Architecture for Broadcast Federation", http://www.cs.berkeley.edu/~mukunds/ms/citris/ms-report.pdf, Dec. 2002.
Krumm, John, et al., "The NearMe Wireless Proximity Server", UBI Comp 2004. The Sixth International Conference on Ubiquitous Computing, Sep. 7-10, 2004, Nottingham, England, http://research.microsoft.com/users/jckrumm/Publications%202004/nearme%20distribute.pdf.
Waldo, Jim, Sun Microsystems, Inc. "Constructing Ad Hoc Networks", pp. 9-20 2001 IEEE.
Berger Stefan, et al., "Towards Pluggable Discovery Frameworks for Mobile and Pervasive Applications", 12 pages 2004 IEEE.
Pertselakis, M., et al., "An Intelligent Agent based approach for Service Discovery in Wireless AD hoc Networks", 2002.
Gandhi, Rajiv, et al., "Minimizing Broadcast Latency and Redundancy in Ad Hoc Networks", 2003, pp. 222-232.
Li, Ning, et al., "BLMST: A Scalable, Power-Efficient Broadcast Algorithm for Wireless Networks", IEEE Computer Society, 2004.
Chen et al., "Enforcing Routing Consistency in Structured Peer to Peer Overlays: Should We and Could We?", 6 pages. 2006.
Gupta, Manish, "TPC-W E-Commerce Benchmark Using Javlin/ObjectStore", 6 pages, 2001.
Mendonga et al., "The Hierarchical Ring Protocol: An Efficient Scheme for Reading Replicated Data", Date: 1993, 33 pages.
Naef et al., "The blue-c Distributed Scene Graph", dated: 2003.
Consistancy-based Routing in Overlay Networks (1 page) http://www.actpress.com/Paperinfo.aspx?PaperID=16686.
Enforcing Routing Consistancy in Structured Peer to Peer Overlays: Should We and Could We? (6 pages) http://research.microsoft.com/asia/dload_files/group/system/2006/Chen-Cons06.pdf.
On the Consistancy of DHT-Based Routing (17 pages) http://www.eecs.berkeley.edu/-kjk/consistancy-rep.pdf.
Skonnard, Aaron, "Learn the ABCs of Programming Windows Communication Foundation" MSDN Magazine The Microsoft Journal for Developers, Feb. 2006, pp. 1-14.
Sun Microsystems, "Federeated Naming Service Programming Guide", Sep. 2002, 110 pages.
Triantafillou, "PLANES: The Next Step in Peer-to-Peer Network Architectures", Oct. 2, 2003, retrieved from http://www.celd.upatras.gr/faculty/peter/papers/ on Jan. 3, 2011.
Harvey et al., "SkipNet: A Scalable Overlay Network with Practical Locality Properties", Mar. 2003, Retrieved from http://research.microsoft.com/en-us/um/people/ssaroiu/publications/usits/2003/abstract.html on Jul. 2009.
Pietzuch et al., "Hermes: A Distributed Event-Based Middleware Architecture", Jul. 11, 2002, Retrieved from http://ieee.org.xpls/abs_all.jsp?arnumber=1030837 on Jul. 6, 2009.
"NoN-Greedy Routing Algorithms Are Optimal or Know thy Neighbor's Neighbor", Dec. 8, 2003, retrieved from http://citeseerx.ist.psu.edu/viewdoc/summary?doi=10.1.1.4.4688 on Aug. 12, 2010.
Tang; "GoCast: Gossip-Enhanced Overlay Multicast for Fast and Dependable Group Communication"—2005—pp. 1-10—http://www.cogsci.rochester.edu/~sarrmor/publications/GoCast-DSN05.pdf.
Choi; "D2HT: Directory Federation Using DHT to Support Open Scalability in Ubiquitous Network"—2005—pp. 1-5—http://ieeexplore.ieee.org/iel5/9593/30313/01392843.pdf?isNumber=.
Baldi; "A comparison of ring and tree embedding for real-time group multicast"—Jun. 2003—pp. 451-464—http://delivery.acm.org/10.1145/880000/874106/p451-baldi.pdf?key1=874106&key2=4662566811&coll=GUIDE&dl=GUIDE&CFID=31221611&CFTOKEN=81646820.
Garcia-Luna-Aceves; "A Multicast Routing Protocol for Ad-Hoc Networks"—1999—pp. 1-9—http://citeseer.ist.psu.edu/cache/papers/cs/11652/http:zSzzSzwww.cse.ucsc.eduzSzresearchzSzcrgzSzpublicationszSzmadruga.infocom99.pdf/garcia-luna-aceves99multicast.pdf.
Castro; "Proximity neighbor selection in tree-based structured peer-to-peer overlays"—2003—pp. 1-11—http://project-iris.com/irisbib/papers/proximity:mstr03/paper.pdf.

Garces-Erice; "MULTI+: Building Topology-Aware Overlay Multicast Trees"—2007—pp. 1-3—http://www.springerlink.com/content/dtbujud595f4ae6f/.
Wepiwe, Giscard, et al., A concentric Multi-ring Overlay for Highly Reliable P2P Networks, Proceedings of the 2005 Fourth IEEE International Symposium on Network Computing and Applications (NCA'05), 8 pages.
Cohen, Reuven, et al., "A New Protocol for Route Discovery in Multiple-Ring Networks: Part II—Multicast, Recovery and High-Speed Processing", IEEE Transactions on Communications, vol. 42, No. 2/3/4, Feb./Mar./Apr. 1994, pp. 1112-1119.
Wang, Guojun, et al., "A Proxy-based Mobile Group Membership Protocol for Large Scale and Highly Dynamic Groups", Jun. 2006, IEEE, pp. 1897-1902.
U.S. Appl. No. 10/956,472, mailed Aug. 9, 2007, Office Action.
U.S. Appl. No. 10/956,472, mailed Mar. 18, 2008, Office Action.
U.S. Appl. No. 10/956,472, mailed Jul. 29, 2008, Office Action.
U.S. Appl. No. 10/956,472, mailed Dec. 19, 2008, Office Action.
U.S. Appl. No. 10/956,472, mailed Jul. 9, 2009, Notice of Allowance.
U.S. Appl. No. 11/307,745, mailed Sep. 3, 2008, Office Action.
U.S. Appl. No. 11/307,745, mailed Feb. 11, 2009, Office Action.
U.S. Appl. No. 11/307,745, mailed Jun. 22, 2009, Office Action.
U.S. Appl. No. 11/307,745, mailed Oct. 22, 2009, Office Action.
U.S. Appl. No. 11/325,693, mailed Feb. 4, 2009, Office Action.
U.S. Appl. No. 11/325,693, mailed Aug. 10, 2009, Office Action.
U.S. Appl. No. 11/325,690, mailed Jan. 3, 2008, Office Action.
U.S. Appl. No. 11/325,690, mailed Jun. 2, 2008, Office Action.
U.S. Appl. No. 11/325,690, mailed Oct. 22, 2008, Notice of Allowance.
U.S. Appl. No. 11/325,691, mailed Mar. 3, 2009, Office Action.
U.S. Appl. No. 11/325,691, mailed Sep. 28, 2009, Notice of Allowance.
U.S. Appl. No. 11/325,693, mailed Dec. 23, 2009, Office Action.
U.S. Appl. No. 11/301,745, mailed Mar. 24, 2010, Office Action.
U.S. Appl. No. 11/325,693, mailed Aug. 16, 2010, Office Action.
U.S. Appl. No. 11/301,745, mailed Sep. 7, 2010, Office Action.
U.S. Appl. No. 11/325,693, mailed Feb. 1, 2011, Office Action.
U.S. Appl. No. 11/301,745, mailed Feb. 14, 2011, Office Action.
U.S. Appl. No. 12/556,429, mailed Mar. 3, 2011, Office Action.
U.S. Appl. No. 12/556,399, mailed Apr. 1, 2011, Office Action.
U.S. Appl. No. 11/301,745, mailed Jun. 27, 2011, Office Action.
U.S. Appl. No. 10/971,451, mailed Jun. 8, 2009, Office Action.
U.S. Appl. No. 11/016,446, mailed Sep. 25, 2007, Notice of Allowance.
U.S. Appl. No. 11/016,446, mailed Nov. 14, 2007, Notice of Allowance.
U.S. Appl. No. 11/220,756, mailed Apr. 2, 2009, Office Action.
U.S. Appl. No. 11/015,460, mailed Feb. 5, 2009, Office Action.
U.S. Appl. No. 11/015,460, mailed Jun. 15, 2009, Office Action.
U.S. Appl. No. 11/015,460, mailed Sep. 14, 2009, Notice of Allowance.
U.S. Appl. No. 11/016,422, mailed Oct. 1, 2008, Notice of Allowance.
U.S. Appl. No. 11/549,332, mailed May 7, 2009, Office Action.
U.S. Appl. No. 11/752,198, mailed Aug. 21, 2009, Office Action.
U.S. Appl. No. 11/428,146, mailed Mar. 16, 2009, Office Action.
U.S. Appl. No. 11/428,146, mailed Aug. 17, 2009, Office Action.
U.S. Appl. No. 11/465,316, mailed Jun. 24, 2009, Office Action.
U.S. Appl. No. 11/428,133, mailed Feb. 6, 2009, Office Action.
U.S. Appl. No. 11/428,133, mailed Jul. 13, 2009, Office Action.
U.S. Appl. No. 11/549,332, mailed Dec. 4, 2009, Notice of Allowance.
U.S. Appl. No. 11/465,316, mailed Dec. 23, 2009, Notice of Allowance.
U.S. Appl. No. 11/220,756, mailed Jan. 14, 2010, Office Action.
U.S. Appl. No. 11/752,198, mailed Feb. 17, 2010, Office Action.
U.S. Appl. No. 10/971,451, mailed Feb. 22, 2010, Office Action.
U.S. Appl. No. 11/220,756, mailed Jul. 20, 2010, Office Action.
U.S. Appl. No. 10/971,451, mailed Jul. 20, 2010, Office Action.
U.S. Appl. No. 11/428,146, mailed Aug. 16, 2010, Office Action.
U.S. Appl. No. 11/428,133, mailed Aug. 19, 2010, Office Action.
U.S. Appl. No. 12/611,825, mailed Oct. 8, 2010, Office Action.
U.S. Appl. No. 11/936,556, mailed Jul. 23, 2010, Office Action.

U.S. Appl. No. 11/220,756, mailed Nov. 23, 2010, Office Action.
U.S. Appl. No. 11/752,198, mailed Dec. 27, 2010, Notice of Allowance.
U.S. Appl. No. 10/971,451, mailed Dec. 30, 2010, Office Action.
U.S. Appl. No. 11/428,133, mailed Jan. 7, 2011, Office Action.
U.S. Appl. No. 11/220,756, mailed Mar. 17, 2011, Notice of Allowance.
U.S. Appl. No. 10/971,451, mailed Mar. 22, 2011, Office Action.
U.S. Appl. No. 12/611,825, mailed Mar. 23, 2011, Office Action.
U.S. Appl. No. 11/428,146, mailed May 9, 2011, Office Action.
U.S. Appl. No. 11/428,133, mailed May 9, 2011, Office Action.
U.S. Appl. No. 11/220,756, mailed May 10, 2011, Notice of Allowance.
U.S. Appl. No. 11/936,556, mailed Jun. 24, 2011, Notice of Allowance.
U.S. Appl. No. 12/556,429, mailed Oct. 6, 2011, Office Action.
U.S. Appl. No. 12/556,399, mailed Oct. 11, 2011, Office Action.
U.S. Appl. No. 12/491,841, mailed May 11, 2012, Office Action.
Notice of Allowance dated Jul. 23, 2012 cited in U.S. Appl. No. 13/221,635.
Notice of Allowance dated Jul. 12, 2012 cited in U.S. Appl. No. 12/556,399.
Pierson, Nick, Microsoft Windows Server 2003 R2, "Overview of Active Directory Federation Services in Windows Server 2003 R2", Oct. 2005, 20 pages.
Ahlgren, Bengt, et al., "A Node Identity Internetworking Architecture", Mar. 29, 2006, 6 pages.
Cluster Resources, "Moab Adaptive Computing Suite", 2010, 4 pages.
Narendula, Rammohan, et al., "Towards Access Control Aware P2P Data Management Systems", ACM International Conference Proceeding Series; vol. 360, Proceedings of the 2009 EDBT/ICDT Workshops, 2009, 8 pages.
Notice of Allowance dated Jun. 2, 2012 cited in U.S. Appl. No. 12/556,429.
Notice of Allowance dated Apr. 26, 2012 cited in U.S. Appl. No. 11/325,693.
Notice of Allowance dated Sep. 14, 2011 cited in U.S. Appl. No. 11/428,146.
Notice of Allowance dated Sep. 14, 2011 cited in U.S. Appl. No. 11/428,133.
Office Action dated Dec. 22, 2011 cited in U.S. Appl. No. 13/221,635.
Office Action dated Mar. 7, 2012 cited in U.S. Appl. No. 13/155,098.
Notice of Allowance dated Jul. 10, 2012 cited in U.S. Appl. No. 13/155,098.
Notice of Allowance dated Nov. 7, 2012 cited in U.S. Appl. No. 12/491,841.
Notice of Allowance dated Dec. 5, 2012 cited in U.S. Appl. No. 13/155,113.
Office Action dated Mar. 29, 2013 cited in U.S. Appl. No. 13/599,742.
U.S. Appl. No. 13/599,681, mailed Dec. 24, 2012, Office Action.
U.S. Appl. No. 13/599,681, filed Aug. 30, 2102, Kakivaya.
U.S. Appl. No. 13/599,742, filed Aug. 30, 2012, Kakivaya.
Banerjee et al. "Scalable Peer Finding on the Internet", Department of Computer Science, University of Maryland, College Park, Conference Publications of Global Telecommunications Conference, Nov. 2002, vol. 3, pp. 1-5. Retrieved online: <<http://pages.cs.wisc.edu/~suman/pubs/gi.o2.pdf>>.
Ben Y. Zhao et al., "Tapestry: An Infrastructure for Fault-Tolerant Wide-Area Location and Routing", University of California, Berkeley, Computer Science Division, Apr. 2001, pp. 1-28.
Bosneag et al., "Consistency-Based Routing in Overlay Networks", Proceedings of the IASTED International Conference, Feb. 2004, pp. 1-6. Retrieved at: <<http://www.actpress.com/Paperinfo.aspx?PaperID=16686>>.
Kannan et al., "On the Consistency of DHT-Based Routing", Technical Report No. UCB/EECS-2007-22, Jan. 2007, pp. 1-16. Retrieved at: <<http://www.eecs.berkeley.edu/Pubs/TechRpts/2007/EECS-2007-22.pdf>>.
Office Action dated Jun. 19, 2013.
Office Action dated Jul. 15, 2013.

* cited by examiner

500

501
Detecting A Component Request To Optimize Access To One Or More Ring Infrastructure Resources Associated With The Component On The Ring Of Nodes So As To Reduce Inter-node Communication Between Nodes On The Ring Of Nodes

502
Determining That At Least One Of The Hosting Location Of And An Access Location For An Associated Ring Infrastructure Resource, Selected From Among The One Or More Ring Infrastructure Resources, Is Not Optimized On The Ring Of Nodes Based On One Or More Users Of The Component Having A Common Interest In The Associated Resource

503
Indicating That The At Least One Of The Hosting Location Of And The Access Location For The Associated Ring Infrastructure Resource On The Ring Of Nodes Is To Be Optimized To Reduce Inter-node Communication Costs Between Nodes On The Ring Of Nodes In Response To The Component Request

*Figure 5*

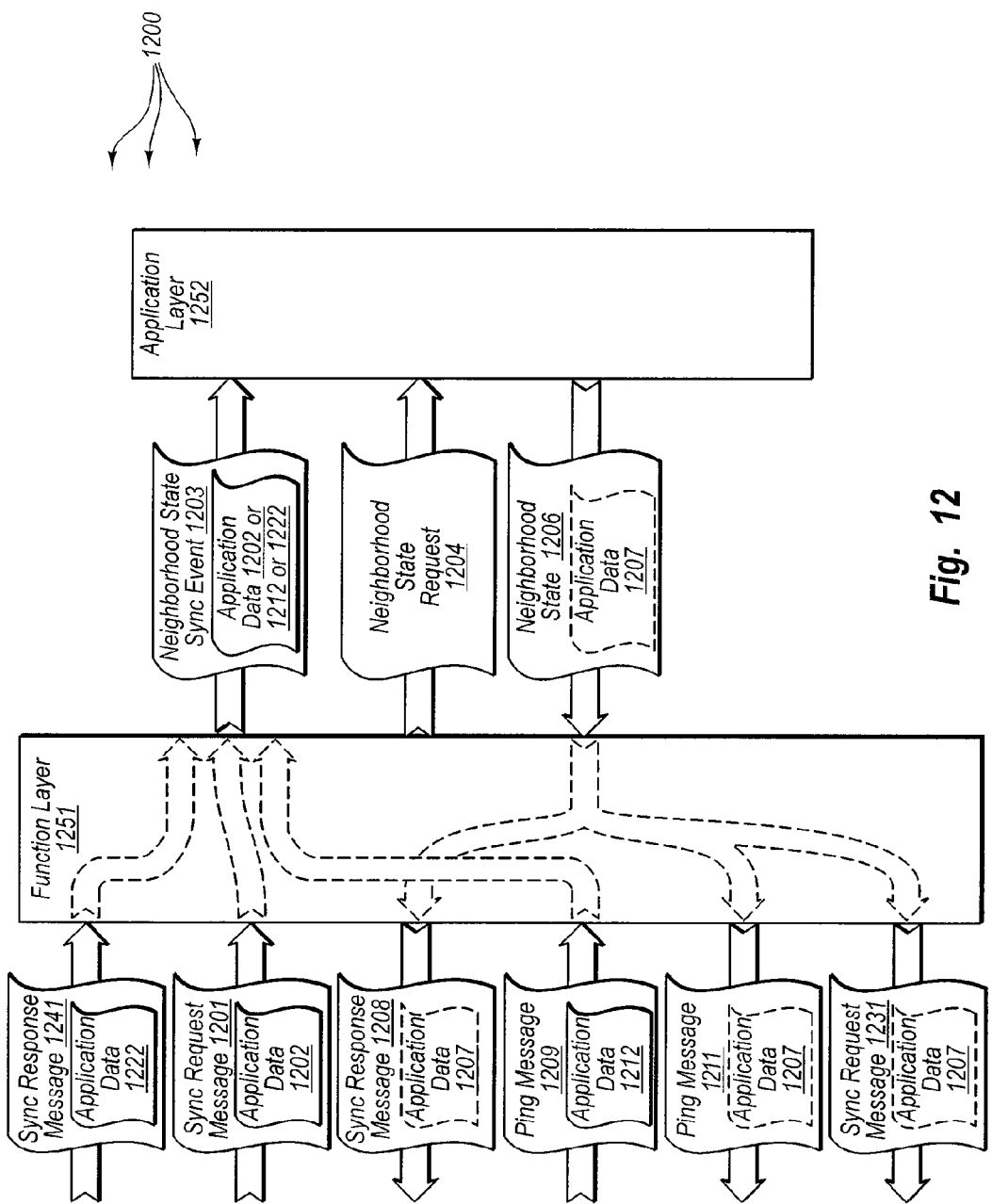

OPTIMIZING ACCESS TO FEDERATION INFRASTRUCTURE-BASED RESOURCES

CROSS-REFERENCE TO RELATED APPLICATIONS

This application is a continuation-in-part of U.S. patent application Ser. No. 10/971,451, filed Oct. 22, 2004, and entitled "Rendezvousing Resource Requests With Corresponding Resources", which is herein incorporated by reference in its entirety. This application is a continuation-in-part of U.S. patent application Ser. No. 11/936,556, filed Nov. 7, 2007, and entitled "Data Consistency Within A Federation Infrastructure", which is herein incorporated by reference in its entirety. This application is a continuation-in-part of U.S. patent application Ser. No. 12/556,399, filed Sep. 9, 2009, and entitled "Organizing Resources Into Collections To Facilitate More Efficient And Reliable Access", which is herein incorporated by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Some network environments include a federation infrastructure (e.g., a ring) of federated nodes. The federation infrastructure, or at least a component of, can provide a hosting environment for applications and/or services that have clients outside of the hosting environment (or "external clients"). In these and other similar hosting environments, stateful resources (e.g., a ring node id ownership token) may be shared across a plurality of external clients.

However, external clients often have no indication of the configuration of nodes within the hosting environment. For example, external clients are typically unaware of the actual node hosting a resource they may need. Thus, when external clients initiate communication with the host environment, for example, to request a resource, they typically do so through a random node (sometimes referred to as an "entrée node"). The entrée node then routes stateful resource related messages within the host environment (possibly over multiple hops) towards the node hosting the requested resource. Among other things, routing of stateful resource related messages within the hosting environment results in inefficient use of hosting environment resources.

BRIEF SUMMARY

The present invention extends to methods, systems, and computer program products for optimizing access to federation infrastructure-based resources. Embodiments of the invention including optimizing access to a ring infrastructure resource. In some embodiments, a user request to access a ring infrastructure resource is received. The user request is sent from a requesting user component.

It is detected that the user request is not directed to an optimized location for accessing the ring infrastructure resource within the ring infrastructure based on characteristics of the requesting user component. An indication of an appropriately optimized location for the requesting user component to access the ring infrastructure resource is sent based on the characteristics of the requesting user component.

In other embodiments, a ring infrastructure detects a component request. The component request is for optimizing access to one or more ring infrastructure resources associated with a component on a ring of nodes. The optimized access is to reduce inter-node communication between nodes on the ring of nodes.

It is determined that at least one of the hosting location of and an access location for an associated ring infrastructure resource, selected from among the one or more ring infrastructure resources, is not optimized on the ring of nodes. The determination that the hosting location is not optimized is based on one or more users of the component having a common interest in the associated resource. It is indicating that at least one of the hosting location of and the access location for the associated ring infrastructure resource on the ring of nodes is to be optimized to reduce inter-node communication costs between nodes on the ring nodes in response to the component request.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a flow chart of an example method for configuring optimized access to federation infrastructure-based resources.

FIG. 12 illustrates an example of a message model and related processing model.

DETAILED DESCRIPTION

Figure 1A:
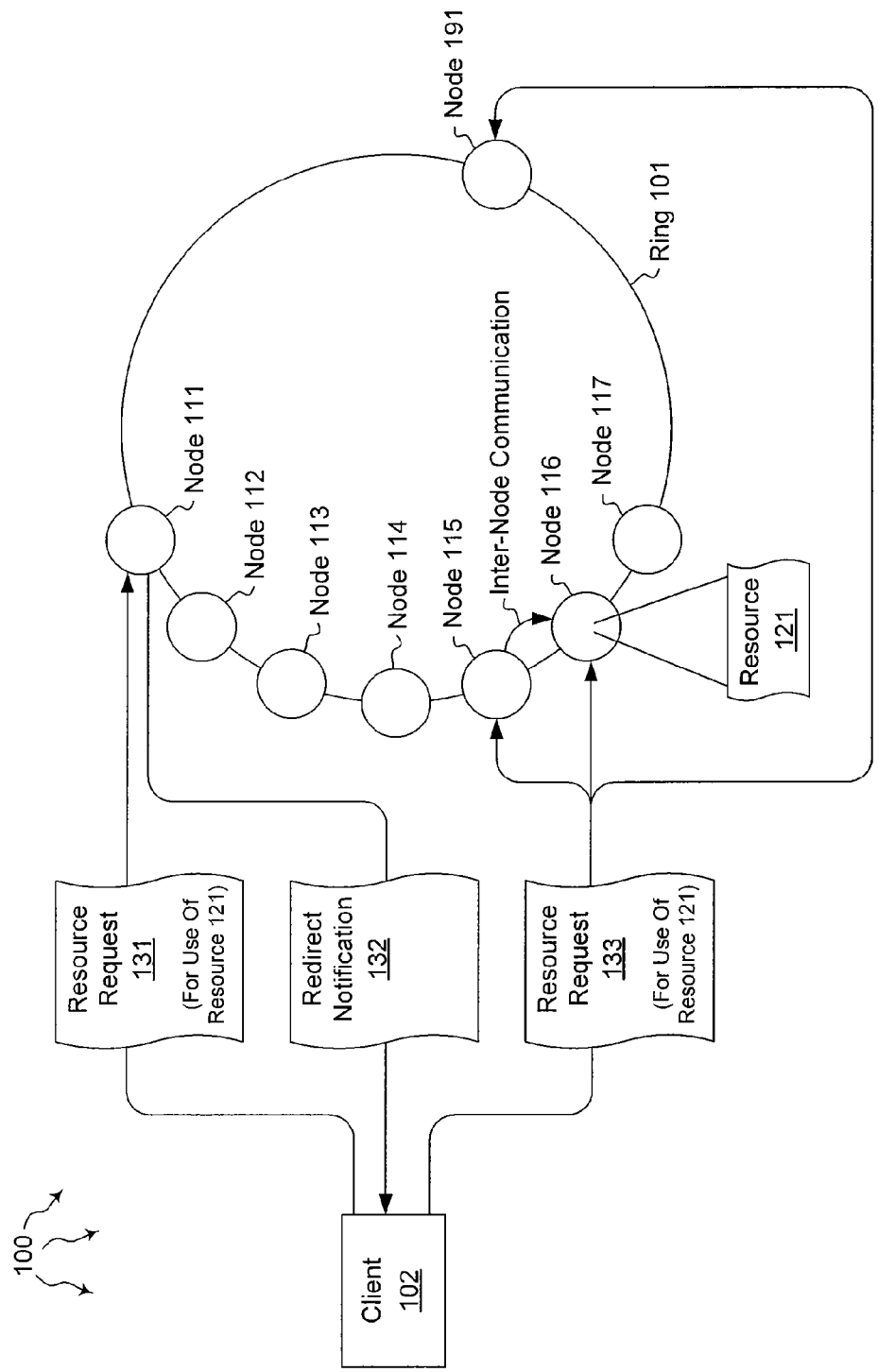
FIGS. 1A and 1B illustrate an example federation infrastructure that facilitates providing optimized access to federation infrastructure-based resources.

The present invention extends to methods, systems, and computer program products for optimizing access to federation infrastructure-based resources. Embodiments of the invention including optimizing access to a ring infrastructure resource. In some embodiments, a user request to access a ring infrastructure resource is received. The user request is sent from a requesting user component.

It is detected that the user request is not directed to an optimized location for accessing the ring infrastructure resource within the ring infrastructure based on characteristics of the requesting user component. An indication of an appropriately optimized location for the requesting user component to access the ring infrastructure resource is sent based on the characteristics of the requesting user component.

In other embodiments, a ring infrastructure detects a component request. The component request is for optimizing access to one or more ring infrastructure resources associated with a component on a ring of nodes. The optimized access is to reduce inter-node communication between nodes on the ring of nodes.

It is determined that at least one of the hosting location of and an access location for an associated ring infrastructure resource, selected from among the one or more ring infrastructure resources, is not optimized on the ring of nodes. The determination that the hosting location is not optimized is based on one or more users of the component having a common interest in the associated resource. It is indicating that at least one of the hosting location of and the access location for the associated ring infrastructure resource on the ring of nodes is to be optimized to reduce inter-node communication costs between nodes on the ring nodes in response to the component request.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "node" is defined as one or more software modules, one or more hardware modules, or combinations thereof, that work together to perform operations on electronic data. For example, the definition of a node includes the hardware components of a personal computer, as well as software modules, such as the operating system of the personal computer. The physical layout of the modules is not important. A node can include one or more computers coupled via a network. Likewise, a node can include a single physical device (such as a mobile phone or Personal Digital Assistant "PDA") where internal modules (such as a memory and processor) work together to perform operations on electronic data. Further, a node can include special purpose hardware, such as, for example, a router that includes special purpose integrated circuits.

Within this description and the following claims, a "resource" is defined as electronic data that is consumable at, or may be acted upon by, a computer system, such as, for example, a client, a communication intermediary, or a node. A non exhaustive list of examples of resources includes files, devices, databases, data packets, electronic messages, data fields, as well as portions thereof. Resource is also defined to include identifiers within an identifier space, such as, for example, node identifiers used to identify nodes within a federation infrastructure identifier space.

In this description and in the following claims, a "resource descriptor" is defined as a data structure (e.g., formatted in accordance with a resource descriptor schema) describing a resource.

In this description and in the following claims, a "namespace" is defined as scoping mechanism for breaking up resources (e.g., all the resources on the Internet) into portions over which resolution, discovery, and message routing can be performed. Namespaces are extensible such that new scopes can be defined and individual scopes can be hierarchical.

Figure 1B:
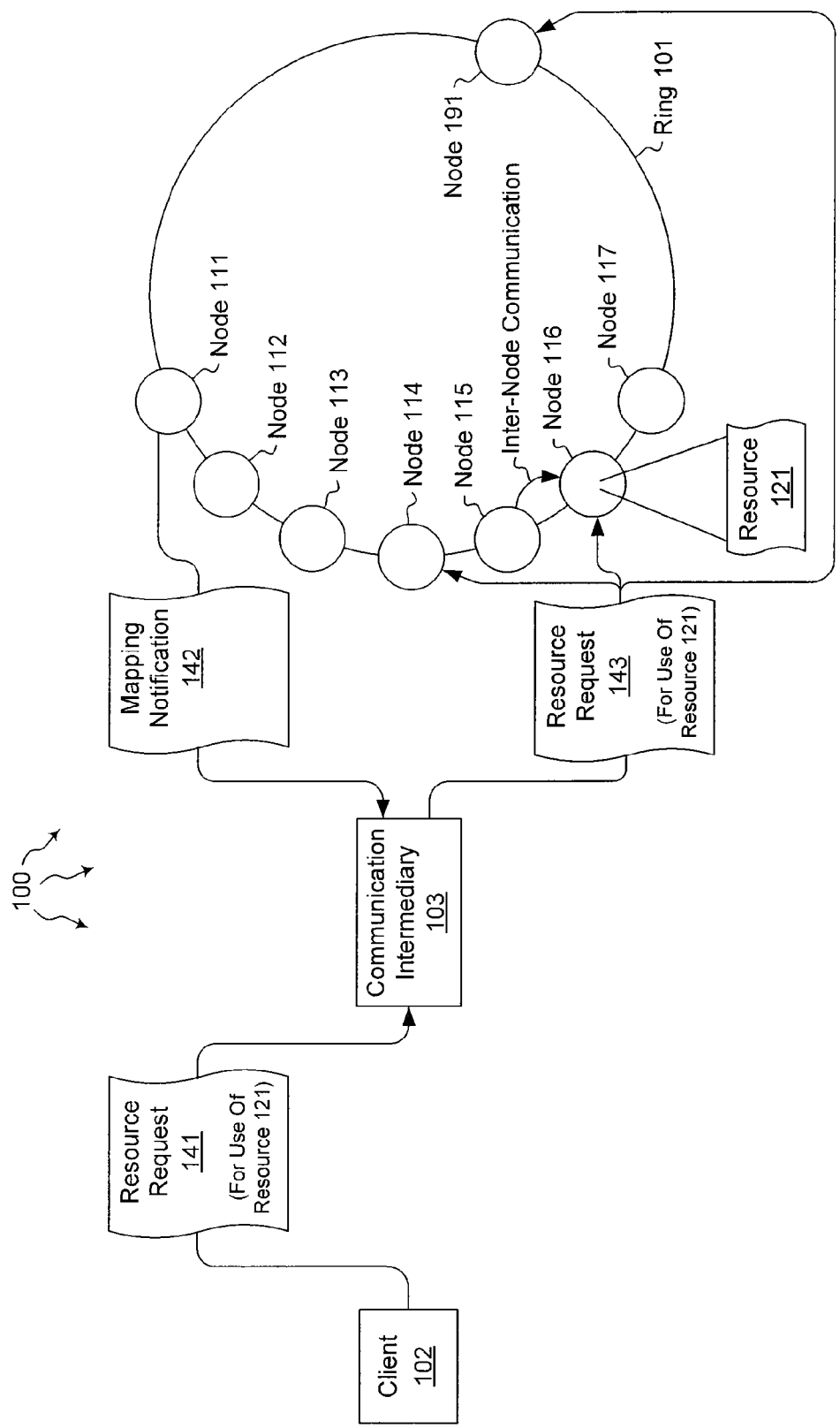

FIGS. 1A and 1B illustrate an example federation infrastructure 100 that facilitates providing optimized access to federation infrastructure-based resources. Referring to FIG. 1, federation infrastructure 100 includes ring 101 and client 102. Ring 101 and client 102 can be connected to one another over (or is part of) a network, such as, for example, a Local Area Network ("LAN"), a Wide Area Network ("WAN"), and even the Internet. Accordingly, ring 101 and client 102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted in FIG. 1A, ring 101 includes a plurality of nodes, such as, for example, nodes 111-117, that have federated together based on a variety of possible federating partnerships. Generally, nodes can utilize federation protocols to form partnerships and exchange information (e.g., state information related to interactions with other nodes). The formation of partnerships and exchange of information facilitates more efficient and reliable access to resources.

Other intermediary nodes (not shown) can exist before, after, and in between nodes 111-117. Thus, a message routed, for example, between node 111 and node 116, can be pass through one or more of the other intermediary nodes. In some embodiments, nodes are federated among one another as peers without a root node. Each node has a corresponding node ID.

As described in further detail below, nodes can federate to form consistent federations as well as best effort federations. Also as described in further detail below, namespace management services can be used to organize resources into collections, potentially providing resource access through a plurality of namespaces.

Client 102 can be a computer system external to ring 101 that requests access to resources hosted within ring 101. Client 102 can know how to communicate with one or more (but potentially not all) of the nodes of ring 101. Thus generally, client 102 can rely on federation protocols used within ring 101 to have communication routed to an appropriate node.

For example, client 102 may be aware of an entrée node into ring 101 as well as a resource name of a resource within a namespace. As such, client 102 can submit the resource name to the entrée node. The entrée node can then utilize federation protocols within ring 101 to route a message to the node hosting the named resource.

In some embodiments, nodes maintain processing information for providing optimized access to federation infrastructure-based resources. For example, for a specified resource, a node on ring 101 can maintain information associating the specified resource with another node on ring 101. The other node may be the node that hosts the specified resource. Alternately, the other node may be a node that, when contacted, results in reduced inter-ring communication cost to route a message to the node hosting the specified resource. For example, requesting a resource from a node that has the hosting node for the resource in its neighborhood set results in less inter-ring communication than requesting a resource from a node that is not natively aware of the existence of the hosting node (i.e., the node relies on federation protocols to make program towards the hosting node).

A node can store various different types and instances of processing information. Processing information can include redirection information, class of service information, priority information, etc. How to optimize any of the hosting location of a resource, access locations to a resource, and an appropriate entrée node for a request for a resource can determined based on available processing information in combination with characteristics of a requesting entity and/or a request. Characteristics of a requesting entity and/or a request include: client characteristics, network diagnostic information, federation infrastructure information, resource characteristics, application characteristics, date, time, etc. For example, a "premium" client may be redirected to a hosting node for a resource. However, other clients may be redirected to a node some number of routing hops away from the hosting node for the resource.

The optimization algorithms used for optimization can be of arbitrary complexity. Algorithms can include various transforms that transform an incoming message into zero or more outgoing messages forwarded to entrée nodes. For example, optimization algorithms can utilize processing information in combination with entity characteristics and/or request characteristics to transform a destination address in a received message into zero or more different destination addresses for inclusion in corresponding outgoing messages.

As depicted in FIG. 1B, federation infrastructure 100 can also include communication intermediary 103. Communication intermediary 103 can be a proxy or other similar device that acts on behalf of external clients to communicate with ring 101. Communication intermediary 103 can forward client requests to nodes of ring 101. Communication intermediary 103 can also return resources form ring 101 back to external clients.

In some embodiments, communication intermediary 103 communicates with ring 101 in response to client requests. In other embodiments, communication intermediary 103 initiates communication with and/or receives communicates from ring 101 (whether or not it has received any client requests). For example, nodes of ring 101 may from time to time push processing information out to communication intermediary 103. Alternately, a request/reply mechanism can be used. Communication intermediary 103 can send a request to a node on ring 101. In response, the ring can be return processing information back to communication intermediary 103.

Communication intermediary 103 can maintain a cache of processing information for one or more specified resources. When a resource request is received, communication intermediary 103 can check the cache to determine if an optimized location for accessing the resource is in the cached processing information. When an optimized location is found, communication intermediary 103 can direct the client request to the optimized location(s) as need. For example, if the request is not already directed to the optimized location, communication intermediary 103 can adjust the request to be sent to the optimized location. When adjusting a client request, communication intermediary 103 may or may not notify a client that its request was adjusted. Further, communication intermediary 103 may or may not indicate the utilized processing information to clients.

Figure 4:
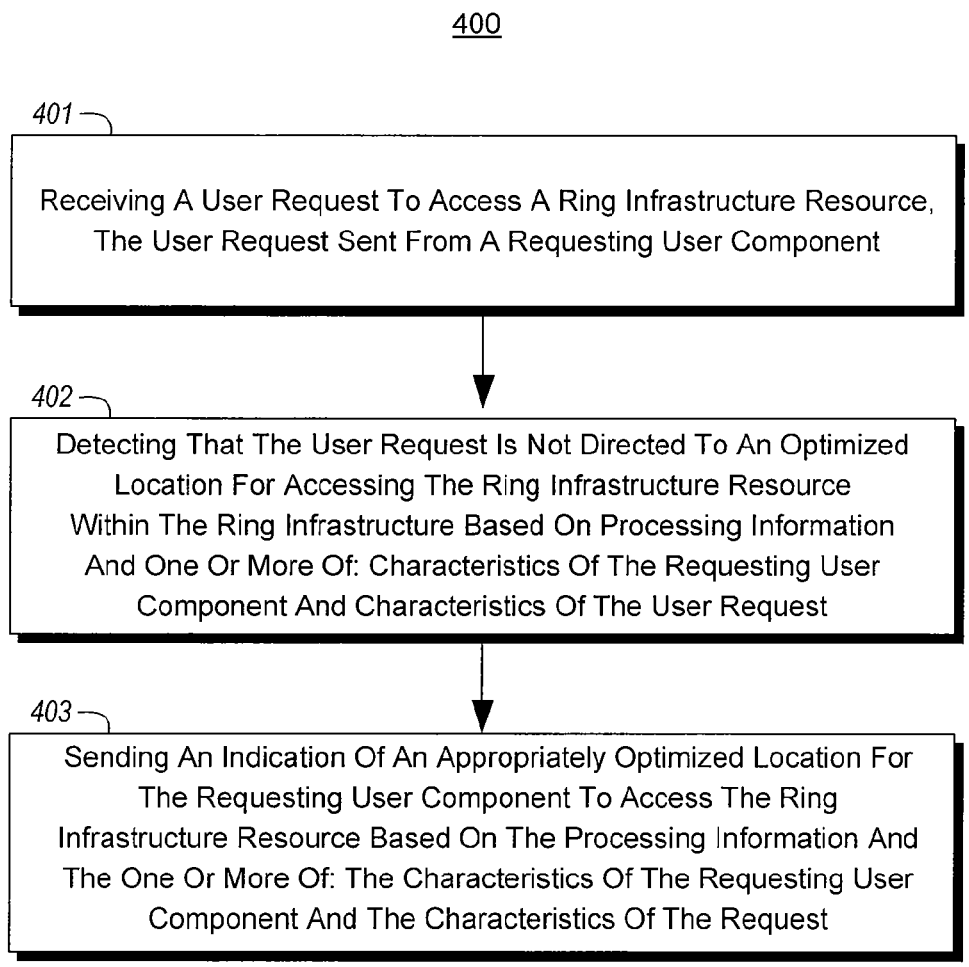
FIG. 4 illustrates a flow chart of an example method for providing optimized access to federation infrastructure-based resources.

FIG. 4 illustrates a flow chart of an example method 400 for providing optimized access to federation infrastructure-based resources. Method 400 will be described with respect to the components and data of computer architecture 100.

Method 400 includes an act of receiving a user request to access a ring infrastructure resource, the user request sent from a requesting user component (act 401). For example, referring to FIG. 1A, client 102 can send resource request 131 to node 111. Node 111 can receive resource request 131 from client 102. Resource request 131 can be a request to access resource 121 (e.g., a node identifier used to identify a node within federation infrastructure 100). Resource request 131 can include a namespace path or other data identifying resource 121. A client can request access to a resource so that the client can take some action on the resource, such as, for example, extracting data from, editing, or deleting the resource.

Method 400 includes an act of detecting that the user request is not directed to an optimized location for accessing the ring infrastructure resource within the ring infrastructure based on processing information and one or more of: characteristics of the requesting user component and characteristics of the user request (act 402). For example, node 111 can refer to stored processing information to determine that request 131 is not directed to an optimized location to access resource 121 based on the characteristics of client 102 and/or of request 131. As such, node 111 can identify an appropriately optimized location for client 102 to communicate with (e.g., an appropriate entrée node) from the stored processing information. For example, node 111 can utilize various optimization algorithms to transform a destination address in request 131 into zero or more different destination addresses for inclusion in other corresponding requests.

Processing information can be stored locally at a node and/or can be stored in some other location accessible to one or more nodes.

Method 400 includes an act of sending an indication of an appropriately optimized location for the requesting user component to access the ring infrastructure resource based on the processing information and the one or more of the characteristics of the requesting user component and the characteristics of the user request (act 403). For example, node 111 can send redirect notification 132 to client 102. Redirect notification 132 can include the optimized location for accessing resource 121. The optimized location can be a destination address for inclusion in a further request for resource 121.

In some embodiments, the appropriate optimized location for accessing a resource is the node that hosts the resource. For example, redirect notification 132 can indicate that client 102 is to request access to resource 121 from node 116 (and can include a destination address for node 116). In response to receiving redirect notification 132, client 102 can send resource request 133 to node 116. Node 116 can receive resource request 133 from client 102. Resource request 133 can be a request to access resource 121. Resource request 133 can include a namespace path or other data identifying resource 121. Node 116 can refer to stored processing information as well as one or more of: characteristics of client 102 and/or of request 133 to determine that node 116 is the optimized location to access resource 121. In response, node 116 can return access to resource 121 to client 102.

In other embodiments, the appropriate optimized location for accessing a resource is a node other than the node that hosts the resource. For example, redirect notification 132 can indicate that client 102 is to request access to resource 121 from node 115 (and can include a destination address for node 115). In response to receiving redirect notification 132, client 102 can send resource request 133 to node 115. Node 115 can receive resource request 133 from client 102. Node 115 can refer to stored processing information as well as one or more of: characteristics of client 102 and/or of request 133 to determine that node 115 is the optimized location to access resource 121 based on the characteristics of client 102.

Accordingly, node 115 accepts resource request 133. Node 115 then uses inter-ring communication (e.g., federation protocols) to send further messages based on resource request 133 to node 116. Upon inter-ring communication reaching node 116, node 116 can return access to resource 121 to client 102.

In further embodiments, redirect notification 132 can indicate that client 102 is to request access to resource 121 from some other node (e.g., node 191) of ring 101. In response to receiving redirect notification 132, client 102 can send resource request 133 to the other node. The other node can receive resource request 133 from client 102. The other node can refer to stored processing information (either stored locally at the node or stored at some other location) as well as one or more of: characteristics of client 102 and/or of request 133 to determine that it is the optimized location to access resource 121.

Accordingly, the other node accepts resource request 133. The other node then uses inter-ring communication (e.g., federation protocols) to send further messages based on resource request 133 to node 116. The inter-ring communication can include using routing protocols to perform one or more routing hops within ring 101. Upon inter-ring communication reaching node 116, node 116 can return access to resource 121 to client 102.

Referring now to FIG. 1B, client 102 can send resource request 141 to some communications endpoint (e.g., a node on ring 101) based on an electronic address. On the path to the communications endpoint, resource request 141 can pass through communication intermediary 103. For example when an IP packet is addressed to a given destination IP address, the IP packet may pass through one or more routers (which are to some degree transparent to each end of the end-to-end communication) along the path to the communications endpoint. Resource request 141 can include a namespace path or other data identifying resource 121. From the namespace path and/or other data, communication intermediary 103 can determine that request 141 is a request to access resource 121.

Communication intermediary 103 can referred to cached processing information to determine if request 141 is directed to an appropriately optimized location to access resource 121. When communication intermediary 103 lacks processing information to make the determination, communication intermediary 103 can query a node of ring 101 for further processing information. From time to time, nodes of ring 101 can also push processing information to communication intermediary 103. For example, in response to a query or at a designate time, node 111 can send mapping notification 142 to communication intermediary 103. Mapping notification 142 can include processing information for determining appropriately optimized locations for requesting access to resource 121. Push mechanisms can also be used in combination with other triggering mechanisms for transferring processing information.

From mapping notification 142, communication intermediary 103 can determine an appropriate optimized location for accessing resource 121. The appropriately optimized location can be node 116, node 115, or some other node. Communication intermediary 103 can then send resource request 143 to the appropriately optimized location. Upon receiving request 143 or inter-ring communication representing request 143, node 116 can return access to resource 121 back to communication intermediary 103. Communication intermediary 103 can forward access to resource 121 back to client 102. Alternately, node 116 can return access to resource 121 directly back to client 102.

Redirection notifications and mapping notifications can be requested and/or sent using request reply protocols, such as, for example, Hypertext Transfer Protocol ("HTTP"), or using other custom protocols. Components external to ring 101, such as, for example, client 102 and/or communication intermediary 103, can be external client-side hosted application/service components, external client-side federation infrastructure components, or an underlying communications/routing infrastructure transparent to a client. External communications/routing infrastructure can be contained within a data center and/or may be an Internet overlay network, such as, for example, components within the Internet itself.

Figure 2:
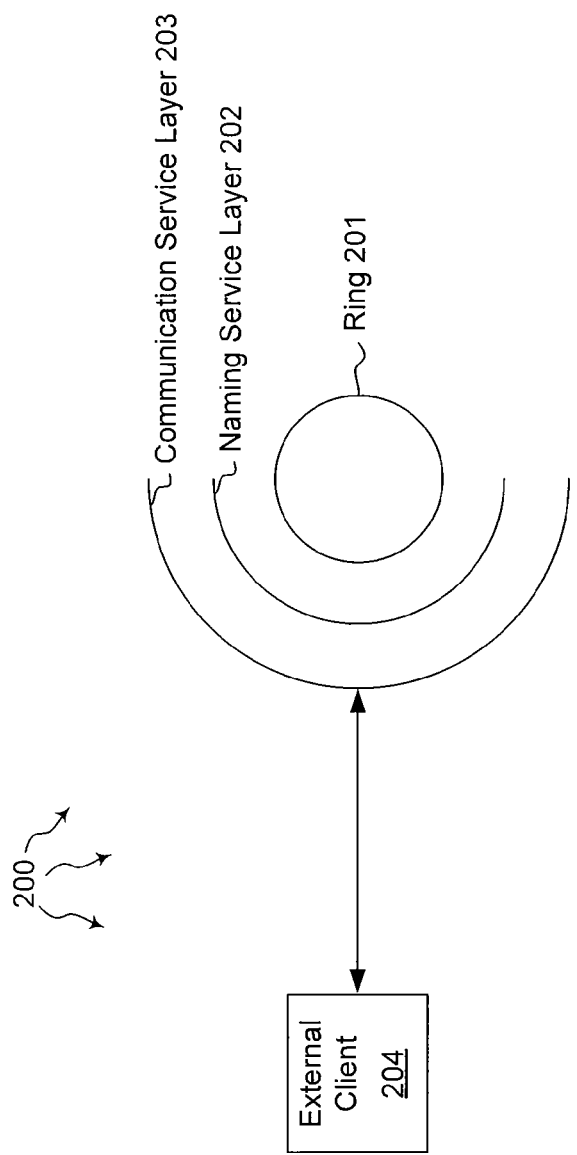
FIG. 2 illustrates an example of different layers within a federation infrastructure.

In some embodiments, a federation infrastructure includes a plurality of different layers providing different functions to a ring of nodes. FIG. 2 illustrates an example of different layers within a federation infrastructure 200. As depicted, federation infrastructure 200 includes ring 201, naming service layer 202, communication service layer 203, and external client 204. Similar to ring 101, ring 201 can include a plurality of nodes that have federated together using one or more possible federating partnerships. Naming service layer 202 converts between namespace paths and node ids for nodes on ring 201. Communication service layer 203 implements communication abstractions to convert between communication with external clients and inter-ring communication within ring 201. External client 204 can be any component as previously described.

A component at any layer, including within ring 201, can signal a location event change event to ring 201. For example, a federation infrastructure membership component can signal location change events, including node Id ownership changed and node Id range ownership changed. A federation infrastructure storage component can signal location change events through the use of a ring dictionary data structure distributed across the ring's nodes. A federation infrastructure naming service can signal location change events for a given branch of a namespace including node Id ownership changed and node Id range ownership changed. A federation infrastructure communication component can signal location change events for named groups implemented via a naming service. These and other location change events can be implemented in consistent federations as well as in best effort federations.

A location change event can instruct ring 201 to adjust the hosting location and/or optimized access location for a resource. In response to a location change event, the hosting location of and/or optimized access location for a resource can be changed. In response to a location change event, nodes within ring 201 can also update stored processing information for a resource. In some embodiments, stored processing information is updated even though a hosting location is not changed. For example, in response to a node failure or addition of a new node, an optimized access location can change even when a resource remains hosted at the same location.

Figure 3:
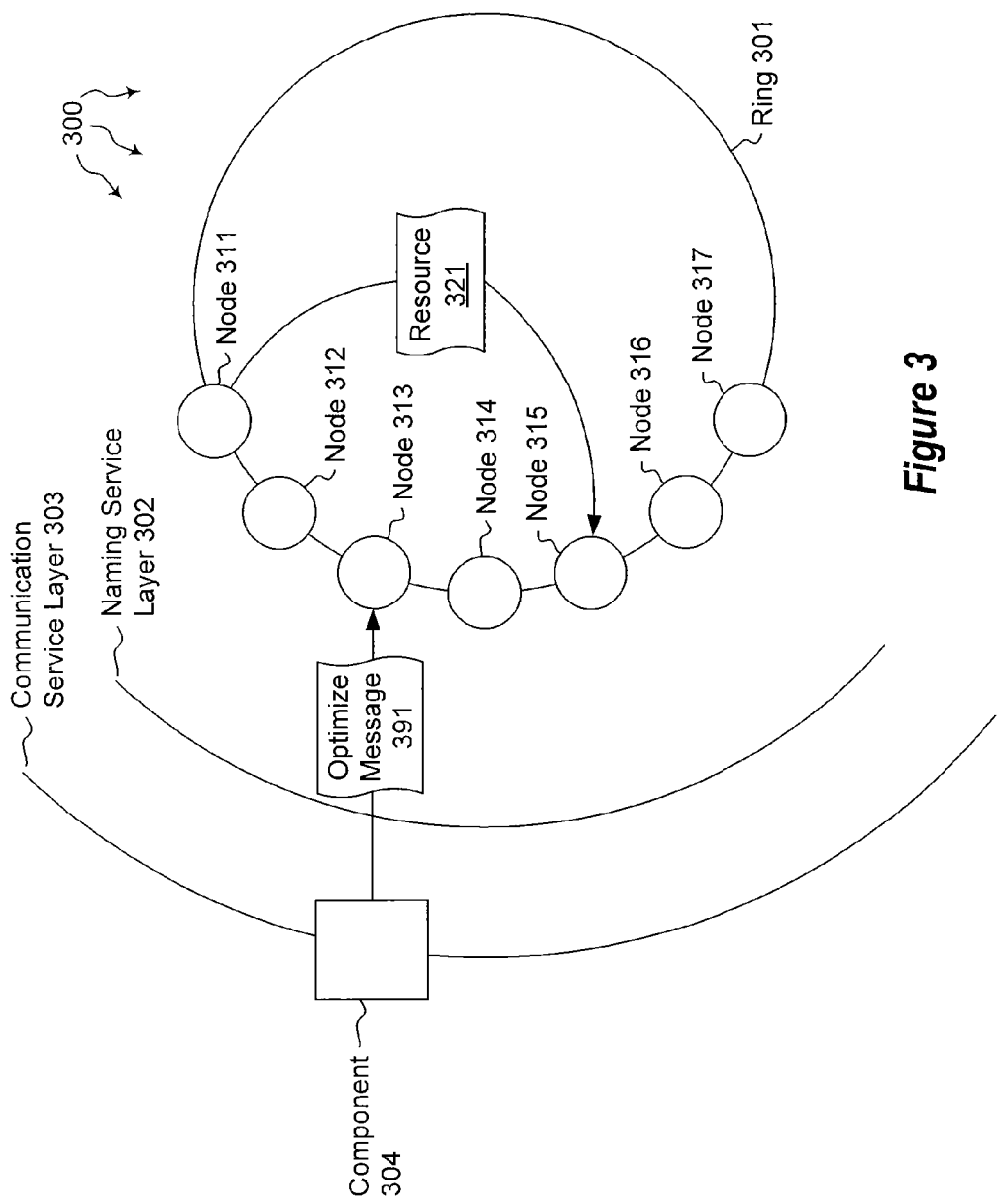
FIG. 3 illustrates an example federation infrastructure that facilitates optimizing a hosting location for a federation infrastructure-based resource.

FIG. 3 illustrates an example federation infrastructure 300 that facilitates optimizing a hosting location for a federation infrastructure-based resource. As depicted, federation infrastructure 300 includes ring 301, naming service layer 302, and communication service layer 303. Component 304 resides at communication service layer 303. Ring 301 includes nodes 311-317 along with one or more other nodes that have federated together using one or more possible federating partnership.

FIG. 5 illustrates a flow chart of an example method 500 for configuring optimized access to federation infrastructure-based resources. Method 500 will be described with respect to the components and data of federation architecture 300.

Method 500 includes an act of detecting a component request to optimize access to one or more ring infrastructure resources associated with the component on the ring of nodes so as to reduce inter-node communication between nodes on the ring of nodes (act 501). For example, component 304 can send optimize message 311 to node 313. Optimize message 391 can be a request to optimize access to resource 321. Node 313 can receive optimize message 391. Optimize message 391 is a request to optimize access to one or more resources associated with ring 301, including resource 321. Optimizing access to resource 321 can reduce inter-node communication between nodes on ring 301.

Method 500 includes an act of determining that at least one of a hosting location of and an access location for an associated ring infrastructure resource, selected from among the one or more ring infrastructure resources, is not optimized on the ring of nodes based on one or more users of the component having a common interest in the associated resource (act 502). For example, node 313 can determine that the hosting location and/or an access location for resource 321 is not optimized on ring 301 based on one or more external clients having an interest in resource 321. A hosting location may not be optimized if another hosting location can be used to reduce inter-ring communication for accessing the resource. An access location may not be optimized (for one or more components) if another access location can be used to reduce inter-ring communication for accessing the resource. A non-optimized access location can take into account various factors, such as, client characteristics, network diagnostic information, federation infrastructure information, resource characteristics, application characteristics, date, time, etc.

Method 500 includes an act of indicating that the at least one of the hosting location of and the access location for the associated ring infrastructure resource is to be optimized on the ring of nodes to reduce inter-node communication costs between nodes on the ring nodes in response to the component request (act 503). For example, ring 301 can indicate that at least one of the host location and an access location for resource 321 is to be optimized. The host location of resource 321 can then be moved from node 311 to node 315. Alternately or in combination, ring 301 can indicate that access locations for one or more clients (not shown) that request access to resource 321 are also to be optimized. Optimization of access locations can take into account various factors, such as, client characteristics, request characteristics, network diagnostic information, federation infrastructure information, resource characteristics, application characteristics, date, time, etc.

In some embodiments, stateful and uniquely identifiable entities are hosted/owned (part of) by an application system (e.g., 303/304). The entities can be associated with (e.g., interested in, having an affinity to, etc.) at least one resource in a federation infrastructure (e.g., in name service layer 302 or ring 301). For example, communication service layer 303 can maintain unique state, such as, for example, application context, for each of its external client connections that sourcing or sinking messages to/from a given name (i.e., the resource). Communication service layer 304 can indicate (via 301) that the unique state, or application context, is to be hosted optimally for at least one resource. Naming service layer 302 can then, from time to time, indicate back up to communication service layer 303 that the unique state, or application context, is to be moved to a different node to maintain appropriate cost with name service layer 302 and/or ring 30

Thus, an application system, such as, for example, communication service layer 303, can indicate (e.g., via optimization request 391) that at least one of its application contexts has an affinity to at least one resource (e.g., resource 321) hosted within federation infrastructure 300. The resource can be hosted at another component of, or hosted by, federation infrastructure 300, such as, for example, at naming service layer 302 or ring 301. Subsequently, the lower layer (301 and/or 302) can source an event to the application system (303) indicating that the at least one application context is to be hosted on a different node.

Accordingly, embodiments of the invention include an overlay ring node API that indicates node ownership id changes. A hosted distributed ring dictionary rejects requests that are for a data element which the current node is not the primary (owner).

A naming service can indicate to application context with an explicit namespace graph-node affinity is to be hosted (in what node) in order to be co-located with a subject name. At least one optimal location can be indicated as a result. Qualified forms of naming operations can be rejected by naming service layer 302 if the application context is not hosted in an optimal machine. Accordingly, rejections indicate at least one optimal hosting location.

In some embodiments, a group communications component (e.g., supporting communication service layer 303 and naming service layer 302 for named group registry and discovery) signals communication service layer 303 when a named-group communication endpoint is not optimally placed within the current host machine. A hosted application/service uses such a signal to further indicate to its external clients that further communications must be redirected to another external communications endpoint. The external indication can be transferred using private protocol messages between the hosted application/service server-side component and its client-side component or, for example, using HTTP redirect responses.

As such, an application service hosted within the hosting federation infrastructure is informed when ownership of a node id or range of node ids changes. In response, the hosted application/service redirects external traffic to the new owner ring node's machine of the subject node id or node id range. This can occur within a consistent or best effort federation infrastructure.

Further, an application/service can be hosted within a federation infrastructure that additionally provides a storage component that supports generation of location change-events to the hosted application/service when ownership of a subject data resource's hosting ring node changes. Additionally, such a hosted application/service can use these location change-events to redirect external client traffic to the machine of the new owning ring node of the subject data resource.

An application/service can also be hosted within a hosting federation infrastructure that provides a communications facility enabling the hosted application/service to establish and use named communication groups (possibly hierarchically) amongst multiple endpoints. Such a communications facility can supporting various MEP such as 1:1, 1:n, n:1, and n:n. Thus, the communications facility can signal location change-events to the hosted application/service to optimize internal federation infrastructure communication needed to maintain a given set of endpoints for a common named group. A hosted application/service also uses these location change-events to redirect related external client traffic to at least one endpoint within a machine indicated in the location change-event received from the hosting federation infrastructure.

In some embodiments, location change-events are sourced from the hosting federation infrastructure resulting in corresponding signals, commands, or messages to be pushed into an external communications infrastructure interconnecting the external client endpoints and federation infrastructure and its hosted application/service effecting transparent redirection of client traffic.

Best Effort Federation Infrastructures

Figure 6:
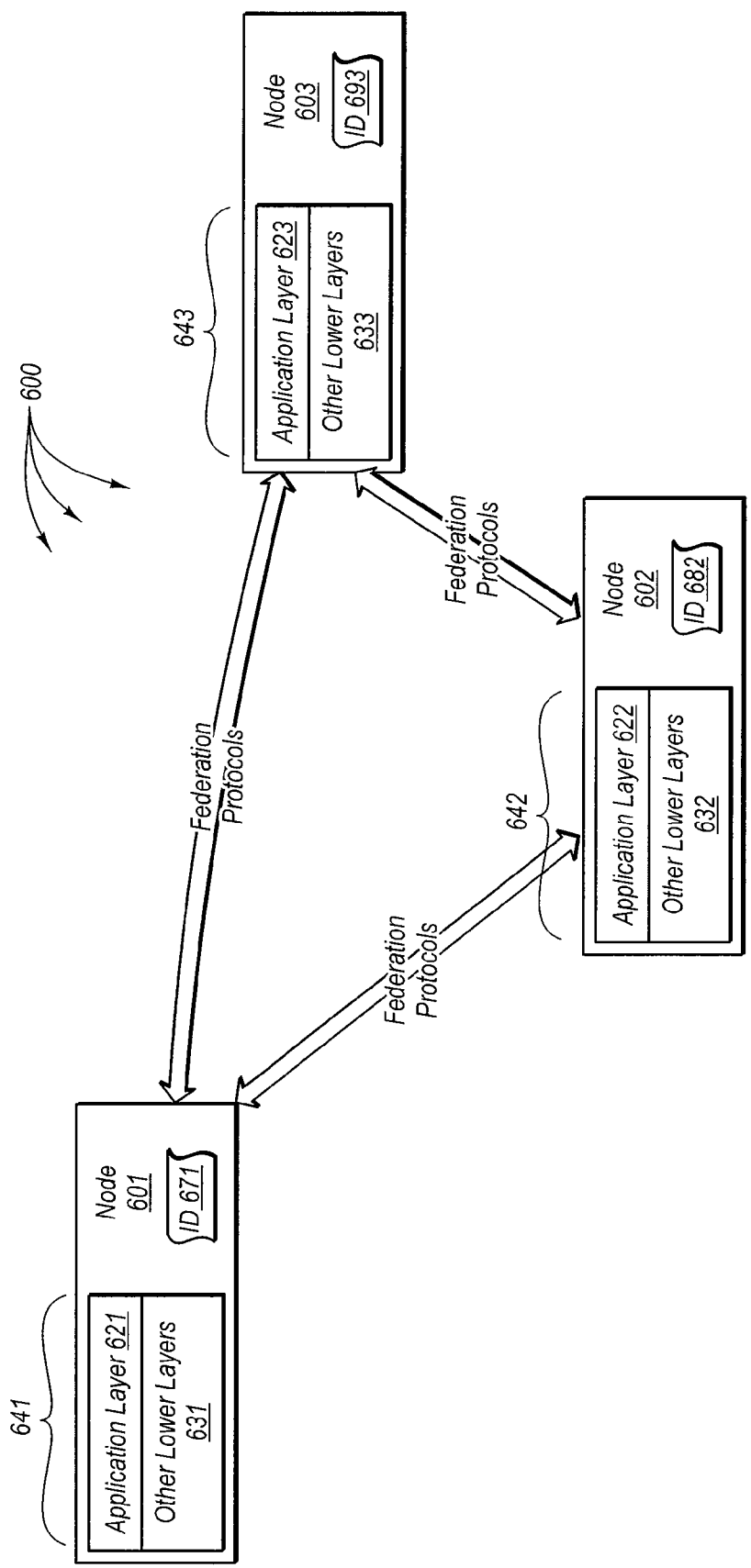
FIG. 6 illustrates an example of a federation infrastructure.

As previously described, in some embodiments nodes can federated together to form a best effort federation infrastructure. FIG. 6 illustrates an example of a federation infrastructure 600. The federation infrastructure 600 includes nodes 601, 602, 603, that can form different types of federating partnerships. For example, nodes 601, 602, 603 can be federated among one another as peers without a root node. Each of nodes 601, 602, and 603 has a corresponding ID 671, 682, and 693 respectively.

Generally, the nodes 601, 602, 603, can utilize federation protocols to form partnerships and exchange information (e.g., state information related to interactions with other nodes). The formation of partnerships and exchange of information facilitates more efficient and reliable access to resources. Other intermediary nodes (not shown) can exist between nodes 601, 602, and 603 (e.g., nodes having IDs between 671 and 693). Thus, a message routed, for example, between node 601 and node 603, can be pass through one or more of the other intermediary nodes.

Nodes in federation infrastructure 600 (including other intermediary nodes) can include corresponding rendezvous protocol stacks. For example, nodes 601, 602, and 603 include corresponding rendezvous protocol stacks 641, 642, and 643 respectively. Each of the protocols stacks 641, 642, and 643 includes an application layer (e.g., application layers 621, 622, and 623) and other lower layers (e.g., corresponding other lower layers 631, 632, and 633). Each layer in a rendezvous protocol stack is responsible for different functionality related to rendezvousing a resource request with a corresponding resource.

For example, other lower layers can include a channel layer, a routing layer, and a function layer. Generally, a channel layer is responsible for reliably transporting a message (e.g., using WS-ReliableMessaging and Simple Object Access Protocol ("SOAP")) from one endpoint to another (e.g., from node 601 to node 603). The channel layer is also responsible for processing incoming and outgoing reliable messaging headers and maintaining state related to reliable messaging sessions.

Generally, a routing layer is responsible for computing the next hop towards a destination. The routing layer is also responsible for processing incoming and outgoing addressing and routing message headers and maintaining routing state. Generally, a function layer is responsible for issuing and processing rendezvous protocol messages, such as, join and depart requests, pings, updates, and other messages, as well as generation of responses to these messages. The function layer processes request messages from the routing layer and sends back corresponding response messages, if any, to the originating node using the routing layer. The function layer also initiates request messages and utilizes the routing layer to have the requests messages delivered.

Generally, an application layer processes non-rendezvous protocol specific data delivered from the function layer (i.e., application messages). The function layer can access application data from the application layer and get and put application data in rendezvous protocol messages (e.g., pings and updates). That is, the function layer can cause application data to be piggybacked on rendezvous protocol messages and can cause the application data to be passed back to the application layer in receiving rendezvous protocol nodes. In some embodiments, application data is used to identify resources and resource interests. Thus, an application layer can include application specific logic and state that processes data received from and sent to the other lower layers for purposes of identifying resources and resource interests.

Federating Mechanisms

Nodes can federate using a variety of different mechanisms. A first federating mechanism includes peer nodes forwarding information to all other peer nodes. When a node is to join a federation infrastructure, the node utilizes a broadcast/multicast discovery protocol, such as, for example, WS-Discovery to announce its presence and issues a broadcast/multicast find to detect other nodes. The node then establishes a simple forwarding partnership with other nodes already present on the network and accepts new partnerships with newly joining nodes. Thereafter, the node simply forwards all application specific messages to all of its partner nodes.

A second federating mechanism includes peer nodes that most efficiently transmit application specific messages to their destination(s). When a new node is to join a federation infrastructure, the new node utilizes a broadcast/multicast discovery protocol, such as, for example, WS-Discovery to announce its presence and issues a broadcast/multicast find to detect other nodes that are part of the federation infrastructure. Upon detecting another node, the new node establishes a partnership with the other node. From the established partnership, the new node learns about the presence of other nodes already participating in federation infrastructure. It then establishes partnerships with these newly-learned nodes and accepts any new incoming partnership requests.

Both node arrivals/departures and registrations of interest in certain application specific messages are flooded through the federation infrastructure resulting in every node having global knowledge of other partner nodes and registrations of interest in application specific messages. With such global knowledge, any node can send application specific messages directly to the nodes that have expressed interest in the application specific message.

A third federating mechanism includes peer nodes indirectly forwarding all application specific messages to their destination/s. In this third mechanism, nodes are assigned identifiers (ID's), such as, for example, a 128-bit or 160-bit ID. The node responsible for a maintaining registration of interest in a given application specific message can be determined to be the one whose ID is closest to the one obtained by mapping (e.g., hashing) the destination identity (e.g. URI) of the application specific message to this 128-bit or 160-bit ID-space.

In this third mechanism, node arrivals and departures are flooded over the entire fabric. On the other hand, registrations of interest in certain application specific messages are forwarded to the nodes determined to be responsible for maintaining such registration information. For scalability, load balancing, and fault-tolerance, the node receiving registration of interest in certain application specific messages can reliably flood that registration information within its neighborhood set. The neighborhood set for a specified node can be determined to be the set of nodes having IDs within a predefined range on either side of the ID of specified node.

Similar to the second mechanism, a newly joining node utilizes a broadcast/multicast discovery protocol, such as, for example, WS-Discovery to announce its presence and issues a local broadcast/multi-cast find to detect a node that is already part of the federation infrastructure. The new node establishes a partnership with the discovered node and uses that partnership to learn about the presence of other new nodes participating in the federation infrastructure. The new node then establishes further partnerships with the newly discovered nodes and accepts any new incoming partnership requests. The new node accepts incoming registrations of interest in certain application layer specific resources from its partners for which it is responsible and may flood them over its neighborhood set. Thus, messages can generally be forwarded to their final destination via intermediary routing nodes (e.g., that a newly joining node has partnered with or that a partner node is aware of).

In response to receiving an incoming application specific message, the new node forwards the message to the partner node that may be responsible for maintaining the registration information for the destination specified in the message. Thus, when using this third mechanism, every node in the federation infrastructure has global knowledge of all other nodes but the registration information is efficiently partitioned among the nodes. Application specific messages are transmitted to their final destination via only the partner's nodes that may have the responsibility for maintaining registration information of interest in those application specific messages. Thus, indirection is accomplished by forwarding only to the partner node that has global knowledge of the registration information of interest for the message being processed. This is in contrast to the first mechanism where the indirection is accomplished by forwarding to all the partner nodes.

A fourth federating mechanism includes peer nodes that route messages to other peer nodes. This fourth mechanism differs from the third mechanism at least in that both node arrivals/departures and registrations of interest in certain application specific messages are all routed instead being flooded. Routing protocols are designed to guarantee rendezvous between application specific messages and the registration messages that express interest in those application specific messages.

Figure 7:
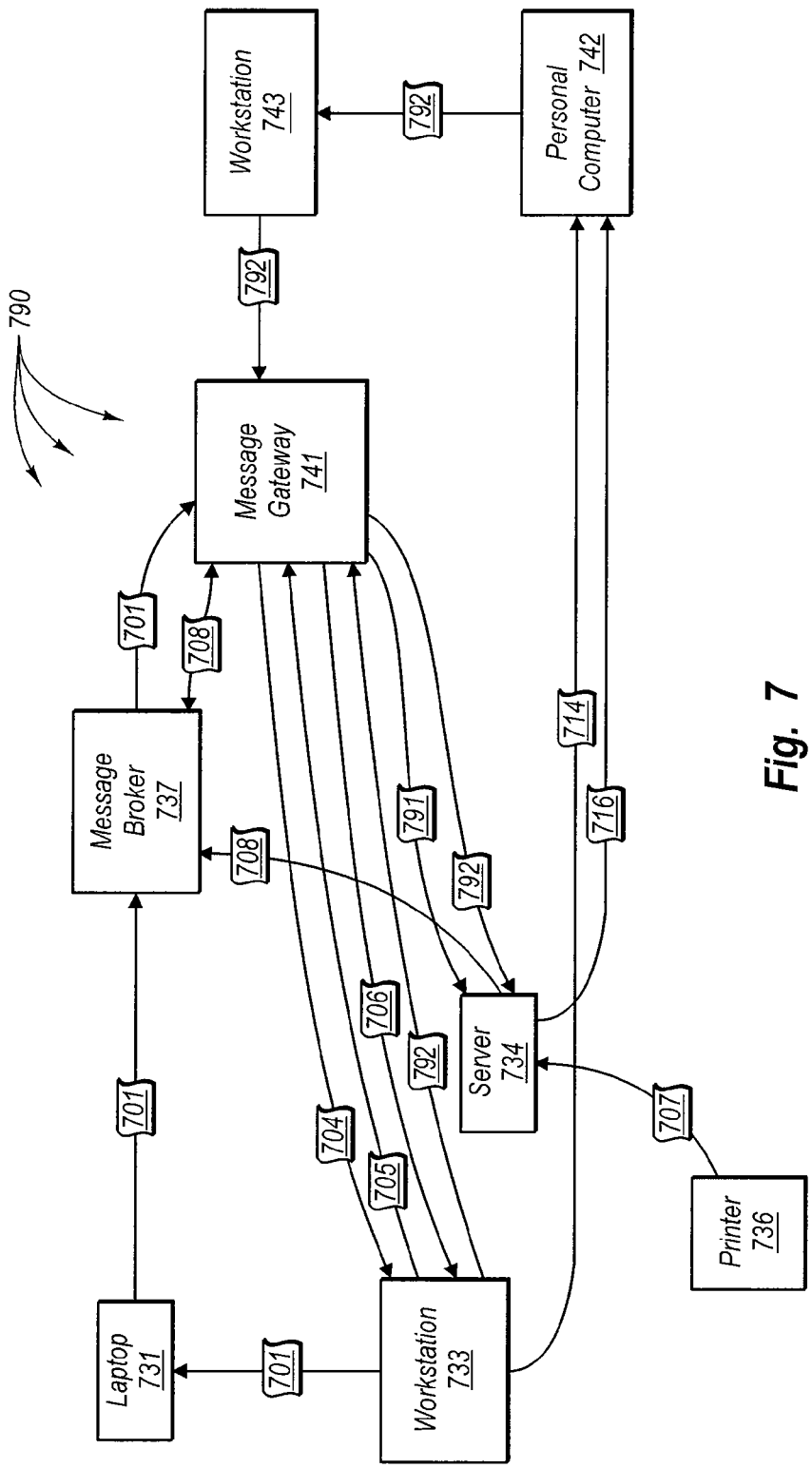
FIG. 7 illustrates an example of a computer architecture that facilitates routing request indirectly to partners.

FIG. 7 illustrates an example of a computer architecture 700 that facilitates routing requests indirectly to partners. Computer architecture 700 depicts different types of computer systems and devices potentially spread across multiple local discovery scopes participating in a federation infrastructure.

Workstation 733 can include a registered PnP provider instance. To inform its partners of the presence of this PnP provider instance, workstation 733 routes registration request 701 over the federation infrastructure. Registration request 701 is initially forwarded to laptop 731, which in turn forwards registration request 701 to message broker 737, which in turn forwards registration request 701 to message gateway 741. Message gateway 741 saves the registration information registration request 701 in its database and returns success message 704 to workstation 733.

Subsequently, another registered provider instance, this time that of running services, comes alive within the workstation 733. This time the node is aware that message gateway 741 is responsible for registrations and forwards registration request 705 to message gateway 741 directly. Message gateway 741 saves the registration information registration request 705 in its database and returns success message 706 to workstation 733.

Subsequently, the printer 736 (e.g., a UPnP printer) is powered on and sends announcement 707. Server 734 detects announcement 707 and routes registration request 708 to message broker 737. Message broker 737 forwards registration request 708 to message gateway 741. Message gateway 741 saves the registration information registration request 708 in its database and returns success message 791 to server 734.

Subsequently, personal computer 742 issues lookup request 792 to discover all devices. Since personal computer 742 doesn't know where to forward lookup request 792, it routes lookup request 792 through workstation 743. As registration and lookup requests are routed to the same destination, the routing protocol essentially guarantees rendezvous between the two requests resulting in workstation 743 forwards find request 792 to message gateway 741. Message gateway 741 looks up the registration information maintained by it and forwards find request 792 to both the workstation 733 and server 734. Workstation 733 and server 734 send response messages 714 and 716 respectively to personal computer 742.

This fourth mechanism works by routing (instead of flooding) a request to the node (message gateway 741) that has global knowledge of the registrations specified in a request. This fourth mechanism, as will be described in further detail below, essentially guarantees that routing can be accomplished in O(log N) hops, where N is the number of nodes participating in the federation infrastructure. Since this fourth mechanism efficiently partitions both node partnership and registration information, it scales to very large networks, even the Internet.

Although a number of federating mechanisms have been described, it would be apparent to one skilled in the art, after having reviewed this description, that other federation mechanisms are possible.

Relationship Between Nodes in a Federation

Accordingly, a federation consists of a set of nodes that cooperate among themselves to form a dynamic and scalable network in which information can be systematically and efficiently disseminated and located. Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 6 to an ID of the fixed upper bound results in an ID of zero (i.e., moving from the end of the linked list back to the beginning of the linked listed. In addition, a 1:1 mapping function from the value domain of the node identities to the nodes themselves is defined.

Figure 8:
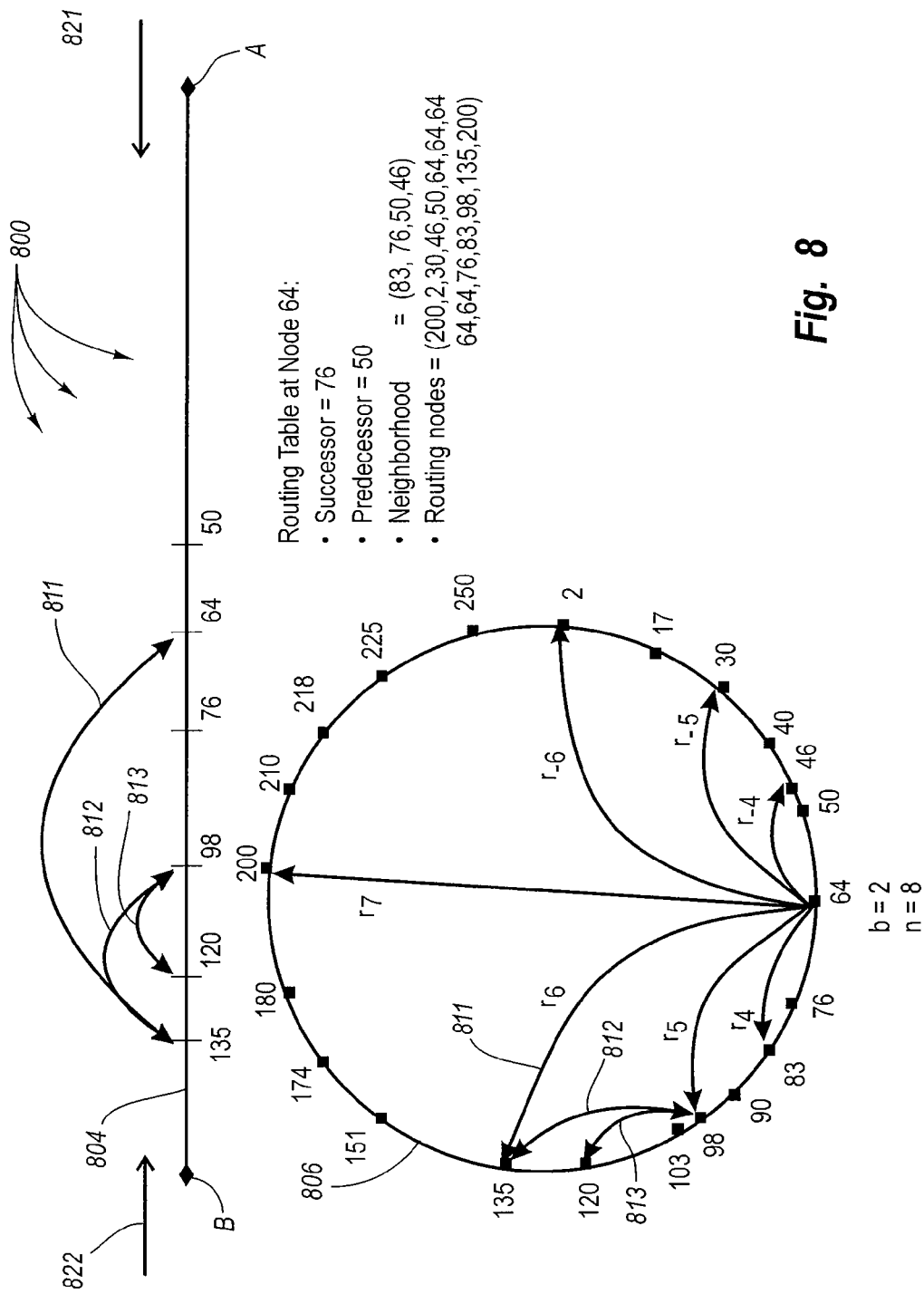
FIG. 8 illustrates an example binary relationship between nodes in a federation infrastructure in the form of a sorted list and corresponding ring.

FIG. 8 depicts an example linked list 804 and corresponding ring 806. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S): Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-6$, where b equals, for example, 8 or 66 and n equals, for example, 628-bit or 660-bit equivalent digits. Accordingly, a node can be assigned an ID, for example, from a range of 0 to $66^{40}-6$ (or approximately 6.461502E48). The range of 0 to $66^{40}-6$ would provide, for example, a sufficient number of IDs to assign every node on the Internet a unique ID.

Thus, each node in a federation can have:

An ID which is a numerical value uniformly distributed in the range of 0 to $b^n-1$; and A routing table consisting of (all arithmetic is done modulo $b^n$):

Successor node (s);

Predecessor node (p);

Neighborhood nodes $(p_k, \ldots, p_1, s, s_1, \ldots, s_j)$ such that $s_j.s.id > (id+u/2)$, $j \geq v/2-1$, and $p_k.p.id < (id-u/2)$, and $k \geq v/2-1$; and Routing nodes $(r_{-(n-1)}, \ldots, r_{-1}, r_1, \ldots, r_{n-1})$ such that $r_{\pm 1} = $ RouteNumerically($id \pm b^i$, Msg).

where b is the number base, n is the field size in number of digits, u is the neighborhood range, v is the neighborhood size, and the arithmetic is performed modulo $b^n$. For good routing efficiency and fault tolerance, values for u and v can be u=b and v≥max($\log_2(N)$, 4), where N is the total number of nodes physically participating in the federation. N can be estimated from the number of nodes present on a ring segment whose length is greater than or equal to b, for example, when there is a uniform distribution of IDs. Typical values for b and n are b=8 or 66 and n=128-bit or 660-bit equivalent digits.

Accordingly, routing nodes can form a logarithmic index spanning a ring. Depending on the locations of nodes on a ring, a precise logarithmic index is possible, for example, when there is an existing node at each number in the set of $id \pm b^i$ where i=(1, 2, ... (n-1)). However, it may be that there are not existing nodes at each number in the set. IN those cases, a node closest to $id \pm b^i$ can be selected as a routing node. The resulting logarithmic index is not precise and may even lack unique routing nodes for some numbers in the set.

Referring again to FIG. 8, FIG. 8 illustrates an example of a binary relation between nodes in a federation infrastructure in the form of sorted list 804 and corresponding ring 806. The ID space of sorted list 804 is in the range 0 to $2^8-6$ (or 255). That is, b=2 and n=8. Thus, nodes depicted in FIG. 8 are assigned IDs in a range from 0 to 255. Sorted list 804 utilizes a binary relation that is reflexive, anti-symmetric, transitive, total, and defined over the domain of node identities. Both ends of sorted list 804 are joined, thereby forming ring 806. This makes it possible for each node in FIG. 8 to view itself as being at the middle of sorted list 804. The sorted list 804 is doubly linked so that any node can traverse the sorted list 804 in either direction. Arithmetic for traversing sorted list 804 (or ring 806) is performed modulo $2^8$. Thus, 255 (or the end of sorted list 804)+6=0 (or the beginning of sorted list 804).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=60, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 635, and 200. This list is generated by identifying the node closest to each number in the set of id±$2^i$ where i=(1, 2, 3, 4, 5, 6, 7). That is, b=2 and n=8. For example, the node having ID 76 can be identified from calculating the closest node to 64+$2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to 243). The node having ID 2 can in turn implement RouteNumerically(243, Msg) to cause the message to be routed (directly or through further intermediary nodes) to the node having ID 250. Thus, it may be that a RouteNumerically function is recursively invoked with each invocation routing a message closer to the destination.

Proximity

Advantageously, other embodiments of the present invention facilitate partitioning a ring into a ring of rings or tree of rings based on a plurality of proximity criteria of one or more proximity categories (e.g., geographical boundaries, routing characteristics (e.g., IP routing hops), administrative domains, organizational boundaries, etc.). It should be understood a ring can be partitioned more than once using the same type of proximity criteria. For example, a ring can be partition based on a continent proximity criteria and a country proximity criteria (both of a geographical boundaries proximity category).

Since IDs can be uniformly distributed across an ID space (a result of random number generation) there is a high probability that any given segment of a circular ID space contains nodes that belong to different proximity classes provided those classes have approximately the same cardinality. The probability increases further when there are a sufficient number of nodes to obtain meaningful statistical behavior.

Thus, neighborhood nodes of any given node are typically well dispersed from the proximality point of view. Since published application state can be replicated among neighborhood nodes, the published information can be well dispersed as well from the proximality point of view.

Figure 9:
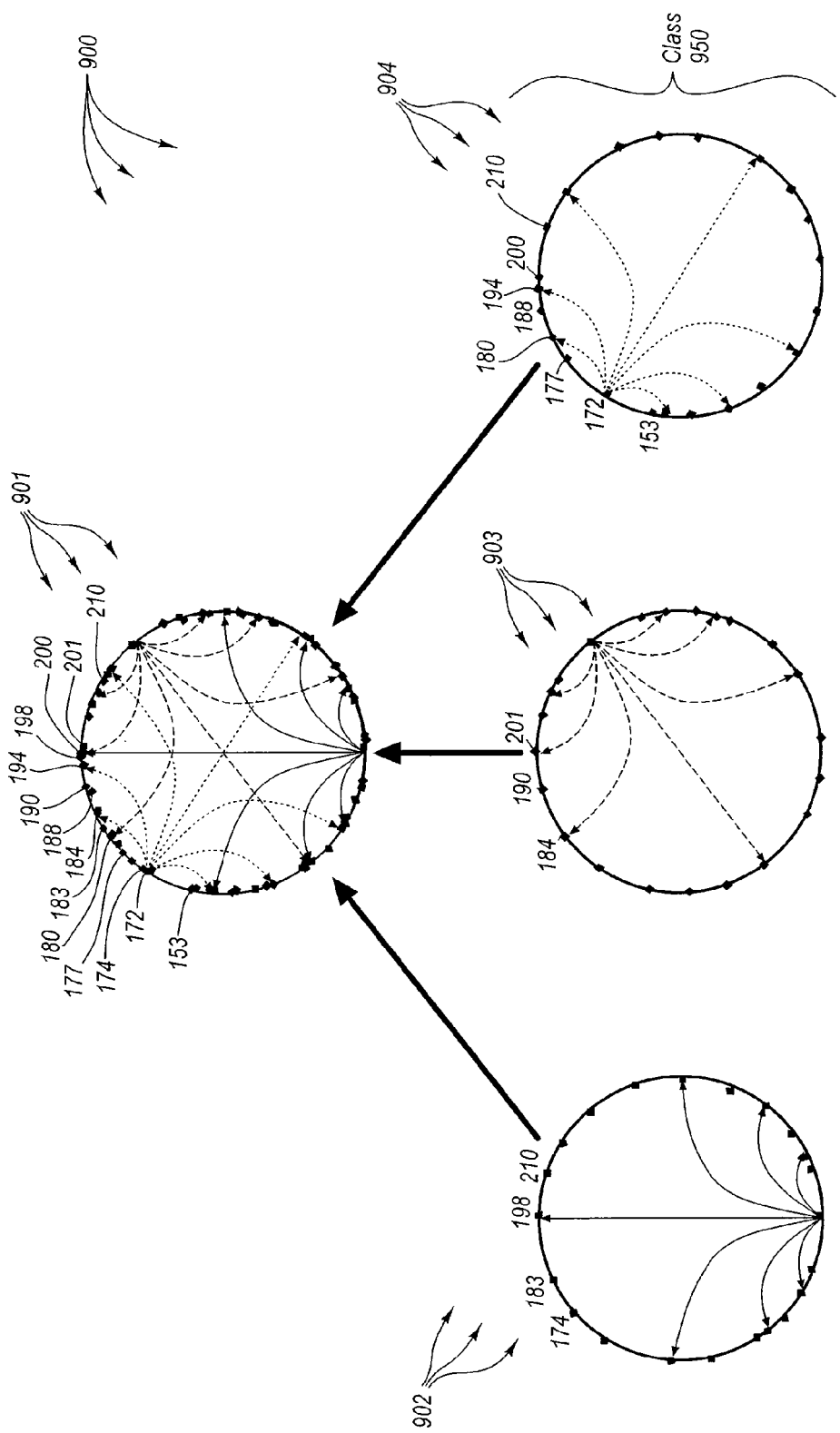
FIG. 9 illustrates an example ring of rings that facilitates proximal routing.

FIG. 9 illustrates a ring of rings 900 that facilitates proximal routing. Ring 901 can be viewed as a master or root ring, and contains all the nodes in each of the rings 902, 903, and 904. Each of the rings 902, 903, and 904 contain a subset of nodes from ring 901 that are partitioned based on a specified proximity criterion. For example, ring 901 may be partitioned based on geographic location, where ring 902 contains nodes in North America, ring 903 contains nodes in Europe, and ring 904 contains nodes in Asia.

In a numerical space containing 65,536 ($2^{16}$) IDs, routing a message from a North American node having an ID 5,345 to an Asian node having an ID 23,345 can include routing the message within ring 902 until a neighbor node of the Asian node is identified. The neighbor node can then route the message to the Asian node. Thus, a single hop (as opposed to multiple hops) is made between a North American node and an Asian node. Accordingly, routing is performed in a resource efficient manner.

Figure 10:
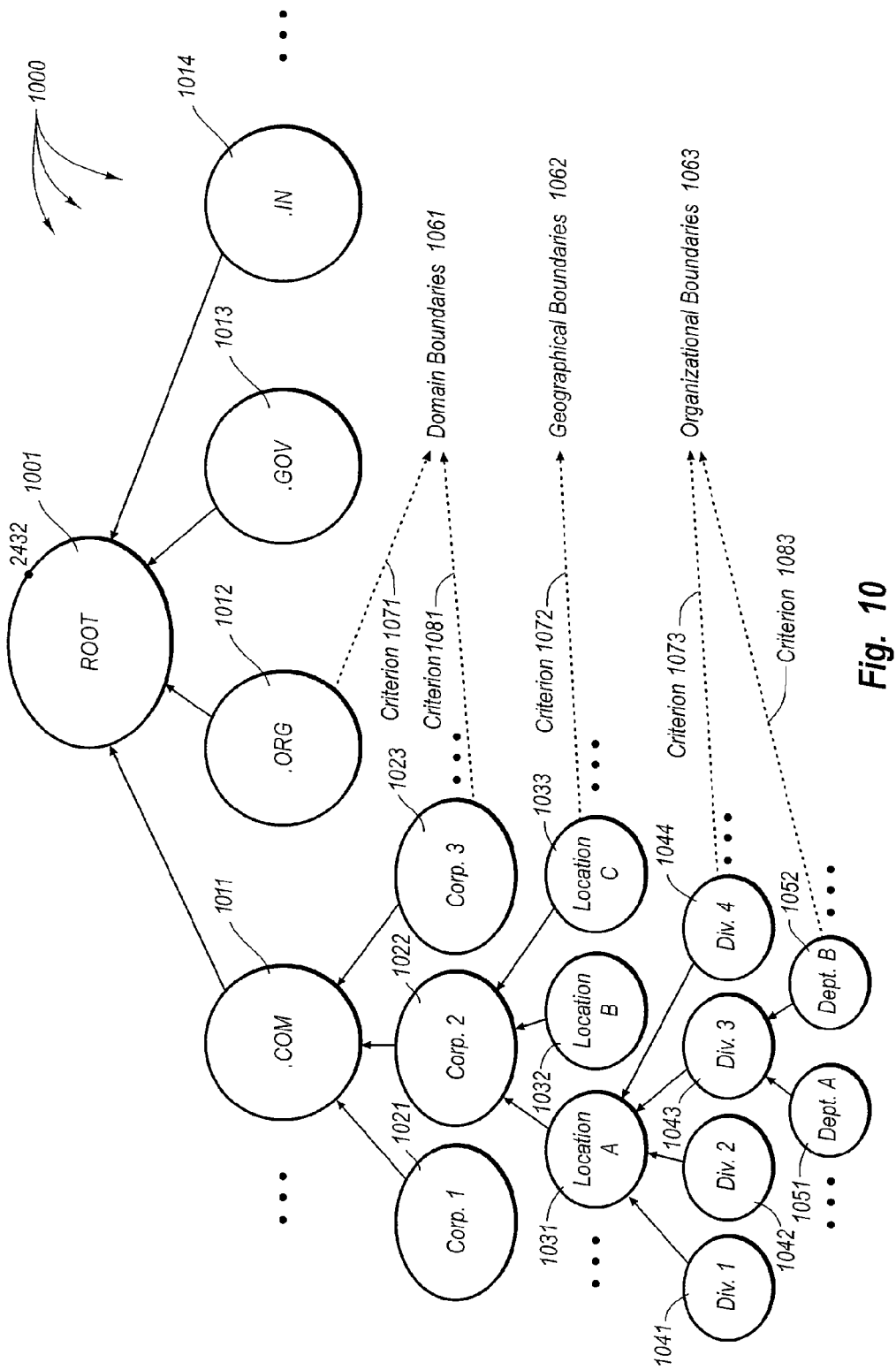
FIG. 10 illustrates an example proximity induced partition tree of rings that facilitates proximal routing.

FIG. 10 illustrates an example proximity induced partition tree of rings 1000 that facilitates proximal routing. As depicted, partition tree of rings 1000 includes a number of rings. Each of the rings represents a partition of a sorted linked list. Each ring including a plurality a nodes having IDs in the sorted linked list. However for clarity due to the number of potential nodes, the nodes are not expressly depicted on the rings (e.g., the ID space of partition tree 1000 may be b=66 and n=40).

Within partition tree 1000, root ring 1001 is partitioned into a plurality of sub-rings, including sub-rings 1011, 1012, 1013, and 1014, based on criterion 1071 (a first administrative domain boundary criterion). For example, each component of a DNS name can be considered a proximity criterion with the partial order among them induced per their order of appearance in the DNS name read right to left. Accordingly, sub-ring 1011 can be further partitioned into a plurality of sub-rings, including sub-rings 1021, 1022, and 1023, based on criterion 1081 (a second administrative domain boundary criterion).

Sub-ring 1022 can be further partitioned into a plurality of sub-rings, including sub-rings 1031, 1032, and 1033, based on criterion 1072 (a geographic boundary criterion). Location based proximity criterion can be partially ordered along the lines of continents, countries, postal zip codes, and so on. Postal zip codes are themselves hierarchically organized meaning that they can be seen as further inducing a partially ordered sub-list of proximity criteria.

Sub-ring 1031 can be further partitioned into a plurality of sub-rings, including sub-rings 1041, 1042, 1043, and 1044, based on criterion 1073 (a first organizational boundary criterion). A partially ordered list of proximity criterion can be induced along the lines of how a given company is organizationally structured such as divisions, departments, and product groups. Accordingly, sub-ring 1043 can be further partitioned into a plurality of sub-rings, including sub-rings 1051 and 1052, based on criterion 1083 (a second organizational boundary criterion).

Within partition tree 1000, each node has a single ID and participates in rings along a corresponding partition path starting from the root to a leaf. For example, each node participating in sub-ring 1052 would also participate in sub-rings 1043, 1031, 1022, 1011 and in root 1001. Routing to a destination node (ID) can be accomplished by implementing a RouteProximally function, as follows:

RouteProximally(V, Msg, P): Given a value V from the domain of node identities and a message "Msg," deliver the message to the node Y whose identity can be mapped to V among the nodes considered equivalent by the proximity criteria P.

Thus, routing can be accomplished by progressively moving closer to the destination node within a given ring until no further progress can be made by routing within that ring as determined from the condition that the destination node lies between the current node and its successor or predecessor node. At this point, the current node starts routing via its partner nodes in the next larger ring in which it participates. This process of progressively moving towards the destination node by climbing along the partitioning path towards the root ring terminates when the closest node to the destination node is reached within the requested proximal context, as originally specified in the RouteProximally invocation.

Routing hops can remain in the proximal neighborhood of the node that originated the request until no further progress can be made within that neighborhood because the destination node exists outside it. At this point, the proximity criterion is relaxed to increase the size of the proximal neighborhood to make further progress. This process is repeated until the proximal neighborhood is sufficiently expanded to include the destination node (ID). The routing hop made after each successive relaxation of proximal neighborhood criterion can be a potentially larger jump in proximal space while making a correspondingly smaller jump in the numerical space compared to the previous hop. Thus, only the absolutely required number of such (inter-ring) hops is made before the destination is reached.

It may be the case that some hops are avoided for lookup messages since published application data gets replicated down the partition tree when it is replicated among the neighborhood nodes of the destination node.

To accomplish proximal routing, each federation node maintains references to its successor and predecessor nodes in all the rings it participates as a member (similar to successor and predecessor for a single ring)—the proximal predecessor, proximal successor, and proximal neighborhood. In order to make the routing efficient, the nodes can also maintain reference to other nodes closest to an exponentially increasing distance on its either half of the ring as routing partners (similar to routing nodes for a single ring). In some embodiments, routing partner nodes that lie between a pair of consecutive successor or predecessor nodes participate in the same lowest ring shared by the current node and the node numerically closest to it among the successor or predecessor node pairs respectively. Thus, routing hops towards a destination node transition into using a relaxed proximity criterion (i.e., transitioning to a higher ring) only when absolutely needed to make further progress. Accordingly, messages can be efficiently rendezvoused with a corresponding federation node.

In some embodiments, nodes implement a proximal routing function to route messages based on equivalence criteria relations. Thus, given a number V and a message "Msg", a node can implement RouteProximally(V, Msg, P) to deliver the message to the node Y whose identify can be mapped to V among the nodes considered equivalent by proximity criterion P. The proximity criterion P identifies the lowest ring in the partition tree that is the common ancestor to all the nodes considered proximally equivalent by it. It can be represented as a string obtained by concatenating the proximity criterion found along the path from the root ring to the ring identified by it separated by the path separator character '/'. For example, the proximity criterion identifying sub-ring 1042 can be represented as "Proximity:/.COM/Corp2/LocationA/Div2". Each ring in the partition tree 1000 can be assigned a unique number, for example, by hashing its representational string with a SHA based algorithm. If the number 0 is reserved for the root ring, it can be inferred that RouteNumerically(V, Msg)=RouteProximally(V, Msg, 0).

For example, a node in sub-ring 1044 can implement RouteProximally to identify a closer node in sub-ring 1031 (e.g., to a node in sub-ring 1013). In turn, sub-ring 1031 can implement RouteProximally to identify a closer node in sub-ring 1022. Likewise, sub-ring 1022 can implement RouteProximally to identify a closer node in sub-ring 1011. Similarly, sub-ring 1011 can implement RouteProximally to identify a closer node in ring 1001. Thus, it may be that a RouteProximally function is recursively invoked with each invocation routing a message closer to the destination.

Thus, when proximity criterion is taken into account, routing hops on a path to a final destination can remain within the proximity of a node that originates a request, while making significant progress between the originating node and the destination node in a numerical space, until either the destination node is reached or no further progress can be made under the chosen proximity criterion at which point it is relaxed just enough to make further progress towards the destination. For example, proximity criterion can be relaxed enough for a message to be routed from ring 1031 up to ring 1022, etc.

Utilizing the above approach to proximity, it is possible to confine published information to a given ring. For example, organizations may like to ensure that organization specific information is not available to entities outside of their trust domains either (1) implicitly in the form of neighborhood replication to nodes outside of their domains or (2) explicitly in the form of servicing lookup requests for such information. The first aspect is satisfied by replicating published information only among the nodes neighboring the target ID within the specified ring. Because all messages originated by a node are routed by successively climbing the rings to which it belongs towards the root ring, there is a high likelihood that all lookup requests originated within an organization will be able to locate the published information confined to it thereby implicitly satisfying the second aspect.

Also, organizations dislike nodes automatically federating with nodes outside of their trust domain. This can happen, for example, when a visiting sales person connects his/her laptop computer to the network in the customer premises. Ideally, the laptop computer belonging to the sales person wishes to locate information published in its home domain and/or federate with the nodes in its home domain starting at its lowest preferred proximity ring. It will typically not be permitted to federate with the nodes in the customer's domain. Supporting this scenario requires ability to locate seed nodes in the home domain. Such seed nodes can be used for locating information published in the home domain, to join the home federation, to selectively import and export published information across domains, and as one possible way to arbitrate conflicting failure reports submitted by other nodes. Seed nodes are also sometimes referred as message gateways.

In other embodiments, an entity publishes references to seed nodes in the root ring. Seed nodes can be published at the unique number (such as the one obtained by hashing its representational string) associated with the ring (as a target ID). Seed node information can further be on-demand cached by the nodes in various rings that are on the path to the corresponding target IDs in the root ring. Such on-demand caching provides for improved performance and reduction in hotspots that might occur when semi-static information is looked up quite frequently. Seed node information can also be obtained via other means such as DNS.

To provide fault tolerance for confined published information, each node can maintain a set of neighborhood nodes in all of the rings it participates in. Given the above, the state maintained by a node can be summarized as follows:

An ID which is a numerical value uniformly distributed in the range of 0 to $b^n-1$.

A routing table consisting of (all arithmetic is done modulo $b^n$):

For each ring, say ring d, in which the node participates

Successor node ($s_d$)

Predecessor node ($p_d$)

Neighborhood nodes ($p_{kd}, \ldots, p_{1d}, p_d, s_d, s_{1d}, \ldots, s_{jd}$) such that $s_{jd}.s_d.\text{id} > (\text{id}+u/2)$, $j > v/2-1$, $p_{kd}.p_d.\text{id} < (\text{id}-u/2)$, and $k \geq v/2-1$.

Routing nodes ($r_{-(n-1)}, r_{-1}, r_1, r_{n-1}$) such that $r_{=i} = \text{RouteProximally}(\text{id} \pm b^i, \text{updateMsg}, d)$ such that $s_d \leq \text{id}+b^i \leq s_{d+1}$ or $p_{d+1} \leq \text{id}-b^i \leq p_d$ as appropriate.

where b is the number base, n is the field size in number of digits, u is the neighborhood range, and v is the neighborhood size.

Note that a subset of the neighborhood nodes maintained by a given node in ring "d" can appear again as neighborhood nodes in the child ring "d+1" in which the given node participates as well. As such one can derive the upper bound on the total number of neighborhood nodes maintained by a given node across all the D rings it participates as $D*max(u,v)/2$. This considers that only one reference to a given node is kept and the worst case upper bound is for a balanced tree.

It should be noted that when a ring is partitioned into a plurality of corresponding sibling sub-rings, it is permitted for a specified node to simultaneously participate in more than one of the plurality of corresponding sibling sub-rings, for example, through aliasing. Aliasing can be implemented to associate different state, for example, from different sub-rings, with the specified node. Thus, although aliases for a given node have the same ID, each alias can have distinct state associated with them. Aliasing allows the specified node to participate in multiple rings having distinct proximity criteria that are not necessarily common ancestors of more specific proximity criteria. That is, the specified node can participate in multiple branches of the proximity tree.

For example, a dual NIC (wired and wireless) laptop can be considered to be proximally equivalent to both other wireless and wired nodes sharing the same LAN segments as the laptop. But, these two distinct proximity criteria can be modeled as sub-criteria that are applicable only after application of a different higher priority proximity criterion, such as, for example, one based on organizational membership. As the laptop belongs to the same organization, the aliased nodes in the two sub-rings representing 1) membership in the wired and 2) membership in the wireless LAN segments merge into a single node in the ring representing the organization to which the laptop belongs. It should be understand that the RouteProximally works as expected without any modifications in the presence of aliasing.

Each proximal ring can be configured in accordance with (potentially different) ring parameters. Ring parameters can be used to define a neighborhood (e.g., ring parameters can represent a neighborhood range, a neighborhood size, ping message and depart message timing and distribution patterns for ping and depart messages), indicate a particular federating mechanisms (e.g., from among the above-described first through fourth federating mechanisms previously described or from among other federating mechanisms), or define communication specifics between routing partners in the same proximal ring. Some ring parameters may be more general, applying to a plurality of different federating mechanisms, while other ring parameters are more specific and apply to specific type of federating mechanism.

Ring parameters used to configure a higher level proximal ring can be inherited in some embodiments by lower level proximal rings. For example, it may be that ring 1043 inherits some of the ring parameters of ring 1031 (which in turn inherited from ring 1022, etc.). Thus, a neighborhood size and neighborhood range associated with ring 1031 is also associated with ring 1041.

However, inherited ring parameters can be altered and/or proximal rings can be individually configured in accordance with different ring parameters. For example, it may be that ring 1011 is for an administrative domain that contains a large number of nodes and thus the above-described fourth federating mechanism is more appropriate for ring 1011. On the other hand, it may be that ring 1021 is for a small business with a relatively smaller number of nodes and thus the above-described second federating mechanism is more appropriate for ring 1021. Thus, the ring parameters associated with ring 1021 can be set to (or inherited parameters changed to) different values than the ring parameters associated with ring 1011. For example, a ring parameter indicating a particular type of federating mechanisms can be different between rings 1011 and 1021. Similarly parameters defining a neighborhood can be different between rings 1011 and 1021. Further, ring 1021 can be configured in accordance with specific parameters that are specific to the above-described second federating mechanism, while ring 1011 is configured in accordance additional with specific parameters that are specific to the above-described fourth federating mechanism.

Accordingly, proximal rings can be flexibly configured based on the characteristics (e.g., number, included resources, etc.) of nodes in the proximal rings. For example, an administrator can select ring parameters for proximal rings using a configuration procedure (e.g., through a user-interface). A configuration procedure can facilitate the configuration of inheritance relationships between proximal rings as well as the configuration of individual proximal rings, such as, for example, to override otherwise inherited ring parameters.

Embodiments of the invention include partitioning nodes of a federation infrastructure. Partitioning nodes of a federation infrastructure can include an act of accessing a sorted linked list containing node IDs that have been assigned to nodes in a federation infrastructure For example, referring back to FIG. 10, a sorted linked list represented by ring 1001 can be accessed. The node IDs of the sorted linked list (the nodes depicted on ring 1001) can represent nodes in a federation infrastructure (e.g., federation infrastructure 600).

Partitioning nodes of a federation infrastructure can include an act of accessing proximity categories that represent a plurality of different proximity criteria for partitioning the sorted linked list. For example, proximity criterion representing domain boundaries 1061, geographical boundaries 1062, and organizational boundaries 1063 can be accessed. However, other proximity criteria, such as, trust domain boundaries, can also be represented in accessed proximity criterion. Proximity categories can include previously created partially ordered lists of proximity criteria. A ring can be partitioned based on partially ordered lists of proximity criteria.

Partitioning nodes of a federation infrastructure can include an act of partitioning the sorted link list into one or more first sub lists based on a first proximity criterion, each of the one or more first sub lists containing at least a subset of the node IDs from the sorted linked list. For example, ring 1001 can be partitioned into sub-rings 1011, 1012, 1013, and 1014 based on criterion 1071. Each of sub-rings 1011, 1012, 1013, and 1014 can contain a different sub-set of node IDs from ring 1001.

Partitioning nodes of a federation infrastructure can include an act of partitioning a first sub list, selected from among the one or more first sub lists, into one or more second sub lists based on a second proximity criterion, each of the one or more second sub lists containing at least a subset of node IDs contained in the first sub list. For example, sub-ring 1011 can be partitioned into sub-rings 1021, 1022, and 1023 based on criterion 1081. Each of the sub-rings 1021, 1022, and 1023 can contain a different sub-set of node IDs from sub-ring 1011.

Embodiments of the invention include populating a node's routing table. Populating a node's routing table can include an act of inserting a predecessor node into a routing table, the predecessor node preceding a current node relative to the current node in a first direction of a sorted linked list. For example, referring to FIG. 8 the node having ID 50 can be inserted into the routing table as a predecessor for the node having ID 64 (the current node). Moving in a clockwise direction 821 (from end A of sorted linked list 804 towards end B of sorted linked list 804), the node having ID 50 precedes the node having ID 64. Inserting a predecessor node can establish a symmetric partnership between the current node and the predecessor node such that current node is a partner of predecessor node and the predecessor node is a partner of the current node.

Populating a node's routing table can include an act of inserting a successor node into the routing table, the successor node succeeding the current node relative to the current node in the first direction in the sorted linked list. For example, the node having ID 76 can be inserted into the routing table as a successor for the node having ID 64 (the current node). Moving in a counter-clockwise direction 822, the node having ID 76 succeeds the node having ID 64. Inserting a successor node can establish a symmetric partnership between the current node and the successor node such that current node is a partner of the successor node and the successor node is a partner of the current node.

Populating a node's routing table can include an act of inserting appropriate neighborhood nodes into the routing table, the neighborhood nodes identified from the sorted linked list in both the first direction and in a second opposite direction based on a neighborhood range and neighborhood size. For example, the nodes having IDs 83, 76, 50, and 46 can be inserted into the routing table as neighborhood nodes for the node having ID 64 (the current node). Based on a neighborhood range of 20 and a neighborhood size 4, the nodes having IDs 83 and 76 can be identified in clockwise direction 821 and the nodes having IDs 50 and 46 can be identified in counter-clockwise direction 822 (moving from end B of sorted linked list 304 towards end A of sorted linked list 804). It may be that in some environments no appropriate neighborhood nodes are identified. Inserting a neighborhood node can establish a symmetric partnership between the current node and the neighborhood node such that current node is a partner of the neighborhood node and the neighborhood node is a partner of the current node.

Populating a node's routing table can include an act of inserting appropriate routing nodes into the routing table, the routing nodes identified from the sorted linked list in both the first and second directions based on the a number base and field size of the ID space for the federation infrastructure, the routing nodes representing a logarithmic index of the sorted link list in both the first and second directions. For example, the nodes having IDs 200, 2, 30, 46, 50, 64, 64, 64, 64, 64, 76, 83, 98, 135 and 200 can be inserted into the routing table as routing nodes for the node having ID 64. Based on the number base 2 and field size of 8 the nodes having IDs 64, 64, 76, 83, 98, 135 and 200 can be identified in direction 821 and the nodes having IDs 64, 64, 50, 46, 30, 2, and 200 can be identified in direction 822. As depicted inside ring 806, the routing nodes represent a logarithmic index of the sorted link list 804 in both clockwise direction 821 and counter-clockwise direction 822. Inserting a routing node can establish a symmetric partnership between the current node and the routing node such that current node is a partner of the routing node and the routing node is a partner of the current node.

Embodiments of the invention include populating a node routing table that takes proximity criteria into account. Populating a node routing table that takes proximity criteria into account can include an act of inserting a predecessor node for each hierarchically partitioned routing ring the current node participates in into a routing table. Each predecessor node precedes the current node in a first direction (e.g., clockwise) within each hierarchically partitioned routing ring the current node participates in. The hierarchically partitioned routing rings are partitioned in accordance with corresponding proximity criteria and contain at least subsets of a bi-directionally linked list (and possibly the whole bi-directionally linked list). For example, referring again to FIG. 10, it may be that a specified node participates in root ring 1001 and sub-rings 1011, 1022, 1023, 1031, and 1042. Thus, a predecessor node is selected for the specified node from within each of the rings 1001 and sub-rings 1011, 1022, 1023, 1031, and 1042.

Populating a node routing table that takes proximity criteria into account can include an act of inserting a successor node for each hierarchically partitioned routing ring the current node participates in into the routing table. Each successor node succeeding the current node in the first direction within each hierarchically partitioned routing ring the current node participates in. For example, a successor node is selected for the specified node from within each of the rings 1001 and sub-rings 1011, 1022, 1023, 1031, and 1042.

Populating a node routing table that takes proximity criteria into account can include an act of inserting appropriate neighborhood nodes for each hierarchically partitioned routing ring the current node participates in into the routing table. The neighborhood nodes can be identified in both the first direction (e.g., clockwise) and in a second opposite direction (e.g., counter clockwise) based on a neighborhood range and neighborhood size from the hierarchically partitioned routing rings the current node participates in. For example, neighborhood nodes can be identified for the specified node from within each of the rings 1001 and sub-rings 1011, 1022, 1023, 1031, and 1042.

Populating a node routing table that takes proximity criteria into account can include an act of inserting appropriate routing nodes for each hierarchically partitioned routing ring the current node participates in into the routing table. For example, routing nodes can be identified for the specified node from within each of the rings 1001 and sub-rings 1011, 1022, 1023, 1031, and 1042.

In some embodiments, appropriate routing nodes are inserted for each proximity ring d except the leaf ring (or leaf rings in embodiments that utilize aliasing), in which the node Y participates. Appropriate routing nodes can be inserted based on the following expression(s):

$$\text{if } Y.s_d.\text{id} < Y.\text{id} + b^i < Y.s_{d+1}.\text{id is true, then use ring } d; \text{ or}$$

$$\text{if } Y.p_d.\text{id} < Y.\text{id} - b^i < Y.p_{d+1}.\text{id is true, then use ring } d.$$

If a ring has not been identified in the previous step, use the lead (e.g., ring 501) ring as ring d. Now, ring d is the proximity ring in which node Y should look for the routing partner closest to z.

Embodiments of the invention include routing a message towards a destination node. Routing a message towards a destination node can include an act of a receiving node receiving a message along with a number indicating a destination. For example, referring again to FIG. 8, the node having ID 64 can receive a message indicating a destination of 212.

Routing a message towards a destination node can include an act of determining that the receiving node is at least one of numerically further from the destination than a corresponding predecessor node and numerically further from the destination than a corresponding successor node. For example, in direction 822, ID 64 is further from destination 212 than ID 50 and, in direction 821, ID 64 is further from destination 212 than ID 76. Routing a message towards a destination node can include an act of determining that the destination is not within a neighborhood set of nodes corresponding to the receiving node. For example, the node with ID 64 can determine that destination 212 is not within the neighborhood set of 83, 76, 50, and 46.

Routing a message towards a destination node can include an act of identifying an intermediate node from a routing table corresponding to the receiving node, the intermediate node being numerically closer to the destination than other routing nodes in the corresponding routing table. For example, the node having ID 64 can identify the routing node having ID 200 as being numerically closer to destination 212 that other routing nodes. Routing a message towards a destination node can include an act of sending the message to the intermediate node. For example, the node having ID 64 can send the message to the node having ID 200.

Embodiments of the invention include routing a message towards a destination node based on proximity criteria. Routing a message towards a destination node based on proximity criteria can include an act of a receiving node receiving a message along with a number indicating a destination and a proximity criterion. The proximity criterion defines one or more classes of nodes. The receiving node receives the message as part of a current class of nodes selected from among the one or more classes of nodes based on the proximity criterion. For example, referring to FIG. 9, the node having ID 172 can receive a message indicating a destination of 201 and proximity criterion indicating that the destination node be part of classes represented by ring 901. The node having ID 172 can receive the message as part of ring 904.

Routing a message towards a destination node based on proximity criteria can include an act of determining that the receiving node is at least one of, numerically further from the destination than a corresponding predecessor node and numerically further from the destination than a corresponding successor node, among nodes in a selected class of nodes. For example, within ring 904, the node with ID 172 is further from destination 201 than the node having ID 174 in the clockwise direction and is further from destination 201 than the node having ID 153 in the counterclockwise direction.

Routing a message towards a destination node based on proximity criteria can include an act of determining that the destination is not within the receiving node's neighborhood set of nodes for any of the one or more classes of nodes defined by the proximity criterion. For example, the node having ID 172 can determine that destination 201 is not in a corresponding neighborhood set in ring 904 or in ring 901.

Routing a message towards a destination node based on proximity criteria can include an act of identifying an intermediate node from the receiving node's routing table, the intermediate node being numerically closer to the destination than other routing nodes in the routing table. For example, the node having ID 172 can identify the node having ID 194 as being numerically closer to destination 201 than other routing nodes in ring 904. Routing a message towards a destination node based on proximity criteria can include an act of sending the message to the intermediate node. For example, the node having ID 172 can send the received message to the node having ID 194. The node having ID 172 can send the received message to the node having ID 194 to honor a previously defined partially ordered list of proximity criterion.

Node 194 may be as close to destination 201 as is possible within ring 904. Thus, proximity can be relaxed just enough to enable further routing towards the destination to be made in ring 901 in the next leg. That is, routing is transitioned from ring 904 to ring 901 since no further progress towards the destination can be made on ring 904. Alternately, it may be that the node having ID 201 is within the neighborhood of the node having ID 194 in ring 901 resulting in no further routing.

Thus, in some embodiments, relaxing proximity criteria to get to the next higher ring is enough to cause further routing.

However, in other embodiments, incremental relaxation of proximity criteria causing transition to the next higher ring continues until further routing can occur (or until the root ring is encountered). That is, a plurality of transitions to higher rings occurs before further routing progress can be made. For example, referring now to FIG. 10, when no further routing progress can be made on ring 1031, proximity criteria may be relaxed enough to transition to ring 1011 or even to root ring 1001.

Node Phases

A node participating in a federation infrastructure can operate in different operational phases. Valid phase values for a node can be defined to be members of an ordered set. For example, {NodeId}.{InstanceIds}. {Phase Value [Phase-State Values: Inserting, Syncing, Routing, Operating]. [Phase.Unknown Indication: phase known at time of transmission, phase unknown at time of transmission]} defines one possible ordered set representing a phase-space of a given node within a federation infrastructure. A node instance can transition (or advance) through the node phase-states from Inserting to Syncing to Routing to Operating in order. Further, in some embodiments, a node instance can be configured such that the node instance is prevented from transitioning back to a prior node phase-state. In some embodiments, a node advances its instance ID each time the node comes up.

For example, a node instance can prevented from transitioning from Routing back to Syncing (or back to Inserting), etc. Accordingly, in some embodiments, when it is known that a given node instance (e.g., identified by (NodeId, InstanceId)) has advanced to a particular node phase-state (e.g., Operating), it is also known that the given node instance is not likely to (and in some embodiments will not) revert to a prior node phase-state (e.g., back to Routing, Syncing, or Inserting). Thus, there is a significant likelihood that any node instance in a node phase prior to the particular node phase-state is a new (and advanced) instance of the node.

In some embodiments, phase information and corresponding instance Ids (which advance as a node comes up) are transferred together. Thus, it is possible to determine that a lesser node phase-state for the same instance is older. Further, when a newer node instance is known (at any phase-state values) any information about older instances is considered out of date.

From time to time, nodes can reboot or lose communication with one another, such as, for example, when first starting up, through a graceful departure, or as a result of abnormal termination (crash). Thus, there is the potential for a node in any node phase-state to reboot or lose communication with other nodes. For example, a crash can cause a node in a Routing phase-state to reboot. During a reboot or lose of communication, there may be no way to determine what node phase-state a node is in. Accordingly, when a node is rebooting or communication to a node is lost, a [Phase Unknown Indication] can be set to indicate that the phase-state for the node is currently not known. However, any previously expressed and/or detected phase-state for the node can be maintained and is not lost.

The [Phase Unknown Indication] can be used to indicate whether a phase-state was known at the time a phase-state value was transmitted (e.g phase value with phase unknown not set) or if a phase-state is a previously expressed phase-state and the phase-state was not known at the time the phase-state was transmitted (e.g., phase value with phase.unknown set). Thus, the phase of a node (its phase value) can be represented using both a phase-state value and a phase.unknown indication.

Join Protocol

Figure 11A:
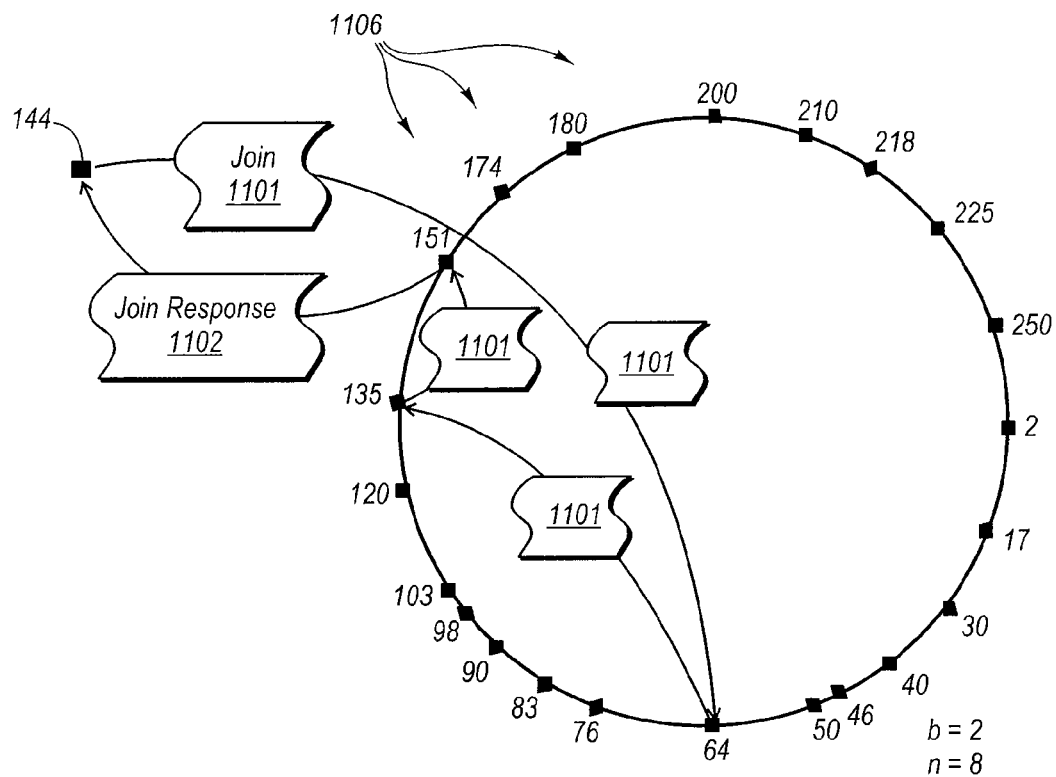
FIG. 11A illustrates an example of a node establishing membership within an existing federation.
Figure 11B:
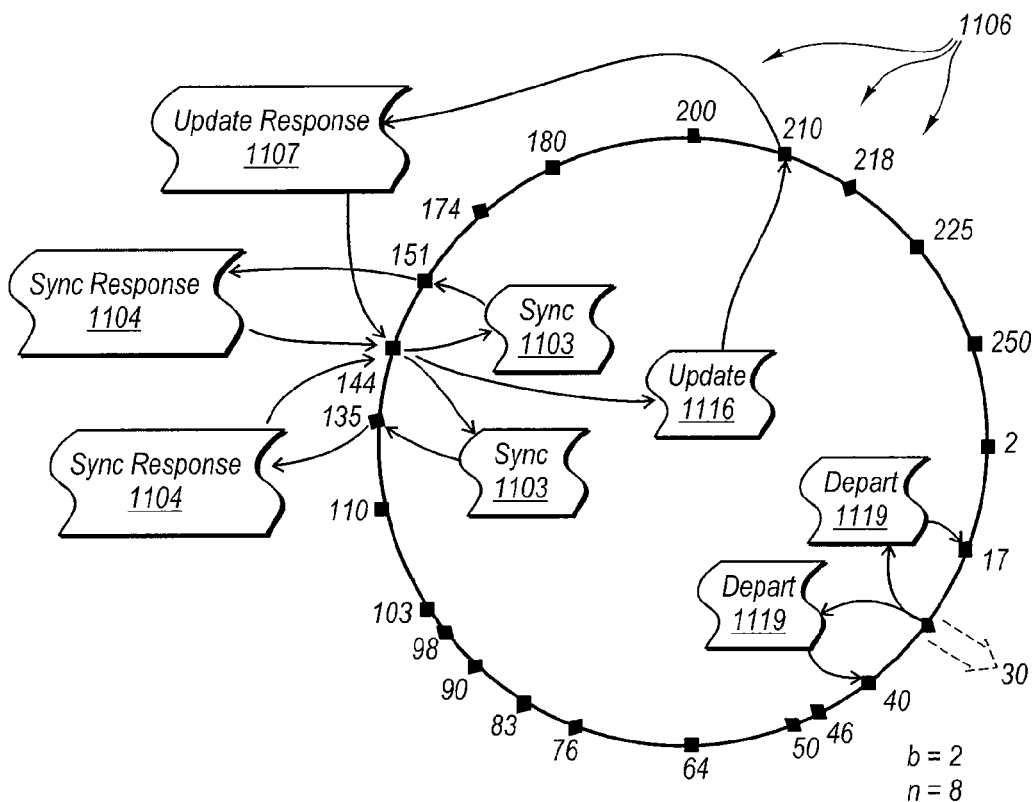
FIG. 11B illustrates an example of nodes in a federation infrastructure exchanging messages.

From time to time, nodes can join to and depart from existing federations. The nodes can implement appropriate protocols for joining and departing federations. For example, a node can implement a Join( ) function to become part of an existing federation. A node implementing the Join( ) function can transition through three ordered phase-states: an inserting phase-state, a synchronizing phase-state, and a routing phase-state before reaching the final operating phase-state. In other embodiments these specific order phase-states may not exist while others may be defined. FIG. 11A illustrates an example of a node establishing membership within a federation infrastructure. FIG. 11B illustrates an example of nodes in a federation infrastructure exchanging messages.

Insertion Phase:

A node, Y, enters this phase-state by issuing a join message, including at least its node ID and indicating a join action to the federation. A join message can be a routed message sent by a newly joining node (node Y) with its destination property set to the identity of the newly joining node. In this phase-state, a newly joining node is inserted between its predecessor and successor nodes in the federation. The insertion phase-state can be implemented according to the following algorithm (All arithmetic is performed modulo $b^n$):

IP1 Y identifies an existing node that is already part of a lowest ring from which the joining node wishes to participate in the federation. This can either be statically configured or dynamically discovered using DHCP and/or DNS and/or WS-Discovery or a (potentially well-known) constant. Let this existing federation node be E.

IP2. Y invokes E.RouteNumerically(Y, joinMsg) to determine the node X whose ID is numerically closest to Y.id in every proximity ring that the node Y participates. This can include routing a join message to multiple nodes.

IP3. Determine the numerical successor (s) and predecessor (p) nodes. (Note that the data needed to do the following insertion can be carried in the join message and its response. As such, there are no additional roundtrips needed.)

Case 1: X.id>Y.id
Y.s=X, Y.p=X.p, X.p.s=Y, and X.p=Y
Case 2: X.id<Y.id
Y.p=X, Y.s=X.s, X.s.p=Y, and X.s=Y In response to the join message, node X (the node that processed the join message) can send a join response back to node Y. The join response can indicate the predecessor node (Y.p) and successor node (Y.s) for node Y. Node Y can receive the join response and process the join response to become aware of its predecessor and successor nodes. After processing the join response, Node Y can be a weak routing participant in the federation. For example, Node Y can simply forward message sent to it, either to its successor or predecessor nodes. Thus, Node Y is inserted into the federation infrastructure but routing and neighborhood tables are not populated. Before reaching this point, node Y will request other nodes sending it messages to redirect the messages sent to it through a different node by returning a status message to the sending node indicating that node Y's liveness phase is in an inserting phase-state.

Generally, from time to time, nodes can exchange sync request and response messages. Sync request and sync response messages can include liveness information (e.g., headers) for other nodes from the sender's point of view. Neighborhood state can also be included in sync request and response messages such that application layers in a neighborhood are aware of one another's state. One example of when sync request and response messages are exchanged is during a synchronizing phase-state of a joining node. However, sync request and response messages can be exchanged during other operational phase-states as well (e.g. while in the Operating Phase-state).

FIG. 12 depicts an example of a message model and related processing model 1200. As depicted in FIG. 12, a node can send and receive sync requests messages. For example, sync request message 1201 can be received at function layer 1651 from a newly inserted node (e.g., the node in FIG. 11B having ID 144). Application data 1202 (e.g., namespace subscriptions) can be piggybacked in sync request message 1201. Function layer 1251 can inform application layer 1252 of any application data included in sync requests messages. For example, function layer 1251 can invoke neighborhood state sync event 1203, including application data 1202, to application layer 1252. Sync request 1231, including application data 1207, can also be sent to another node that processes sync request 1231 similar to the processing to sync request 1201 in processing model 1200.

In response to some function layer event (e.g., sync request message 1201, sync response message 1241, or ping message 1212) function layer 1251 can invoke the neighborhood state request function 1204 in application layer 1252. Neighborhood state request 1204 is a request to the application layer to obtain the state that needs to be propagated in the neighborhood. In response to neighborhood state request 1204, application layer 1252 can supply neighborhood state 1206, including optional application data 1207, to function layer 1251. Alternately, application layer 1252 can send neighborhood state 1206, including optional application data 1207 in reaction to some application layer event. Using internal mechanisms similar to the above, function layer 1251 can send sync response message 1208, including optional application data 1207, to propagate application layer neighborhood state.

Synchronization Phase:

After processing a join response message, a node Y transitions from the insertion phase-state to synchronizing (Syncing) phase-state. In the synchronization phase-state, the newly-inserted node Y synchronizes information with nodes in the neighborhood. Generally, Node Y can send sync messages to at least its predecessor and successor nodes identified in the insertion phase-state. These nodes processing the sync messages can return sync responses that indicate corresponding neighborhood and routing partner nodes of these processing nodes. In a more specific example, the synchronizing phase-state can be implemented according to the following algorithm (All arithmetic is performed modulo $b^n$):

SP1. Compute the Neighborhood(Y) from the union of Neighborhood(Y.s) and Neighborhood(Y.p) nodes in each proximal ring the node Y participates. The union computation can be done as follows:

$$(s_j, \ldots, s_1, s, p, p_i, \ldots, pk) \text{ such that } s_j.s.\text{id} > (Y.\text{id} + u/2), j \geq v/2-1, p_k.p.\text{id} < (Y.\text{id} - u/2), \text{ and } k > v/2-1$$

SP2. Referring briefly to FIG. 12, query Y's local application layer (e.g., application layer 1252) via a neighborhood state request (e.g., neighborhood state request) 1204 to obtain optional application specific neighborhood data (e.g., application specific data 1207).

SP3. Send synchronize message to at least the proximal successor and predecessor nodes including at least liveness state information of each proximal neighborhood and routing partner node from Y's perspective. Any optional application specific neighborhood data (e.g., application data 1207) accessed via SP 2 is included in the sync request 1231.

SP3. Y receives sync response messages back from those nodes processing sync messages sent in SP2. For example, node Y can exchange synchronize messages (request/response) with one or more nodes within its computed neighborhood. After synchronize messages are exchanged with at least one and potentially all of a node Y's neighborhood nodes, the computed neighborhood nodes can exchange further messages to propagate synchronized data. A synchronization message (request or response) can be a non-routed message sent by a node to proactively synchronize its data with a target node that is, for example, in the nodes neighborhood.

SP4. As sync response message in SP3 are received (e.g., sync response message 1241), any optional application specific neighborhood data present in these received sync response messages (e.g., application data 1222) can be offered to Y's application layer 1252 via neighborhood state sync event 1203.

As part of the synchronizing phase-state, the proximal successor (e.g., Y.s) and predecessor (Y.p) nodes exchange their routing tables with the newly-inserted node (e.g., Y). Nodes that receive sync messages can respond by sending sync responses. Sync responses carry data similar to synchronize messages except from the perspective of the responding node. Both sync messages and sync responses can carry (or piggyback) application data. Thus, application data can be propagated between nodes during the synchronizing phase-state. When the synchronize phase-state is complete, the node can process messages destined for it, instead of simply forwarding them either to a successor or predecessor. However, the node may still be viewed as a weak routing participant because its routing table is not populated.

Routing Phase:

After the synchronizing phase-state is completed, a node transitions into the routing phase-state. In the routing phase-state, the newly-synchronized node (e.g., node Y) computes its routing nodes. The routing phase-state can be implemented according to the following algorithm (All arithmetic is performed modulo $b^n$):

RP1 If the routing phase-state is being executed as part of the balancing procedure (explained later), ensure that the successor node (Y.s) and the predecessor node (Y.p) are alive in every proximity ring the node Y participates. If either is not alive, determine the replacement node for the failed one(s) by choosing a next best successor or predecessor node among the neighborhood nodes in the ring under consideration.

RP2. For $1 \leq i \leq n-1$

RP2*a*. Compute $z = Y.id \pm b^i$

RP2*b*. If the ring d is not the most specific proximity, find the proximity ring d in which the node Y participates and satisfying the condition $Y.s_d.id < Y.id + b^i < Y.s_{d+1}.id$ or $Y.p_d.id < Y.id - b^i < Y.p_{d+1}.id$. Else make ring d the most specific proximity ring. Ring d is the proximity ring in which node Y should look for the routing partner closest to z. Let Q be the node numerically closest to z between and $Y.s_d.r_{\pm i}$ and $Y.p_d.r_{\pm i}$. If |Q.id−z| is within a configurable percentage of $b^i$ (typically 20%), simply make If Q.id is closer to z than either $(Y.s_d.id \pm b^i)$ or $(Y.p_d.id \pm b^i)$, it means node Y is a better partner routing node to node Q in proximity ring d than either $Y.s_d$ or $Y.p_d$. Therefore, send updateMsg to node Q, if it has not already been sent, supplying i and node Y as parameters so that node Q can establish node Y as its partner routing node at $r_{-i}$.

RP2*c*. If this phase-state is being executed as part of the balancing procedure and if $Y.s_d.r_{\pm i}.id == Y.p_d.r_{\pm i}.id$, there is only one node in the numerical range between $(Y.s_d.id \pm b^i)$ and $(Y.p_d.id \pm b^i)$. That node is the one pointed to by the routing node $r_{\pm i}$ of the successor (or predecessor) node. Therefore, simply make $Y.r_{\pm i} = Y.s_d.r_{\pm i}$.

RP2*d*. Else, compute the routing partner $Y.r_{\pm i}$ by invoking RouteProximally on node Q with the proximity criterion set to that of ring d. This implies $Y.r_{\pm i} = Q.RouteProximally(z, updateMsg, d)$.

RP3. At this point, node Y can process not only messages destined for it but can also route messages.

RP4. Subscribe to liveness notification events sent from the application layer for the endpoint IDs of the partner routing nodes, if this has not already been done. Also, revoke any liveness event subscriptions previously established with the application layer for the nodes that are no longer partner routing nodes. For example, referring briefly back to FIG. 6, subscription and/or revoke requests can be passed up to an application layer (e.g., application layer 621) that implements pub-sub logic for a corresponding application (e.g., a namespace application). When subsequent application specific liveness messages (e.g. those resulting from namespace subscriptions) are received at the application layer, notifications (events) can be pushed down to other lower layers (e.g., other lower layers 631) for processing.

Figure 13:
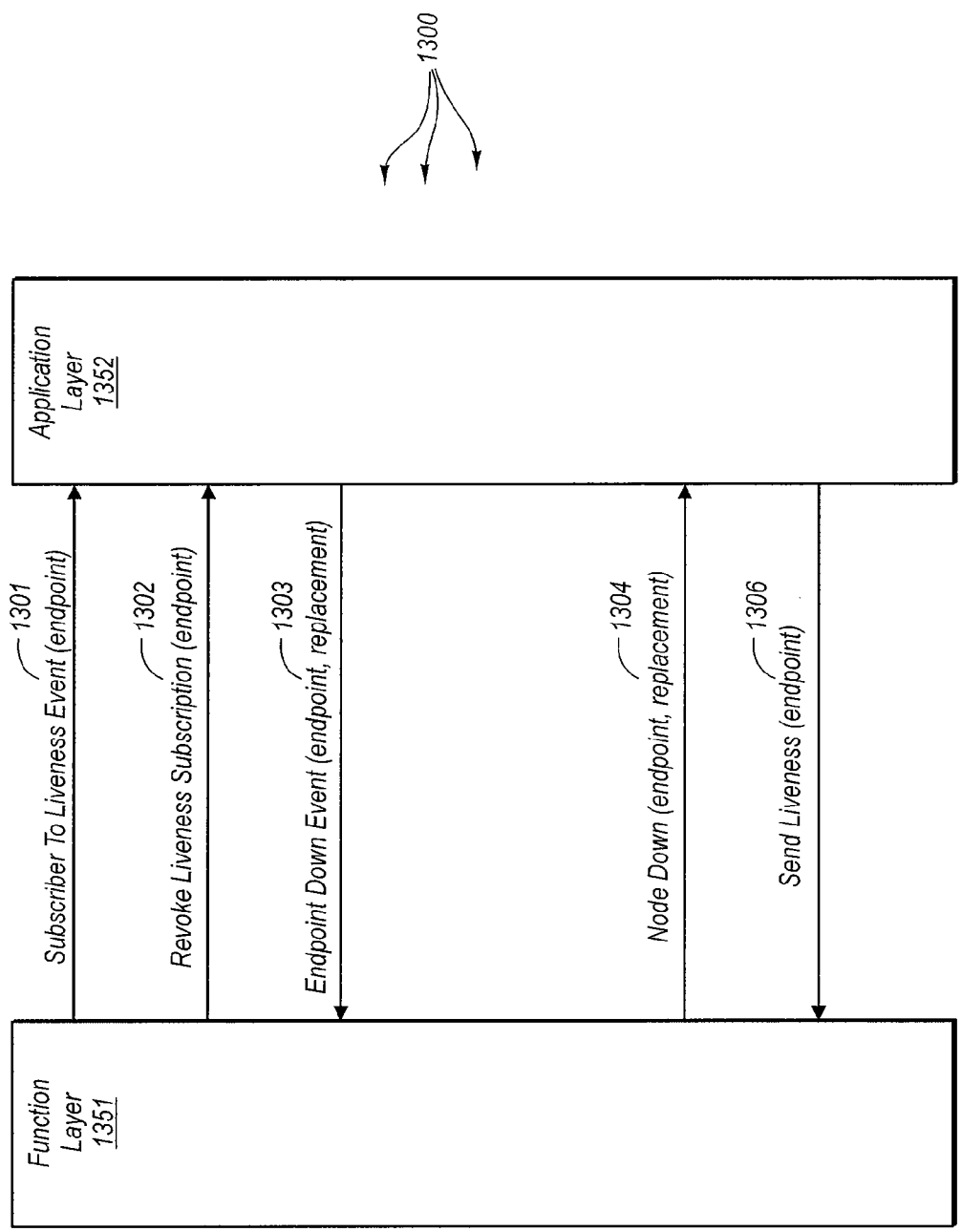
FIG. 13 illustrates an example of a number of liveness interactions that can occur between a function layer and an application layer.

FIG. 13 depicts an example of a number of liveness interactions that can occur between function layer 1351 and application layer 1352. As depicted in FIG. 13, endpoints are, for example, publish/subscribe topics (e.g., represented by a URL or URI) representing various nodes and can be, for example, federation infrastructure nodes. Subscribe To Liveness Event 1301 can be invoked from function layer 1351 to application layer 1352 to subscribe to a liveness event (e.g., to a publish/subscribe topic). Revoke Liveness Subscription 1302 can be invoked from function layer 1351 to application layer 1352 to revoke a subscription to a liveness event. End Point Down Event 1303 can be sent from application layer 1352 to function layer 1351 to indicate that an endpoint may be down and provide function layer 1351 with an optional replacement endpoint. End Point Down Event 1303 can be sent asynchronously based on a prior subscription (e.g., Subscribe To Liveness Event 1301).

Node Down 1304 can be invoked from function layer 1351 to application layer 1352 to indicate that function layer 1351 (or some other lower layer) has detected a failed node and optionally provide application layer 1352 with a replacement node. Application layer 1352 can subsequently propagate that a potentially failed node was detected to other interested parties. Node down event 1304 can be sent asynchronously anytime function layer 1351 or some other lower layer detects a potentially failed node. Send liveness 1306 can be invoked from application layer 1352 to function layer 1351 when application layer 1352 detects that a node is down (e.g., from node down event 1304 or from some other out-of-band mechanism). Send liveness event 1306 can cause function layer 1351 to send a liveness message. Send liveness event 1306 can also be invoked asynchronously anytime application layer 1352 detects that a node is down and does not depend on any prior established subscriptions (via subscribe to liveness).

Thus, in some embodiments, function layer 1351 is used recursively. For example, function layer 1351 can indicate an interest in a specified node (e.g., is the particular node up or down) to application layer 1352. Application layer 1352 can formulate an application specific subscription for notifications related to the specified node and then reuse function layer 1351 to communicate the formulated subscription to appropriate corresponding application layer 1352 instances in other federation nodes. For example if the application layers 1352 with in federation nodes implemented a namespaces pub/sub behaviors, function layer 1351 can route the subscription to a publish/subscribe manager that manages notifications for the specified node—the pub/sub Manager being implemented as at least part of the application 1352 in the related federation nodes. Accordingly, function layer 1351 is used to route a subscription that function layer 1351 caused to be generated. Similar recursive mechanisms can also be used to unsubscribe or otherwise indicate that there is no longer an interest in the specified node.

Operating Phase:

After the routing phase-state is completed, a node transitions into the operating phase-state. The node can remain in an operating phase-state until it goes down (e.g., rebooting). In the operating phase-state, the node can send update messages to routing partners from time to time. Update messages (both update requests and update responses) can include neighborhood node liveness information for the sending nodes (e.g., for all proximal neighborhoods of interest). This sent liveness information can also include that of the sender's liveness info. Update messages can be routed messages originated by nodes to periodically update its routing partner nodes. Application data can be piggyback on update messages such that application data can be propagated during routing partner updates. The message destination is set to the identity of the perfect routing partner at the desired routing index. The Message ID property of this message is assigned an application sequence number so as to enable the node(s) processing this message to determine the latest message and this message is routed proximally.

A node that receives an update message can respond with an update response. An update response carries the same data as the update message except that the data is from the perspective of the responding node. Through the exchange of update messages and update responses nodes can exchange routing information. From time to time, operational nodes can update routing partners.

From time to time, operational nodes can also send ping messages (e.g., ping messages 1209 and 1211 in FIG. 12). A ping message is a one-way message sent by a node to periodically announce its presence and disseminate information within its neighborhood about its neighborhood/routing nodes and replicate (e.g., piggybacked) application data.

An origin node can send a ping message to one or more of its immediate predecessor and successor neighborhood nodes. Thus, depending on the ping distribution pattern (i.e., which nodes are sent ping messages) information related to the origin node is propagated to other nodes on a ring within the neighborhood of the origin node. For example, the origin node can send a ping message only to its immediate predecessor and successor nodes and the ping message propagates outward from the position (node ID) of the origin node along the ring in both directions to the edge of the origin's neighborhood. Alternately, the origin node can send a ping message to every $n^{th}$ node in its neighborhood in both its predecessor and successor directions.

Each node receiving a ping message checks its interest in the origin node from a neighborhood range perspective. If not interested, it discards the ping message. If interested it processes the ping message and forwards the ping message according to its specified ping pattern if such forwarding is constrained to the neighborhood of the originating node. For example, after processing a ping message a receiving node can forward the ping message to at least its successor node if the sending and origin nodes are in its predecessor node set or at least its predecessor node if the sending and origin node are in its successor set.

Thus, the outward propagation of ping messages stops when the message reaches the edge of the neighborhood node set around the origin node. The Message ID property of ping message is assigned an application sequence number so as to enable the nodes processing this message to determine the latest message from the origin node and avoid duplicate processing or otherwise unneeded forwarding.

Referring back to FIG. 12, ping message 1209 can be received at function layer 1251 from a neighborhood node. Application data 1212 (e.g., namespace subscriptions) can be piggybacked in ping message 1209. Function layer 1251 can inform application layer 1252 of any application data included in ping messages. Similarly, function layer 1251 can inform application layer 1252 of any application data included in Sync Request messages. Both of these cases of transference can be accomplished via sending a neighborhood state sync event 1203, including application data 1212, to application layer 1252.

In response to some function layer event (e.g., received ping message 1209) function layer 1251 can send neighborhood state request 1204 to application layer 1252. Neighborhood state request 1204 is invoked on the application layer 1252 to obtain the state that needs to be optionally propagated in the neighborhood. In response to neighborhood state request 1204, application layer 1252 can return neighborhood state 1206, including optional application data 1207, to function layer 1251. Function layer 1251 can send ping message 1211, including optional application data 1207, to propagate neighborhood and routing partner node liveness information as well as optional application layer neighborhood state. Function layer 1251 can also send sync response 1208, including optional application data 1207, to propagate application state.

Departure Protocol

When it is appropriate for a node to depart from a federation, the node can implement a Depart function to be gracefully removed from the federation. A node departs an existing federation by sending a departure message to one or more of its immediate proximal predecessor and successor nodes, and maybe other nodes in the same proximal neighborhood. Thus, depending on the departure distribution pattern (i.e., which nodes are sent departure messages) information related to the departing node is propagated to other nodes on a ring within the neighborhood of the departing node. A departure message is a one-way message originated by a gracefully departing node to inform one or more other nodes within at least one of its proximal neighborhoods about its impending departure. The departing node propagates the depart message (e.g., within its neighborhood) in a manner similar to the propagation of the ping messages. For example, referring back to FIG. 11, the node having ID 30 can send depart messages 1119 to the nodes having IDs 17 and 40. The node having ID 30 can then remove itself from the federation infrastructure from the standpoint of a given proximal ring. Note that it is possible that a node remove itself from one proximal neighborhood but not others to which it may belong.

Since the nodes having IDs 17 and 40 (i.e., the predecessor and successor nodes) are likely to be the closest nodes to ID 30 after the node having ID 30 is removed, the nodes having IDs 17 and 40 are made aware of the node having ID 30's departure. Thus, future messages that are to be delivered to ID 30 can be appropriately processed at the nodes having IDs 17 and 40. The nodes having IDs 17 and 40 can propagate the departure of the node having ID 30 to the other nodes on ring

1206. In the absence of the node having ID 30, the nodes have IDs 17 and 40 can also recompute predecessor and successor pointers, potentially pointing to each other.

The Message ID property of a depart message is assigned the same application sequence ID as that of Ping messages so as to enable the nodes processing the depart message to determine the latest message among a series of ping and depart messages sent by an origin node. Graceful departure from a federation proximal ring is optional but encouraged. However, the federation is designed to self-heal if nodes leave abruptly.

Liveness

During the lifetime of a federation, nodes can exchange liveness information to maintain the federation. Liveness information can be included in virtually any message that is exchanged within a federation in the form of Liveness Message Headers. For example, join messages, join responses, sync messages, sync responses, update messages, update response, application specific messages, liveness messages, and ping messages can all include liveness information headers. When a federation node sends any message or response, the node can include Liveness information for processing by other nodes. Liveness information can be included in a liveness information header of liveness message.

Liveness information indicating the liveness state of a node can be represented using the following properties:

[Node]: Identifies the node whose liveness state is being represented. A node can be identified based on [Reference Properties] that further include an [Instance ID].
  [Reference Properties]: Element information items specified in the WS-addressing specification. WS-addressing defines the [Instance ID] reference property for inclusion in the reference property set.
    [Instance ID]: A number that identifies a particular instance of a node. An incrementing boot count can be used as the instance ID of a node.
[Phase]: Conveys the phase of identified node.
  [Phase-State Value] Conveys the highest phase-state (inserting, synchronizing, routing, operating) that the indicated node instance was know to have achieved
  [Phase Unknown Indication] An indicator that conveys if the current phase is known or unknown.
[Freshness]: Conveys the freshness of the information and its value ranges from 0 to MaxFreshness. The higher the value, the fresher the information with 0 implying no information and MaxFreshness is a protocol defined constant.
[Color]: Identifies the proximity equivalence class to which the node belongs. Two nodes with the same color value are always considered to be proximally closest because they both belong to the same equivalence class identified by the color value. The number of proximity equivalence classes can increase over time as more nodes join the federation.
[Weight]: Supplies the node capability metric and its value ranges from 0 to MaxWeight. It measures the desirable characteristics of a federation node such as large computational power, high network bandwidth, and long uptime. The higher the value, the more capable the node is making it more desirable from a partnership perspective.

In some environments, the [Node] and [Freshness] properties of a node are either implicitly or explicitly conveyed in a larger scope such as the [Origin] and [Sender] message headers and as such inclusion of the above properties again in the liveness headers will be duplicative. For example the sender of a message need only convey its current phase, color, and weight information as its ID, Instance Id are supplied in the message addressing headers and its Freshness is implied.

Liveness state can be at least partially ordered based on a "<" binary relation defined as follows:

"L1<L2" is true if

1. "L1.[Node].[Name]=L2.[Node].[Name]" is true and one of the following is true with the tests performed and short-circuited in the order listed:
  L1.[Node].[Reference Properties].[Instance ID]<L2.[Node].[Reference Properties].[Instance ID]
  L1.[Phase.Unknown Indication]!=true AND L2.[Phase Unknown Indication]!=true AND L1.[Phase-State]<L2.[Phase-State]
  L1.[Freshness]<L2.[Freshness]
2. Or "L1.[Color]=L2.[Color]" is true and one of the following is true with the tests performed and short-circuited in the order listed:
  L1.[Phase-State]<L2.[Phase-State]
  L1.[Weight]<L2.[Weight]

Further, a liveness "down" message can be sent to a specified node when it is detected or suspected that the specified node has become unavailable (e.g. gone down). As an example, referring briefly again back to FIG. 6, when an application layer (e.g., application layer 621) detects that another application layer (e.g., application layer 623) or a node hosting that another application layer is down, the detecting application layer can notify other lower layers (e.g., other lower layers 631) that the node may be down, for example, in accordance with message model and related processing models 1200 and/or 1300. Such a notification can cause other lower layers, such as, for example, function layer 1251, to send a liveness down message. This is only one example of stimulus for the generation of liveness down messages.

Since liveness down messages are routed and thus delivered to a node closest to those nodes suspected of being down, if a liveness down message for a specified node gets delivered back to the specified node, then either the specified node never went down or the specified node is a different instance (e.g., with a different instance ID). On the other hand, if the liveness down message gets delivered to another node, it indicates the specified node does appear to have gone down. Accordingly, if the node receiving the liveness down message views itself as being in the proximal neighborhood of the specified node, it may source a departure message for the specified node into that proximal neighborhood as described as well as indicating to its the application layer (e.g., using Node Down 1304) that the specified node may be down and that the receiving node is its replacement. A liveness down message for the specified node can be routed proximally with its target ID set to that of the node that may be down.

Balancing Procedure

Embodiments of the present invention are designed to accommodate large number of nodes joining and departing the federation in a short period of time. Such changes in the network can cause routing delays if the logarithmic search trees maintained at the various nodes become unbalanced. That is, if there are more nodes on one side of a ring than the other. To facilitate optimal routing efficiency, nodes participating in a federation execute the balancing procedure when certain criteria are met.

For example, when any of the following conditions are true, any node can execute the balancing procedure to ensure a balanced routing table for optimal routing efficiency:

A configured number of liveness messages described above were received.

A configured amount of time has elapsed since the receipt of the last liveness message described above.

The neighborhood has changed in the sense that some new nodes have arrived or some existing nodes have departed.

Balancing the routing tables is a simple process. For example, nodes with an unbalanced routing table can re-execute the Synchronization and Routing phase-states of the Join protocol.

Acts RP2*b*, RP2*d* and RP4 combined with 1) finding the closest routing node to a number, 2) the departure protocol followed by the nodes leaving a federation gracefully, and 3) balancing procedure followed by the nodes receiving liveness messages result in a the faster healing system when federating nodes join and depart the network fairly quickly and in large numbers.

Status Messages

Figure 14:
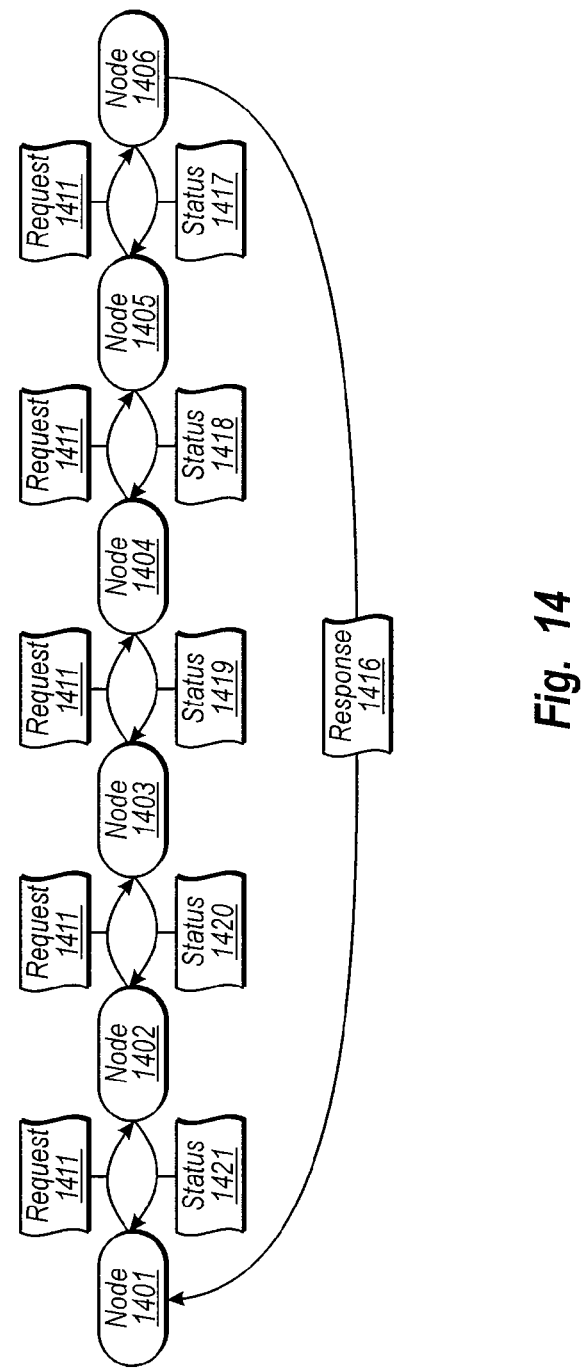
FIG. 14 illustrates an example of messages forming part of a request-response message exchange pattern are routed across nodes on a ring.

A status message is non-routed message sent by a receiver node to a sender node to inform routing success/failure of a correlated message that the sender node previously forwarded to the receiver node. FIG. 14 depicts an example of how messages forming part of a request-response message exchange pattern are routed across nodes on a ring. A status message can include headers that identify the original correlated message whose routing status is being reported. As such, status messages can be used between nodes to indicate that message was successfully routed form one node to the next. For example, routing request message 1411 from node 1401 to node 1406 includes sending request 1411 though nodes 1402, 1403, 1404, and 1405. Corresponding cascading success status messages (status 1417, 1418, 1419, 1420 and 1421) can be sent from node 1406 to node 1405, from node 1405 to node 1804, from node 1404 to node 1403, from mode 1403 to node 1402, and from node 1402 to node 1401 respectively. In response to request 1411, response 1416 can be sent end-to-end from node 1407 to node 1401. Response 1416 is optional and may not exist in a one-way message exchange pattern.

Joining A Federation Infrastructure

Embodiments of the invention include a node joining a federation infrastructure. Joining a federation infrastructure can include an act of issuing a join message to a federation infrastructure. For example, referring to Figure back to FIG. 11A, the node having ID 144 can issue join 1101 to federation infrastructure including ring 1106. Joining a federation infrastructure can include an act of receiving a join message from a joining node. For example, an existing node in the federation infrastructure including ring 1106 can receive join 1101.

Joining a federation infrastructure can include an act of routing a join message to a processing node. The processing node can be a node having an ID numerically closer the ID of the joining node than other active nodes in the federation infrastructure at the time the join message is being routed. For example, join 1101 can initially be received at the node having ID 64, routed to the node having ID 135 and routing to the node having ID 151.

Joining a federation infrastructure can include an act of computing one or more predecessor nodes and one or more successor nodes for the joining node. For example, the node having ID 151 can compute an immediate predecessor node and an immediate successor node for the node having ID 144. Within ring 1106, the node having ID 151 can compute that the node having ID 135 is an immediate predecessor node that the node having ID 151 is an immediate successor node. Similar computations can be made for other proximal rings.

Joining a federation infrastructure can include an act of computing one or more routing nodes for the joining node. For example, the node having ID 151 can compute routing nodes (from the node having ID 151's perspective) for the node having ID 144. Within ring 1106, the node having ID 151 can compute, for example, that the nodes having IDs 218 and 40 are routing nodes for the node having ID 144. Similar computations can be made for other proximal rings.

Joining a federation infrastructure can include an act of sending a join response to the joining node. A join response can identify all the predecessor and successor neighborhood and routing partner nodes for the joining node as computed by the processing node given its current view of the federation infrastructure. For example, join response 1102 can identify at least the node having ID 135 as the immediate predecessor node to the node have ID 144, can identify the node having ID 151 as the immediate successor node to the node having ID 144, and can identify any routing nodes (for the node having ID 144) computed at the node having ID 151 for node ID 144 (the newly joining node).

Joining a federation infrastructure can include an act of receiving a join response from a federation node that processed the join message. For example, the node having ID 144 can receive join response 1102 from the node having ID 151.

Joining a federation infrastructure can include an act of sending a sync request to at least each of the immediate proximal predecessor nodes and immediate proximal successor nodes. For example, referring now to FIG. 11B, the node having ID 144 can send sync requests 1103 to the nodes having IDs 135 and 151. Sync request 1103 can include an identification of any neighborhood nodes of the node having ID 144 and/or an identification of any routing partners of the node having ID 144.

The nodes having IDs 135 and 151 can receive the sync requests 1103. In response to receiving sync requests 1103, the nodes having IDs 135 and 151 can identify their neighborhood and routing partner nodes from corresponding routing tables. The nodes having IDs 135 and 151 can include their identified neighborhood and routing partner nodes' liveness information in sync response 1104 and send the send sync responses 1104 to the node having ID 144.

Joining a federation infrastructure can include an act of receiving a sync response from each of the proximal predecessor and successor nodes. For example, the node having ID 144 can receive sync responses 1104 from the nodes having IDs 135 and 151. Sync response 1104 can include liveness information for one or more nodes on ring 1106 or other rings in a federation infrastructure. Sync response 1104 can also identify any prospective routing partner nodes for the node having ID 144.

Joining a federation infrastructure can include an act of computing neighbor nodes. For example, the node having ID 144 can compute corresponding neighborhood nodes based on the union of the neighborhood nodes for the nodes having IDs 135 and 151. Neighborhood nodes can be computed based on a summarized view of the join response message and any sync response messages.

Joining a federation infrastructure can include an act of computing routing nodes. For example, the node having ID 144 can compute routing nodes from among the nodes of ring 1106. Routing partners can be computed base on a summarized view of the join response message and any sync response messages.

Joining a federation infrastructure can include an act of exchanging at least neighborhood node information with computed routing partners. For example, the node having ID 144 and the node having ID 218 (a computed routing partner) can exchange state information (e.g., instance ID, phase-state, etc) corresponding to their respective neighborhood nodes. These exchanges are accomplished by the newly joining node sourcing (routing) an Update message to at least each unique computed routing partner as described in the Routing Phase-state text above. The nodes processing the Update message will send corresponding Update response message in reaction to the receipt of these update messages from the newly joining node. The Update response includes at least the liveness information for itself and its neighborhood nodes.

Joining a federation infrastructure can also include an act of initiating an initial propagation of routing tables to at least one neighborhood node. For example, the node having ID 144 can include computed neighborhood and routing partner nodes in a ping message and send the ping message to the node having ID 174 (e.g., one of the computed neighborhood nodes). The node having ID 174 can receive the ping message and update a corresponding routing table with the liveness information originated at the node having ID 144. The node having ID 174 can also include its corresponding routing table in a second ping message and send the second ping message at some future point to the node having ID 144. The node having ID 144 can receive the second ping message and can update its corresponding routing table with nodes in the liveness information included in second ping message (i.e., nodes in the routing table of the node having ID 174). The node having ID 144 can repeat the sending of ping messages with other neighborhood nodes in ring 1206.

It should be understood that when a newly joining node joins a federation, the newly joining node may not find an existing federation member and thus becomes the sole member. Thus, there may be no predecessor, successor, or neighbor nodes assigned for the newly joining node. Accordingly, the newly joining node is mapped as the best routing partner in all cases.

Further, although joining a federation infrastructure has been described with respect to a single ring (ring 1106), it should be understood that in some embodiments a node that joins one ring inherently also joins one or more other rings. For example, referring briefly back to Figure '0, a node at joins ring '051 inherently also joins rings 1043, 1031, 1022, 1011, and 1001. Thus, joining a federation infrastructure can be implemented to join a plurality of rings. In other embodiments some or all of the acts of joining a federation infrastructure may be repeated when joining multiple rings. For example, referring again to FIG. 10, joining a federation infrastructure can be repeated when a node joins both ring 1051 and ring 1014 (e.g., aliasing).

In any event, a joining node ID can be accessed and used to identify a joining node in a sorted linked list as well as corresponding hierarchically partitioned sub-lists the joining node is to participates in. A receiving node is identified from the sorted linked list and each partitioned sub-list. The join message is routed to a processing node (e.g., based on ID) in the sorted linked list and each portioned sub-list. A join response is received from the processing node in the sorted linked list and each partitioned sub-list.

Maintaining Membership In A Federation Infrastructure

Embodiments of the invention include a node maintaining membership in a federation infrastructure. Joining a federation infrastructure can include an act of issuing a join message to a federation infrastructure. A node maintaining membership in a federation infrastructure can include an act of sending a first ping message to a neighborhood node. The first ping message indicates that a current node sending the first ping message is neighbor of the neighborhood node. The first ping message can also include routing partner and neighborhood nodes' state of the current node. For example, in FIG. 11B, the node having ID 144 can send a ping message to the node having ID 151. Upon receiving the first ping message, the node having ID 151 is made aware that the node having ID 144 is a neighbor of the node having ID 151. Node 151 may also discover newer liveness information (for other nodes on ring 1206) from node 144 as a side effect of this act.

Ping messages can be periodically repeated at a specified frequency based on, for example, configuration state associated with a proximal ring into which the ping message is to be sent. The frequency can be varied depending on the configuration state. For example a specified ping frequency for a WAN can be different than the specified frequency for a LAN. Ping messages can also be sent in accordance with a ping distribution pattern. The ping distribution pattern for an originating node can indicate that ping messages are to be sent to be neighborhood nodes in both directions on a ring. For example, the node having ID 144 can send pings both in the direction of the node having ID 135 and in the direction of the node having ID 151. Ping distribution patterns and frequencies can be varied. For example, per proximity ring.

A node maintaining membership in a federation infrastructure can include an act of receiving a second ping message from the neighborhood node. The second ping message indicates to the current node at least that the neighborhood node originating the second ping message is a neighbor of the current node. The second ping message can also include routing partner and neighborhood nodes' state of the originating neighborhood node. For example, the node having ID 151 can send a second ping message to the node having ID 144. Upon receiving the second ping message, the node having ID 144 is made aware that the node having ID 151 is a neighbor of the node having ID 144. The second ping message can also include liveness information for other nodes on ring 1106. Thus generally, ping messages can be exchanged within a neighborhood and can be used to maintain neighborhood membership (for each proximal membership) and an approximated common neighborhood view of node presence within the federation.

A received ping message can be periodically repeated/forwarded to other nodes within the proximal neighborhood into which the ping was originated (sent by the originating node). Forwarded ping messages can also be sent in accordance with a ping distribution pattern. The ping distribution pattern for a forwarding node can indicate that ping messages are to be sent to be neighborhood nodes in a direction away from an originating node. For example, the node having ID 151 can forward pings originating at the node having ID 144 in the direction of the node having ID 174. Ping forwarding distribution patterns can be varied, for example, per proximity ring.

Nodes can be configured to receive ping messages at corresponding intervals. When expected ping messages are not received, a node may interpret a communications failure and set the phase unknown indication for another node to true for the node that should have originated the expected, but at least late, ping message.

A node maintaining membership in a federation infrastructure can include an act of proximally routing an update request message to a perfect routing node. The update request message indicates to the routing node receiving such a routed update request that the current node is participating as a routing partner of the receiving routing node. The update request message can also include at least the current node's neighborhood nodes' identities (e.g. in the form of liveness information). For example, the node having ID 144 can route update message 1116 to the node having ID 208 (the perfect routing partner offset by 64 from 144). Because node 210 (a previously computed routing node) is closest to 208, it will receive and process the routed update request. Upon receiving update message 1116, the node having ID 210 is made aware (or is reinforced) that the node having ID 144 is a routing partner of the node having ID 210.

A node maintaining membership in a federation infrastructure can include an act of receiving an update response message from the processing (receiving) routing node. The update response indicates to the current node that the processing routing node is participating as a routing partner of the current node. The update response message can also include at least the processing routing partner's neighborhood nodes' identities. For example, the node having ID 210 can send update response 1107 to the node having ID 144. Upon receiving update response 1107, the node having ID 144 is made aware that the node having ID 210 is a routing partner of the node having ID 144.

A node maintaining membership in a federation infrastructure can also include an act of appropriately updating node information to indicate that the current node and the neighborhood node are participating as neighbors and that the current node and the neighborhood node are participating as routing partners. For example, the node having ID 144 can update node information corresponding to the node having ID 151 to indicate that the nodes having IDs 144 and 141 are participating in a (proximal) neighborhood. Similarly, the node having ID 144 can update node information corresponding to the node having ID 210 to indicate that the nodes having IDs 144 and 210 are participating as routing partners.

In some embodiments, application state saved at a specified node X is replicated among its Neighborhood(X) nodes using reliable-flooding protocol. Each item in the application state has an assigned owner, which could be the endpoint that created the item. Each item in the application state also has an associated timestamp (a.k.a. sequence number) given by its owner. The timestamp has at least three components:

Instance ID (e.g., an unsigned-integer) of the owning entity. Must be at least monotonically (>1) increasing.

Sequence ID (e.g., a URI) identifying the particular sequence generated by an owner. This component allows the same owner to generate multiple independent sequences Ordinal number (e.g., an unsigned-integer) identifying the offset within the identified application sequence ID.

Item timestamps are used to detect latest information associated with the corresponding item during replication because item timestamps generate at least a partial-order with <Instance ID, Sequence ID, and Offset> triples. The timestamp associated with an item being replicated is compared against the local one, if any, to detect the latest one. Item timestamps are also used to support idempotent semantics of create/update/delete operations. For example, when a node receives a request to update an existing item in the application state, the update is accepted only if the timestamp associated with the update request is higher than the one associated with the local item. Conflict resolution techniques based on vector timestamps can be utilized where items cannot be assigned a single owner. Application state replication provides fault-tolerance and facilitates load-balancing requests across neighborhood nodes.

As an optional behavior, Nodes not detecting (after a period of time) an expected Update or Ping from (origin) other partner (routing and/or partner) nodes can consider the phase-state unknown, set a phase unknown indication to true, and report it as such to other $3^{rd}$ party nodes. In other words periodic generation of updates and pings can be required. This requirement and actual timeout values can be an attribute of various proximal rings. For example, a ring can have more restrictive timing requirements for some sub-rings (e.g., in a LAN segment) and node failure detection/reporting is relatively quick. On the other hand, a ring can have less restrictive timing requirements (or even no timing requirements) for other sub-rings (e.g., on the Internet) and proactive node failure detection/reporting is relative long (or doesn't exist).

Discovering Liveness In A Federation Infrastructure

Embodiments of the invention include a node discovering liveness information for another node in a federation infrastructure. Generally, referring to FIGS. 11A and 11B, any message, such as, for example, sync 1103, sync response, 1104, update 1116, update response 1107, etc., can include at least one liveness header. In some embodiments, a liveness header includes a <node ID, instance ID, phase [phase-state value].[phase unknown indication], freshness value, a color (proximity) value, and a weight value> for a node. In other embodiments, a liveness header includes <a phase [phase-state value].[phase unknown indication], freshness value, a color (proximity) value, and a weight value>. In these other embodiments, liveness headers can be used to augment addressing headers that already include node ID and instance ID for sender and origin nodes. Since the addressing headers already include node ID and instance ID, this information can be omitted from the liveness header.

A node discovering liveness information for another node can include an act of receiving a liveness header representing state information for a node participating in a federation infrastructure. The liveness header includes at a least a received participating node ID, a received node's instance ID, a received phase value, and a received freshness value. For example, the node having ID 144 can receive a first liveness header in sync response 1104 from the node having ID 151. The first liveness header can include a <participating node ID, an instance ID, phase value [phase-state value].[phase unknown indication], a freshness value, a color (proximity) value, and a weight value> for the node having ID 174. The phase-state value (e.g., Inserting, Syncing, Routing, Operating) identifies the expressed phase of the node having ID 174 at the time of the first freshness value. The phase value (e.g., phase-state: [Inserting, Syncing, Routing, Operating], and phase unknown) identifies the expressed and/or detected phase information of the node having ID 174 at the time indicated by the first freshness value.

However, a freshness value can be discounted due to communication delay. A freshness value can also decay with the passage of time. The decay curves for a freshness value can differ (and may not be linear or symmetric) for the different phase states (including unknown). Thus, across different node phases, the decay of a freshness value can be non-linear and/or asymmetric.

A node discovering liveness information for another node can include an act of accessing at least a current instance ID, current phase value, and current freshness value for the participating node maintained at the current node. For example, the node having ID 144 can access a previous received and stored instance ID, phase value [phase-sate value].[phase unknown indication], and freshness value for the node having ID 174.

A node discovering liveness information for another node can include an act of comparing at least the received instance ID, received phase value, and received freshness value to the current instance ID, the current phase value, and the current freshness value respectively at a current node. For example, the node having ID 144 can compare the previously received and stored instance ID, phase value [phase-sate value.][phase unknown indication], and freshness value for the node having ID 174 to the instance ID, phase value [phase-sate value.] [phase unknown indication], and freshness value received in the liveness header.

The node having ID 144 can determine that current state information for the node having ID 174 (e.g., received from the node having ID 151) is stale based on (in order) the first instance ID being greater than the currently stored instance ID for the node having ID 174, based on first phase-state value being more advanced than the currently stored phase-state value for the node having ID 174, or based on the first freshness value being a value greater than the freshness value currently stored for the node having ID 174. The node having ID 144 can also determine that at least one phase.unkown indication (either currently stored or received in the liveness header) indicates that a phase-state was known at the time the phase-state was detected/transmitted.

A node discovering liveness information for another node can include an act of determining if state information for the participating node is to be updated at the current node based on the comparison. For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase unknown indication, or freshness value) with values included in the liveness header. For example, the node having ID 144 can update state information for the node having ID 174 to indicate that the node having ID 174 has transitioned to a more advanced phase-state.

In some embodiments, it can be detected that communication with the participating node may have been lost. For example, the node having ID 144 can detect that communication with the node having ID 151 has been lost. Referring briefly to FIG. 13, in response to a prior subscription for liveness events 1301 (with an endpoint of the node having ID 151), application layer 1752 can send endpoint down event 1303 (with an endpoint of the node having ID 151) to function layer 1351. In these embodiments such detected liveness conditions can be indicated in liveness information with the Phase Unknown indicator being set to true along with the last known Phase state value.

A node discovering liveness information for another node can further include an act of receiving a message that includes a second liveness header from a second different node in the federation infrastructure. For example, the node having ID 144 can receive a status message (from the node having ID 103 or some other node of ring 1106) that includes a second liveness header. The second liveness header can include <the participating node ID, a second instance ID, a second phase value [phase-state value].[phase unknown indication], a second freshness value, a second color (proximity) value, and a second weight value> for the node having ID 174. The second phase value (e.g., phase-state: [Inserting, Syncing, Routing, Operating], and phase unknown indication) identifies the expressed/detected phase of the node having ID 174 at the time of the second freshness value.

Alternately, subsequent to receiving the first liveness header, the node having ID 144 can attempt to communicate directly with the node having ID 174. If communication is successful, the node having ID 174 can return a message (e.g., sync response) having the node ID and second instance ID in an addressing header and having a liveness header including <the second phase value, the second freshness value, the second color (proximity) value, and the second weight value>. If a failure is detected, the node having ID 144 generates an internal liveness state change (e.g. freshness=max, and phase unknown indication=true) and processes the state change as if the state change were received from another node. Such a state change has highest freshness value.

A node discovering liveness information for another node can also include an act of comparing the second instance ID, the second phase value, and the second freshness value to the current instance ID, the current phase value, and the current freshness value respectively. For example, after receiving a status message from the node having ID 103, the node having ID 144 can determine that current state information for the node having ID 151 is stale based on (in order) the second instance ID being greater than the first instance ID, the second phase being more advanced than the first phase value, or the second freshness value being greater than the first phase value.

A node discovering liveness information for another node can also includes an act of determining if state information for the participating node is to be updated based on the comparison. For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase unknown indication, or freshness value) with values included in the second liveness header. For example, the node having ID 144 can update state information for the node having ID 174 to indicate that the node having ID 174 has transitioned to a more advanced phase-state.

In some embodiments, phase values are compared within the context of equal color values. As previously described, a node can participate in multiple proximity rings. Participation in multiple proximity rings can occur as a result of participation in a more specific ring implying participation in a more general ring (along a common spine). For example, referring back to FIG. 10, a node's participation in ring 532 also implies that the node is participating in rings 1022, 1011, and 1001. Thus, a color for a more specific ring also represents all parent proximal rings. Also as previously described, participation in multiple proximity rings can occur when a node in one ring is aliased into one or more other rings (potentially along different spines). For example, still referring to FIG. 10, a node participating in ring 1032 can be aliased into ring 1031 (or even ring 1041 that would imply participation in rings 1031, 1022, 1011, and 1001). Thus, a color for one ring (e.g., ring 1031) can be viewed as a peer color (or proximity) of another ring (e.g., ring 1032).

When a node participates in a plurality of proximity rings in an aliased fashion, there is some potential that phase values (e.g., phase-state values and/or phase unknown indications) for the node will differ between different proximity rings. Thus, a node that receives state information for another node, identifies the corresponding proximity ring for the state information (color) before determining if current state information is to be updated for that node and color. For example, the node having ID 144 can identify the corresponding proximity ring for received state information corresponding to the node having ID 174 before comparing the received state information to current state information.

Identifying an appropriate proximity ring can include comparing a received color value to one or more current color values. When the received color value and a current color value are equal, other state information, such as, for example, a current instance ID, a current phase value, and a current freshness value, can be compared to corresponding received state information, such as, for example, a received instance ID, a received phase value, and a received freshness value. On the other hand, when the received color value and a current color value differ, further comparisons do not occur.

Equality between color values can result in a variety of ways. For example, equality between color values can result when a current color value and a received color value indicate the same proximity ring (e.g., ring 1032). Further, equality between color values can result when a more specific color value is compared to a corresponding parent color value (e.g., another ring along the same spine). For example, comparing the color value for ring 1032 to the color value for ring 1011 (or ring 1022 or 1001) can result in equality. Thus, the child proximity is the parent proximity but is more specific.

Thus generally, currently operational nodes in a federation infrastructure can exchange expressed and detected liveness state information for other nodes even when communication with those other nodes appears to be lost.

Bootstrapping Mechanisms

Generally, in order for a node to become an active member of a federation (e.g., join), the node has to communicate with at least one other node that is already an active member of the leaf ring it intends to join. To help insure this initial form of communication is available, federations can utilize a bootstrapping mechanism. A bootstrapping mechanism can be used as a last resort when other types of communication fail to identify an active member of a leaf ring or security constraints require a newly joining node to initially communicate with at least one of a set of special nodes such as seed nodes. That is when other types of communication fail or because of security requirements, a bootstrapping mechanism can be used to identify an active member node of a leaf ring.

In some embodiments, seed nodes are used to bootstrap communication with a federation. Seed nodes provide well known points of entry for some types of cross (inter) proximity communication. Seed nodes help heal ring partitions due to infrastructure failure/recovery and general dynamism. Each ring can have at least one operational seed node in order to provide basic bootstrapping properties for a federation.

Peer seed nodes can communicate amongst themselves to maintain a ring structure (e.g., a doubly linked list) for a proximity that consists of at least all active seed nodes for that proximity. A dedicated seed node synchronization protocol can be used to provide each seed node with at least total knowledge of all other seed nodes' presence (active) state. An active seed node is a member node of the proximity leaf ring in which it is homed as well as all other ancestral rings of the leaf ring. Thus, a seed node can represent an entire spine of proximity rings, for example, from the seed node's leaf ring to the root ring. Accordingly, seed nodes can function as highly available and well known entry nodes in each of those proximity rings. As a result, presence state about seed nodes can be useful for various forms of communication (e.g., inter-proximal communication) within a federation. Accordingly, seed nodes can provide a number of special properties, such as, for example, acting as well known "join points" for joining nodes, acting as a secure ring authority, aiding in healing infrastructure partitions, and acting as a stable "entry node" for each of their proximities.

To provide presence data, a seed node's arrivals and orderly departures can be registered as a stable entry node at a rendezvous point in each of their proximities. For example, registration messages can be routed to a fixed URI whose destination ID is the SHA-1 hash of the string "Proximity:/". While in one embodiment seed nodes acting as stable entry nodes register themselves in this manner there are other embodiments where selected non-seed nodes may also register themselves in the same manner and with the same or similar protocols described here for seed node. When a stable entry node (such as a seed node) registers, the stable entry node can indicate each ring it is a member of Thus, information maintained at the rendezvous point identified by this fixed URI is essentially a list of stable entry nodes and their corresponding ring memberships. Accordingly, any node can refer to the rendezvous point identified by this fixed URI to obtain a list of available stable entry nodes and their ring memberships.

In one embodiment the stable entry node directly registers these arrival and departure events. In another embodiment, the stable entry node registers these events directly at a rendezvous point within its immediate proximity ring and that rendezvous point transparently facilitates (directly or indirectly) updating of all other appropriate rendezvous points in each of the remaining proximities rings to which the registering/unregistering stable entry node belongs. The application state sequencing and propagation properties of a federation can be used to maintain and propagate this stable entry node registration information. For example, a reliable-flooding protocol can be used to replicate saved application state among a node's Neighborhood nodes.

The promotion of a stable entry node's presence data towards the root ring allows other nodes in a federation to look up at least one entry node in every proximity. Entry Node Lookup can be facilitated by routing a node lookup message towards the above determined rendezvous point in the Lowest Common Ancestor Ring ("LCAR") of the leaf ring of the node performing the lookup and the desired proximity ring. For example, referring to FIG. 10, a node in ring 1041 may desire to communication with a node in ring 1033. However, the node in ring 1041 may have no direct knowledge of any node in ring 1033. Thus, the node in ring 1041 can send a Node Lookup Message to ring 1022 (the LCAR of ring of ring 1041 and ring 1033). A rendezvous point node in ring 1022 that processes entry node presence information (e.g. caused to exist in the system because of a registration message originated by that entry node) can return a Lookup Response Message with contact information for at least a registered stable entry node in ring 1033.

In some embodiments, stable entry nodes are seed nodes configured specifically as stable entry nodes for maintaining presence data for various proximities. In other embodiments, other types of nodes can also function as stable entry nodes maintaining presence data for various proximities and may also be configured to perform other operations. For example, certain other types of nodes may be configured (e.g., by an administrator) as being highly available and thus suitable as a stable entry node (i.e. to be registered as described above). However, the other types of nodes may not include additional seed node functionality (e.g., may not be trusted as a security ring authority). In some embodiments, rendezvous points that maintain entry node presence state for their immediate proximity may register themselves as a stable entry node in the ancestral ring or rings.

Node Monitoring

Figure 15A:
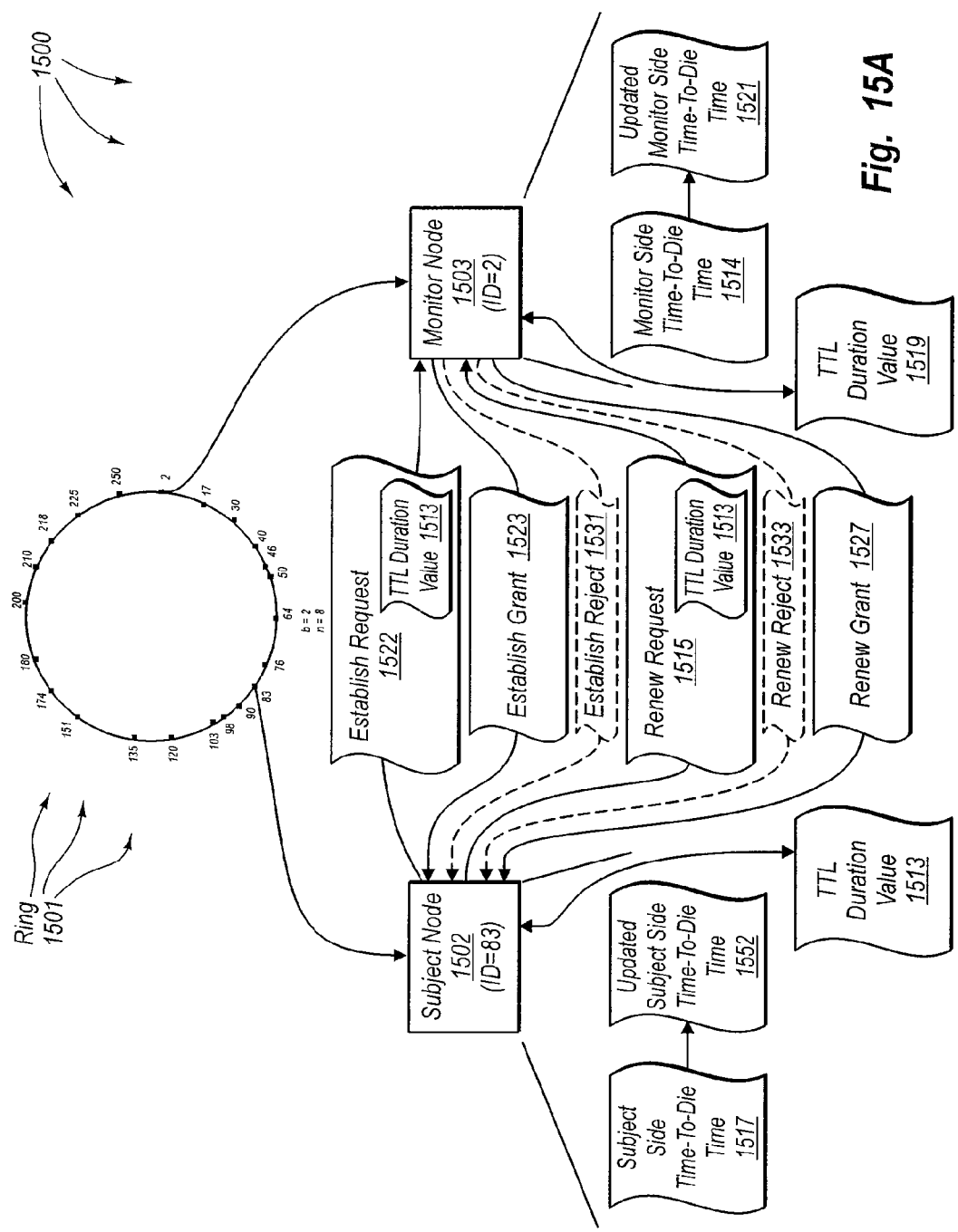
FIG. 15A illustrates an example ring architecture that facilitates one node monitoring another (e.g., subject) node.

FIG. 15A illustrates an example ring architecture 1500 that facilitates one node monitoring another node. As depicted, ring architecture includes at least ring 1501 (and any number of other higher and/or lower level rings (not shown)). Ring 1501 can be configured similar to ring 806 of FIG. 8. However, monitoring can occur on any ring of nodes, including any of the rings in FIGS. 9, 10, 11A, and 11B. FIG. 15A depicts an expanded view of subject node 1502 (having ID=83) and monitor node 1503 (having ID=2). In the depicted embodiment, monitor node 1503 is to monitor subject node 1502. However, any node on ring 1501 can be configured to monitor any other node on ring 1501.

Embodiments of the invention include one node monitoring another node. One node monitoring another node can include an act of a subject node generating a subject side time-to-live duration value for use in monitoring of the subject node. For example, subject node 1502 can establish time-to-live (TTL) duration value 1513. TTL duration value 1513 indicates a duration for which subject node 1502 can assume a monitoring relationship with monitor node 1503 is active.

One node monitoring another node can include an act of the subject node sending an establish request to the monitor node, the establish request indicative of the subject node requesting that the monitor node monitor the subject node, the establish request including the subject side time-to-live duration value. For example, subject node 1502 can send establish request 1522, including TTL value duration 1513, to monitor node 1503.

One node monitoring another node can include an act the subject node establishing an existing subject side time-to-die time based on the subject side time-to-live duration value and the time the establish request was sent, wherein the subject node clock reaching the existing subject side time-to-die time, prior to receiving an establish grant from the monitor node, is an indication of the subject node having to transition to a failure state. For example, subject node 1502 can establish subject side time-to-die time 1517 based on TTL duration value 1513 and the time the establish request 1522 was sent to monitor node 1503. Subject side time-to-die time 1517 can be a time relative to subject node 1502. If a clock of subject node 1502 reaches subject side time-to-die time 1517, prior to receiving an establish grant form monitor node 1503, subject node 1502 is to transition to a failure state. In some embodiments, when a clock of subject node 1502 reaches subject side time-to-die time 1517, prior to receiving an establish grant from monitor node 1503, a failure state is caused. In other embodiments, other activities occur to transition subject node 1502 into a failure state.

One node monitoring another node can include an act of the monitor node receiving the establish request from the subject node, the establish request indicative of the subject node requesting that the monitor node monitor the subject node, the establish request including at least the subject side time-to-live duration value, the subject side time-to-live duration value used to determine a subject side time-to-die time at the subject node, wherein the subject node clock reaching the subject side time-to-die time, prior to receiving an establish grant from the monitor node, is an indication of the subject node having to transition to a failure state. For example, monitor node 1503 can receive establish request 1522, including TTL duration value 1513, from subject node 1502. TTL duration value 1513 having been used at subject node 1502 to establish subject side time-to-die time 1517.

One node monitoring another node can include an act of the monitor node deriving a monitor side time-to-live duration value from the subject side time-to-live duration value. For example, monitor node 1502 can use TTL value duration 1513 to derive TTL duration value 1519. In some embodiments, monitor node 1503 copies TTL duration value 1513 to derive TTL duration value 1519. In these embodiments, TTL value duration 1513 and TTL value duration 1519 are equal.

In other embodiments, monitor node 1503 modifies TTL duration value 1513 to derive TTL duration value 1519. In these other embodiments TTL duration value 1513 and TTL duration value 1519 differ. For example, monitor node 1503 can increase the value of TTL duration value 1513 to derive TTL duration value 1519 such that TTL duration value 1519 is larger than TTL duration value 1513.

One node monitoring another node can include an act of the monitor node establishing a monitor side time-to-die time based on the monitor side time-to-live duration value and the time the establish request was received, the monitor node clock reaching the monitor side time-to-die time, prior to receiving a renew request from the subject node, being indicative of a suspected failure of the subject node. For example, monitor node 1503 monitor side time-to-die time 1514 based on TTL duration value 1519 and the time establish request 1522 was received. Monitor side time-to-die time 1514 can be a time relative to monitor node 1503. If a clock of monitor node 1503 reaches monitor side time-to-die time 1514, prior to receiving a renew request from subject node 1502, monitor node 1503 suspects subject node 1502 of failure.

One node monitoring another node can include an act of the monitor node sending an establish grant to the subject node to indicate to the subject node that the monitor node has agreed to monitor the subject node. For example, monitor node 1503 can send establish grant 1523 to subject node 1502. One node monitoring another node can include an act of the subject node receiving an establish grant from the monitor node, the establish grant indicative of the monitor node monitoring the subject node. For example, subject node 1502 can receive establish grant 1523 from monitor node 1503. Generally, establish grant 1523 indicates that monitor node 1503 has agreed to monitor subject node 1502. In some embodiments, the establish grant message can include the monitor side TTL duration value. For example, it may be establish grant 1523 includes TTL duration value 1519.

Alternately, a monitor node can send an establish reject to a subject node to indicate to the subject node that the monitor node has not agreed to monitor the subject node. For example, in response to receiving establish request 1522, monitor node 1503 can alternately (as indicated by the dashed line) send establish reject 1531 to subject node 1502. A subject node can receive an establish reject sent from a monitor node. For example, subject node 1502 can receive establish reject 1531 from monitor mode 1503. Establish reject 1531 generally indicates to subject node 1502 that monitor node 1503 has not agreed to monitor subject node 1502.

From time to time (and intermingled between the performance of other operations within ring architecture 1500), a subject node can renew an established monitoring agreement with a monitor node. Generally, the subject node leaves the existing agreement in force (the current subject-side-time to die time) until a new grant is received. However, the subject node can generate a new TTL duration value and derive what an updated time-to-die time would be. The subject node then sends the new TTL duration value to the monitor node. The monitor node receives the new TTL duration value. When appropriate the monitor node grants the renew request and sends a renew grant back to the subject. The subject node receives the renew grant. In response to receiving the renew grant the subject implements the renewed agreement using the updated time-to-die time as the new current time-to-die time.

As such, one node monitoring another node can include an act of the subject node sending a renew request to the monitor node prior to the subject node clock reaching the subject side time-to-die time. For example, subject node 1502 can send renew request 1515, including TTL duration value 1513, to monitor node 1503 prior to a clock of subject node 1502 reaching subject side time-to-die time 1517. In some embodiments, renew request 1515 does not include a subject side TTL duration value. In these embodiments, continued use of TTL duration value 1513 can be inferred. In other embodiments, TTL duration value 1513 is expressly included in renew request 1515. In yet other embodiments, a different subject side TTL duration value is included in renew request 1515. A new subject side TTL duration value can be generated and used by subject node 1502 in response to configuration changes of subject node 1502 and/or to configuration changes else where in ring 1501 (e.g., changed network conditions).

Node 1502 can also calculate what an updated subject side time-to-die time is to be if a corresponding renew grant responsive to renew request 1515 is received. The calculation can be based at least on the time renew request 1515 was sent and on the subject side TTL duration value related to or associated with renew request 1515.

One node monitoring another node can include an act of the monitor node receiving a renew request from the subject node subsequent to sending the establish grant message and prior to the monitor node clock reaching the monitor side time-to-die time, the renew request indicating that the subject node has not failed. For example, monitor node 1503 can receive renew request 1515 subsequent to sending establish grant 1523 and prior to a clock of monitor node 1503 reaching monitor side time-to-die time 1514. Reception of renew request 1515 can indicate to monitor node 1503 that subject node 1502 has not failed.

One node monitoring another node can also include an act of the monitor node granting the renew request to the subject node. For example, monitor node 1503 can grant renew request 1515.

One node monitoring another node can include an act of the monitor node establishing an updated monitor side time-to-die time in response to and based at least on the time the renew request was received, the monitor node clock reaching the updated monitor side time-to-die time, prior to receiving another renew request from the subject node, being indicative of a suspected failure of the subject node. For example, monitor node 1503 can establish updated monitor side time-to-die time 1521 in response to and based on the time renew request 1515 was received and the implied or indicated monitor TTL duration value related to or potentially contained in a renew request 1515. Updated monitor side time-to-die time 1521 can be a time relative to monitor node 1503. Updated monitor side time-to-die time 1521 can be subsequent to monitor side time-to-die time 1514. However, there is no requirement that monitor side time-to-die time 1514 have occurred before establishing updated monitor side time-to-die time 1521. Thus, it is also possible that updated monitor side time-to-die time 1521 is in fact prior to (or the same as) monitor side time-to-die time 1514. If a clock of monitor node 1503 reaches updated monitor side time-to-die time 1521, prior to receiving another renew request from subject node 1502, monitor node 1503 suspects subject node 1502 of failure.

If no subject side TTL duration value is included in renew request 1515 (and thus TTL duration value 1513 is inferred) or if renew request expressly includes TTL duration value 1513, monitor node 1503 can also use TTL duration value 1519 to establish updated monitor side time-to-die time 1521. On the other hand, if a subject side TTL duration value other than TTL duration value 1513 is expressly included in renew request 1515, monitor node 1503 can use the other expressly included subject side TTL duration value to derive a new monitor side TTL duration value. From the new monitor side TTL duration value, monitor node 1503 can then establish updated monitor side time-to-die time 1521.

One node monitoring another node can include an act of the monitor node sending a renew grant to the subject node to indicate to the subject node that the monitor node has agreed to continue monitoring the subject node. For example, monitor node 1503 can send renew grant 1527 to subject node 1502. One node monitoring another node can include an act of the subject node receiving a renew grant from the monitor node subsequent to sending the corresponding renew request and prior to the subject node clock reaching the subject side time-to-die time, the renew grant message indicative of the monitor node continuing to monitor the subject node. For example, subject node 1502 can receive renew grant 1527 from monitor node 1503 subsequent to sending renew request 1515 and prior to a clock at subject node 1502 reaching subject side time-to-die time 1517. Generally, renew grant 1527 is indicative of monitor node 1503 agreeing to continue to monitor subject node 1502.

Alternately, a monitor node can send a renew reject to a subject node to indicate to the subject node that the monitor node is no longer agreeing to monitor the subject node. For example, in response to receiving renew request 1515, monitor node 1503 can alternately (as indicated by the dashed line) send renew reject 1533 to subject node 1502. A subject node can receive a renew reject sent from a monitor node. For example, subject node 1502 can receive renew reject 1533 from monitor mode 1503. Renew reject 1531 generally indicates to subject node 1502 that monitor node 1503 is no longer agreeing to monitor subject node 1502.

One node monitoring another node can include an act of the subject node transitioning to a previously calculated updated subject side time-to-die time in response to receiving the renew grant, wherein the subject node clock reaching the updated subject side time-to-die time, prior to receiving another renew grant from the monitor node, is an indication of the subject node having to transition to a failure state For example, subject node 1502 can transition to updated subject side time-to-die time 1552 when the corresponding renew grant message is received. Updated subject side time-to-die time 1552 can have been calculated at around the time renew request 1515 was sent to monitor node 1503. Updated subject side time-to-die time 1552 can have been calculated based on the time corresponding renew request 1515 was sent and on the TTL duration related to or associated with renew request 1515. Updated subject side time-to-die time 1552 can be a time (e.g., subsequent, prior, or equal to subject side time-to-die time 1517) relative to subject node 1502.

If TTL value 1513 is still the appropriate TTL value, subject node 9102 can also used TTL duration value 1513 to establish updated subject side time-to-die time 1552. If another TTL duration value has been generated, subject node 1502 can also use the other generated TTL duration value to establish updated subject side time-to-die time 1552.

Subsequent, to establishment of a current subject side time-to-die time (either 1517 or 1552), it may be a clock at subject node 1502 reaches the current subject side time-to-die time prior to receiving another renew grant from monitor node 1503. This may result from communication errors between subject node 1502 and monitor node 1503. For example, subject node 1502 may send another renew request subsequent receiving renew grant 1527 and prior to a clock of subject node 1502 reaching updated subject side time-to-die time 1552. However, due to communication failures the other renew request does not reach monitor node 1503. Alternately, the other renew request may be received at monitor node

1503, but the corresponding renew grant from monitor node 1503 does not reach subject node 1502 due to communication errors. In either event, a clock at subject node 1502 may reach a current subject side time-to-die time prior to receiving the corresponding renew grant responsive to the other renew request.

Alternately, subject node 1502 can malfunctioning such that subject node 1502 is prevented from sending another renew request to monitor node 1503 prior to a clock at subject node 1502 reaching t updated subject side time-to-die time 1552.

However, whether or not a renew request is sent, if a renew grant is not received prior to a clock at subject node 1502 reaching a current subject side time-to-die time 1552, subject node 1502 transitions into a failure state.

Referring back to monitor node 1503, it may be that a clock at monitor node 1503 reaches a monitor side time-to-die time (either 1514 or 1521) prior to receiving another renew request from subject node 1502 (either due to a malfunction at subject node 1502 or to communication errors in ring 1501). As a result, monitor node 1503 suspects subject node 1502 of failure. Monitoring node 1503 can transition to a timeout state indicative of detecting a suspected failure at another node.

Two-Way Node Monitoring

Figure 15B:
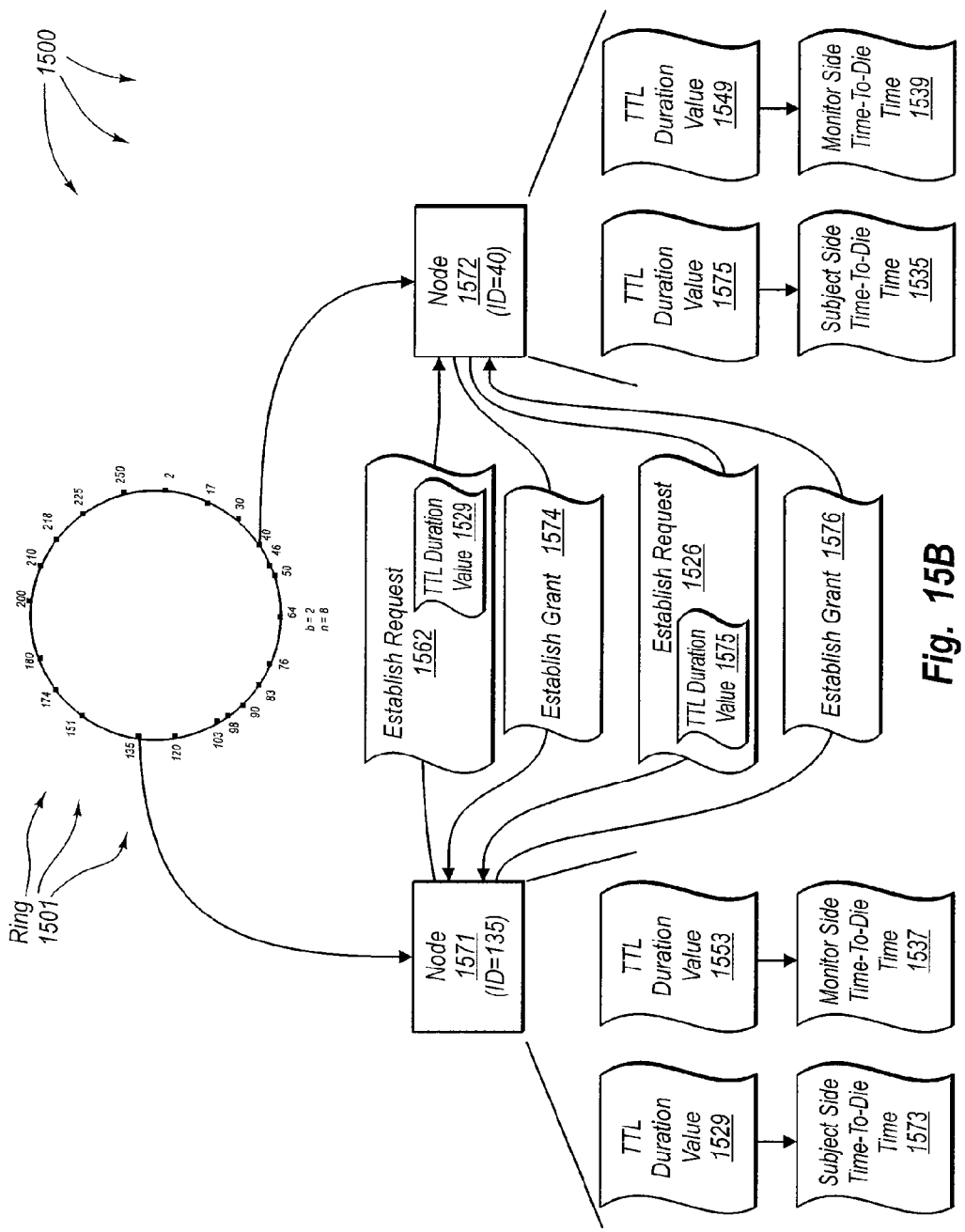
FIG. 15B illustrates an example ring architecture that facilitates two nodes monitoring each other.

In other embodiments a pair of nodes can monitor each other. Thus, a first node can monitor a second node and the second node can also monitor the first node. For example, each node can implement both the subject node side and the monitor node side of nod monitoring with the other node. FIG. 15B illustrates an example ring architecture 1500 that facilitates two nodes monitoring each other.

Node 1571 can generate TTL duration value 1529 for use in monitoring node 1571. Node 1571 can send establish request 1562, including TTL duration value 1529, to node 1572. Node 1571 can also establish subject side time-to-die time 1573 based on TTL duration value 1529. Node 1572 can receive establish request 1562, including TTL duration value 1529, from node 1571. Node 1572 can derive TLL duration value 1549 from TTL duration value 1529. Node 1572 can establish monitor side time-to-die time 1539 based on TTL duration value 1549. Node 1572 can send establish grant 1574 to node 1571. Node 1571 can receive establish grant 1574 from node 1572.

In parallel, node 1572 can generate TTL duration value 1575 for use in monitoring node 1572. Node 1572 can send establish request 1526, including TTL duration value 1575, to node 1571. Node 1572 can also establish subject side time-to-die time 1535 based on TTL duration value 1575. Node 1571 can receive establish request 1526, including TTL duration value 1575, from node 1572. Node 1571 can derive TLL duration value 1553 from TTL duration value 1533. Node 1571 can establish monitor side time-to-die time 1537 based on TTL duration value 1553. Node 1571 can send grant message 1576 to node 1572. Node 1572 can receive grant message 1576 from node 1571.

Alternately, either of nodes 1571 and 1572 reject an establish request from the other node. For example, node 1571 can reject establish request 1562. Likewise, node 1572 can reject establish request 1526. When either node rejects an establish request, it can send an establish reject (e.g., similar to establish reject 1531) to the other node. This indicates to the other node that no monitoring agreement has been established.

Node 1571 and node 1572 can then exchange renew requests and renew grants (as well as renew rejects similar to renew reject 1533) as previously described. Accordingly, each of node 1571 and node 1572 are both a subject node and a monitor node. Based on the depicted TTL duration values and time-to-die times in FIG. 15B, various events may occur during and/or after the monitor relationships are established.

If a clock at node 1571 reaches subject side time-to-die time 1573 prior to receiving a renew grant from node 1572, node 1571 transitions to a failure state. If a clock at node 1572 reaches monitor side time-to-die time 1539 prior to receiving a renew request from node 1571, node 1572 suspects node 1571 of failure.

If a clock at node 1572 reaches subject side time-to-die time 1535 prior to receiving a renew grant from node 1571, node 1572 transitions to a failure state. If a clock at node 1571 reaches monitor side time-to-die time 1537 prior to receiving a renew request from node 1572, node 1571 suspects node 1572 of failure.

Arbitration of Node Failures

Due to various different types of communication errors and node malfunctions, there exists some possibility that each node in a pair of nodes will suspect failure of the other node. Further, each node may suspect that it is functioning properly.

In some ring architectures, portions of resources are configured such that a single node controls a resource at a given moment in time. Further, the needed availability of some resources may also be high such that essentially constant control by a node is required. Thus, when a node fails, control of various resources may need to be transferred to another node. Accordingly, when a node in a pair of nodes suspects the other node of failure, arbitration mechanisms can be used to determine at least which node has or should fail.

For example, when each node when a pair nodes suspects the other node of failing, each node can transition to a timeout state and report their suspicion to an arbitration facility. When in a timeout state, certain other processing at each node can be suspended until the results of the arbitration are received. The arbitration facility can report back to a node indicating if it is to remain active. For example, an arbitration facility can send an accept message to a reporting node that is to remain active. The arbitration facility can send a deny message to a reporting node that is to transition to a failure state. A node that receives an accept message can remain active. A node that doesn't not receive an accept message (e.g., due to network conditions) or that receives a deny message transitions to a failure state.

Figure 15C:
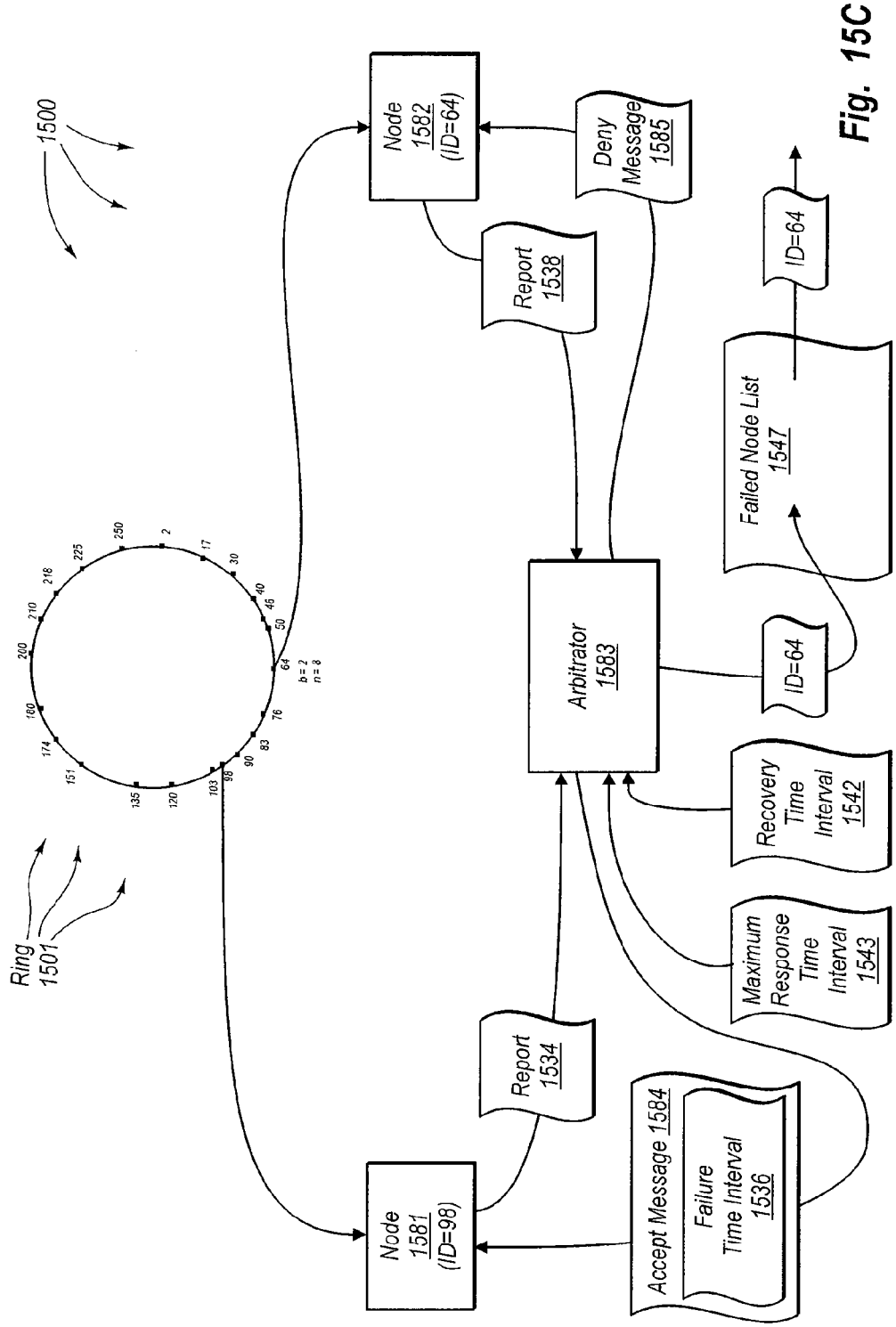
FIG. 15C illustrates an example ring architecture that facilitates arbitration when mutually monitoring nodes can each report that the other node is suspected of failing.

FIG. 15C illustrates example ring architecture 1500 that facilitates arbitration when mutually monitoring nodes each can report that the other node is suspected of failing. FIG. 15C depicts an expanded view of node 1581 (having ID=98), monitor node 1582 (having ID=64), and arbitrator 1983.

In some embodiments, arbitrator 1583 is also a member of ring 1501. In other embodiments, arbitrator 1583 is a member of an ancestor ring of ring 1501 but is not member of ring 1501. In further embodiments, arbitrator 1583 is external to the ring hierarchy that includes ring 1501. For example, arbitrator 1583 can be included in a separate arbitration federation ring of nodes. Nodes in the arbitration federation can be configured as arbitrators for the nodes of ring 1501 and its ancestors.

In some embodiments, arbitrator 1583 is mutually agreed to by node 1571 and node 1582 to arbitrate for nodes 1581 and 1582. In other embodiments, arbitrator 1583 is assigned to arbitrate for nodes 1581 and 1582 by another entity. The other entity can be a node internal to the ring hierarchy including ring 1501 (e.g., a seed node) or, for example, a human administrator. For example, the other node can be a member of ring 1501 or a member of an ancestor ring of ring 1501 but not member of ring 1501. Alternately, the other entity can be external the ring hierarchy including ring 1501. For example, the other entity can be a node that is a member of separate arbitration federation ring.

Arbitrator 1583 can have varying knowledge of the ring hierarchy including ring 1501. For example, arbitrator 1583 can have global knowledge of the ring hierarchy including ring 1501. Alternately, arbitrator 1583 can have knowledge of some subset of rings included the ring hierarchy including ring 1501. In other embodiments, arbitrator 1583 has knowledge of a subset of nodes in ring 1501 including (and potentially only) nodes 1581 and 1582.

Arbitrator 1583 can be configured to arbitrate for any number of node pairs including, but not limited to, nodes 1581 and 1582. In some embodiments, an arbitration mechanism has no knowledge of nodes it is to arbitrate for prior to receiving a report of a suspected node failure. Thus, although a pair of nodes have agreed to use arbitrator 1583 or arbitrator 1583 has been assigned to arbitrate for a pair of nodes, arbitrator 1583 may be unaware of any agreement or assignment prior to receiving a report of a suspected node failure for a node in the pair of nodes.

Arbitration can include arbitrating between nodes that present conflicting failure reports. For example, when a first node is monitoring a second node and the second node is also monitoring the first node, it may be that each node reports that the other node is suspected of failure. The suspected failure can be detected using virtually any failure detection mechanisms including those previously described in this document.

Failed node list 1547 can include a list of nodes that have been reported as suspected failed nodes. Nodes can be report other nodes as suspected failed nodes to arbitrator 1583 and, when appropriate, arbitrator 1583 can include the reported nodes in failed node list 1547. Arbitrator 1583 can remove failed nodes from failed node list 1547 after appropriate periods of time (e.g., at a future time when the likelihood of continued conflict is not possible). For example, entries in failed node list 1547 can be removed at recovery time interval 1542 after they were inserted into failed node list 1547. Recovery time interval 1542 can be long enough to insure that nodes that have been told to fail do fail.

Thus, embodiments of the invention include arbitrating between conflicting reports of suspected node failures. Arbitrating between conflicting reports of suspected node failures can include an act of a first node sending a report to an arbitration facility that a second node is suspected of failing. For example, node 1581 can send report 1534 to arbitrator 1583. Arbitrating between conflicting reports of suspected node failures can include an act of an arbitrator receiving a report from the first node that the second node is suspected of failing. For example, arbitrator 1583 can receive report 1534 from node 1581.

Arbitrating between conflicting reports of suspected node failures can include an act of the arbitrator determining that no other node has suspected the first node of failing within a specified recovery time interval prior to receiving the report from the first node. For example, arbitrator 1583 can determine that no other node has suspected node 1581 of failing within recovery time interval 1542 (after which arbitrator 1583 would have removed node 1581 from failed node list 1547 anyway).

Arbitrating between conflicting reports of suspected node failures can include an act of the arbitrator recording in a list that the second node is in a failure state. For example, arbitrator 1583 can record in failed node list 1547 that node 1582 (ID=64) is in a failure state.

Arbitrating between conflicting reports of suspected node failures can include an act of the arbitrator sending an accept message to the first node within a maximum response time interval, the accept message including a failure time value indicative of a time period after which the second node is guaranteed to transition into a failure state. For example, arbitrator 1583 can send accept message 1584 to node 1581 within maximum response time interval 1543 of receiving report 1534. Accept message 1584 includes failure time interval 1536 indicative of a time when node 1582 is guaranteed to have transitioned into a failure state. Generally, a maximum response time interval represents a point in time after which a requestor (e.g., node 1581 or 1582) assumes an arbitration facility (arbitrator 1583) will not answer a request for arbitration (e.g., report 1534 or 1538). When a maximum response time interval expires at a requestor subsequent to sending a request for arbitration, the requestor performs similar (and potentially identical) operations to those that would be performed if an express deny message was received.

Arbitrating between conflicting reports of suspected node failures can include an act of the first node receiving an accept message from the arbitration facility within a maximum response time interval, the accept message including a time value indicative of a time period after which the second node is guaranteed to transition into a failure state. For example, node 1581 can receive accept message 1584, including failure time interval 1536, from arbitrator 1583. Failure time interval 1536 is indicative of a time when node 1582 is guaranteed to have transitioned into a failure state. Thus, after the expiration of failure time interval 1536, node 1581 can attempt to claim control of one or more ring resources previously controlled by node 1582.

Arbitrating between conflicting reports of suspected node failures can include includes an act of the first node claiming control of one or more ring resources previously controlled by the second node subsequent to expiration of the time period. For example, node 1581 can claim control of one or more ring resources within ring 1501 previously controlled by the node 1582 subsequent to expiration of failure time interval 1536.

Claimed ring resources can vary depending on the ring resources controlled by node 1582 prior to transition to a failure state. For example, node 1581 can assume message routing responsibilities of node 1582 (e.g., the responsibility to receive messages directed to a range of identifies on ring 1501), any seed node responsibilities of node 1582, any arbitration responsibilities of node 1582, etc.

At some time at or after the first node reports the second node, the second node may also suspect the first node of failure. For example, it may be that node 1582 also suspects node 1581 of failure.

Arbitrating between conflicting reports of suspected node failures can include an act of the second node sending a report to the arbitration facility that the first node is suspected of failing. For example, node 1582 can send report 1538 to arbitrator 1583 that node 1581 is suspected of failure. Arbitrating between conflicting reports of suspected node failures can include an act the arbitrator receiving a report from the second node that the first node is suspected of failing, the report from the second node received within the specified recovery time interval subsequent to receiving the report from the first node. For example, arbitrator 1583 can receive report 1538 from node 1582 that node 1581 is suspected of failure within recovery time interval 1542 of receiving report 1534.

Arbitrating between conflicting reports of suspected node failures can include an act of the arbitrator referring to the list to determine that the second node is to transition to a failure state. For example, arbitrator 1583 can refer to failed node list 1547 to determine that node 1582 (ID=64) is to transition to a failure state.

Arbitrating between conflicting reports of suspected node failures can include an act of sending a deny message to the second node to cause the second node to transition into a failure state. For example, arbitrator 1583 can send deny message 1585 to node 1582 to cause node 1582 to transition to a failure state. Arbitrating between conflicting reports of suspected node failures can include an act of the second node receiving a deny message from the arbitration facility. For example, node 1582 can receive deny message 1585 from arbitrator 1583.

Arbitrating between conflicting reports of suspected node failures can include an act of the second node transitioning into a failure state. For example, node 1582 can transition into a failure state in response to receiving deny message 1585. After failing, node 1582 can subsequently attempt to rejoin ring 1501.

Routing In Accordance With Cached Agreements

In some embodiments, messages are routed in accordance with cached routing agreements. For example, adjacent nodes of a ring can agree to a division of responsibility for a range of unoccupied identifiers between the adjacent nodes. An identifier can be unoccupied for any number of reasons. For example, an identifier may be unoccupied because the identifier is unassigned (i.e., the identifier that has not been assigned to a node). For assigned identifiers (i.e., identifiers that have been assigned to a node), an identifier may be unoccupied because the corresponding node has been deliberately shutdown or the node is for some reason, such as, for example, due to communication or node failures, otherwise unreachable.

Routing agreements between nodes can be established and cached prior to nodes being permitted to accept messages for and deliver messages for any of the unoccupied identifiers that are to be the responsibility of the adjacent nodes. Reference to a cached routing agreement significantly reduces any communication between (potentially) adjacent nodes that may otherwise occur to determine which node is responsible for a specific unoccupied identifier.

A cached routing agreement can divide a range of unoccupied identifiers in an arbitrary fashion, in accordance with configurable rules, or in accordance with a fixed methodology. In some embodiments, a range of identifiers between adjacent nodes on a ring is divided essentially in half. This reduces the likelihood of an unoccupied identifier being further from a node that is responsible for the unoccupied identifier.

When there is an even number of unoccupied identifiers between adjacent nodes, the midway point between the adjacent nodes is between unoccupied identifiers. Thus, responsibility for the unoccupied identifiers can be divided at the midway point between the adjacent nodes. Accordingly, each adjacent node can be assigned responsibility for an equal number of unoccupied identifiers.

On the other hand, when there is an odd number of unoccupied identifiers between adjacent nodes, the midway point between the adjacent nodes is at an unoccupied identifier. Thus, responsibility for the unoccupied identifiers can be divided at one side or the other of the unoccupied identifier that is the midway point. Accordingly, one adjacent node can be assigned responsibility for one more unoccupied identifier than the other adjacent node.

Figure 16A:
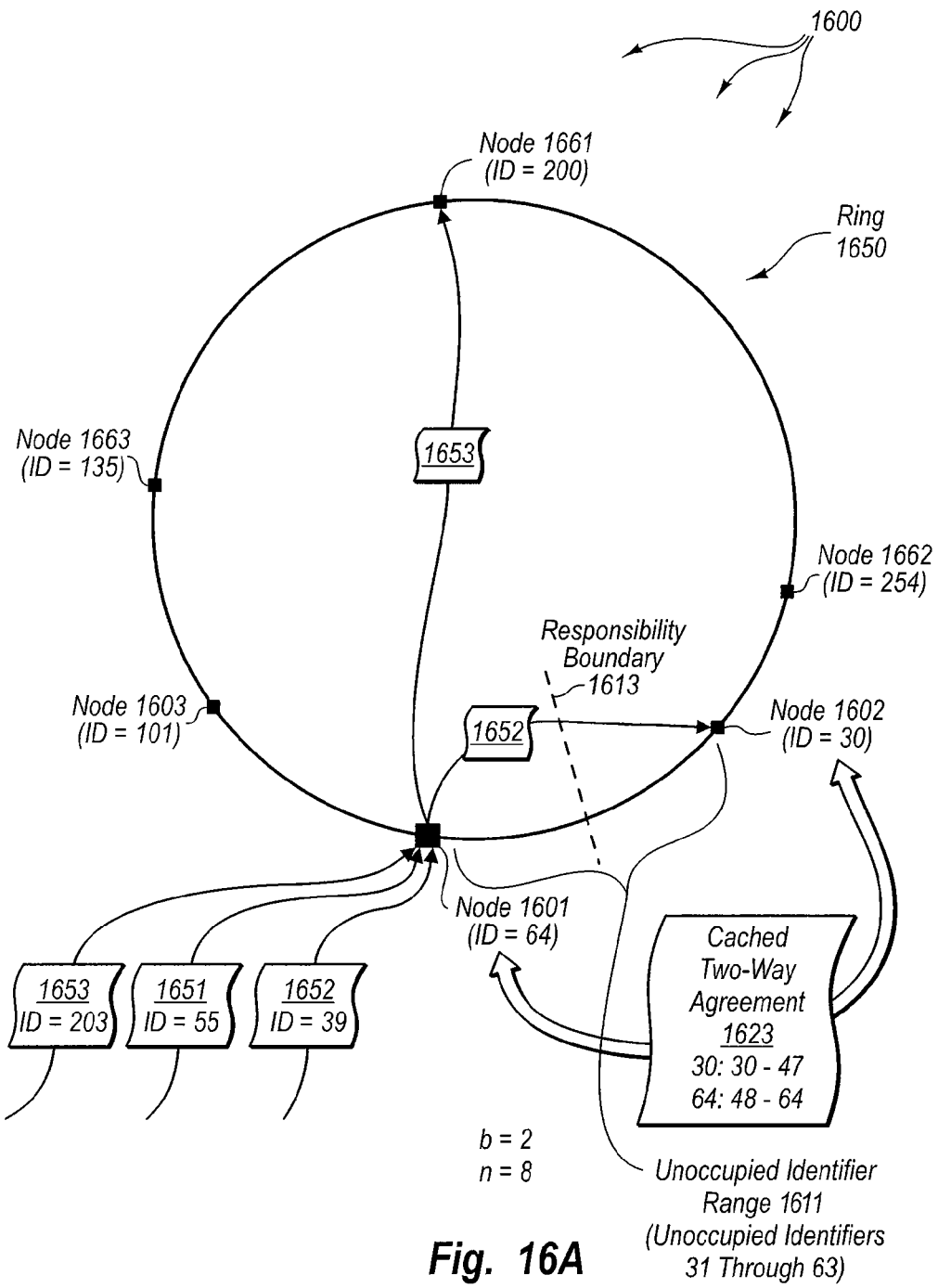
FIG. 16A illustrates an example ring architecture that facilitates routing a message in accordance with a cached two-way agreement.

For example, referring now to FIG. 16A, FIG. 16A illustrates an example ring architecture 1600 that facilitates routing a message in accordance with a cached two-way agreement between nodes. As depicted, various nodes (shown as squares on ring 1650) including (but not limited to) nodes 1601, 1602, 1603, 1661, 1662, and 1663 are included on ring 1650. Each node has a corresponding ID (shown in parenthesis) indicating its position on ring 1650. For example, node 1601 has ID=64 and node 1602 has ID=30.

There are ranges of unoccupied identifiers between the depicted nodes. For example, unoccupied identifier range 1611 represents unoccupied identifiers 31 through 63 between nodes 1602 and 1601.

As depicted, node 1601 and 1602 have established and cached two-way agreement 1623. For example, through prior communication, nodes 1601 and 1602 can determine that there are no other nodes currently interspersed between ID=64 and ID=30. Thus, nodes 1601 and 1602 can further determine that they are adjacent to one another on ring 1650. Accordingly, node 1601 and 1602 can divide responsibility for unoccupied identifier range 1611 (i.e., unoccupied identifiers 31 through 63) such that node 1602 is responsible for a portion of unoccupied identifier range 1611 and node 1601 is responsible for the remaining portion unoccupied identifier range 1611. Each node is also responsible for its assigned ID. That is, node 1602 is responsible for ID=30 and node 1601 is responsible for ID=64.

Accordingly, as depicted by responsibility boundary 1613 (between unoccupied identifier 47 and unoccupied identifier 48), node 1602 (ID=30) is responsible for itself as well as unoccupied identifiers 31 through 47 and node 1601 (ID=64) is responsible for itself as well as unoccupied identifiers 48 through 63. Although the midway point between nodes 1601 and 1602 is at unoccupied identifier 47, node 1602 is assigned responsibility for unoccupied identifier 47 such that each unoccupied identifier is the responsibility of a single node. Thus, as previously described, when a responsibility boundary falls on an unoccupied identifier, one of the adjacent nodes can be assign the sole responsibility for the unoccupied identifier.

Embodiments of the invention include routing a message in accordance with a cached two-way agreement. Routing a message in accordance with a cached two-way agreement can include an act of a receiving node receiving a message along with a destination identifier indicating a destination on the ring of nodes, the destination identifier located between the receiving node and one of the immediate neighbor nodes. For example, node 1601 can receive message 1651, indicated for delivery to ID=55. Alternately, node 1601 can receive message 1652, indicated for delivery to ID=39. Message 1651 and 1652 can be received from another node in ring 1650 (intra-ring communication), from a node in another ring of ring architecture 1600 (inter-ring communication), or through non-ring communication.

Routing a message in accordance with a cached two-way agreement can include an act of the receiving node referring to a cached two-way agreement between the receiving node and the immediate neighbor node to determine the next appropriate node that is to receive the message. The two-way agreement at least implies a division of responsibility for the identifier space between the receiving node and an immediate neighbor node. For example, node 1601 can refer to cached two-way agreement 1623 to determine the next appropriate node that is to process message 1651. Since cached two-way agreement 1623 indicates that node 1601 (ID=64) is responsible for unoccupied identifier 55, node 1601 determines that it is the appropriate node to process message 1651. Likewise, node 1601 can refer to cached two-way agreement 1623 to determine the next appropriate node that is to process message 1652. Since cached two-way agreement 1623 indicates that node 1602 (ID=30) is responsible for unoccupied identifier 39, node 1601 determines that node 1602 is the next appropriate node that is to process message 1652.

Routing a message in accordance with a cached two-way agreement can include an act of sending the message to the next appropriate component based on the determination of the next appropriate node. For example, node 1601 can provide message 1651 to its resource handler instance corresponding to unoccupied identifier 55, since cached two-way agreement 1623 indicates that node 1601 is responsible for unoccupied identifier 55. Alternately, node 1601 can provide message 1652 to node 1602, since cached two-way agreement 1623 indicates that node 1602 is responsible for unoccupied identifier 39. Subsequently, node 1602 can provide message 1652 to its resource handler instance corresponding to unoccupied identifier 39.

When an identifier is not included in a cached two-way agreement, a node can refer to a routing table (e.g., as depicted in FIG. 8) to make progress towards a destination. For example, node 1601 can send message 1653, indicated for delivery to ID=203, to node 1661 (ID=200). Node 1661 can then refer to any cached two-way agreements with its adjacent nodes to determine the node that is responsible for identifier 203.

Figure 16B:
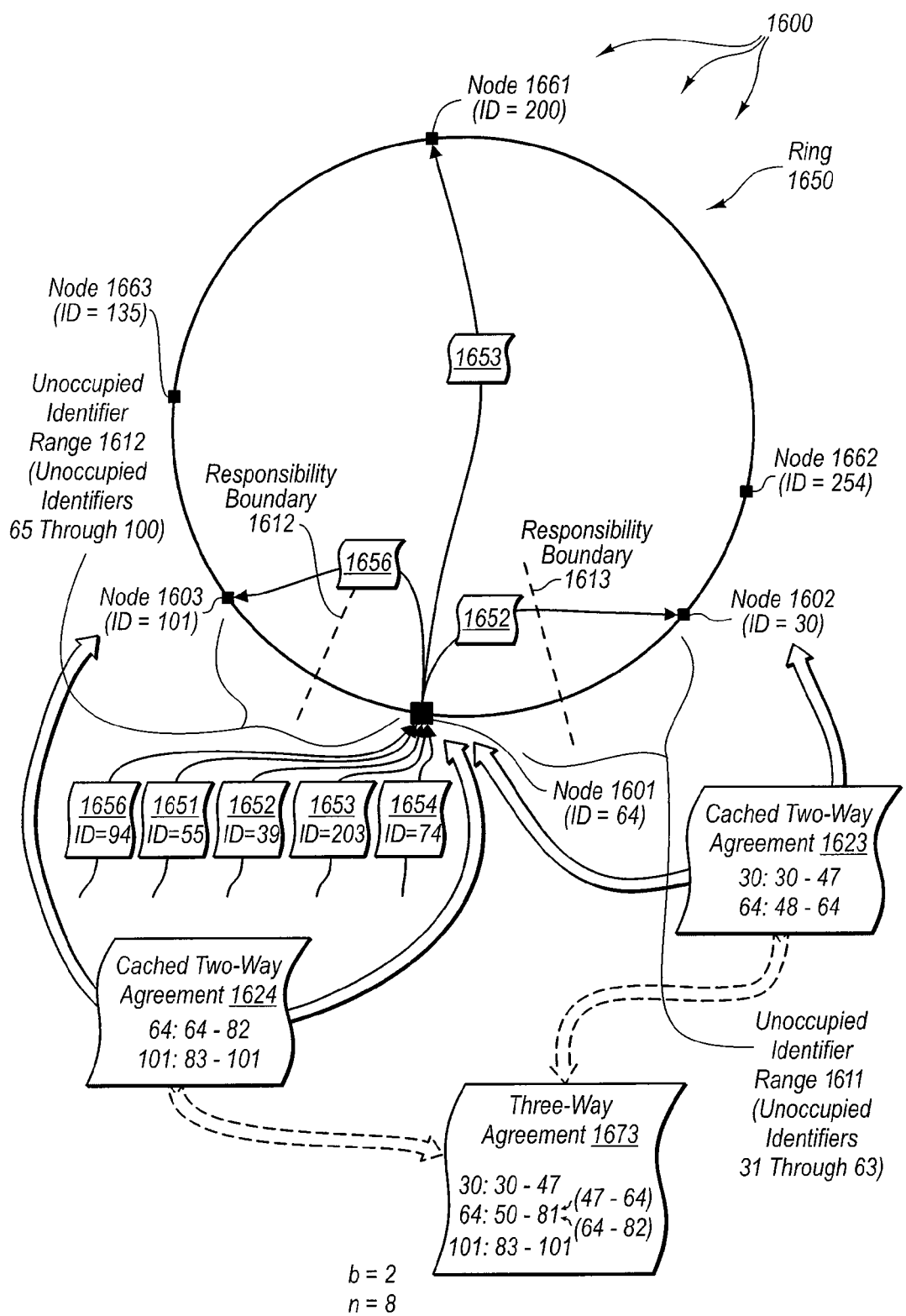
FIG. 16B illustrates an example ring architecture that facilitates routing a message in accordance with multiple cached two-way agreements.

In some embodiments, multiple two-way agreements can, from the perspective of a given node, essentially represent a three-way agreement between the given node, the given node's immediate predecessor node, and the given node's immediate successor node. FIG. 16B illustrates the example ring architecture 1600 that facilitates routing a message in accordance with multiple cached two-way agreements.

As previously described, nodes 1601 and 1602 can establish cached two-way agreement 1623. Similarly, nodes 1601 and 1603 can establish cached-two way agreement 1624 to divide responsibility for unoccupied identifier range 1612 (i.e., unoccupied identifiers 65 through 101). Thus, through prior communication, nodes 1601 and 1603 can determine that there are no other nodes currently interspersed between ID=65 and ID=101. Thus, nodes 1601 and 1603 can further determine that they are adjacent to one another on ring 1650. Accordingly, nodes 1601 and 1603 can divide unoccupied identifier range 1612 such that node 1602 is responsible for a portion of unoccupied identifier range 1612 and node 1601 is responsible for the remaining portion of unoccupied identifier range 1612. Accordingly, as depicted within two-way agreement 1624, node 1601 (ID=64) is responsible for itself as well as unoccupied identifiers 65 through 82 and node 1602 (ID=101) is responsible for itself as well as unoccupied identifiers range 83 through 100.

From the perspective of node 1601, the combination of cached two-way agreement 1623 and cached two-way agreement 1624 essentially represents three-way agreement 1673. That is, node 1601 is responsible for a portion of identifier space between node 1601 and node 1602 and is responsible for a portion of identifier space between node 1601 and node 1603. The parenthetical ranges of identifiers indicate the ranges of responsibility (i.e., 47 through 64 and 64 through 82) form the cached-two way agreements 1623 and 1624 on either side of node 1601.

Embodiments of the invention include routing a message in accordance with a multiple cached two-way agreements.

Routing a message in accordance with a multiple cached two-way agreements can include an act of a receiving node receiving a message along with a destination identifier indicating a destination on the ring of nodes. For example, node 1601 can receive any of messages 1651, 1652, 1653, 1654, and 1656 indicated for delivery to ID=55, ID=39, ID=203, ID=74, and ID=94 respectively. Messages 1651, 1652, 1653, 1654, and 1656 can be received from another node in ring 1650 (intra-ring communication) or from a node in another ring of ring architecture 1600 (inter-ring communication), or through non-ring communication.

Routing a message in accordance with a multiple cached two-way agreements can include an act of the receiving node referring to a first cached two-way agreement with the predecessor node and a second cached two-way agreement with the successor node to determine the next appropriate node that is to receive the message. The first and second cached two-way agreements at least imply a division of responsibility for the identifier space between the predecessor node and the successor node. For example, node 1601 can refer to cached three-way agreements 1623 and 1624 to determine the next appropriate node that is to receive any of messages 1651, 1652, 1653, 1654, and 1656.

Since cached two-way agreement 1623 indicates that node 1602 (ID=30) is responsible for unoccupied identifier 39, node 1601 determines that node 1602 is the next appropriate node that is to process message 1652. Since cached two-way agreement 1623 indicates that node 1601 (ID=64) is responsible for unoccupied identifier 55, node 1601 determines that it is the appropriate node to process message 1652. Since cached two-way agreement 1624 indicates that node 1601 (ID=64) is responsible for unoccupied identifier 74, node 1601 determines that it is the appropriate node to process message 1654. Since cached two-way agreement 1624 indicates that node 1603 (ID=101) is responsible for unoccupied identifier 94, node 1601 determines that node 1603 is the next appropriate node that is to process message 1654.

Routing a message in accordance with a multiple cached two-way agreements can include an act of sending the message to the next appropriate component based on the determination of the next appropriate node. For example, node 1601 can send messages 1651, 1652, 1653, 1654, and 1656 to the next appropriate component on ring 1650 based on the determination of the next appropriate node that is to process messages 1651, 1652, 1653, 1654, and 1656.

For example, node 1601 can provide message 1652 to node 1602, since cached two-way agreement 1623 indicates that node 1602 is responsible for unoccupied identifier 39. Subsequently, node 1602 can provide message 1652 to its resource handler instance corresponding to unoccupied identifier 39. Node 1601 can provide message 1651 to its resource handler instance corresponding to unoccupied identifier 55, since cached two-way agreement 1623 indicates that node 1601 is responsible for unoccupied identifier 55. Node 1601 can provide message 1654 to its resource handler instance corresponding to unoccupied identifier 74, since cached two-way agreement 1624 indicates that node 1601 is responsible for unoccupied identifier 74. Node 1601 can provide message 1656 to node 1603, since cached two-way agreement 1624 indicates that node 1603 is responsible for unoccupied identifier 94. Subsequently, node 1603 can provide message 1656 to its resource handler instance corresponding to unoccupied identifier 94.

When an identifier is not included in a cached either of multiple cached two-way agreements, a node can refer to a routing table (e.g., as depicted in FIG. 3) to make progress towards a destination. For example, node 1601 can send message 1656, indicated for delivery to ID=203, to node 1661 (ID=200). Node 1661 can then refer to a any cached two-way agreements with its predecessor node and/or its successor node to determine the next appropriate component that is to receive message 1653.

Formulating Cached Agreements

Rings can be reconfigured from time to time, such as, for example, when a new node joins a ring or when an existing node departs a ring (e.g., through graceful removal, as a result of node monitoring, through reference to an arbitrator, etc.). When a node detects that the configuration of a ring has changed, the node can reformulate cached routing agreements with any adjacent nodes. During agreement reformulation, the node can queue any received messages, expect those for formulating the agreement. After formulation of the agreement is complete, the node can then process the messages in accordance with the agreement.

Reconfiguration of a ring can cause multiple routing agreements to be reformulated. For example, when a node departs a ring, immediately adjacent nodes on either side of the departing node can formulate an agreement for the range of unoccupied identifiers that were previously the responsibility of the departing node (thus potentially gaining responsibility for additional unoccupied identifiers). This reformulation joins responsibility for a portion of the range of unoccupied identifiers from the departing node with the range of unoccupied identifiers for each immediately adjacent node. That is, each immediately adjacent node gains responsibility for a portion of the departing node's range of unoccupied identifiers and the departing node's identifier.

Figure 17A:
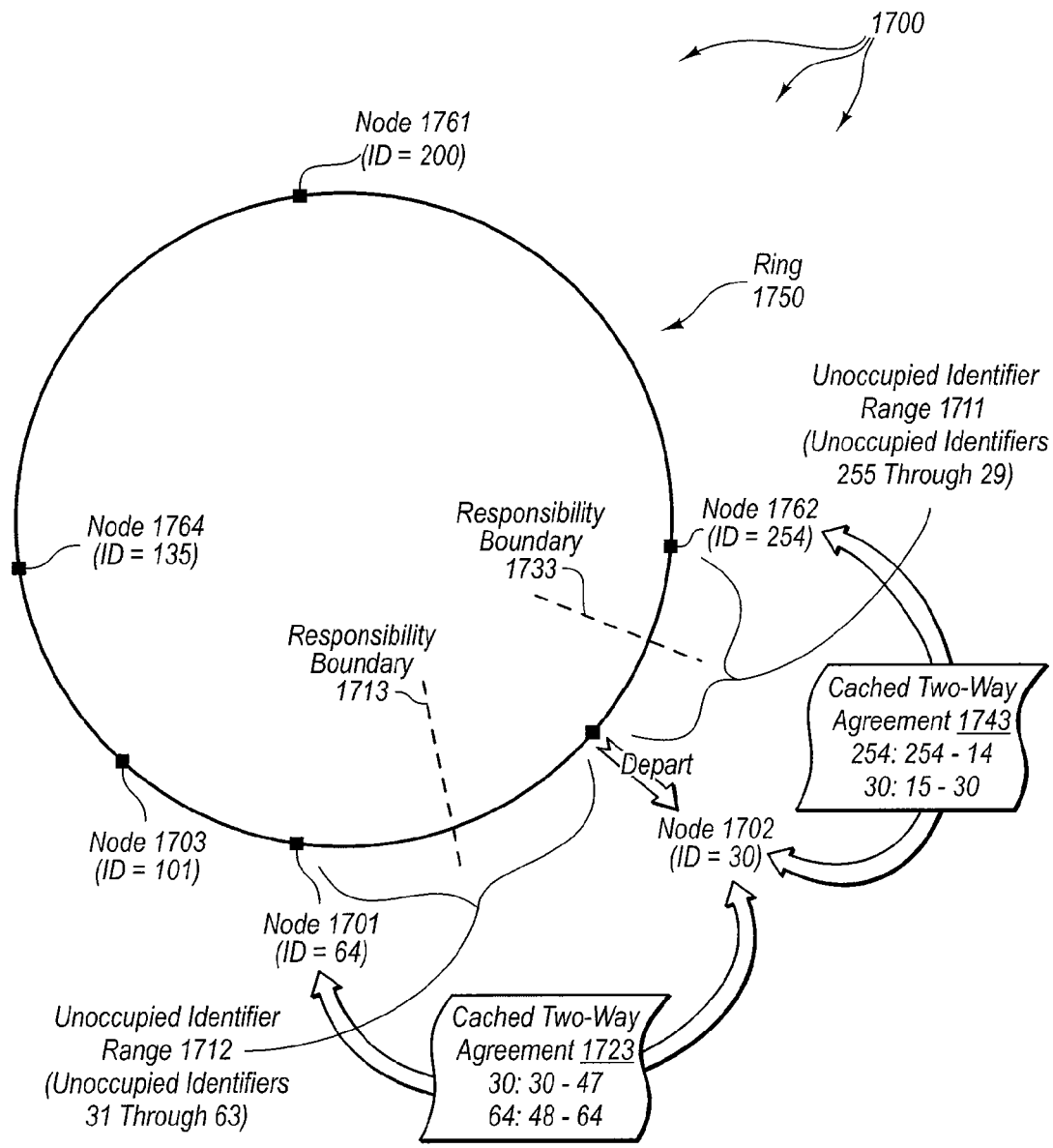
FIGS. 17A through 17D illustrate an example ring architecture that facilitates formulating a cached two-way agreement.

FIGS. 17A through 17D illustrate an example ring architecture 1700 that facilitates formulating a cached two-way agreement. As depicted in FIG. 17A, nodes 1701 and 1702 have formulated cached two-way agreement 1723 dividing responsibility for unoccupied identifier range 1712 (i.e., unoccupied identifiers 31 through 63) at responsibility boundary 1713 (between unoccupied identifier 47 and unoccupied identifier 48). Similarly, nodes 1702 and 1762 have formulated cached two-way agreement 1743 dividing responsibility for unoccupied identifier range 1711 (i.e., unoccupied identifiers 255 through 29) at responsibility boundary 1733 (between unoccupied identifiers 14 and 15).

Figure 17B:
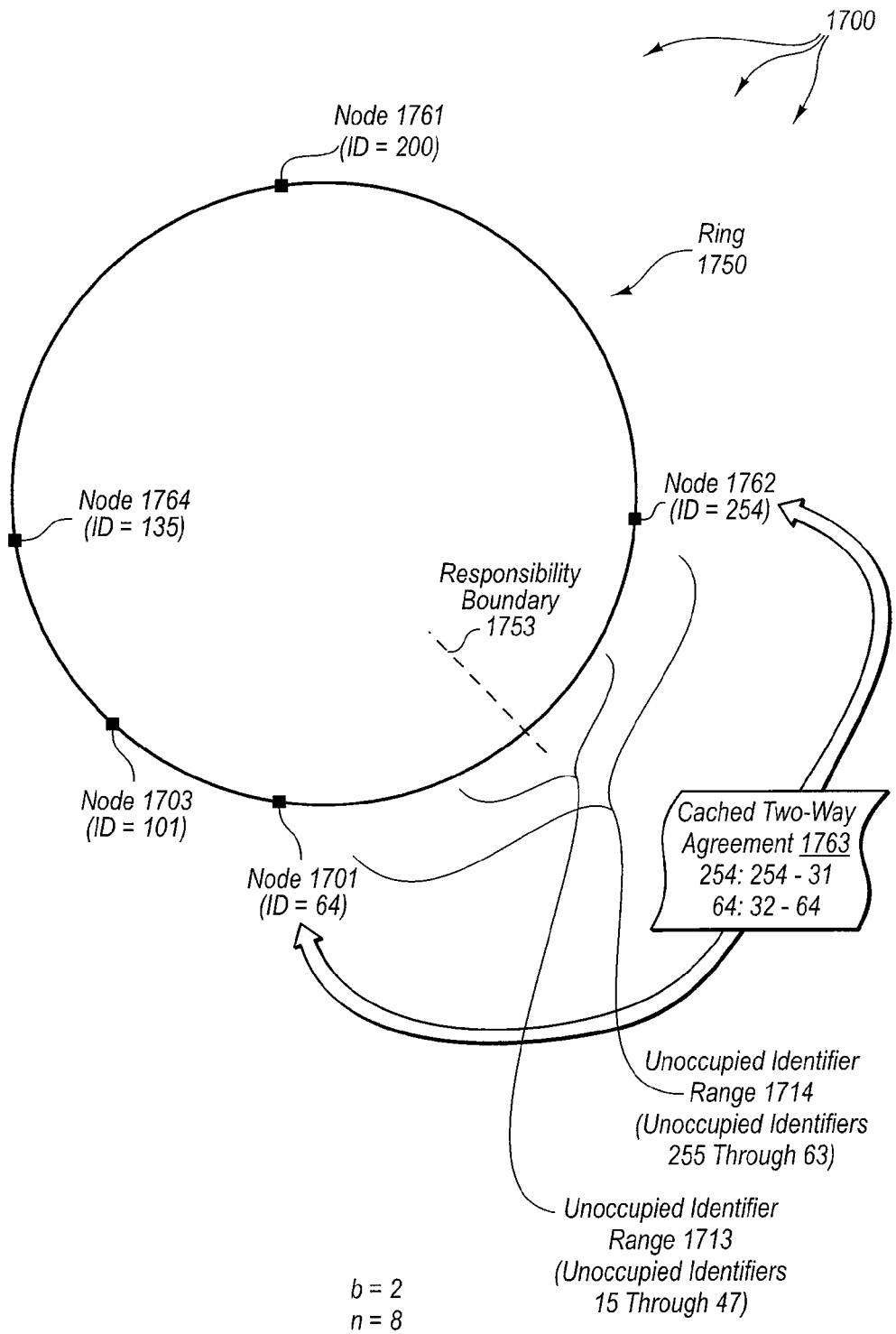

At some time subsequent to the formulation of cached two-way agreements 1723 and 1743, node 1702 can leave ring 1750 (e.g., through graceful removal, as a result of node monitoring, based on instructions from an arbitrator, etc.). Referring now to FIG. 17B, subsequent to node 1702 leaving ring 1750 there is no node responsible for the unoccupied identifiers that were previously the responsibility of node 1702. Unoccupied identifier range 1713 (unoccupied identifiers 15 through 47, including now unoccupied identifier 30) represents the range of unoccupied identifiers that node 1702 was responsible for prior to departing ring 1750.

In response to node 1702 leaving ring 1750, nodes 1701 and 1762 attempt to identify new immediate neighbor nodes. Node 1762 attempts to identify a new immediate successor node (i.e., an immediate neighbor node in the same direction as node 1702 relative to node 1762). Node 1701 attempts to identify a new immediate predecessor node (i.e., an immediate neighbor in the same direction as node 1702 relative to node 1701). In FIG. 17B, node 1762 identifies node 1701 as its new immediate successor and node 1701 identifies node 1762 as its new immediate predecessor.

Upon identifying new immediate neighbor nodes, nodes 1762 and 1701 formulate cached two-way agreement 1763 to that divides responsibility for unoccupied identifier range 1714 (unoccupied identifiers 255 through 63, including now unoccupied identifier 30). Unoccupied identified range 1714 includes unoccupied identifier range 1713, which was previously the responsibility of node 1702. Thus, portions of unoccupied identifier range 1713 can become the responsibility of either node 1762 or node 1701, after node 1702 departs ring 1750.

Accordingly, as depicted by responsibility boundary 1753 (between unoccupied identifier 31 and unoccupied identifier 32), node 1762 (ID=254) and node 1701 (ID=30) formulate cached two-way agreement 1763. In accordance with cached two-way agreement 1763, node 1762 (ID=254) is responsible for itself as well as unoccupied identifiers 255 through 31 and node 1701 (ID=64) is responsible for itself as well as identifier range 32 through 63. Although the midway point between nodes 2201 and 2202 is at unoccupied identifier 31, node 1762 is assigned responsibility for unoccupied identifier 31 such that each unoccupied identifier is the responsibility of a single node.

During time between the departure of node 1702 and formulation of cached two-way agreement 1763, nodes 1701 and 1762 do not process messages indicated for delivery to identifiers in the range between 255 and 63. Instead, nodes 1701 and 1762 queue any messages, expect those for formulating cached two-way agreement 1763. After formulation of the cached two-way agreement 1763 is complete, nodes 1701 and 1762 can then process the messages in accordance with cached two-way agreement 1763.

When a new node joins a ring between two existing nodes, each existing node can formulate a routing agreement with the new node (and thus potentially giving up responsibility for a portion of unoccupied identifiers). This formulation can essentially split a range of unoccupied identifiers an existing node is responsible for between the joining node and the existing node. That is, each existing node potentially gives up responsibility for a portion of the existing node's unoccupied identifiers to the joining node.

Figure 17C:
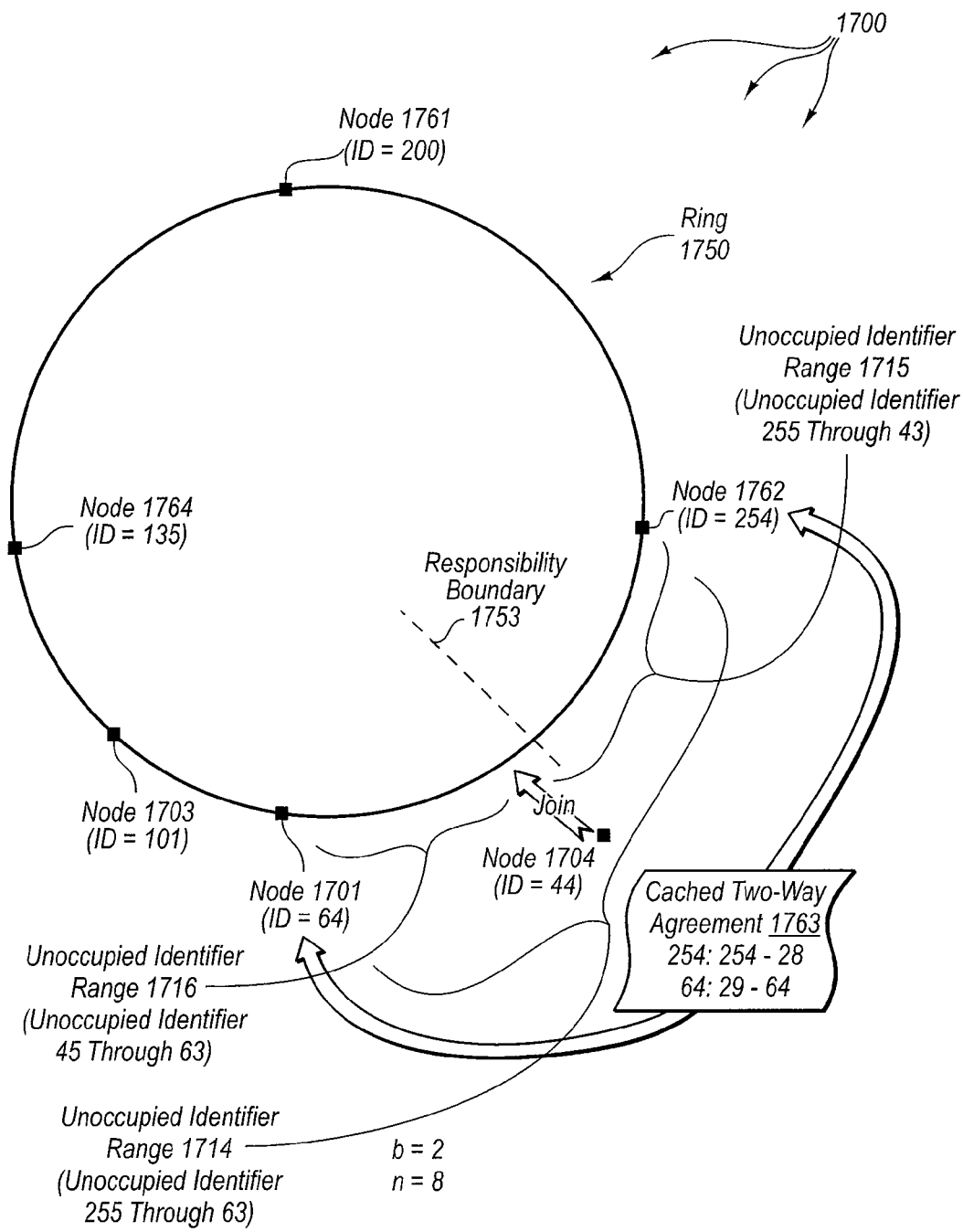

Referring now to FIG. 17C, at some time subsequent to the formulation of cached two-way agreement 1763, node 1704 (ID=44) can join ring 1750. Subsequent to node 1704 joining ring 1750, node 1762 can detect node 1704 as its immediate successor. Likewise, node 1701 can detect node 1704 as its immediate predecessor. In response to each of the detections, unoccupied identifier range 1714 is essentially split into unoccupied identifier range 1715 (unoccupied identifiers 255 through 43) and unoccupied identifier range 1716 (unoccupied identifiers 45 through 63). New cached-two way agreements can then be formulated to divide responsibility for unoccupied identifier ranges 1715 and 1716.

Figure 17D:
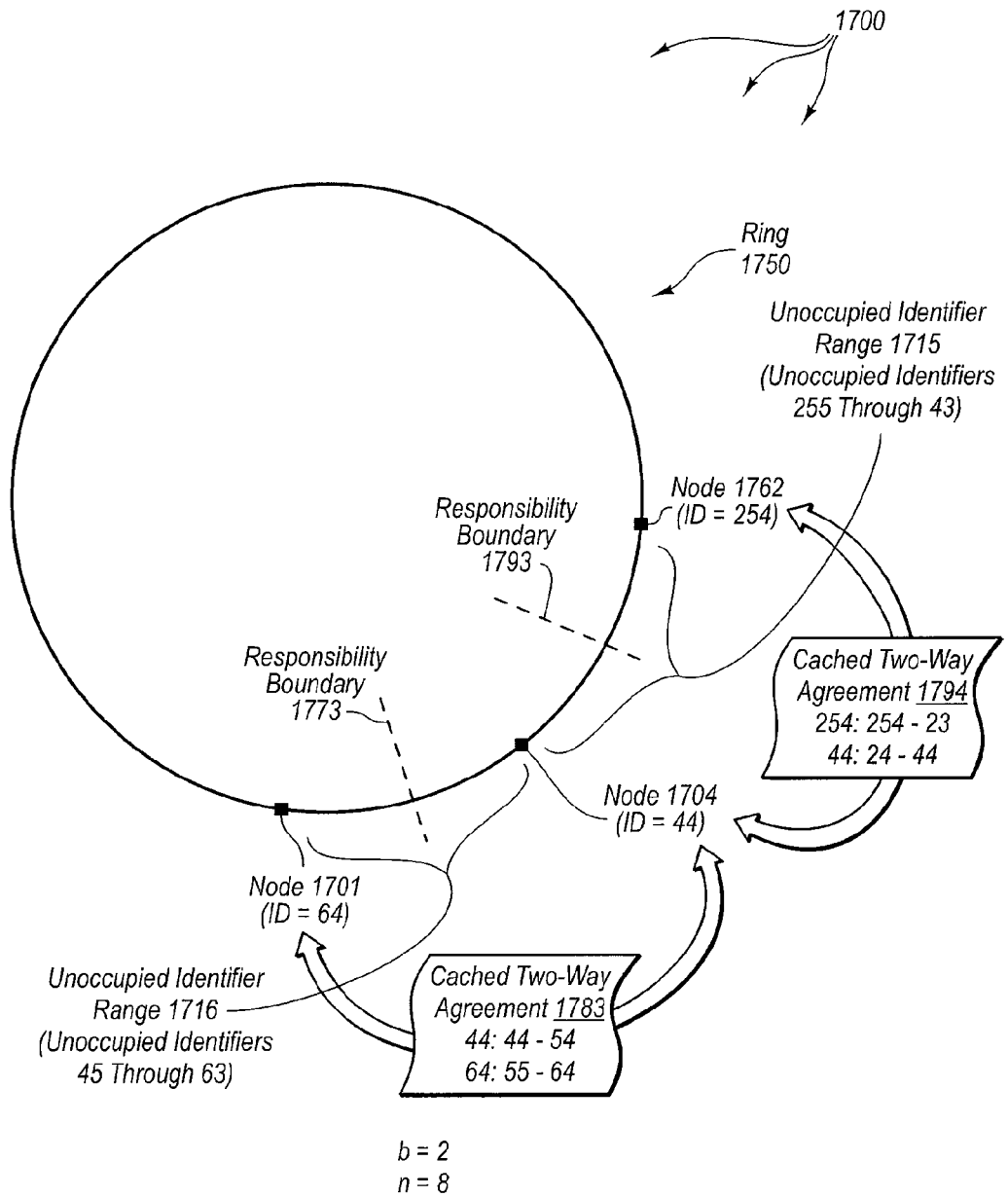

Referring now to FIG. 17D, upon identifying node 1704 as a new immediate successor node, nodes 1762 and 1704 formulate cached two-way agreement 1794 to that divides responsibility for unoccupied identifier range 1715 (unoccupied identifiers 255 through 43). Unoccupied identified range 1715 includes portions of unoccupied identifier range 1714, which were previously the responsibility of node 1762 and in this case some of which were previously the responsibility of node 1701. Thus, portions of unoccupied identifier range 1714 that were the responsibility of either node 1762 or node 1701, can become the responsibility of node 1704 when node 1704 joins ring 1750.

Accordingly, as depicted by responsibility boundary 1793 (between unoccupied identifier 17 and unoccupied identifier 24), node 1762 (ID=254) and node 1704 (ID=44) formulate cached two-way agreement 1794. In accordance with cached two-way agreement 1794, node 1762 (ID=254) is responsible for itself as well as unoccupied identifiers 255 through 17 and node 1704 (ID=44) is responsible for itself as well as identifier range 24 through 43. Although the midway point between nodes 2201 and 2202 is at unoccupied identifier 17, node 1762 is assigned responsibility for unoccupied identifier 17 such that each unoccupied identifier is the responsibility of a single node.

Similarly, upon identifying node 1704 as a new immediate predecessor node, nodes 1701 and 1704 formulate cached two-way agreement 1783 that divides responsibility for unoccupied identifier range 1716 (unoccupied identifiers 45 through 64). Unoccupied identified range 1716 includes portions of unoccupied identifier range 1714, which were previously the responsibility of node 1701. Thus, portions of unoccupied identifier range 1714, which were the responsibility of node 1701, can become the responsibility of node 1704 when node 1704 joins ring 1750.

Accordingly, as depicted by responsibility boundary 1773 (between unoccupied identifier 54 and unoccupied identifier 55), node 1704 (ID=44) and node 1701 (ID=64) formulate cached two-way agreement 1783. In accordance with cached two-way agreement 1783, node 1704 (ID=44) is responsible for itself as well as unoccupied identifiers 45 through 54 and node 1701 (ID=64) is responsible for itself as well as identifier range 55 through 63. Although the midway point between nodes 2201 and 2202 is at unoccupied identifier 54, node 1704 is assigned responsibility for unoccupied identifier 54 such that each unoccupied identifier is the responsibility of a single node.

During time between the joining of node 1704 and formulation of cached two-way agreement 1794, nodes 1762 and 1704 do not process messages indicated for delivery to identifiers in the range between 255 and 43. Instead, nodes 1762 and 1704 queue any messages, expect those for formulating cached two-way agreement 1794. After formulation of the cached two-way agreement 1794 is complete, nodes 1762 and 1704 can then process the messages in accordance with cached two-way agreement 1794.

Similarly, during time between the joining of node 1704 and formulation of cached two-way agreement 1783, nodes 1704 and 1701 do not process messages indicated for delivery to identifiers in the range between 45 and 63. Instead, nodes 1704 and 1701 queue any messages, expect those for formulating cached two-way agreement 1783. After formulation of the cached two-way agreement 1783 is complete, nodes 1704 and 1701 can then process the messages in accordance with cached two-way agreement 1783.

From the perspective of node 1704, the combination of cached two-way agreement 1794 and cached two-way agreement 1783 can essentially represent a corresponding three-way agreement (not shown) between node 1704, node 1762, and 1701. From the perspective of node 1704, the corresponding represented three-way agreement defines responsibility for (assigned and unoccupied) identifiers from and including ID=254 to and including ID=64.

Embodiments of the invention include joining a two-way agreement.

Joining a two-way agreement can include an act of a current node accessing an indication that the configuration of the ring of nodes has changed, the indication indicative of a need to formulate a two-way agreement dividing responsibility for at least unoccupied identifiers on the ring between the current node and the immediate neighbor node. For example, referring to FIGS. 17A and 17B, node 1701 and/or node 1762 can access an indication, for example, from node 1702, through monitoring of node 1702, or from an arbitrator, that node 1702 departed ring 1750. The indication of node 1702 departing ring 1750 indicates to node 1701 and/or node 1762 a need to formulate a two-way agreement dividing responsibility for unoccupied identifier range 1714 (unoccupied identifiers 255 through 63).

Alternately, referring to FIGS. 17C and 17D, node 1701 can access an indication (e.g., sent as part of the join process of node 1704) that node 1704 has joined ring 1750. The indication of node 1704 joining ring 1750 indicates to node 1701 a need to formulate a two-way agreement dividing responsibility for unoccupied identifier range 1716 (unoccupied identifiers 45 through 63). Similarly, node 1762 can access an indication (e.g., sent as part of the join process of node 1704) that node 1704 has joined ring 1750. The indication of node 1704 joining ring 1750 indicates to node 1762 a need to formulate a two-way agreement dividing responsibility for unoccupied identifier range 1715 (unoccupied identifiers 255 through 43).

Joining a two-way agreement can include an act of the current node and the immediate neighbor node agreeing to a responsibility boundary between the current node and the immediate neighbor node that is to divide responsibility for the unoccupied identifiers between the current node and the immediate neighbor node. Unoccupied identifiers between the current node and the responsibility boundary are the responsibility of the current node and unoccupied identifiers between the responsibility boundary and the immediate neighbor node are the responsibility of the immediate neighbor node.

For example, referring to FIG. 17B node 1701 and node 1762 can agree to responsibility boundary 1753, which is essentially between unoccupied identifiers 31 and 32. Thus, unoccupied identifiers between node 1701 and responsibility boundary 1753 (i.e., unoccupied identifiers 32 through 63) are the responsibility of node 1701. Likewise, unoccupied identifiers between responsibility boundary 1753 and node 1762 (i.e., unoccupied identifiers 255 through 31) are the responsibility of node 1762.

Referring to FIG. 17D, node 1701 and node 1704 can agree to responsibility boundary 1773, which is essentially between unoccupied identifiers 54 and 55. Thus, unoccupied identifiers between node 1701 and responsibility boundary 1773 (i.e., identifiers 55 through 63) are the responsibility of node 1701. Likewise, unoccupied identifiers between responsibility boundary 1773 and node 1704 (i.e., unoccupied identifiers 45 through 54) are the responsibility of node 1704.

Still referring to FIG. 17D, node 1704 and node 1762 can agree to responsibility boundary 1793, which is essentially between unoccupied identifiers 17 and 24. Thus, identifiers between node 1704 and responsibility boundary 1793 (i.e., unoccupied identifiers 24 through 43) are the responsibility of node 1704. Likewise, unoccupied identifiers between responsibility boundary 1793 and node 1762 (i.e., unoccupied identifiers 255 through 17) are the responsibility of node 1762.

Joining and Leaving a Ring of Nodes With Ring Consistency

Figure 18:
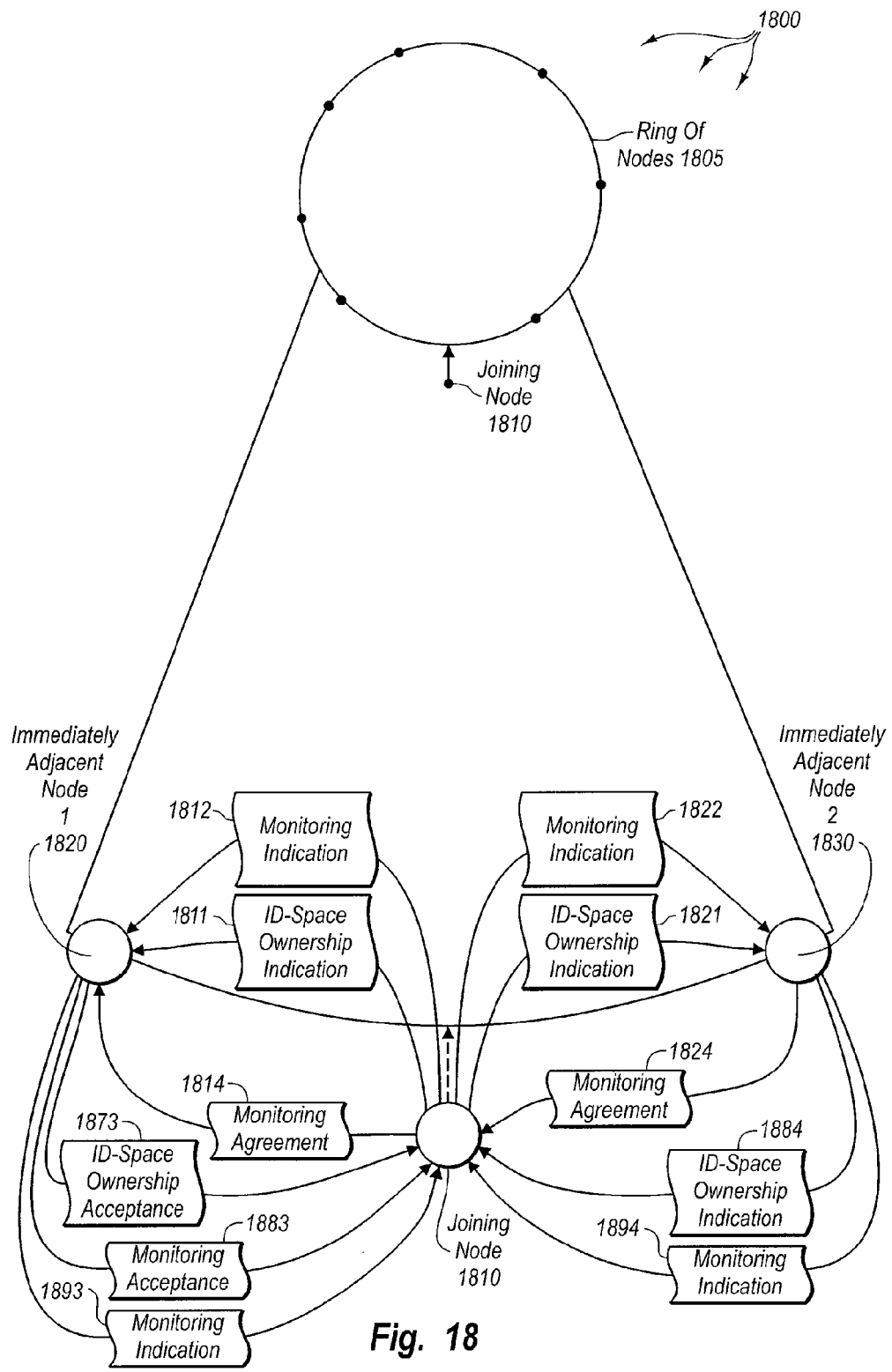
FIG. 18 illustrates an example ring architecture that facilitates joining of a node to a ring of nodes within a federation with ring consistency.
Figure 19:
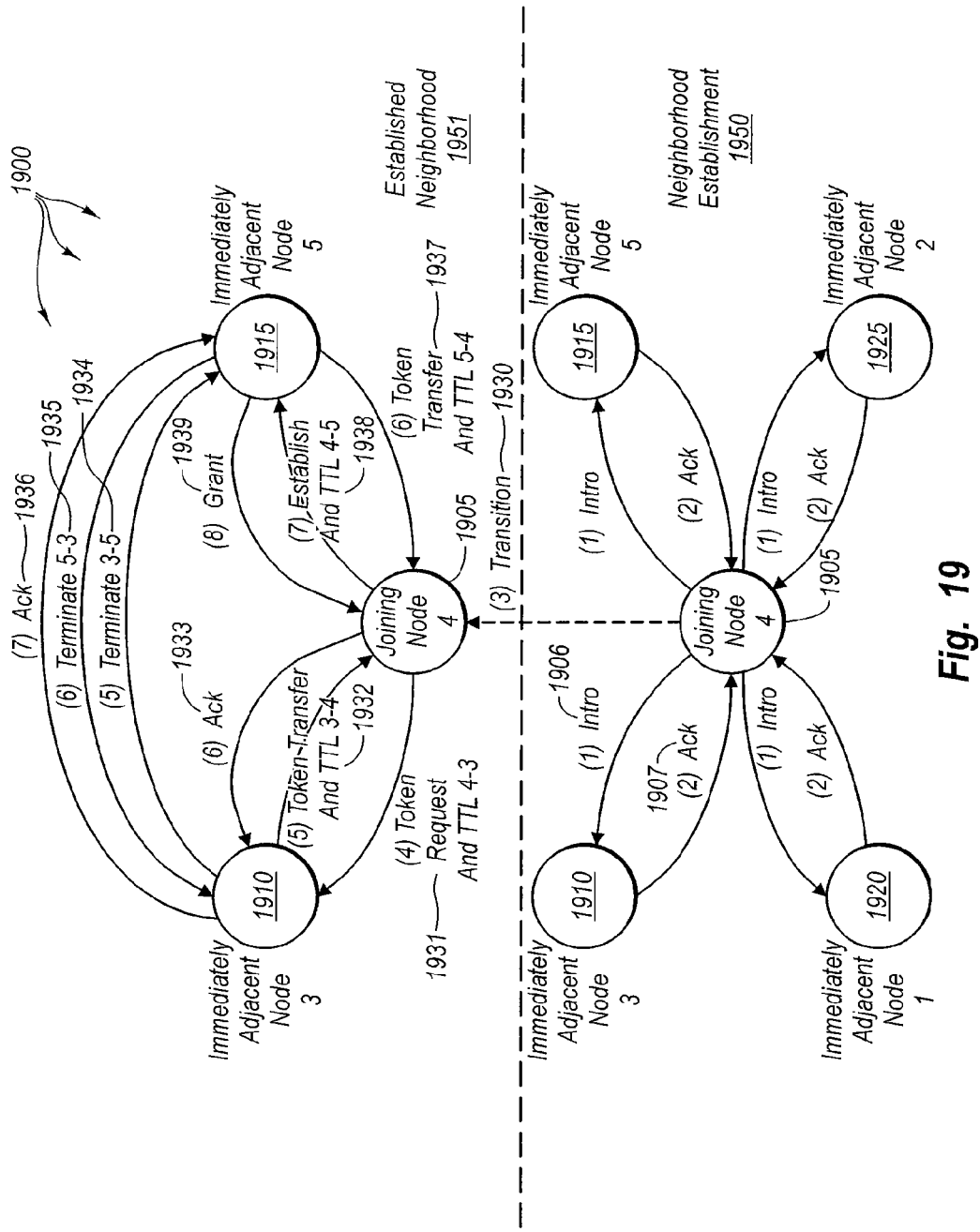
FIG. 19 illustrates an example state diagram for a joining node joining a ring of nodes with ring consistency.

As previously described, in some embodiments nodes can federated together to form a consistent federation infrastructure. FIG. 18 illustrates a ring architecture 1800 that facilitates joining of a node to a ring of nodes within a federation with ring consistency. Ring architecture 1800 includes ring of nodes 1805. In some embodiments, ring of nodes 1805 may be similar to or the same as ring 1750 in FIG. 17C, as described above. Ring of nodes 1805 may include joining node 1810 which may be attempting to join the ring between immediately adjacent node 1 (1820) and immediately adjacent node 2 (1830). In some embodiments, joining node 1810 may join ring of nodes 1810 in a manner similar to that described in FIG. 17C, where the joining node determines an identifier range based on a cached agreement between nodes 1701 and 1762. FIG. 19 illustrates a state diagram 1900 for a joining node joining the ring of nodes with ring consistency.

Embodiments of the invention include maintaining ring consistency during the joining of a node to a federation infrastructure, which will be described with respect to FIGS. 18 and 19. Maintaining ring consistency during the joining of a node can include an act of a joining node detecting a neighborhood of a plurality of other nodes on the ring, the neighborhood including at least an immediately adjacent predecessor node and an immediately adjacent successor node. For example, joining node 1810 may detect and/or establish a neighborhood of a plurality of other nodes on ring 1805, where the neighborhood includes immediately adjacent node 1820 and other immediately adjacent node 1830. In some embodiments, such as in state diagram 1900, joining node 1905 may establish a neighborhood by sending introduction messages (e.g. Intro 1906) in step 1. Each node that receives such an introduction message may respond with an acknowledgement (ACK) message (e.g. ACK 1907) in step 2 of the state diagram. The intro 1906 may include one or more portions of information used to identify the joining node and indicate that joining node 1805 intends to join ring 1805.

From the ACK messages received back by joining node 1905, the joining node may be configured to determine which node is the closest to it on the ring. For example, each ACK message may include identifier ranges and/or position identifiers indicating the nodes position on the ring and the ranges for which the node has responsibility. Thus, in state diagram 1900, joining node 1905 may determine that immediately adjacent node 3 (1910) is the joining node's immediately adjacent predecessor node and that immediately adjacent node 5 (1915) is the joining node's immediately adjacent successor node. Furthermore, joining node 1905 may determine that adjacent node 1 (1920) and adjacent node 2 (1925) are on the same ring as the joining node, but are not necessarily the joining node's immediately closest nodes. Thus, neighborhood establishment 1950 may be accomplished according to exemplary state diagram 1900.

Maintaining ring consistency during the joining of a node can include an act of the joining node indicating to one of the immediately adjacent nodes selected from among the immediately adjacent predecessor node and an immediately adjacent successor node, the intent of the joining node to take id-space ownership for a portion of the id-space between the joining node and the selected immediately adjacent node. For example, joining node 1810 may indicate to immediately adjacent node 1 (1820) selected from among immediately adjacent node 1 (1820) and immediately adjacent node 2 (1830), the intent of joining node 1810 to take id-space ownership for a portion of the id-space between joining node 1810 and selected immediately adjacent node 1820. As previously described, id-space may include an identifier range (unoccupied or otherwise) for which a given node is responsible. For example, id-space may include a numerical range of node identifiers for which a given node is responsible.

In some embodiments, such as in state diagram 1900, the act of the joining node 1905 indicating to one of the immediately adjacent nodes selected from among the immediately adjacent predecessor node and an immediately adjacent successor node, the intent of the joining node to take id-space ownership for a portion of the id-space between the joining node 1905 and the selected immediately adjacent node 1910 comprises an act of sending a token request 1931 to a selected immediately adjacent node 1910 from among the immediately adjacent predecessor node 1910 and an immediately adjacent successor node 1915, the token request including a node identifier such that only the node with the node identifier is capable of replying and a first time-to-live duration value 1931, the first time-to-live duration value indicative of a duration for which the joining node 1905 can assume a monitoring relationship with the selected immediately adjacent node is active.

In some cases, the token request message 1931 includes a marker indicating an updated status of the joining node's 1905 expected ownership range. Time-to-live values (TTL's) and relationship monitoring may be substantially the same as described in FIGS. 15A-15C.

Maintaining ring consistency during the joining of a node can include an act of the joining node indicating an intent to monitor the selected immediately adjacent node. For example, joining node 1810 may indicate an intent to monitor immediately adjacent node 1 (1820) as indicated in monitoring indication 1812. In such a monitoring relationship, joining node 1810 may agree to monitor a certain range of node identifiers. In some cases, a range may include identifiers between those of immediately adjacent node 1820 and immediately adjacent node 1830. In some embodiments, monitoring indication 1812 and an id-space ownership indication may be combined in a single message.

Maintaining ring consistency during the joining of a node can include an act of a first selected immediately adjacent node receiving an indication from the joining node indicating the intent of the joining node to take id-space ownership for a portion of the id-space between the joining node and the first selected immediately adjacent node. For example, immediately adjacent node 1 (1820) may receive an indication (e.g. id-space ownership indication 1811) from joining node 1810 indicating the intent of joining node 1810 to take id-space ownership for a portion of the id-space between the joining node and node 1820.

Maintaining ring consistency during the joining of a node can include an act of the first selected immediately adjacent node receiving an indication from the joining node of the joining node's intent to monitor the selected immediately adjacent node. For example, immediately adjacent node 1 (1820) may receive an indication (e.g. monitoring indication 1812) from joining node 1810 of the joining node's intent to monitor immediately adjacent node 1820.

Maintaining ring consistency during the joining of a node can include an act of the first selected immediately adjacent node sending an indication to the joining node indicating acceptance of the joining node's intent to take id-space ownership for a portion of the id-space between the joining node and the first selected immediately adjacent node. For example, immediately adjacent node 1 (1820) may send id-space ownership acceptance 1873 indicating acceptance of the joining node's intent to take id-space ownership for a portion of the id-space between joining node 1810 and immediately adjacent node 1820 (e.g. id-space ownership acceptance 1873).

Maintaining ring consistency during the joining of a node can include an act of the first selected immediately adjacent node sending a second indication to the joining node indicating acceptance of the joining node's intent to monitor the selected immediately adjacent node. For example, immediately adjacent node 1 (1820) may send monitoring acceptance 1883 indicating acceptance of the joining node's 1810 intent to monitor selected immediately adjacent node 1820.

Maintaining ring consistency during the joining of a node can include an act of the first selected immediately adjacent node sending a third indication to the joining node indicating the first selected immediately adjacent node's intent to monitor the joining node. For example, immediately adjacent node 1 (1820) may send monitoring indication 1893 to joining node 1810 indicating the first selected immediately adjacent node's 1820 intent to monitor joining node 1810. In some embodiments, the first, second and third indications may be combined in a single indication. Additionally or alternatively, any combination of the first, second and third indications may be combined in a single combination (e.g. first and third or second and third).

Maintaining ring consistency during the joining of a node can include an act of the joining node receiving a first indication from the selected immediately adjacent node indicating acceptance of the joining node's intent to take id-space ownership for a portion of the id-space between the joining node and the selected immediately adjacent node. For example, joining node 1810 may receive id-space ownership acceptance 1873 from immediately adjacent node 1 (1820) that indicates acceptance of the joining node's intent to take id-space ownership for a portion of the id-space between joining node 1810 and immediately adjacent node 1820.

Maintaining ring consistency during the joining of a node can include an act of the joining node receiving a second indication from the selected immediately adjacent node indicating acceptance of the joining node's intent to monitor the selected immediately adjacent node. For example, joining node 1810 may receive monitoring acceptance 1883 from selected immediately adjacent node 1820 indicating acceptance of the joining node's intent to monitor selected immediately adjacent node 1820.

Maintaining ring consistency during the joining of a node can include an act of the joining node receiving a third indication from the selected immediately adjacent node indicating the first selected immediately adjacent node's intent to monitor the joining node. For example, joining node 1810 may receive monitoring indication 1893 from selected immediately adjacent node 1820 indicating selected immediately adjacent node's intent to monitor joining node 1810. In some cases, the first, second and third indications may be combined in a single indication. Additionally or alternatively, any combination of the first, second and third indications may be combined in a single combination.

In some embodiments, such as in state diagram 1900, the act of the joining node 1905 receiving an indication from the selected immediately adjacent node 1910 that indicates acceptance of the joining node's intent to take id-space ownership for a portion of the id-space between the joining node and the selected immediately adjacent node and indicates the selected immediately adjacent node's 1910 intent to monitor the joining node 1905 comprises an act of receiving a first token transfer 1932 from the selected immediately adjacent node 1910, the first token transfer including the joining node's ownership range of unoccupied node identifiers in the ring of nodes between the joining node 1905 and the selected immediately adjacent node 1910, a second time-to-live duration value 1932, the second time-to-live duration value indicative of a duration for which the selected immediately adjacent node can assume a monitoring relationship with the joining node 1905 is active and a first establish grant indicative of the selected immediately adjacent node 1910 monitoring the joining node.

Maintaining ring consistency during the joining of a node can include an act of the joining node indicating acceptance of the selected immediately adjacent node's intent to monitor the joining node. For example, joining node 1810 may indicate in monitoring agreement 1814 acceptance of the first selected immediately adjacent node 1's (1820) intent to monitor joining node 1810. In some embodiments, such as in state diagram 1900, the act of the joining node 1905 indicating acceptance of the selected immediately adjacent node's 1910 intent to monitor joining node 1905 comprises an act of sending an acknowledgement message 1933 to the selected immediately adjacent node 1910 acknowledging the selected immediately adjacent node's intent to monitor joining node 1905.

Referring again to FIG. 27, maintaining ring consistency during the joining of a node can include an act of the first selected immediately adjacent node receiving an indication from joining node 1810 indicating acceptance of the first selected immediately adjacent node's intent to monitor joining node 1810. For example, immediately adjacent node 1820 may receive an agreement (e.g. monitoring relationship agreement 1814) from joining node 1810 agreeing to participate in a one-way monitoring relationship with immediately adjacent node 1820.

In some embodiments, selected immediately adjacent node 1820 may, additionally or alternatively, perform the acts of indicating to a second selected immediately adjacent node the first node's intent to terminate any monitoring relationships with the second selected immediately adjacent node, receiving an indication from the second selected immediately adjacent node indicating the second node's intent to terminate any monitoring relationships with the first selected immediately adjacent node and acknowledging the second node's intent to terminate. For example, immediately adjacent node 1 (1820) may indicate to immediately adjacent node 2 (1830) node 1's intent to terminate any monitoring relationships with node 2 (1830). Immediately adjacent node 1 (1820) may also receive an indication from node 2 (1830) indicating node 2's intent to terminate any monitoring relationships with node 1. Immediately adjacent node 1 (1820) may also acknowledge node 2's intent to terminate.

In some cases, such as in state diagram 1900, immediately adjacent node 3 (1910) may be configured to indicate to immediately adjacent node 5 (1915) node 3's intent to terminate any monitoring relationships with node 5 (1915) in step 5 (1934) of the state diagram. Immediately adjacent node 3 (1910) may also receive an indication from node 5 (1915) indicating node 5's intent to terminate any monitoring relationships with node 3 in step 6 (1935) of the state diagram. This may also serve to ack 1934 in some embodiments. Immediately adjacent node 3 (1910) may also acknowledge node 5's intent to terminate in step 7 (1936) of the state diagram. It should be noted that the steps (1-8) of state diagram 1900 may occur in series or in parallel. Thus, in some embodiments, all steps labeled (5), for example, may occur simultaneously and others may occur in series. Any combination of steps performed in series or parallel is possible.

In some embodiments, maintaining ring consistency during the joining of a node can include optional acts of receiving an introduction message from the joining node. The introduction message can include an expected ownership range of node identifiers indicated as being owned by the joining node and sending an acknowledgment message to the joining node. The acknowledgement message can include an indication that the range of node identifiers identified by the joining node is consistent with the selected immediately adjacent node's range of node identifiers. In some cases, the range of node identifiers may not be included in either of the introduction message or the acknowledgement messages. Instead, the range of node identifiers may be calculated at the time of reception or sending by the node that sent or received the message.

Maintaining ring consistency during the joining of a node can include act of another immediately adjacent node, selected from among the immediately adjacent predecessor node and an immediately adjacent successor node, indicating to the joining node id-space ownership for the portion of id-space between the joining node and the first selected immediately adjacent node. For example, immediately adjacent node 2 (1830), selected from among immediately adjacent node 1 (1820) and an immediately adjacent node 2 (1830), may indicate an id-space ownership indication 1884 to joining node 1810 id-space ownership for the portion of id-space between joining node 1810 and immediately adjacent node 1830.

Maintaining ring consistency during the joining of a node can include includes an act of the other immediately adjacent node indicating the other immediately adjacent node's intent to monitor the joining node. For example, immediately adjacent node 2 (1830) may indicate node 2's intent (1894) to monitor joining node 1810.

Maintaining ring consistency during the joining of a node can include includes an act of the joining node receiving an indication from the other immediately adjacent node that indicates id-space ownership for the portion of id-space between the joining node and the other immediately adjacent node. For example, joining node 1810 may receive id-space ownership indication 1884 from immediately adjacent node 2 (1830) that indicates id-space ownership for the portion of id-space between joining node 1810 and immediately adjacent node 1830.

Maintaining ring consistency during the joining of a node can include an act of the joining node receiving an indication from the other immediately adjacent node indicating the other immediately adjacent node's intent to monitor the joining node. For example, joining node 1810 may receive monitoring indication 1894 from other immediately adjacent node 1830 indicating the other immediately adjacent node's intent to monitor joining node 1810.

In some embodiments, such as in state diagram 1900, the act of the joining node 1905 receiving an indication from the other immediately adjacent node 1915 that indicates id-space ownership for the portion of id-space between the joining node 1905 and the other immediately adjacent node 1915 indicates the other immediately adjacent node's intent to monitor the joining node comprises an act of receiving a third time-to-live duration value 1937, the third time-to-live duration value indicative of a duration for which the other immediately adjacent node 1915 can assume a monitoring relationship with the joining node 1905 is active. In some embodiments, the joining node may receive a second token transfer 1937 from the other immediately adjacent node 1915 in step 6, the second token transfer including the joining node's ownership range of unoccupied node identifiers between the joining node 1905 and the other immediately adjacent node 1915. In other cases, the ownership range may be computed by either or both of the joining node and the other immediately adjacent node.

Referring again to FIG. 18, maintaining ring consistency during the joining of a node can include an act of the joining node indicating to the other immediately adjacent node the intent of the joining node to establish id-space ownership for a portion of the id-space between the joining node and the other immediately adjacent node. For example, joining node 1810 may indicate (e.g. in id-space ownership indication 1821) to immediately adjacent node 2 (1830) the intent of joining node 1810 to establish id-space ownership for a portion of the id-space between joining node 1810 and immediately adjacent node 1830.

In some embodiments, such as in state diagram 1900, the act of the joining node 1905 indicating to the other immediately adjacent node 1915 the intent of the joining node to establish id-space ownership for a portion of the id-space between the joining node 1905 and the other immediately adjacent node 1915 comprises an act of sending an establishment request (1938 in step 7) to establish a second ownership range between the joining node 1905 and the other immediately adjacent node 1915, the establishment request 1938 including a fourth time-to-live duration 1938, the fourth time-to-live duration indicative of a duration for which the joining node 1905 can assume a monitoring relationship with the other immediately adjacent node 1915 is active, and a third establish grant indicative of the joining node monitoring the other immediately adjacent node 1915. In some embodiments, the establishment request 198 can also represent an indication of a second ownership range between the joining node 1905 and the other immediately adjacent node 1915. In other cases, as explained above, the range may be calculated by any immediately adjacent pair of the nodes on the ring of nodes 1805.

Maintaining ring consistency during the joining of a node can include an act of the joining node initiating an intent to monitor the other immediately adjacent node. For example, joining node 1810 may initiate (e.g. via monitoring indication 1822) an intent to monitor immediately adjacent node 2 (1819). In some embodiments, such as in state diagram 1900, the act of the joining node 1905 indicating to the other immediately adjacent node 1915 the intent of the joining node to establish id-space ownership for a portion of the id-space between the joining node 1905 and the other immediately adjacent node 1915 comprises an act of sending an establishment request 1938 to establish a second ownership range between the joining node 1905 and the other immediately adjacent node 1915, the establishment request 1938 including a second ownership range between the joining node and the other immediately adjacent node, a fourth time-to-live duration 1938, the fourth time-to-live duration indicative of a duration for which the joining node can assume a monitoring relationship with the other immediately adjacent node is active, and a third establish grant 1938 indicative of the joining node monitoring the other immediately adjacent node.

Maintaining ring consistency during the joining of a node can include an act of the other immediately adjacent node receiving an indication of the joining node's intent to establish id-space ownership for a portion of the id-space between the joining node and the first selected immediately adjacent node. For example, immediately adjacent node 2 (1830) may receive id-space ownership indication 1821 indicating the joining node's intent to establish id-space ownership for a portion of the id-space between joining node 1810 and immediately adjacent node 1830.

Maintaining ring consistency during the joining of a node can include an act of the other immediately adjacent node receiving an indication of the joining node's intent monitor the first selected immediately adjacent node. For example, immediately adjacent node 2 (1830) may receive monitoring indication 1822 indicating joining node's intent to monitor immediately adjacent node 1830.

Maintaining ring consistency during the joining of a node can include an act of the other immediately adjacent node indicating to the joining node the other node's intent to monitor the joining node. For example, immediately adjacent node 2 (1830) may indicate to joining node 1810 (e.g. via monitoring indication 1894) the immediately adjacent node's intent to monitor joining node 1810.

In some cases, immediately adjacent node 2 (1830) may, additionally or alternatively, perform the acts of receiving an indication from a second selected immediately adjacent node indicating the second node's intent to terminate any monitoring relationships with the first selected immediately adjacent node, indicating to the second selected immediately adjacent node the first node's intent to terminate any monitoring relationships with the second selected immediately adjacent node and receiving an acknowledgment acknowledging the first node's intent to terminate. The other immediately adjacent node may also acknowledge the indication from the second selected immediately adjacent node. For example, immediately adjacent node 2 (1830) may receive an indication from immediately adjacent node 1 (1820) indicating node 1's intent to terminate any monitoring relationships with node 2. Node 2 (1830) may also receive an acknowledgement (3036 in state diagram 3000) acknowledging node 2's intent to terminate. Node 2 (1830) may also acknowledge the indication from node 1 (1820).

Maintaining ring consistency during the joining of a node can include an act of the joining node receiving an indication from the other immediately adjacent node indicating the other immediately adjacent node's intent to monitor the joining node. For example, joining node 1810 may receive monitoring indication 1894 from immediately adjacent node 2 (1830) (e.g. monitoring) indicating the other immediately adjacent node's intent to monitor joining node 1810. In some embodiments, such as in state diagram 1900, the act of the joining node receiving an indication from the other immediately adjacent node indicating the other immediately adjacent node's intent to monitor the joining node comprises an act of receiving a fourth establish grant (e.g. 1939 in step 8) for the establishment request, the fourth establish grant indicative of the other adjacent node 1915 monitoring the joining node 1905.

Furthermore, joining node 1810 may receive a negative acknowledge (NAK) message from at least one of the nodes on the ring (e.g. immediately adjacent node 1 (1820), where the NAK message includes an indication of the NAK sender's view of the ring. Using the NAK sender's view of the neighborhood, joining node 1810 may update its view of the neighborhood based on the NAK sender's view of the ring.

Figure 20:
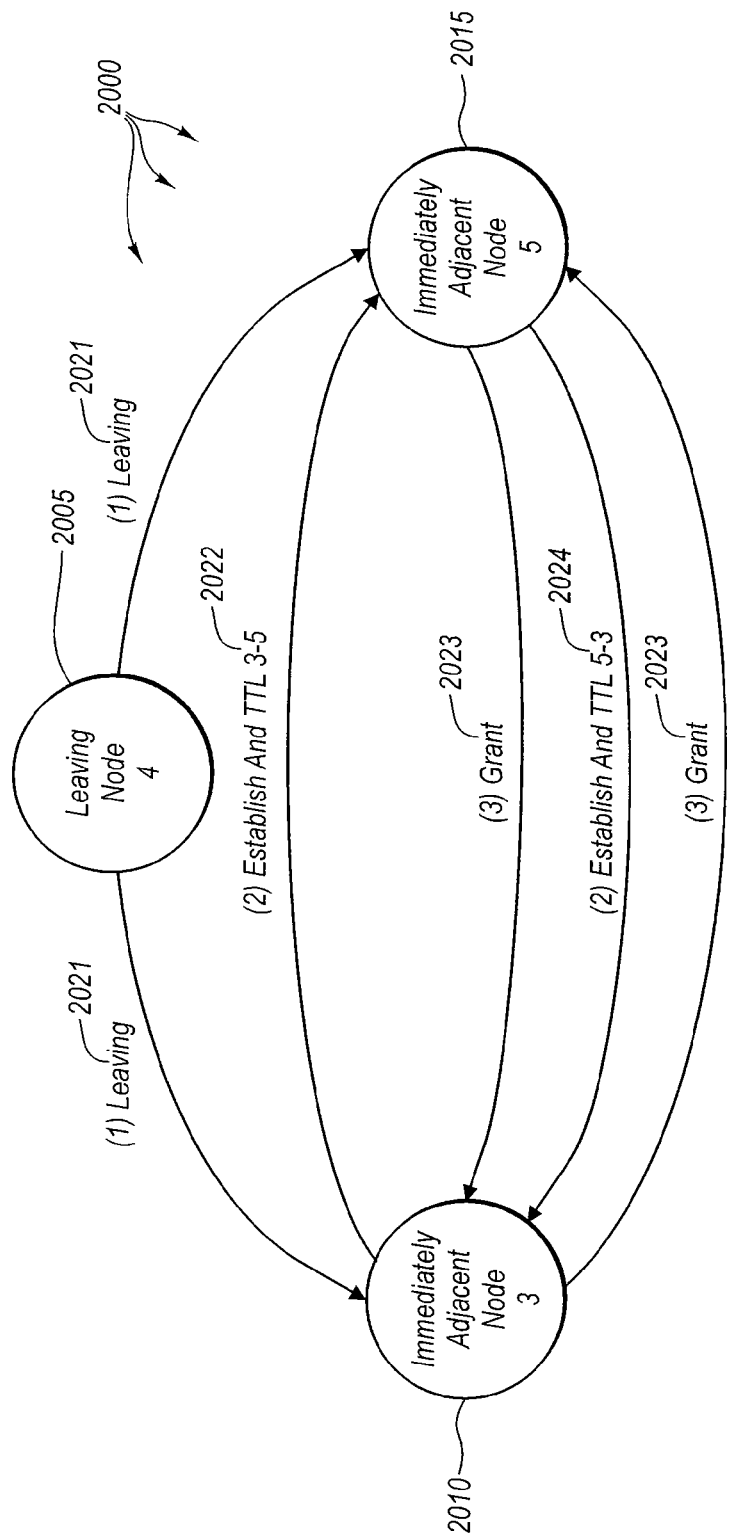
FIG. 20 illustrates an example state diagram for a leaving node leaving a ring of nodes with ring consistency.

FIG. 20 illustrates a state diagram 2000 for a leaving node leaving the ring of nodes with ring consistency. Embodiments of the invention include maintaining ring consistency during the leaving of a node from a federation infrastructure, which will be described with respect to FIGS. 18 and 20.

Maintaining ring consistency during the leaving of a node from a federation can include an act of the first selected immediately adjacent node receiving an indication of the leaving node's act of leaving the ring of nodes. For example, immediately adjacent node 3 (2010) may receive an indication from any node on the ring (e.g. from leaving node 4 (2005)) indicating leaving node's 2005 act of leaving the ring of nodes. In some cases, leaving node 2005 may already have left the ring of nodes when the indication is received. Or, leaving node 2005 may be either in the process of leaving or planning to leave the ring of nodes. In some embodiments, the act of the first selected immediately adjacent node 2010 receiving an indication that leaving node 2005 is leaving the ring of nodes comprises the first selected immediately adjacent node 2010 receiving a departure message 2021 (step 1 in state diagram 2000) from leaving node 2005, where the departure message may include an ownership range of node identifiers indicated as being owned by leaving node 2005. In other embodiments, immediately adjacent node 2010 may receive an indication (e.g. leaving indication 2021) from a node outside the ring of nodes such as from an underlying bus and/or network.

Maintaining ring consistency during the leaving of a node from a federation can include an act of the first selected immediately adjacent node sending an indication to the second selected immediately adjacent node indicating an intent to assume the leaving node's id-space ownership for a portion of the id-space between the leaving node and the first selected immediately adjacent node (act 2920). For example, immediately adjacent node 3 (2010) may send an indication (e.g. Establish & TTL 2022) to immediately adjacent node 5 (2015) indicating an intent to assume the leaving node's id-space ownership for a portion of the id-space between leaving node 2005 and immediately adjacent node 2010.

Maintaining ring consistency during the leaving of a node from a federation can include an act of the first selected immediately adjacent node sending an indication to the second selected immediately adjacent node indicating establishment of at least a one-way monitoring relationship between the first selected immediately adjacent node and the second selected immediately adjacent node. For example, immediately adjacent node 3 (2010) may send an indication (e.g. Establish & TTL 2022) to immediately adjacent node 5 (2015) indicating establishment of at least a one-way monitoring relationship between immediately adjacent node 3 (2010) and immediately adjacent node 5 (2015).

In some embodiments, such as in state diagram 2000, the act of the first selected immediately adjacent node sending an indication to the second selected immediately adjacent node indicating an intent to assume the leaving node's id-space ownership for a portion of the id-space between the leaving node and the first selected immediately adjacent node comprises an act of the first selected immediately adjacent node 2010 sending a first establishment request 2022 (e.g. in step 2 of state diagram 2000) to the second selected immediately adjacent node 2015 to establish an ownership range between the first selected immediately adjacent node 2010 and the second selected immediately adjacent node 2015, the first establishment request including a first time-to-live duration 2022, the first time-to-live duration indicative of a duration for which the first selected immediately adjacent node 2010 can assume a monitoring relationship with the second selected immediately adjacent node 2015 is active, and an act of the first adjacent node 2010 receiving a first establish grant 2023 (e.g. in step 3 of state diagram 2000) for the first establishment request 2022, the first establish grant 2023 indicative of the second adjacent node 2015 monitoring the first selected immediately adjacent node 2010.

Maintaining ring consistency during the leaving of a node from a federation can include an act of the first selected immediately adjacent node receiving an indication from the second selected immediately adjacent node indicating acceptance of the first node's intent to assume id-space ownership for a portion of the id-space between the leaving node. For example, immediately adjacent node 3 (2010) may receive an indication (e.g. Establish & TTL 2024) from immediately adjacent node 5 (2015) that indicates acceptance of immediately adjacent node 5's intent to assume id-space ownership for a portion of the id-space between leaving node 2005 and the first selected immediately adjacent node.

Maintaining ring consistency during the leaving of a node from a federation can include an act of the first selected immediately adjacent node receiving an indication from the second selected immediately adjacent node indicating establishment of a one-way monitoring relationship between the second selected immediately adjacent node and the first selected immediately adjacent node. For example, immediately adjacent node 2010, and indicates establishment of a one-way monitoring relationship between immediately adjacent node 2015 and immediately adjacent node 2010.

In some embodiments, such as in state diagram 2000, wherein the act of an act of the first selected immediately adjacent node receiving an indication from the second selected immediately adjacent node that indicates acceptance of the first node's intent to assume id-space ownership for a portion of the id-space between the leaving node and the first selected immediately adjacent node and indicates establishment of a one-way monitoring relationship between the second selected immediately adjacent node and the first selected immediately adjacent node comprises an act of the first adjacent node 2010 receiving a second establishment request (e.g.

in step 2 of state diagram 2000) from the second adjacent node 2015 to establish an ownership range between the first adjacent node 2010 and the second adjacent node 2015, the second establishment request including a second time-to-live duration 2024, the second time-to-live duration indicative of a duration for which the second adjacent node 2015 can assume a monitoring relationship with the first adjacent node 2010 is active, and an act of the first adjacent node 2010 sending a second establish grant 2023 (e.g. in step 3 of state diagram 2000) for the second establishment request, the second establish grant indicative of the first adjacent node 2010 monitoring the second adjacent node 2015.

Data Consistency

Figure 21:
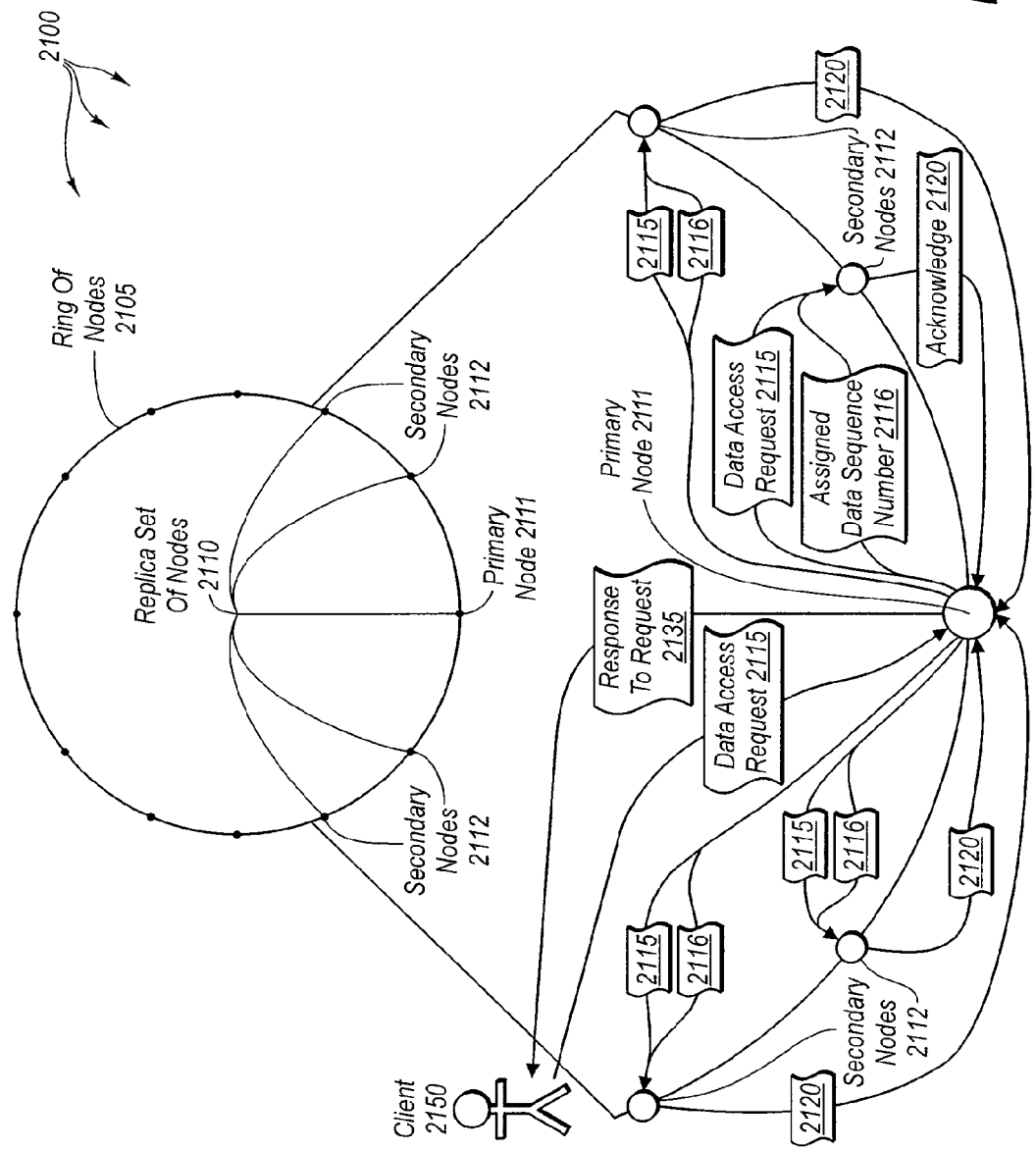
FIG. 21 illustrates an example ring architecture that facilitates maintaining replica set and data consistency within a federation.

FIG. 21 illustrates an example ring architecture 2100 that facilitates maintaining replica set and data consistency within a federation a ring architecture. In some embodiments, ring of nodes 2105 may be similar to or the same as ring 1750 in FIG. 17C and/or ring 1805 in FIG. 18, as described above.

Embodiments of the invention include performing a data access transaction within a replica set within a federation infrastructure.

In some embodiments, performing a data access transaction within a replica set can include an act of electing a primary node from among a plurality of nodes in the replica set of nodes. For example, primary node 2111 may be elected from among a plurality of nodes in replica set of nodes 2110. To assist in maintaining data consistency, a replica set may be created to replicate or duplicate one or more portions of data. Thus, when nodes leave the ring (either by failure or by smooth departure), other nodes will also contain the information held by the departing node. In some cases, each node in a replica set may include the following: 1) the identity of the replica set, 2) the configuration sequence number (CSN), 3) the membership of the replica set and who the primary node is, 4) the last used sequence number (LSN), and 5) the data stored in the replica set. The state information represented in 1-3 may be referred to as "configuration state" for the replica set and the state information represented in 4-5 may be referred to as "data stored" in the replica set.

It should be understood that the principles, descriptions, and explanations provided above regarding routing consistency and ring consistency are applicable with respect to leader election (i.e. electing a primary node). For example, principles of maintaining id-space ownership within the ring may be applied to primary and secondary nodes as discussed herein. In general, the properties of primary and secondary nodes are consistent with any or all of the other nodes described in the sections above.

In some embodiments, replica set 2110 may be created with a single node acting as its primary (primary node 2111). Primary node 2111 may initialize its LSN and CSN to zero and initialize the replica membership, including only itself as a member. Replica set 2110 may then be expanded to a desired size by adding nodes to the replica set using various reconfiguration algorithms, as will be described in greater detail below. In some cases, any node in a replica set that is not a primary node is referred to as a secondary node. The LSN may be incremented to create a total order among both write and reconfiguration operations. The CSN may point to the latest configuration change in the replica set. Thus, in this case, the CSN shares the LSN sequence. Gaps in the LSN sequence typically indicate data loss, and should thus be avoided.

Performing a data access transaction within a replica set can include an act of determining that a primary node has been elected from among a plurality of nodes in a replica set of nodes, the primary node being configured to accept and process client data access requests, the replica set comprising the elected primary node and one or more secondary nodes. For example, primary node 2111 may determine that it has been elected from among a plurality of nodes in replica set of nodes 2110, where primary node 2111 is configured to accept and process client data access request 2115, and where replica set 2110 includes primary node 2111 and secondary nodes 2112.

It may be desirable to add multiple secondary nodes to increase fault tolerance (i.e. more secondary nodes storing the same data). The number of secondary nodes to add may be determined based on a maximum number of tolerable simultaneous failures. Thus, if the maximum number of tolerable simultaneous failures is, for example, 3, it may be desirable to have at least 4 secondary nodes so that at least one node would still be part of the replica set even after three others have failed. In some cases, the number of secondary nodes to be members of the replica set corresponds to the number of members in the primary node's neighborhood.

This maximum number of tolerable simultaneous failures may be related to a threshold number of secondary nodes. Such a threshold number of secondary nodes may be referred to as a quorum. When the data access request 2115 is a data write request, the threshold number of secondary nodes may be referred to as a write quorum. Similarly, when the data access request 2115 is a data read request, the threshold number of secondary nodes may be referred to as a read quorum. Thus, read and write quorums may represent a minimum threshold number of nodes necessary to provide complete fault tolerance for a given number of tolerable simultaneous failures.

Performing a data access transaction within a replica set can include an act of the primary node receiving one or more client data access requests, each data access request indicating at least a portion of data that is to be accessed on at least one of the secondary nodes in the replica set. For example, primary node 2111 may receive client data access request 2115 from client 2150, where request 2115 indicates at least a portion of data that is to be accessed on secondary nodes 2112 in replica set 2110. Data access request 2115 may, for example, include a file that is to be written to at least one of the nodes in the replica set. Additionally or alternatively, data access request 2115 may include the name of a file that is to be read and retrieved from at least one of the nodes in the replica set. The primary node 2111 manages the incoming data requests and sends the appropriate information to the secondary nodes 2112 including configuration state information corresponding to the replica set. The portion of data may also include a set of control information about the replica set itself including a node's data sequence number (DSN), LSN, CSN, primary node identity or secondary node identity.

Figure 22:
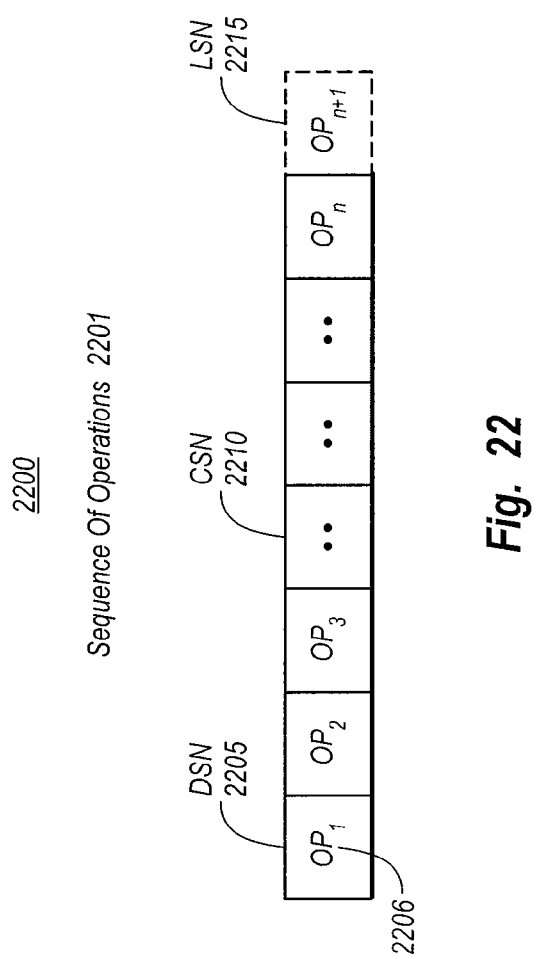
FIG. 22 illustrates an exemplary sequence of operations.

Performing a data access transaction within a replica set can include an act of the primary node assigning a data sequence number (DSN) to each of the client data access requests that mutate state in the order the client data access requests are received, the data sequence numbers comprising a linearized processing order that is to be followed by each of the nodes in the replica set. For example, primary node 2111 may assign a DSN to each client data access request 2115 that mutate state in the order the requests are received. The DSN's may include a linearized processing order that is to be followed by each of the nodes in replica set 2110. In some cases, the linearized processing order may be referred to as sequence of operations 2201, as illustrated in FIG. 22. In cases where the request does not mutate state, primary node 2111 may omit assigning a data sequence number to the client data access request.

Sequence of operations 2201 may include multiple operations arranged in the order they were received, according to a data sequence number (DSN 3505). For example, primary node 2111 may assign $OP_1$ to represent a first operation, $OP_2$ to represent a second operation, and down the line as represented by $OP_n$. $OP_{n+1}$ may represent the last-used sequence number (LSN 3515). As mentioned above, LSN 2215 may be incremented to create a total order among both write and reconfiguration operations. The CSN 2210 may point to the latest configuration change in replica set 2110. In some cases, CSN 2210 may share the LSN sequence. Gaps in the LSN sequence typically indicate that the sequence of operations 2201 has not been followed, which often results in data loss.

Performing a data access transaction within a replica set can include an act of the primary node sending at least one of the client data access requests including any corresponding data sequence numbers to at least one of the secondary nodes. For example, primary node 2111 may send client data access request 2115 including any assigned DSN's 2116 to secondary nodes 2112. In some cases, client data access request may be sent to a quorum such as a write quorum or a read quorum. The quorum may respond with the expected information and additionally with an indication of other data access requests the primary node is unaware of For example, a secondary node may have processed other transactions before primary node 2111 was elected or may have been assigned certain transactions that the primary is not aware of Thus, this information may be sent to primary node 2111, which may be used to update the primary node's sequence of operations 3501. In some cases, this process only occurs during a replica set reconfiguration, as will be explained in greater detail below.

Performing a data access transaction within a replica set can include an act of the primary node receiving, from at least a threshold number of secondary nodes, an acknowledgement indicating reception of the client data access request. For example, primary node 2111 may receive, from a threshold number of secondary nodes (e.g. a read or write quorum), an acknowledgement message 2120 acknowledging reception of client data access request 2115. The acknowledgement 2120 may further indicate that the secondary node that sent the message has inserted the client data access request 2115 into its data access queue (i.e. sequence of operations 2201). In some cases, primary node 2111 may receive such an acknowledgement message from all of the nodes in the replica set or from a quorum thereof. The acknowledgement may, additionally or alternatively, indicate acceptance or rejection of the client data access request.

Performing a data access transaction within a replica set can include an act of the primary node committing the data access request, the committing including accessing the data according to the client data access request. For example, primary node 2111 may commit the data access request 2115 in a single phase, where the committing includes accessing the data according to client data access request 2115. Thus, in cases where the data access request is a write request, primary node 2111 may commit the write request in a single phase. Committing in a single phase may be done without sending and receiving commit queries from each of the secondary nodes. Committing in a single phase may be referred to as a non-blocking transaction. Because failure detection, as described above, within the replica set is perfect, the primary node does not have to send and receive commit queries from each of the secondary nodes.

In some embodiments, primary node 2111 may send client data access request 2115 to a second replica set. The second replica set may be in a different neighborhood than the neighborhood of the primary node. In some cases, the primary node's neighborhood includes the same nodes as those in the replica set. Primary node 2111 may request that replica set 2110 handle a first portion of the client data access request 2115 and the request the second replica to handle a second different portion of the data access request. Such embodiments, however, would use a two-phase commit process. For example, the process may include receiving a reply from replica set 2110 corresponding to the first portion of the client data access request 2115. The process may also include receiving a reply from the second replica set corresponding to the second different portion of the data access request. The replies may be combined and, based on the combined replies, an up-to-date data access response may be generated.

In an exemplary embodiment, primary node 3211 may respond to a client data write request as follows: 1) primary 3211 validates the request against the application consistency constraints. If primary 3211 determines a violation, it responds to the client 3250 with a failure status of application consistency violation and skips to step (7) below. 2) Primary 3211 assigns the write operation a sequence number which may be obtained by atomically incrementing the primary's LSN. In this example, the sequence number associated with a given write operation is referred to as its DSN. 3) The primary 3211 communicates the DSN, CSN, and data to be written to all the secondary nodes and waits for a write quorum of secondary nodes to respond (a variant approach may be for the primary to send the data to be written to only a write quorum).

4) After hearing acknowledgements from a write quorum of secondary nodes, primary 2111 performs the write operation locally and is the point at which the write operation is considered committed. Primary 2111 responds back to the client with a success status and skips to step (7) below. 5) If primary 2111 fails to get acknowledgements from a write quorum of secondary nodes, it initiates a reconfiguration operation to eliminate the failed secondary nodes. 6) If primary 2111 fails to perform the write operation locally, it initiates a reconfiguration operation to transition to a new primary, removes itself from the replica set 2110, and skips step (7). 7) Primary 2111 waits for the next incoming client data access request. It should be noted that other embodiments are possible and may include more or less steps, as explained above.

In an exemplary embodiment, one or more secondary nodes 2112 may process a data write request in the following manner: 1) the secondary compares the CSN specified in the incoming write operation to its CSN. If the specified CSN is less than its CSN, the secondary ignores the request and skips to step (4) below. Secondary node 2112 asserts that the specified CSN cannot be greater than its CSN because such a condition implies that reconfiguration was accomplished with an imperfect failure detector. 2) Secondary node 2112 compares the DSN of the incoming write data request with its LSN. If the DSN is less than its (LSN+1), secondary node 2112 ignores the write data request. If the DSN is greater than its (LSN+1), secondary node 2112 buffers the data write request and skips to step (4) below. Otherwise, secondary node 2112 atomically increments it's LSN and accepts the data write request, and sends back an acknowledgement 2120. If secondary node 2112 is unable to accept the request due to local failures, it requests the primary to initiate a reconfiguration to remove it as secondary from the replica set. 3) Secondary node 2112 examines the currently buffered operations and processes them until it has examined each of them, accepting any whose DSN is within the scope of the secondary's LSN value described here, thus preserving the total order established by the primary. 4) Secondary node 2112 waits for the next data access request from primary 2111. The act of processing can include writing the related data to a stable storage facility.

In a database setting, an exemplary method for performing a write transaction is as follows: 1) For operations prior to a "commit" including "abort", primary 2111 simply performs the operations locally and skips to step (6) below. 2) For "commit", primary 2111 determines the transaction order by locally preparing the transaction. This step also validates the transaction against database consistency constraints. If the local prepare fails, it responds back to client 2150 with a failure status and skips to step (6) below. 3) Primary node 2111 forwards the transaction with the "commit" request to the secondary nodes 2112 as specified in steps (2)-(3) in the previous example. 4) After primary node 2111 gets acknowledgments from a write quorum of secondary nodes, it commits the transaction locally and reports success to the client 2135. 5) If primary node 2111 fails to get acknowledgements from a write quorum of secondary nodes, it aborts the locally prepared transaction and initiates a reconfiguration operation to eliminate the failed secondary nodes. 6) Primary 2111 waits for the next incoming client data access request 2115.

Embodiments of the invention include establishing and maintaining a consistent replica set within a federation infrastructure.

Establishing and maintaining a consistent replica set within a federation infrastructure can include establishing a replica set from among a plurality of nodes in a ring of nodes, the replica set comprising as members a primary node and one or more secondary nodes. For example, replica set 2110 may be established from among nodes 2111, 2112 and other nodes on ring of nodes 2105. Replica set 2110 may include as members primary node 2111 and secondary nodes 2112. In some cases, the boundaries of replica set 2110 may be the same as the neighborhood of the primary and which secondary nodes are also members.

Establishing and maintaining a consistent replica set within a federation infrastructure can include an act of receiving an indication indicating a replica set configuration event occurrence affecting at least one of the replica set members. For example, any of nodes 2111 and 2112 in replica set 2110 may receive an indication of a replica set configuration event occurrence that affects at least one of primary node 2111 and secondary nodes 2112. Replica set configuration events may include a node failure within the replica set, a node departure from the replica set or a node joining the replica set. Other events affecting nodes of the replica set that would cause a reconfiguration are also possible. In some cases, such a configuration event may occur during a client data access request.

Establishing and maintaining a consistent replica set within a federation infrastructure can include includes an act of, based on the received indication, an act of determining that the replica set is to be reconfigured, the reconfiguration including at least one of removing an existing secondary node from the replica set, adding a new secondary node to the replica set, abruptly transitioning to a new primary and smoothly transitioning to a new primary, based on the replica set configuration event occurrence. For example, based on the received indication, one of the nodes in replica set 2110 may determine that replica set 2110 is to be reconfigured. The reconfiguration may include removing an existing secondary node from the replica set, adding a new secondary node to the replica set, abruptly transitioning to a new primary or smoothly transitioning to a new primary, depending on which configuration event occurred.

Example methods and algorithms for reconfiguring a replica set and transitioning to a new primary node are included below. The examples of replica set reconfiguration generally cover four cases including 1) an abrupt transition to a new primary, 2) a smooth transition to a new primary, 3) removing a secondary node, and 4) adding a secondary node. Each of these four general examples may occur independently and, at least in some embodiments, do not involve replacement of an existing primary.

Establishing and maintaining a consistent replica set within a federation infrastructure can include an act of reconfiguring the replica set according to the reconfiguration corresponding to the replica set configuration event. For example, replica set 2110 may be reconfigured according to the reconfiguration corresponding to the replica set configuration event. Thus, in cases where the replica set configuration event is a node failure, replica set 2110 may be reconfigured by adding a secondary, removing a secondary or transitioning to a new primary. Similarly, when the replica set configuration event is a node joining, replica set 2110 may be reconfigured according to any of the above methods. In some cases, certain reconfiguration methods may correspond to certain reconfiguration events. This correspondence may be configured by a user or may be automatic.

In some cases, primary node 2111 may detect, based on the configuration state information, that one or more replica set reconfigurations in progress. As indicated above, during the reconfiguration process, a new primary node may be elected for the replica set. According to the embodiments described above, nodes in the ring 3205 may communicate with the new primary node to ensure that the new primary node's information is up-to-date with respect to the other nodes on the ring.

In some embodiments, a consistent replica set similar to or the same as the one described above, may be used to access and store data. For example, replica set 2110 may be configured to maintain a portion of data storage on one or more of the replica set nodes (e.g. on secondary nodes 2112). Primary node 2111 may receive client data access request 2115. Request 2115 may include an indication of information that is to be accessed on at least one node within replica set of nodes 2110. Primary node may either process the request directly, or pass it to a secondary node. In cases where primary node 2111 detects that it has failed to access at least a portion of information indicated in the received client data access request 2115, primary node 2111 may remove itself from the replica set so that information stored on primary node 2111 is prevented from being accessed in response to the client data access request. This eliminates the possibility of returning stale or out-of-date information and ensures that any information returned in response to client data access request 2115 is up-to-date.

According to some embodiments, an abrupt transition to a new primary may occur in the following manner. When the existing primary fails, a new primary is elected using reliable leader election algorithm per the method mentioned above. Before accepting any client operations, the new primary may perform the following configuration change to remove the old primary from the replica set: 1) The new primary checks to see if it has knowledge of the replica set state. If the new primary does not have the knowledge, it impliedly determines that all members of the replica set have failed and it skips to step (9) below. 2) The new primary contacts every node of the replica set to determine their CSN and LSN until it hits a fix point in terms of having contacted all existing secondary nodes. Using the information collected in this step, the new primary determines the earliest CSN, latest CSN, and latest LSN. Note that the earliest CSN and latest CSN may be same in some (or most) cases. When the earliest and latest CSN are different, failure of primaries in the middle of reconfiguration operations is indicated. Then, any replica with a CSN larger than the earliest CSN definitively has the latest data. Thus, at the end of this step, the new primary already has the latest data when the earliest CSN and latest CSN are different. Otherwise, the new primary only has data written prior to latest CSN and the check in step (3) ensures that it also has the data written past the latest CSN.

3) If the earliest CSN and latest CSN is the same and the new primary has failed to contact a read quorum of secondary nodes, there is a potential for data loss and the new primary skips to step (9) below. In some cases, it may be highly advantageous (or even necessary) for the read quorum to intersect with its write quorum. For size based quorums, the read quorum is any set larger than (n-w) where n is the number of replica nodes specified in the CSN and w is the write quorum.

4) The new primary attempts to bring the secondary nodes in its configuration current with respect to data by sending them the operations between their reported LSN and latest LSN determined in step (2) above. Incomplete reconfiguration operations after the earliest CSN and up to latest CSN may be sent as abbreviated void reconfiguration operations in this step. 5) The new primary builds a new replica configuration locally after removing the failed primary (e.g. primary 2111) and secondary nodes (e.g. secondary nodes 2112) from the configuration with the latest CSN, makes the latest LSN its LSN, and assigns the new configuration a CSN obtained by incrementing the LSN. 6) The new primary communicates the new replica configuration to all the secondary nodes.

7) If the new primary fails to get success status from all secondary nodes or hears a failure status from any secondary in response to the reconfiguration operation sent in step (6) above, the new primary re-executes steps (2)-(6) above. 8) After hearing success status from at least some of (or all) the secondary nodes, the new primary skips to step (10) below. 9) The new primary takes steps to perform disaster recovery such as ringing bells in the data center, sending pager messages, etc. In some cases, the replica set can only be restored using manual intervention. 10) The new primary resumes processing of the client operations at this point. In step (2) above, the new primary might discover new secondary nodes that were in the process of being added to the replica set when the old primary failed. The fix point is meant to capture the stable set of secondary nodes that the new primary considers part of the new configuration. If we eliminate the optimization around the abrupt primary transition also handling new secondary nodes, this fix point computation may be eliminated.

According to some embodiments, a smooth transition to a new primary may occur in the following manner. The transition from an existing primary to a new primary is very similar to adding a new secondary to the replica set (as will be explained below). Note that the new primary may or may not be a current secondary in the replica set. In this example, the potential new primary follows this algorithm to become part of the replica set: 1) the new primary contacts one or more existing secondary nodes in the replica set to transfer data to it, 2) the new primary simultaneously contacts the existing primary (e.g. primary 2111) to forward new operations to it.

3) If the DSN of the new operation received from the new primary is larger than the data received from a secondary, it merges the new write operations sent by the new primary with the data received from the secondary. 4) After all the secondary nodes contacted by the new primary in step (1) above report that the data transfer is complete, the new primary contacts the existing primary 2111 to initiate a configuration change to make the new primary the current primary of the replica set. 5) After receiving success status from the existing primary as a response to the reconfiguration request sent in step (4), the new primary assumes the primary role for the replica set, and 6) until the reconfiguration request in step (5), the new primary forwards any client operations it receives to the existing primary.

According to some embodiments, the process of removing a secondary node may occur in the following manner. When a perfect failure detector (as described above with regard to FIGS. 14 and 19) reports to the one of the ring nodes (e.g. primary node 2111) that an existing secondary 2112 has failed or when an existing secondary contacts one of the other nodes (e.g. the primary) to voluntarily remove itself from the replica set 2110, one of the nodes (e.g. the primary) may exercise the following algorithm to remove the secondary from the replica set. In this example, 1) the primary blocks processing of incoming client operations (e.g. 2115) and either buffers them or asks the clients (e.g. 2150) to retry later, 2) the primary installs a new replica configuration locally by removing the failed secondary from the replica set membership and assigns the new configuration a CSN by atomically incrementing it's LSN. In some cases, this means that reconfiguration operations are in the same sequence stream as data operations. 3) The primary communicates the new configuration to all the secondary nodes, and 4) after hearing success status from at least some of (or all) the secondary nodes, the primary resumes processing of the client operations.

During such a reconfiguration process, the secondary being reconfigured may behave as follows: 1) the secondary compares the CSN of the reconfiguration operation with its LSN. If the CSN is less than (LSN+1), the secondary sends the primary a failure status and skips to step (3) below. If the CSN is equal to (LSN+1), the secondary atomically increments it's LSN and accepts the reconfiguration operation, and sends back a success status. Otherwise, the secondary buffers the reconfiguration operation and skips to step (3) below, 2) the secondary examines the currently buffered operations and processes them until it has examined at least some (or all) of them, and 3) the secondary waits for the next operation request from the primary.

The perfectness of the failure detector ensures that old and new reconfigurations do not simultaneously exist. In some embodiments, an overall assumption is that there exists a perfect failure detector that can be used to detect fail-stop failures. The use of "perfect" in this sense captures the assumption that the failure detector never reports that a node instance has become unavailable unless it (that instance of the node's existence) has indeed become permanently unavailable. As mentioned above, failure detection may go hand-in-hand with and may be reliant on the concepts of ring consistency and routing consistency properties, as explained above. Because old and new reconfigurations do not exist simultaneously, this implies that replica set state does not exist outside of the replica set members because a replica set node is removed from the replica set only after either it has failed or voluntarily removed itself This property is useful in identifying the condition where all the members of a replica set have failed because the newly elected primary will realize that it does not have access to the replica set state under this condition.

In this example, because the primary blocks processing of incoming operations until the reconfiguration operation is complete, it allows an operator to ignore the reconfiguration operations that have become invisible. A reconfiguration operation may become invisible when the primary that initiated it fails during the reconfiguration process itself and the secondary nodes that were contacted by the failed primary also fail subsequently. This property allows a newly elected primary that finds a single CSN among the existing secondary nodes of the replica set to be assured that either the CSN it found is indeed the latest CSN from an oracle perspective observing the entire system or that no data operations were initiated after the later reconfiguration operations that have since become invisible. As such, it is safe for the newly elected primary to determine data loss based on the latest CSN it found among the existing secondary nodes as explained in the example regarding abrupt transition to a new primary.

Given that the reconfiguration operations can be in the same sequence as data operations, at least some (or all) secondary nodes are brought current with respect to data (meaning they all have the same LSN) at the end of a reconfiguration operation. In the presence of a write quorum, this property makes it safe for the newly elected primary to determine data loss based on the latest CSN it finds among the existing secondary nodes.

According to some embodiments, the process of adding a secondary node may occur in the following manner. In this example, the new secondary follows the following algorithm to become part of the replica set: 1) the secondary node contacts one or more existing secondary nodes in the replica set to transfer data to it, 2) the secondary node simultaneously contacts the primary (e.g. 2111) to forward new operations to it, 3) if the DSN of the new operation received from the primary is larger than the data received from a secondary, the secondary node merges the new write operations sent by the primary with the data received from the secondary, and 4) after at least some of (or all) the secondary nodes contacted by it in step (1) above report that the data transfer is complete, the secondary node contacts the primary to initiate a configuration change to add itself to the replica set.

Continuing this example, the algorithm followed by the primary to add a new secondary to the replica set is as follows: 1) in response to the first request from the new secondary, the primary starts forwarding new operations to the would-be new secondary though it is not yet part of the replica set, and 2) in response to the subsequent reconfiguration request from the new secondary, the primary can initiate a reconfiguration operation using virtually the same steps mentioned above in the "removing a secondary node" example with the difference being that the new configuration adds the new secondary instead of removing an existing secondary.

Figure 23:
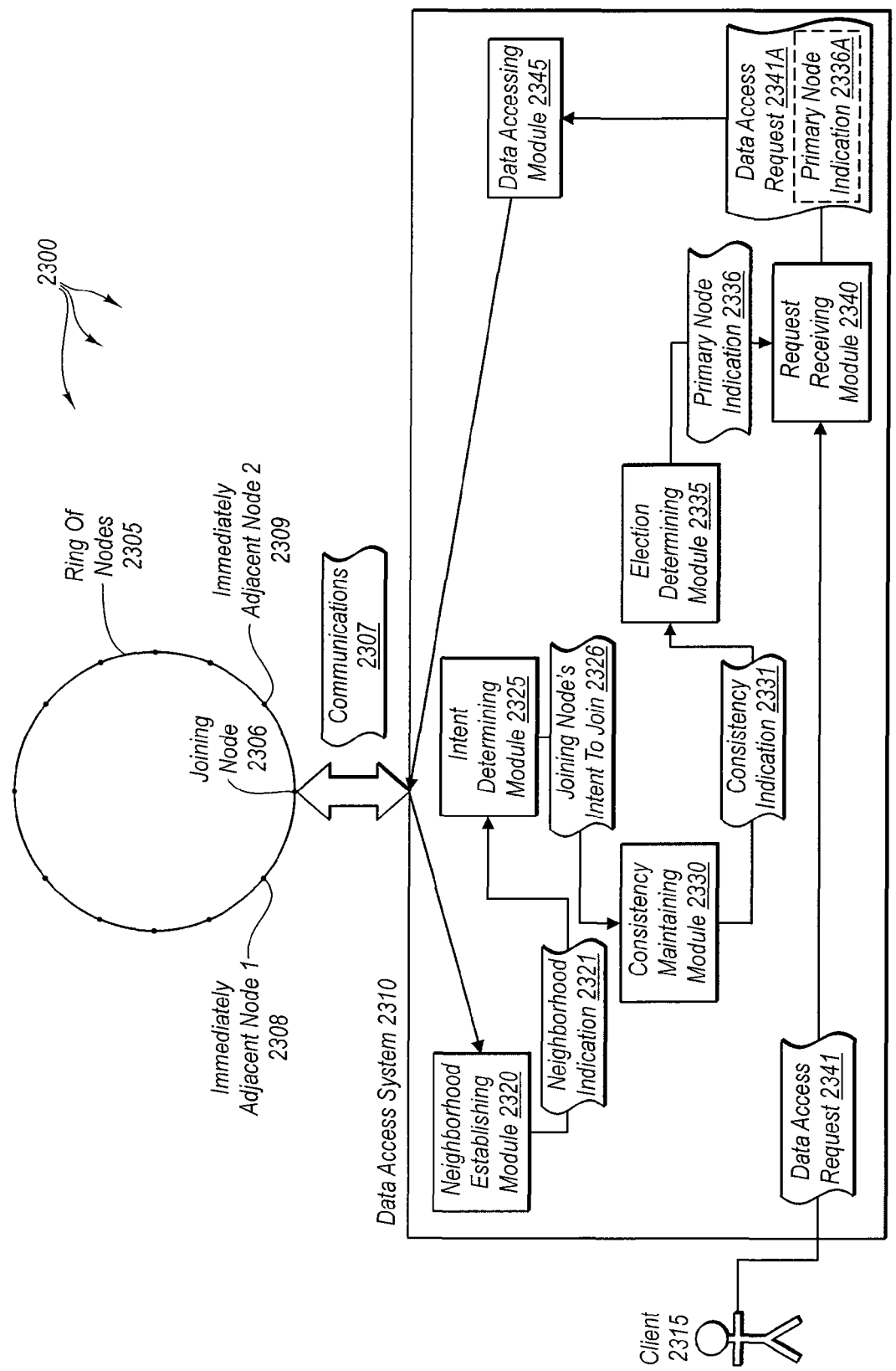
FIG. 23 illustrates an exemplary system for accessing data from a replica set within a federation infrastructure.

FIG. 23 illustrates an exemplary system 2300 for accessing data from a replica set within a federation infrastructure. Environment 2300 includes data access system 2310 that comprises a plurality of modules. In general, each module described below exists within the ring implementation (e.g. ring of nodes 2105) and may be implemented as a distributed algorithm across the nodes making up a neighborhood and/or replica set and more generally nodes making up a ring of nodes arrangement and devices attempting to become an active node in such a ring of nodes arrangement. The system includes a neighborhood establishing module 2320 configured to establish a neighborhood of a plurality of nodes on the ring, the neighborhood including at least an immediately adjacent predecessor node and an immediately adjacent successor node. Ring of nodes 2105 may include joining node 2306 which may be attempting to join the ring between immediately adjacent node 1 (2308) and immediately adjacent node 2 (2309). In some embodiments, joining node 2306 may join ring of nodes 2305 in a manner similar to that described in FIG. 17C, where the joining node determines an identifier range based on a cached agreement between nodes 1701 and 1762.

The system further includes an intent determining module 2325 configured to determine that a joining node outside the established neighborhood has indicated an intent to join the established neighborhood in the ring of nodes. Intent determining module 2325 may receive neighborhood indication 2321 from neighborhood establishing module 2320 indicating the establishment of a neighborhood of nodes. The neighborhood may include immediately adjacent node 1 (2308), joining node 2306 and immediately adjacent node 2 (2309). Intent determining module 2325 may send joining node's intent to join 2326 to consistency maintaining module 2330.

Consistency maintaining module 2330 may be configured to maintain consistency within the established neighborhood such that each node in the plurality of nodes takes id-space ownership for a portion of id-space in the neighborhood. As described above under the heading "Joining and Leaving a Ring of Nodes," consistency within the neighborhood may be maintained when joining node 2306 joins the ring of nodes 2305. Consistency maintaining module 2330 may send consistency indication 2331 to election determining module 2335. It should be noted that, in some embodiments, for all state consistently maintained at a given id in the id-space of a ring, there is a replica set formed for that unit of state who's primary node is the ring node owning that id at any given moment. As id-space ownership transfers (consistently) for a given id between nodes, so does the corresponding primary-ness of any units of service state stored at (or controlled by) that owning node. In this embodiment, the id-space ownership and primary-ness is transferred in a simultaneous manner.

Election determining module may be configured to determine that one of the nodes in the plurality of nodes has been elected to be a primary node with responsibility over a replica set of nodes configured to respond to client data access requests as directed by the primary node. As explained above with regard to primary node election, election determining module may determine that a primary node has been elected for a replica set (which may include all the nodes in the established neighborhood) and send an indication (2336) of which node was elected to be primary to request receiving module. As explained above, such leader election may follow the principles of ring consistency and routing consistency (including monitoring agreements forming at least in part a perfect failure detector mechanism) as defined earlier in this paper.

Request receiving module 2340 may be configured to receive one or more client data access requests from client 2315, where each data access request 2341 indicates at least a portion of data that is to be accessed on at least one of the nodes in the replica set. Request receiving module 2340 may also receive primary node indication 2323. The primary node indication 2323 and the data access request 2341 may be combined 2341A & 2323A (or may each be sent separately (not shown)) to data accessing module 2345. Data accessing module 2345 may be configured to communicate with one or more of the nodes in ring of nodes 2305 via communications 2307 and access the data indicated in the client data access request 2341. Thus, an entire system may be instantiated where nodes may join and leave ring of nodes 2305, consistency will be maintained, primary nodes elected and data reliably accessed. Each of the modules described in this system may perform these functions as well as other functions described in greater detail in the above sections that correspond to each module.

In some embodiments, the data that is to be accessed comprises a service. For example, joining node 2306 may provide a service that client 2315 desires to access. For example, the service may be an email application. Client 2315 may indicate data that is to be accessed and data access system 2310 may be configured to access the data, regardless of whether the joining node leaves the ring due to the ring and data consistency maintained by the data access system. In other cases, the service provided may be a lock manager, a data storage system, producer-consumer queues or any other service. In cases where the system is used to access data such as a database, system 2310 may be configured to maintain each of the atomicity, consistency, isolation, and durability (ACID) properties for the data in the replica set. Thus, a system is presented that may be configured to provide consistent, reliable data access, regardless of which node actually contains the data, which nodes are joining or leaving the ring of nodes, or whether a substantial number of nodes containing the data have failed.

In some cases, the operations exposed by a service can be partitioned into those that mutate state and those that do not mutate state. In the case of a storage service, operations that mutate state may be referred to as "writes" and operations that do not mutate state are referred to as "reads." In the case of a lock manager service, the operations that mutate state are referred to as "acquires" and "releases" and operations that do not mutate state are referred to as "queries." In the case of producer-consumer queues (sometimes used for distributed computations), operations that mutate state are referred to as "enqueue" and "dequeue" and operations that do not the state are referred to as "peeks." Thus, in some embodiments herein, the term "write" captures any operation that mutates state and the term "read" captures any operation that does not mutate state.

Referring back to FIG. 21, in some cases, read operations are processed locally by the primary node 2111. If a read can't be satisfied at a would-be primary because the client-requested state does not exist there, that state will not (guaranteed) exist at any of the secondary nodes. In some embodiments, write operations may be ordered though primary node 2111. In such cases, primary node 2111 may not actually write the client-supplied state locally until at least a write quorum of secondary nodes have acknowledged that they have written that state themselves. Then, primary node 2111 actually writes (or attempts to write) the state locally. Reconfiguration, in some embodiments, may occur any time a replica set member (primary or secondary node) cannot write the requested state. In such cases, the node may initiate a reconfiguration in the replica set by removing itself from the replica set. Furthermore, any secondary nodes not responding will fail (this is guaranteed because of the perfect failure detector) and the primary node will trigger a reconfiguration by removing that secondary node from the replica set. In some cases, this will not cause the primary node to stop being the primary for the replica set.

Data access system 2310 may be configured to write data according to a client data write request. Thus, in cases where data access request 2341 (or data access request 2115) is or includes a write request, primary node 2111 may instruct a secondary node 2112 to write the data indicated in the client data write request to a data store in the secondary node. In some cases, the primary node replicates the write request to one or more secondary nodes 2112 in two phases. The advantage of this variant is that it allows for read operations to be serviced by a secondary if the write quorum consists of all the secondary nodes in the replica set 2110. In some cases, accepting a write operation at secondary nodes and the primary node can trigger additional logic such as writing the data to stable storage available to each of the nodes individually.

Data access system 2310 may be configured to read data according to a client data read request. Thus, in cases where data access request 2341 (or data access request 2115) is or includes a read request, either primary node 2111 or secondary nodes 2112 may be configured to handle the read request directly. In some cases, it is unnecessary for primary node 2111 to call on a secondary node to read the data indicated in the request. In other cases, the secondary may be able to read the data and respond to the client data read request autonomously.

Namespaces

As previously described, namespace management services can be used to organize resources into collections, potentially providing resource access through a plurality of namespaces. Namespaces can be viewed as a forest where each namespace (tree) is represented as a Uniform Resource Identifier ("URI") with scheme and the part immediately following it serving as the root. The URI scheme can be hierarchical or flat. Hierarchical schemes such as "name" and "http" (as opposed to flat schemes such as "uuid") can be identified by the presence of the ":/" character sequence after the scheme name. The first part of hierarchical schemes can identify the naming authority responsible for the rest of the URI components. Such URIs are identified by the presence of the "://" character sequence after the scheme name. Namespaces can be both hierarchical and are routable meaning that namespaces serve as identifiers that can be used to identify the communication paths from the sender to receiver.

In some embodiments, a namespace can be defined as follows:

| | |
|---|---|
| Namespace := | Flat \| Hierarchical |
| Flat := | Scheme ':' Opaque_part |
| Hierarchical := | Scheme ':/' ('/' Authority '/')? |
| | Segment ('/' Segment)* |
| Scheme := | as defined by RFC-2396 on URI Generic Syntax |
| Opaque_part := | as defined by RFC-2396 on URI Generic Syntax |
| Authority := | as defined by RFC-2396 on URI Generic Syntax |
| Segment := | as defined by RFC-2396 on URI Generic Syntax |

Resources can be made available at any branch in the tree, and a given resource can be exposed in multiple namespaces. Also, a given namespace can identify a single resource or a namespace branch (a group of resources). Such a grouping can be logical or physical depending on the semantics of the Namespace. The group is obtained by performing a depth-first-search on the identified Namespace branch. Once a group of resources have been identified, many operations can be performed on them such as selecting resources that satisfy some criteria, sending (and potentially routing) a given message to only those in a group, and so on.

A single resource can be viewed as a trivial collection. Thus, every resource can be assigned a name(space). Because namespaces are routable, messages can be routed over a namespace federation infrastructure to any resource that has a name. Such routing can cross trust boundaries and traverse firewalls.

Generally, a resource can be assigned one or more URIs that can be used to access the resource. One URI, the Resource ID, assigned to a resource can be, at a minimum, unique across all namespaces implemented by a given namespace federation infrastructure such that the resource can be singularly referenced. Other, potentially non-unique, URIs can also be assigned to resources. These other, potentially non-unique, URIs provide access to the resource via additional locations within namespaces implemented by a given namespace federation infrastructure. A resource can be assigned at least one potentially non-unique URI for each namespace that can be traversed to access the resource.

Figure 28:
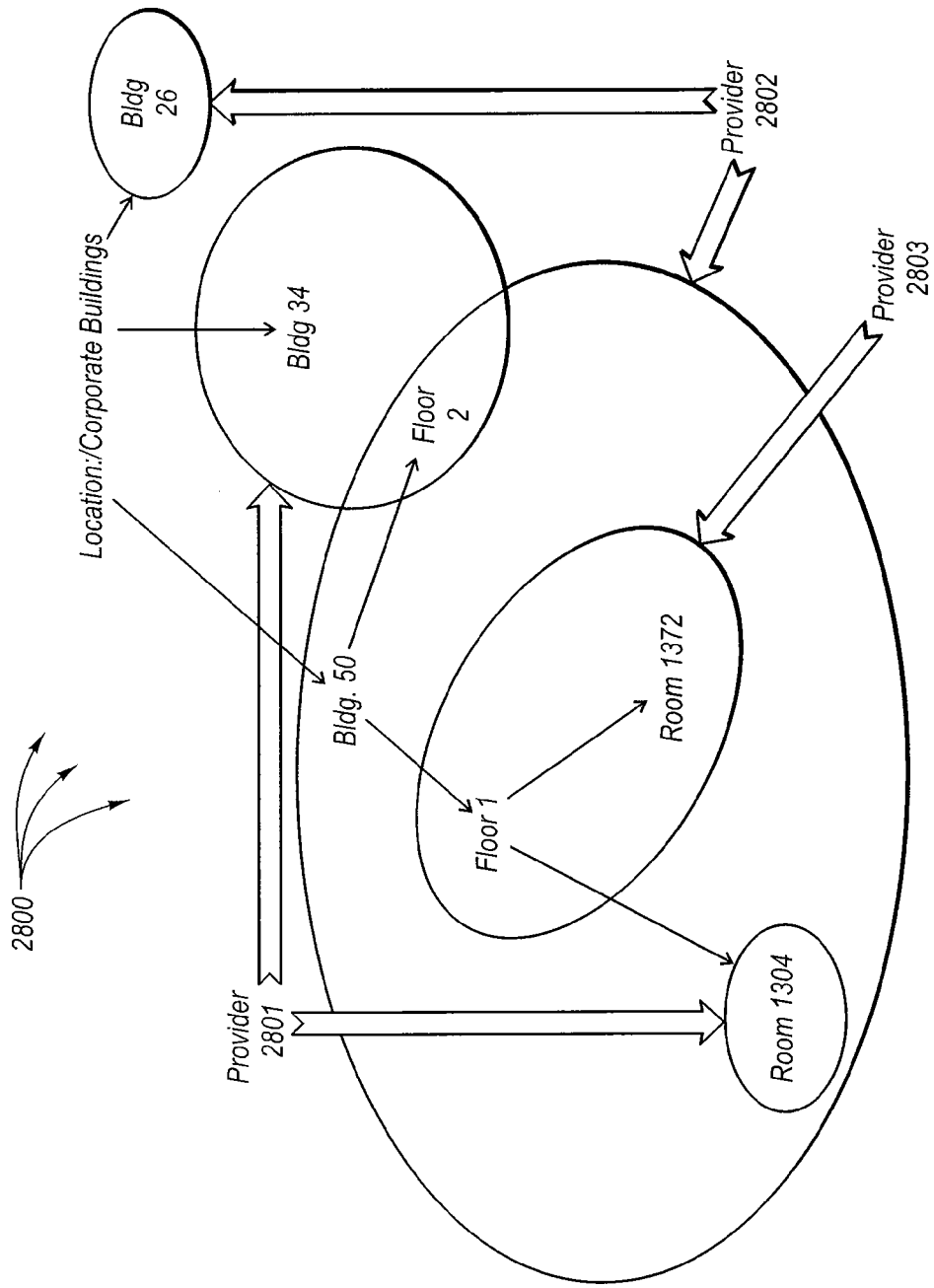
FIG. 28 illustrates an example of a namespace federation infrastructure from provider and collection views of a namespace.

FIG. 28 illustrates an example of a namespace federation infrastructure 2800 from provider and collection views of a namespace. Namespace federation infrastructure 2800 depicts that providers can be registered at any branch in a namespace tree. Further, a provider can be registered at multiple namespace branches, potentially in different trees. For example, provider 501 is registered for the namespace branches location:/CorporateBuildings/bldg34, location:/CorporateBuildings/bldg50/floor2, and location:/CorporateBuildings/bldg50/floor1/room1304. Provider 2802 is registered for namespace branches location:/CorporateBuildings/bldg50 and location:/CorporateBuildings/bldg26. Provider 2803 is registered for location:/CorporateBuildings/bldg50/floor1.

As depicted in FIG. 28, applications can view namespaces as a logical collection of resources that can nest hierarchically. That is, intermediate namespace nodes (e.g., location:/CorporateBuildings/bldg50/floor1 and location:/CorporateBuildings/bldg50) are viewed as resources—namespace node resources. Applications can efficiently operate on such logical collections in a coherent and scalable manner, including publishing, searching, locating, tracking, targeting, and sourcing events from inside the collections. Note that not all the resources inside a logical collection are necessarily located on a single computer system or device. Resources can be distributed both in space and time across many computer systems and device. The namespace federation infrastructure takes care of efficiently routing lookup requests to the computer systems and devices participating in any given collection, thereby providing a uniform and consistent view to applications.

Figure 29:
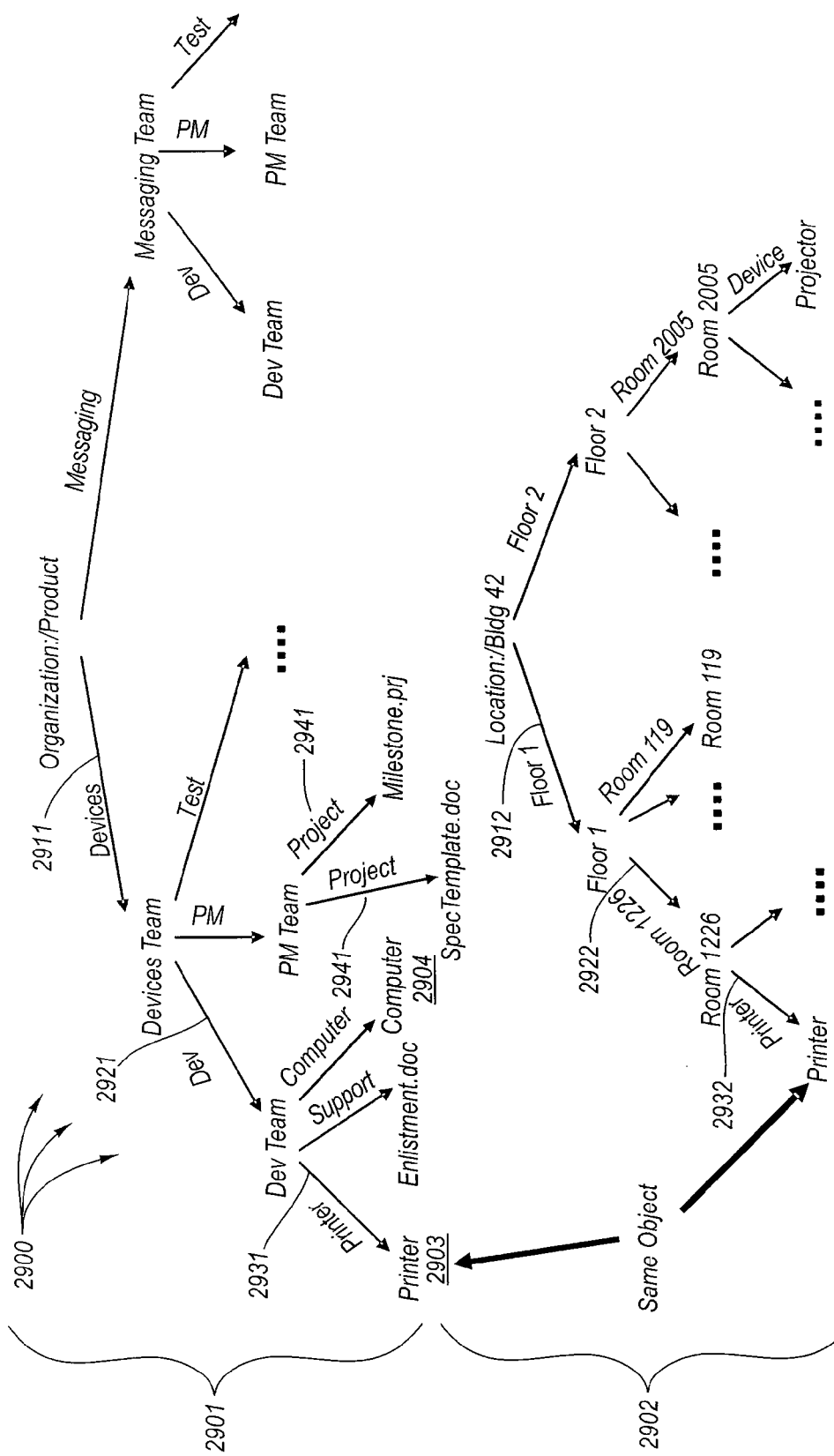
FIG. 29 illustrates an example namespace federation infrastructure with a resource made available in a plurality of namespaces.

FIG. 29 illustrates an example namespace federation infrastructure 2900 with a resource made available in a plurality of namespaces. The URI Organization:/Product identifies the root of namespace tree 2901. Similarly, URI Location:/Bldg 42 identifies the root of namespace tree 2902. As depicted, printer 603 is exposed in both namespace tree 2901 and namespace tree 2902.

Within this specification and the following claims, a namespace node resource can be viewed simply as a node in a namespace tree. Some namespace node resources can be viewed as root nodes (e.g., Location:/Bldg42), others can be viewed as intermediate nodes (e.g., Organization:/Product/Devices Team, and others can be viewed as leaf nodes (e.g., Location:/Bldg 42/Floor 1/Room 112/Printer 2903). However, it should be understood that a namespace node resource in one namespace tree can reference a namespace node resources (or other resources) in another namespace tree. Thus, viewing a namespace node resource as a root, intermediate, or leaf in one namespace tree does not limit the querying of that namespace node resource from other namespace trees.

A namespace also includes namespace segments that link (or relate) two or more namespace node resources. A namespace segment can be utilized to link namespace node resources in the same namespace. For example, the namespace segment 2911 ("Devices") links Organiaztion:/Product to Devices Team. Further, a namespace segment can link (otherwise connected) namespace node resources in different namespace trees thereby providing the functionality of symbolic links. Traversing a namespace segment includes navigation to all the target namespace node resources. For example, the namespace segment 2941 ("Project") connects the PM Team to the file resources SpecTemplate.doc and Milestone.prj.

Accordingly, namespace segment 2911 ("Devices"), namespace segment 2921 ("Dev"), and namespace segment 2931 ("Printer") can be traversed in namespace tree 2901 to identify printer 2903. Likewise, namespace segment 2912 ("Floor 1"), namespace segment 2922 ("Room 1226"), and namespace segment 632 ("Printer") can be traversed in namespace tree 2902 to identify printer 2903. It should be understand that the URI scheme of namespace tree 2901 and the URI scheme of namespace tree 2902 can differ.

Since the same resource can participate in multiple namespaces and with the presence of the symbolic link functionality, a global view of all the namespaces and the resources participating in them forms a directed graph with the Namespace segments serving as labeled graph edges and namespace node resources and other resources serving as graph nodes. The namespace roots effectively partition the namespace node resources and other resources in this global graph into a set of starting and reachable resources with the starting namespace node resources providing the basis for namespace scoping. Accordingly, cached information for implementing queries is reduced and distributed across each namespace.

Also, any given namespace can form a graph since the same resource can be made available at multiple Namespace branches and some segments can connect otherwise connected namespace node resources.

Figure 24:
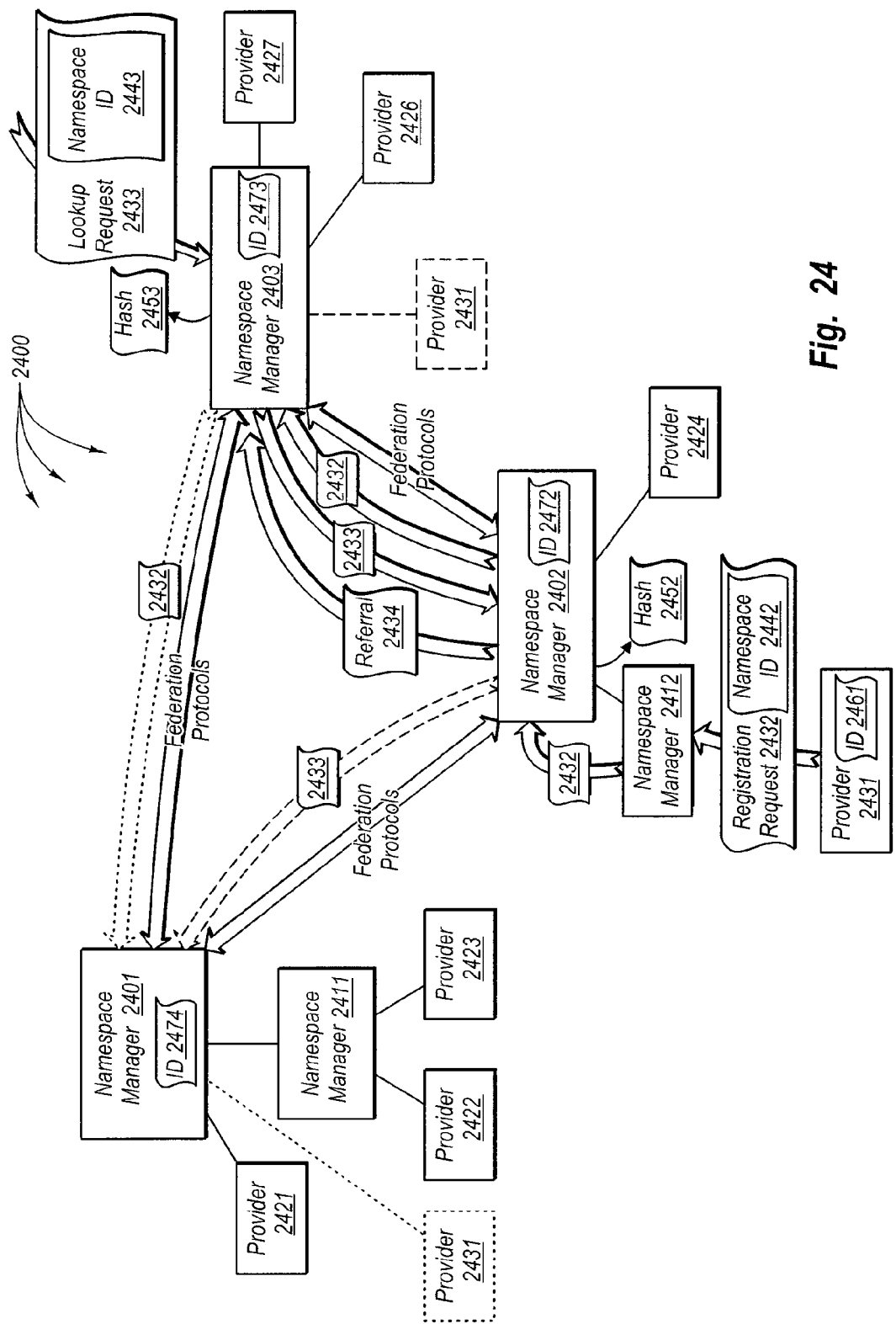
FIG. 24 illustrates an example of a namespace federation infrastructure.

FIG. 24 illustrates an example of a namespace federation infrastructure 2400. The namespace federation infrastructure 2400 includes namespace managers 2401, 2402, 2403, 2411, and 2412 that can form different types of federating partnerships. For example, namespace managers 2401, 2402, 2403 are federated among one another as peers without a root namespace manager. On the other hand, namespace managers 2411 and 2412 federate with namespace managers 2401 and 2402 respectively with namespace managers 2401 and 2402 serving as root namespace managers. Different types of devices can participate in the namespace federation infrastructure, including hosts (e.g., PCs hosting resources), message routers, message gateways (e.g., firewalls, network address translation ("NAT" boxes, and redirectors), and message brokers (e.g., pub-sub intermediaries). Namespace federation infrastructure 2400 facilitates bus protocols (e.g., liveness, control, eventing, and streaming). Further, namespace federation infrastructure 2400 can interoperate with third-party software and hardware stacks using related WS protocols such as, for example, WS-Discovery and WS-Eventing.

Generally, the namespace managers 2401, 2402, 2403, 2411, and 2412 can utilize namespace federation protocols to form partnerships and exchange namespace information. The formation of partnerships and exchange of namespace information facilitates more efficient and reliable access to namespace resources. It may be that peer namespace managers (e.g., namespace managers 2401, 2402 and 2403) exchange namespace information with other peer namespace manages. However, other namespace managers (e.g., namespace managers 2411 and 2412) may exchange namespace information with corresponding root namespace managers (e.g., namespace managers 2401 and 2402). Each of the namespace managers 2401, 2402, 2403, 2411, and 2412 can maintain a database of namespace information, such as, for example, what namespace managers or providers are interested in which namespace branches.

Namespace federation infrastructure 2400 includes providers 2421, 2422, 2423, 2424, 2426, and 2427. Each of the providers can be interested in one or more namespace branches in the namespace federation infrastructure. Providers exchange namespace information with a corresponding namespace manager. For example, provider 2422 exchanges namespace information with namespace manager 2411. A corresponding namespace manager then facilitates transferring the namespace information to other namespace managers. For example, namespace manager 2411 can transfer the namespace information to namespace manager 2401 and namespace manager 2401 can in turn transfer relevant portions of the namespace information to namespace managers 2402 and 2403.

A namespace federation infrastructure (e.g., namespace federation infrastructure 2400) facilitates distributing lookup requests over namespaces to appropriate providers. For example, it may be that providers 2801, 2802, and 2803 are each one of the providers 2421, 2422, 2423, 2424, 2426, or 2427.

Namespace managers can federate using a variety of different mechanisms. A first federating mechanism includes peer namespace managers forwarding namespace information to all other peer namespace managers. When a namespace manager is to join a namespace federation infrastructure, the namespace manager utilizes a broadcast/multicast discovery protocol, such as, for example, WS-Discovery to announce its presence (a broadcast/multicast Hello) and issues a broadcast/multi-cast Probe to detect other namespace managers. The namespace manager then establishes a simple forwarding partnership with other namespace managers already present on the network and accepts new partnerships with newly joining namespace managers. Thereafter, the namespace manager can forward every namespace request to its partners.

A second federating mechanism includes peer namespace managers efficiently forwarding all namespace information to other peer namespace managers. When a new namespace manager is to join a namespace federation infrastructure, the new namespace manager utilizes a broadcast/multicast discovery protocol, such as, for example, WS-Discovery to announce its presence (a broadcast/multicast Hello) and issues a broadcast/multicast Probe to detect other namespace managers that are part of the namespace federation infrastructure. Upon detecting another namespace manager, the new namespace manager establishes a partnership with the other namespace manager. From the established partnership, the new namespace manager learns about the presence of other namespace managers already participating in federation namespace infrastructure. It then establishes partnerships with these newly-learned namespace managers and accepts any new incoming partnership requests.

Both namespace manager arrivals/departures and namespace registrations are flooded through the namespace federation infrastructure resulting in every namespace manager having global knowledge of other namespace mangers and namespace registrations. With such global knowledge, any namespace manager can forward lookup requests to only partners that have providers/subscribers registered under the namespace branch specified in the request.

A third federating mechanism includes peer namespace managers indirectly forwarding namespace information to other peer namespace managers. In this third mechanism, namespace managers are assigned unique identifiers (ID's), such as, for example, a 128-bit or 160-bit ID. The namespace manager responsible for a given namespace tree is determined to be the one whose ID is closest to the one obtained by an at least one-way mapping function, such as, for example, hashing the given namespace tree. Such a hashing based mapping scheme for namespaces is described in further detail below.

In this third mechanism, namespace manager arrivals and departures are flooded over the fabric. On the other hand, namespace registrations are forwarded to the namespace manager determined to be responsible for the namespace branch specified in the request. For scalability, load balancing, and fault-tolerance, the namespace manager receiving namespace registrations may reliably flood these registrations among those namespace mangers that are within its neighborhood set. The neighborhood set for a specified namespace manager is determined to be the set of namespace managers having IDs within a predefined range on either side of the ID of specified namespace manager within a finite modulo ID-address-space.

Similar to mechanism 2, a newly joining namespace manager utilizes a broadcast/multicast discovery protocol, such as, for example, WS-Discovery to announce its presence (a broadcast/multicast Hello) and issues a broadcast/multicast Probe to detect a namespace manager that is already part of the namespace federation infrastructure. The new namespace manager establishes a partnership with the discovered namespace manager and uses that partnership to learn about the presence of other namespace managers participating in the namespace federation infrastructure. The new namespace manager then establishes further partnerships with the newly discovered namespace managers and accepts any new incoming partnership requests. It accepts incoming namespace registrations from its partners under the namespace branches for which it is responsible and may flood them over its neighborhood set.

In response to incoming lookup requests, the new namespace manager consults its registration database and forwards the requests to the namespace managers having providers/subscribers registered under the namespace branch specified in the request. Thus, when using this third mechanism, every namespace manager in the namespace federation infrastructure has global knowledge of all other namespace managers but the registration information is efficiently partitioned among the namespace mangers. A namespace manager thus indirectly forwards the lookup request to only those partners that have providers/subscribers registered under the namespace branch specified in the request. This indirection is accomplished via the namespace manager that has global knowledge of the namespace registrations under the namespace branch specified in the request.

A fourth federating mechanism includes peer namespace managers indirectly routing namespace information to other peer namespace managers. This fourth mechanism differs from the third mechanism in the sense that both namespace manager arrivals/departures and namespace registration/lookup requests are all routed instead of being flooded. Routing protocols are designed to guarantee rendezvous between namespace lookup requests and namespaces registration requests.

Figure 25:
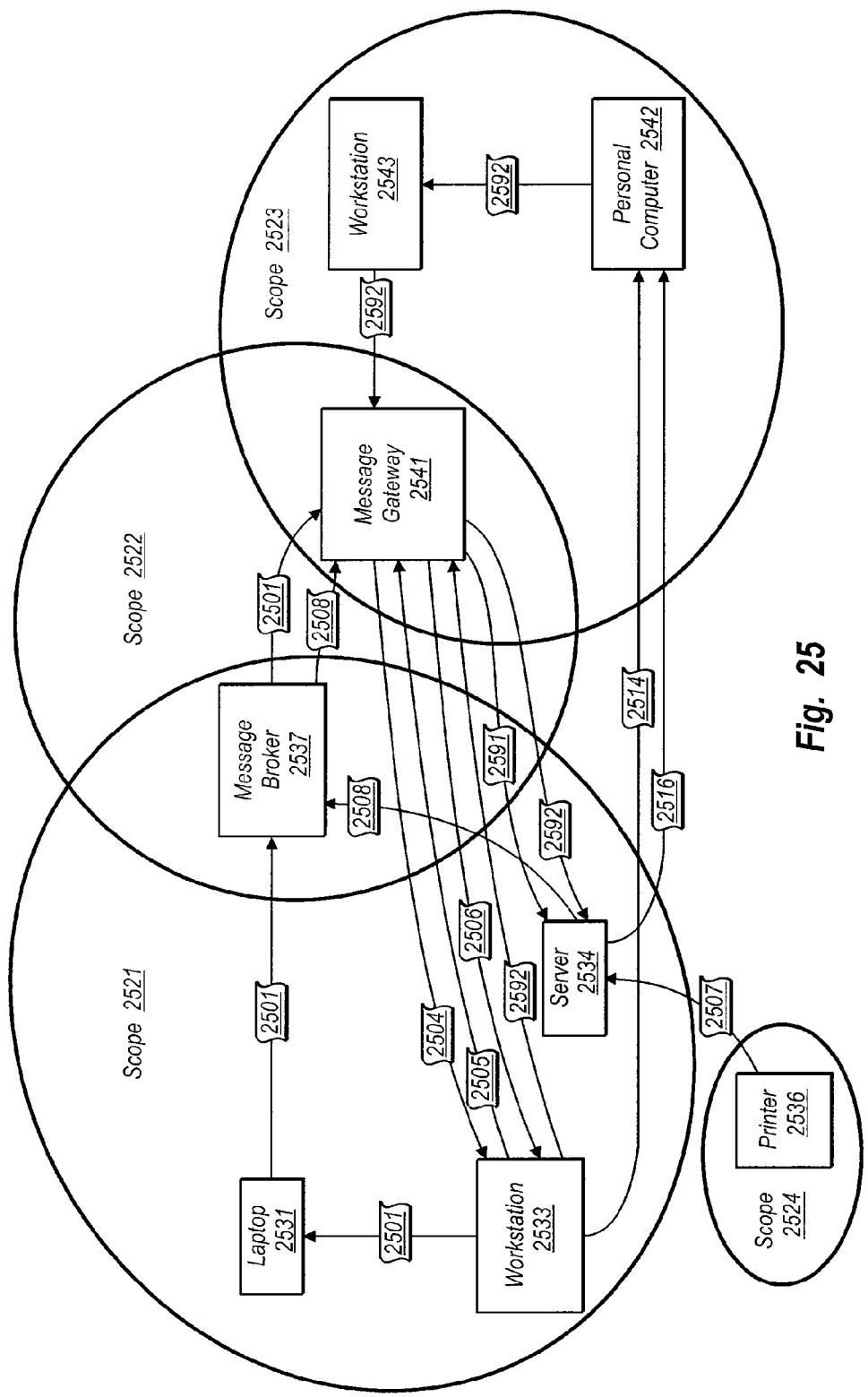
FIG. 25 illustrates an example of a computer architecture that facilitates routing request indirectly to partners.

FIG. 25 illustrates an example of a computer architecture 2500 that facilitates routing requests indirectly to partners. Computer architecture 2500 depicts different types of computer systems and devices potentially spread across multiple local discovery scopes participating in a namespace federation infrastructure.

Workstation 2533 can include a PnP provider instance that registers with a corresponding namespace manager under the location:/architecture200/scope221/Devices namespace branch. To inform its partners of the presence of this PnP provider instance, workstation 2533 routes namespace registration request 2501 over the namespace federation infrastructure. Namespace registration request 2501 is initially forwarded to laptop 2531, which in turn forwards namespace registration request 2501 to message broker 2537, which in turn forwards namespace registration request 2501 to message gateway 2541. Message gateway 2541 saves the registration information registration request 2501 in its database and returns success message 2504 to workstation 2533.

Subsequently, another provider instance, this time that of running services, comes alive within the workstation 2533 and registers itself with the corresponding namespace manager under the location:/architecture200/scope221/Services namespace branch. This time the namespace manager is aware that message gateway 2541 is responsible for registrations under location:/architecture200 and forwards registration request 2505 to message gateway 2541 directly. Message gateway 2541 saves the registration information registration request 2505 in its database and returns success message 2506 to workstation 2533.

Subsequently, the printer 2536 (e.g., a UPnP printer) is powered on and sends announcement 2507. Server 2534 detects announcement 2507, assigns the namespace location:/architecture200/scope224/Devices to printer 2536, and routes registration request 2508 to message broker 2537. Message broker 2537 forwards registration request 2508 to message gateway 2541. Message gateway 2541 saves the registration information registration request 2508 in its database and returns success message 2591 to server 2534.

Subsequently, personal computer 2542 issues find request 2592 to discover all devices under the Namespace branch location:/architecture200. Since personal computer 2542 doesn't know where to forward find request 2592, it routes find request 2592 through workstation 2543. As the routing protocol essentially guarantees rendezvous between registration and lookup requests for a given Namespace tree, workstation 2543 forwards find request 2592 to message gateway 2541. Message gateway 2541 forwards find request 2592 to both the workstation 2533 and server 2534. Workstation 2533 and server 2534 send response messages 2514 and 2516 respectively to personal computer 2542.

This fourth mechanism works by routing a request to the namespace manager (message gateway 2541) that has global knowledge of the namespace registrations under the namespace branch (e.g., location:/architecture200) specified in a request. This fourth mechanism essentially guarantees that routing can be accomplished in O(log N) hops, where N is the number of namespace managers participating in the federation namespace infrastructure. Since this fourth mechanism efficiently partitions namespace registration information and does not mandate global knowledge of all the participating namespace managers, it scales to very large networks, even the Internet.

Figure 26:
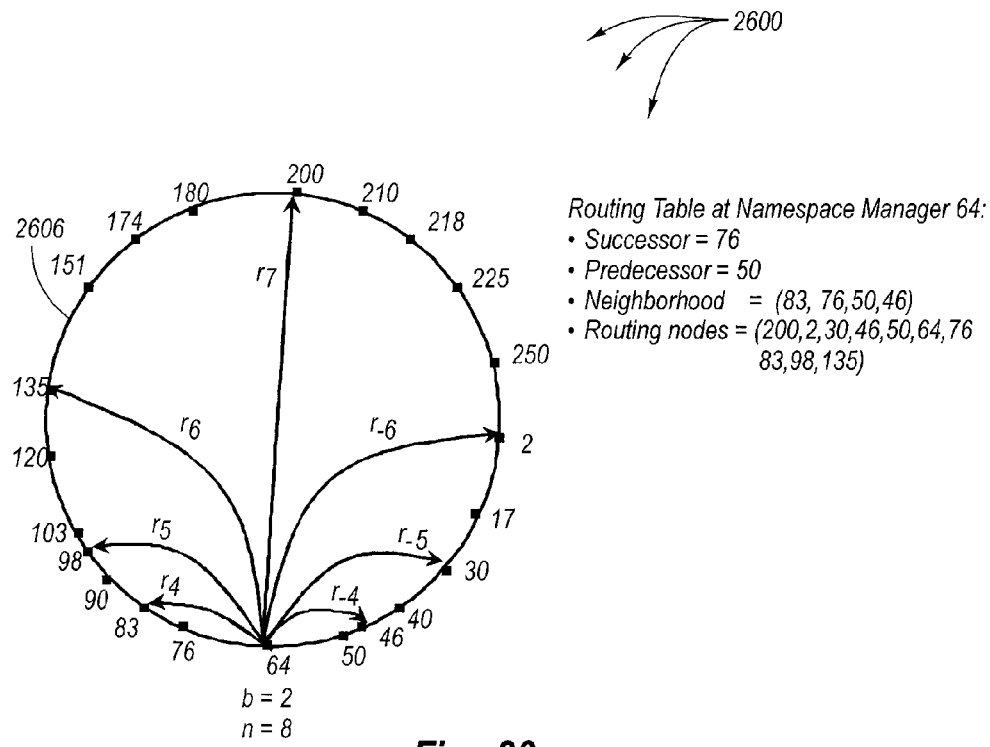
FIG. 26 illustrates an example of a binary relation between namespace managers in a namespace federation infrastructure.

FIG. 26 illustrates an example of a binary relation between namespace manages in a namespace federation infrastructure. The binary relation depicted in FIG. 3 is one relation that may be utilized to implement more efficient routing between namespace managers. Namespace managers participating in a namespace federation infrastructure are organized as a sorted list using a binary relation that is reflexive, anti-symmetric, transitive, total, and defined over the domain of namespace manager identities. Both ends of the sorted list are joined, thereby forming ring 306. This makes it possible for each namespace manager in the sorted list to view itself as being at the middle of the sorted list. The sorted list can be doubly linked so that any namespace manager can traverse the sorted list in either direction. Further, there is a 1:1 mapping from the value domain of the namespace manager identities (e.g., 2, 50, or 151) to the namespace managers themselves. This mapping accounts for the sparseness of the namespace managers in the value domain when the mapping is not tight.

Each namespace manager on ring 2606 can include a routing table that facilitates routing namespace information (e.g., registration and lookup requests) to other namespace managers. An example routing table for the namespace manager having ID 64 is depicted in FIG. 26. The routing table indicates that the successor to ID 64 is ID 76. The successor can be in the immediate adjacent namespace manager in a clockwise direction from ID 64 on ring 2606. The successor can change, for example, when a new namespace manager (e.g., with an ID of 71) joins or an existing namespace manager (e.g., ID 76) leaves the namespace federation infrastructure.

The routing table indicates that the predecessor to ID 64 is ID 50. The predecessor can be the immediate adjacent namespace manager in a counterclockwise direction from ID 64 on ring 306. The predecessor can change, for example, when a new namespace manager (e.g., with an ID of 59) joins or an existing namespace manager (e.g., ID 50) leaves the namespace federation infrastructure.

The routing table indicates that the neighbors to ID 64 are IDs 83, 76, 50 and 46. Neighbors can be identified using the larger of the two factors size and range. A namespace manager is identified as a member of a neighborhood when a corresponding ID is within minimum range of the subject ID (e.g., in a clockwise or counterclockwise direction of ring 2606) or there are less than some configured minimum neighborhood size present in the neighborhood already. For example, on ring 306, the specified range can have a magnitude of 20 and the size can be greater than 4. Accordingly, IDs within 20 locations of ID 64 in both the clockwise (+10) and counterclockwise direction (−10) are neighbors to ID 64. The neighbors can change, for example, when namespace managers join or leave the namespace federation infrastructure or when the specified range is changed. For example, with size equals 4 a new namespace manager with ID 48 can replace the namespace manager having ID 46.

The routing table indicates that ID 64 can route directly to IDs 200, 2, 30, 46, 50, 64, 76, 83, 98, and 135. Thus, when namespace manager having ID 64 receives a request, the namespace manager can route the requests to the namespace manager having an ID in the routing table that is closer to the namespace manager ID in the request.

Figure 27:
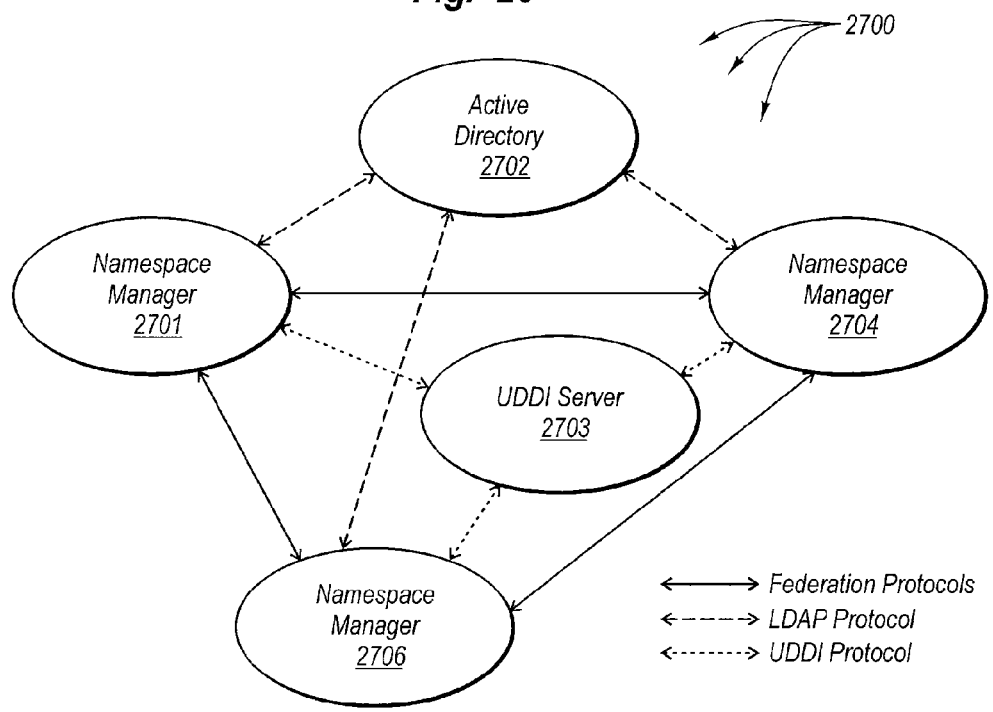
FIG. 27 illustrates an example of an architecture that facilitates integrating a namespace federation infrastructure with other protocols.

FIG. 27 illustrates an example of an architecture 400 that facilitates integrating namespace federation infrastructure with other protocols. A namespace federation infrastructure can support a provider-based extension model. Accordingly, a federation namespace infrastructure can be integrated with existing protocols provided the resource model of the existing protocol is compatible with that of namespaces. Architecture 2700 depicts namespace managers 2701, 2704, 2706 (e.g., of a namespace federation infrastructure) interoperating with active directory 2702 and UDDI server 2703. The solid arrows indicate that namespace managers communicate using namespace federation protocols, the dashed areas indicate that namespace manages communicate with active directory 2702 using LDAP protocols, and the dotted arrows indicate that namespace managers communicate with UDDI server 2703 using UDDI protocols.

Pub-sub topics is another example usage of namespaces. A pub-sub topic can be viewed as a collection of subscribers to that topic; as such, the topic name is treated as a namespace. An advantage of treating pub-sub topics as namespaces is that the namespace federation infrastructure can be used to route notification messages from publishers to subscribers. A subscription to a topic can be viewed as a namespace registration request and publish to topic can be viewed as a namespace lookup request.

In some embodiments, a namespace federation infrastructure can provide a bus-like abstraction to programmers for developing distributed applications. For example, the namespace federation infrastructure can abstract liveness—the mechanism applications employ to know when a resource they are interested in has fallen off the network. To track a given resource, the application subscribes to notifications sent to the pub-sub topic named after that resource's identity URI (i.e., its name). Any component (e.g., application) that notices that a given resource has fallen off the network can publish a liveness notification message to the topic named after the resource's identity URI, thereby informing other applications interested in tracking the resource. Since pub-sub subscriptions are federated across the namespace infrastructure and since many identity schemes are hierarchical (to capture the containment aspect of the resource from a liveness perspective), the system avoids the $n^2$ pinging problem of simple detection systems and scales very well. Further, the more interest components (e.g., applications) have in a given resource, the quicker someone will notice that it has fallen off the network, which is advantageous.

Developers can view a namespace federation infrastructure as a cloud into which resources, such as, files and event sources are registered. Applications can issue find requests against the cloud to discover registered resources. Applications can also request the cloud to subscribe on their behalf to both current and future event sources registering with the cloud. Further, applications can subscribe to pub-sub topics maintained in the cloud. Anyone can publish a notification message and the cloud takes care of forwarding the message to the subscribers of the event topic into which that message was published.

Various types of resources can be published in Namespaces, including services, devices, files, hosts, components, items in a database, metadata about metadata (schemas), and so on. A resource can have a service component hosting/backing it. For example, a file resource can have a file server as the service component for accessing the file. A conference room can have a receptionist's mailbox as the service component for scheduling a meeting.

Each resource can be associated with a resource descriptor that captures its descriptive aspect. Thus, Resource descriptors can be queried to identify resources of interest. When a resource is identified, the resource can be accessed through the resource's corresponding service aspect. The types of messages that can be sent to the service hosting/backing a resource vary from one resource type to another. For example, file servers support opening file resources and receptionists accept scheduling requests for conference rooms.

The data model for implementing resource descriptors can be versionable, extensible, and interoperable. Such a resource data model can be shared across many of the current frameworks such as Distributed File System ("DFS"), AD, and UDDI. Such a single shared data model can facilitate AD objects and DFS files (or resources form other resource management systems) being viewed as resources, federated using the namespaces approach, and that are accessed by sending messages to the services hosting them.

Accordingly, resources can be defined to have the following properties:

Resource ID: a URI that can optionally be augmented with a set of reference properties and can be stable in space and time. It can be represented as an instance of a resource reference schema. A resource ID along with resource properties can collectively represent the identity of a resource.

Descriptor: a resource-specific schema instance containing semi-static metadata about the resource. This metadata is useful for resource selection. Resource descriptor schemas can be taxonomized.

Config number: a monotonically-increasing number that identifies a particular version of resource description data. This number is incremented whenever the resource description is modified.

Instance ID: a monotonically-increasing number that identifies a particular instance of an active resource. For example, this can be the same as the boot time for service/device resources or the file modification time for file resources.

Figure 30:
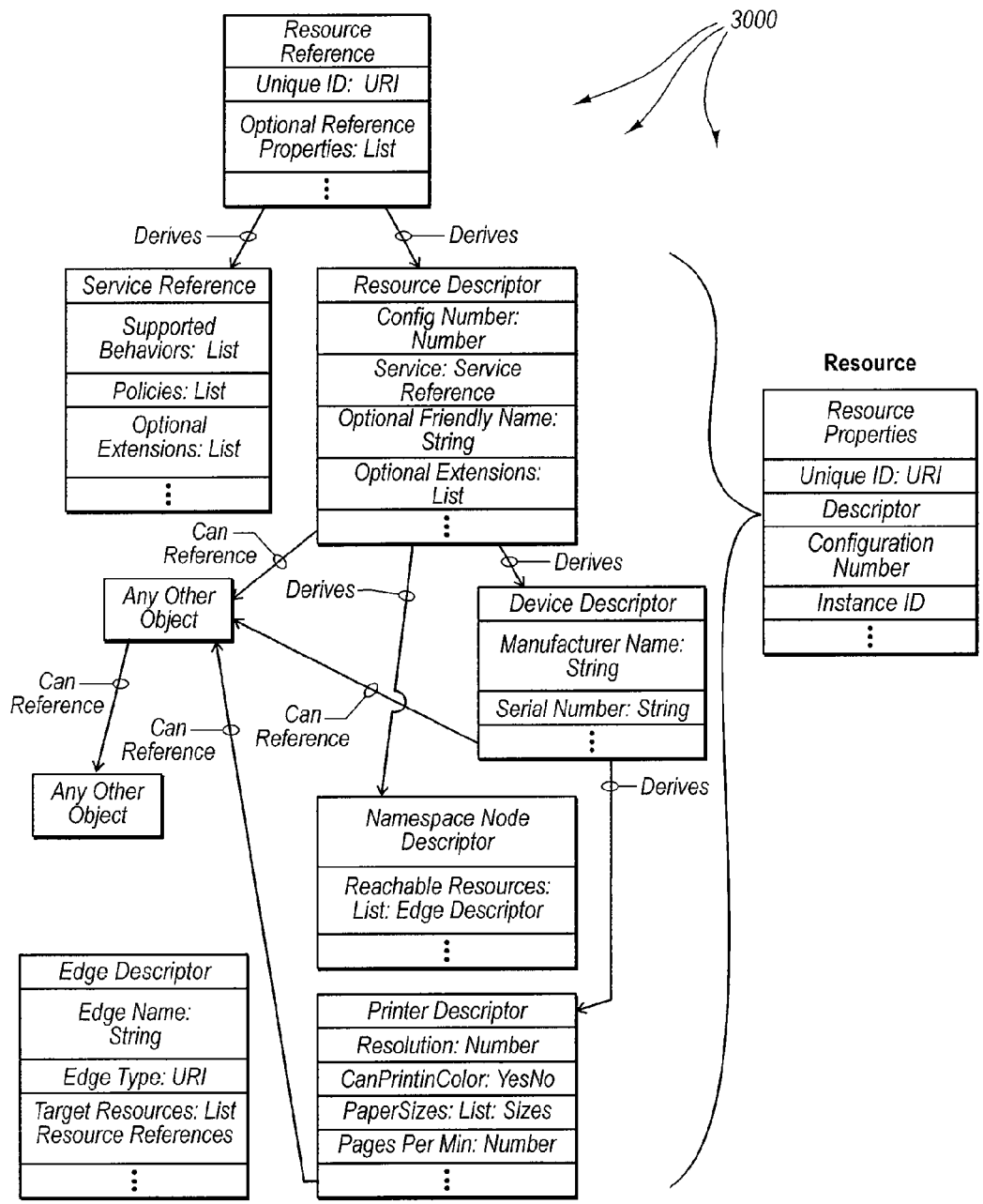
FIG. 30 illustrates an example schema taxonomy that can be used to describe a resource.

With further reference to descriptors, a device can have metadata in accordance with one or more schemas. For example, a printer can have metadata in accordance with different schemas that describe different aspects of the printer. Resource descriptor schemas can be standardized by organizations such as UPnP Forum working groups (e.g., Printer Schema can be standardized by the UPnP printer working group) and W3C. FIG. 30 depicts example taxonomy 3000 for describing a resource. Within taxonomy 3000 different schemas are generally represented as follows:

Service Reference Schema: extends a resource reference schema and specifies a list of behavior types identifying messages supported by the resource, a policy container for its assertions (such as supported transports), and a set of extensions.

Resource Descriptor Schema: extends a resource reference schema and specifies the descriptor's configuration number (see below for explanation), friendly name of the resource, the service reference of the service backing the resource, and a set of extensions.

Namespace Node Descriptor Schema: extends a resource descriptor schema and specifies the resources reachable from it as instances of an edge descriptor schema.

Edge Descriptor Schema: specifies a locally-scoped edge name, the edge type, and target resources.

Device Descriptor Schema: extends a resource descriptor schema and specifies the serial number and manufacturer name.

Printer Descriptor Schema: extends the device descriptor schema and specifies printer-specific properties such as resolution, ability to print in color, pages per minute, and supported paper sizes.

Any of the information defined in any of the above description schemas can be included in a query for identifying resources in a federation namespace infrastructure. For example, the descriptor data can be searched and navigated using a filter (or query) expression. For example, one can filter by the type of descriptor schema or field values, navigate to instances reachable from its reference fields, apply a sub-filter on those, and so on. In some embodiments, XPath-based filter expressions are used. Referring back to FIG. 29, using an XPath syntax, a filter expression that operates over the description data specified by the resource description schemas can be used to locate a printer in Location:/Bldg42/Floor1 that can print in color.

A namespace can specify a filter expression, in the form of a URI segment parameter, for the fields/attributes defined on a namespace node resource for selection and traversal. For example, the namespace Location:/Bldg42/Floor1/Room1226;employee="employee1"/printer would traverse namespace node resource "Room 1226" only if the descriptor of "Room 1226" has a "employee" field with the value "employee1". Similarly, the namespace Organization:/Product/DevicesTeam;building="Bldg33"/Dev/Computer2904; printer="color" would traverse namespace node resource "Devices Team" only if its descriptor has a "building" field with the value "Bldg 33" (thus identifying a first portion of resources) and would select namespace node resource "Computer 2904" only if its descriptor has a "printer" field with the value "color" (meant to identify that a color printer has been attached to it).

As previously described, namespace managers can be assigned a unique numeric identifier, such as, for example, a 160-bit ID. In some embodiments, the unique identifier is generated from hashing one or more namespace manager characteristics, such as, for example, Domain Name Services ("DNS") name, location, department, etc. Any of a variety of different hashing functions, such as, for example, SHA, can be used to generate a unique ID.

Utilizing the unique namespace manager IDs the following functions can be provided for routing namespace information in a namespace federation infrastructure:

RouteNumerically(V, Msg): Given a value V from the value domain of namespace manager identities and a message "Msg," deliver the message to namespace manager X whose identity can be mapped to V using the mapping function.

Neighborhood(X, S): Neighborhood is the set of namespace managers on the either side of namespace manager X (e.g., on ring 306) with cardinality equal to S.

Embodiments of the present invention can also utilize proximity criterion of namespaces managers participating in a federation. Proximity criteria can be defined as an equivalence relation that partition the set of federating namespace managers into a disjoint set of classes (or partitions). Generally, a relation R on a set S is an equivalence relation if it satisfies the following properties:

Reflexive: x in an element of S→x R x
Symmetric: Given x, y elements of S, x R y→y R x
Transitive: Given x, y, z elements of S, x R y ∧ y R z→x R z Embodiments of the present invention can support a plurality of different proximity criteria and proximity criteria can be arranged in a partial order. For example, a criterion that considers all the namespace node resources belonging to "Corporation 1" to be proximally close precedes the criterion that considers all the namespace managers within "Corporation 1, Location A" to be proximally close. This results from set of namespace managers considered proximally close by the former criterion (belonging to "Corporation A") being a super set of the set of namespace managers considered proximally close by the latter criterion (belonging to "Corporation 1, Location A"). On the other hand, there is no ordering relationship between the criterion that considers all the namespace managers within "Corporation 1, Location A" as proximally close and the criterion that considers all the namespace managers within "Corporation 1, Location A" as proximally close.

Taking proximity considerations into account when computing routing namespace managers for each namespace manager in a federation results in an increased chance that each routing hop on the path to the final destination remains within the proximity of the namespace manager that originated the request. Further, significant progress in closing the distance between the namespace managers in the numerical space can still be made.

Utilizing unique IDs along with proximity criterion, the following additional function can be provided for routing namespace information in a namespace federation infrastructure:

RouteProximally(V, Msg, P): Given a value V from the domain of namespace manager identities and a message "Msg," deliver the message to the namespace manager Y whose identity can be mapped to V among the namespace managers considered equivalent by the proximity criteria P.

When a provider/subscriber registers at namespace branch with a namespace manager, the registration request is sent (and potentially routed) to a partner namespace manager responsible for maintaining registration information for the namespace tree specified in the registration request. Alternately, it may be that the namespace manager that originates the namespace registration request into the fabric is the responsible namespace manger. Thus, embodiments of the invention include routing a namespace registration request.

Routing a namespace registration request can include an act of receiving a namespace registration request to register a namespace branch, the namespace registration request including a namespace identifier that identifies the namespace branch. For example, namespace manager 2412 can receive registration request 2432, including a namespace ID 2442, from provider 2431. Since, namespace manager 2412 is not a peer namespace manager, namespace manager 2412 can forward registration request 2432 to namespace manager 2402. Namespace manager 2412 can canonicalize namespace ID 2442 per rules identified by its scheme before transferring registration request 2432 over the namespace federation infrastructure 2400.

Routing a namespace registration request can include an act of generating an at least one-way equivalent identification value based on the scheme portion of the namespace identifier along with at least part of the path portion of the namespace identifier. For example, namespace manager 2402 can generate a hash 2452 based on the scheme portion of namespace ID 2442 along with at least part of the path portion of namespace ID 2442. Any of a variety of different hashing functions, such as, for example, SHA, can be used to generate a hash value from portions of a namespace string. Generating a hash value for a namespace string can vary based on the configuration of the namespace federation infrastructure.

For non-hierarchical Namespace schemes such as "uuid" (e.g., identified by the absence of the ":1" character sequence after the scheme), a hash can be generated over the entire Namespace. For example, the entire namespace string "uuid: a36fab9c-9c7f-42c3-97d8-36cd57e9bd29" may be used to generate a SHA hash value.

Hierarchical namespaces can be authoritative or non-authoritative, with the two distinguished, for example, by the respective character sequences "://" and ":/" following the scheme component. For authoritative namespaces such as "name", a hash is generated over the scheme part, followed by the "://" character sequence, the authority component, and the first path component of the namespace. For example, the portion "name://red.prn.xrx:200/printers" of the namespace string "name://red.prn.xrx:200/printers/b42-1749-a" may be used to generate a SHA hash value. For non-authoritative namespaces such as the "location" scheme of FIG. 6, a hash can be generated over the scheme part, followed by the ":/" character sequence and the first path component of the Namespace. For example, the portion "location:/Bldg42" of the namespace string "location:/Bldg42/Floor1/Room1226"

Routing a namespace registration request can include an act of sending the namespace registration request to a namespace manager having an identifier that is numerically closer to the at least one-way equivalent numeric identification value than the identifiers of other namespace managers. For example, namespace manager 2402 can invoke a RouteNumerically function supplying hash 2452 and registration message 2432 as input, for example, RouteNumerically(hash 2452, registration message 2432). Alternately, a RouteProximally function can be used. In some embodiments, the namespace registration request is sent directly and no routing occurs.

Federation namespace infrastructure 2400 then utilizes federation protocols to forward the registration message to the appropriate namespace manager. For example, registration request 2432 can be routed to namespace manager 2403. It may be that namespace manager 2403 has migrated responsibility for the namespace branch to another namespace manager. Thus, it may be that namespace manager 2403 returns a referral message to namespace manager 2402. Accordingly, when responsibility for the namespace branch has been referred, namespace manger 2402 can receive a referral message specifying the appropriate namespace manager. Namespace manager 2402 can in turn send registration request 2432 to the appropriate namespace manager. One or more referrals can be encountered until a namespace manager accepts or rejects the registration request.

Routing a namespace registration request can include an act of associating the namespace manager with the namespace branch. For example, namespace manager 2403 can be associated with the namespace branch identified by namespace ID 2442 (through provider 2431). Namespace ID 2442 can, for example, identify a portion of namespace 2901 or namespace 2902. Associations between a namespace manager and a namespace branch allow requests (e.g., lookup requests) specifying a namespace branch beneath the one specified in the registration request to be forwarded, instead of being routed, to the namespace manager specified in the association. Associations are broken when either a namespace manager failure is detected or a referral to a different namespace manager is obtained. When a failure is detected, subsequent requests are routed until a new association can be formed.

Embodiments of the invention include migrating a namespace registration request. Migrating a namespace registration request can include an act of determining that a namespace manager has satisfied a policy constraint. For example, namespace manager 2403 can determine that the amount of namespace information (related to federation namespace infrastructure 2400) being processed at namespace manager 103 has exceeded a configured threshold. A configured threshold can be, for example, a total number of registrations maintained at a namespace manager or a total number of lookup requests being serviced at a namespace manager.

Migrating a namespace registration request can include an act of identifying a namespace branch that can be migrated to meet a policy action associated with the policy constraint. For example, namespace manager 2403 can identify a namespace branch (e.g., corresponding to namespace ID 2442) that can be migrated to reduce the namespace information processed at namespace manager 2403 below a configured threshold. It may be that a namespace manager identifies a more heavily-populated and/or heavily-serviced namespace branch for migration.

Migrating a namespace registration request can include an act of an act of migrating existing registrations for the namespace branch to a partner namespace manager in response to the policy action. For example, namespace manager 2403 can migrate existing registrations to a partner (e.g., a neighborhood) namespace manger in response to an action that is to occur to relieve the burden on the heavily-populated and/or heavily-serviced namespace branch.

Migrating a namespace registration request can also include an act of receiving a namespace request corresponding to the namespace branch. For example, namespace manager 2403 can receive registration request 2432 correspond to the namespace branch represented by namespace ID 142.

Migrating a namespace registration request can also include an act of taking action to redirect the namespace request to a partner namespace manager. For example, as indicated by the dotted arrow, namespace manager 2403 can reroute registration request 2432 to namespace manager 2401. A namespace manager that migrates a namespace branch can invoke a RouteNumerically to reroute request to a different namespace manager. For example, RouteNumerically(H, migrateMsg) can be invoked to reroute requests to a namespace manager (e.g., namespace manager identified by an at least one-way equivalent value of the namespace branch being migrated. For example, to migrate the branch location:/Bldg42/Floor1, namespace manager 2403 generates a hash H over the string "location:/Bldg42/Floor1", invokes RouteNumerically(H, migrateMsg) to identify the namespace manager 2401 responsible for the migrated branch, and migrates all the namespace registrations underneath the migrated branch such as location:/Bldg42/Floor1/Room1226 and location:/Bldg42/Floor1/Room1119 to the identified namespace manager 2401.

A namespace manager may also decide to forward all the namespace registrations encountered along the spine of the migrated namespace branch to the partner namespace manager hosting the branch. This facilitates the partner namespace manager branch servicing all the lookup requests that specify the namespace branch without the requests having to go through the migrating namespace manager, either directly or indirectly, all the time. The migrating namespace manager can leave behind a stub indicating that it has migrated registration information under the specified namespace branch. The migrating namespace manager can also revoke subscriptions, if any, for liveness notifications tracking providers/subscribers specified in the migrated registrations. Accordingly, subsequent namespace registrations under and along the spine of the migrated namespace branch received by the migrating namespace manager are forwarded to the partner namespace manager.

Embodiments of the invention include processing a namespace registration request. Processing a namespace registration request can include an act of receiving a namespace registration request to register a namespace branch, the namespace registration request including a namespace URI string that identifies the namespace branch and a unique reference or identifier for the provider (or subscriber) requesting registration in the namespace branch. For example, namespace manager 2403 can receive registration request 2432 that includes reference to provider 2431.

Processing a namespace registration request can include an act of determining that a namespace manager is interested in the namespace branch. For example, namespace manager 2402 can determine if namespace manager 2402 is responsible for the namespace branch represented by namespace ID 142 (e.g., Organiztion:/Product/Messaging Team). When namespace manger 2402 is not responsible, namespace manager 2402 can forward the namespace registration request (e.g., registration request 2432) to a responsible namespace manger (e.g., namespace manger 2403) for the specified namespace branch. Alternately, when namespace manger 2402 is not responsible, namespace manager 2402 can send a referral message 2434 to the namespace manger (e.g., namespace manager 2403) that initiated the registration request (e.g., registration request 2432) to instead contact the responsible namespace manager (e.g., namespace manager 2401). When namespace manager 2402 is responsible, namespace manager 2402 can retain the namespace registration request.

Processing a namespace registration request can include includes an act of saving the namespace identifier in an appropriately indexed namespace registration database. For example, if the namespace identifier is a URI string, it is stored in the namespace registration database index in alphabetical order with longer strings ranked higher. For example, namespace manager 2403 can save namespace ID 142 in namespace registration database. The dashed line and corresponding dashed box surrounding provider 2431, indicates that namespace manager 2403 has referenced provider 2431 as being interested in the namespace represented by namespace ID 142.

Processing a namespace registration request can also include an act of determining how often the liveliness of the provider is to be subsequently verified. For example, namespace manager 2403 can determine how often the liveliness of the provider 2431 is to be subsequently verified. Namespace provider 2403 can optionally subscribe to liveness notifications published to the pub-sub topic of provider 2431 identified by ID 161. The pub-sub topic can be identified by ID 161. Alternately, if a liveness subscription is not made, the registration is assigned a time-limited lease. Provider 2431 can renew registration before the lease expires by directly contacting namespace manager 2403. Other liveness mechanisms can also be used.

Namespace manager and provider liveliness can be distributed across a hierarchy. A namespace manager positioned at a higher level in a hierarchy can rely on other similarly positioned namespace managers to report liveness information for corresponding lower level namespace managers and providers. For example in FIG. 24, namespace manager 103 can track the liveness of namespace manager 2402 (both are root namespace managers). Namespace manager 2403 can rely on namespace manager 2402 to report failures of any corresponding lower level namespace managers (e.g., namespace manager 2412) or providers (e.g., provider 2424). Namespace manager 2402 would in turn rely on namespace manager 2403 to report similar type failures (e.g., failure of provider 2426).

Subsequent to a successful registration (or failure) of provider 2431, namespace manager 2402 can send a message indicating the success (or failure) to provider 2431.

From time to time, consumers (other computer systems or devices) may desire access to resources in a namespace branch that is managed by a provider. To obtain access to resources, the consumers may issue lookup requests to attempt to identify resources. Lookup requests can be received at namespace mangers and delivered to one or more appropriate providers. Generally, when a namespace manager receives a lookup request, it routes that lookup request to the partner namespace manager closest to it (as determined by some predefined proximity metric) and toward the neighborhood of the namespace manager responsible for the namespace branch specified in the request. As the registration information is replicated across the neighborhood namespace managers, the lookup request can be satisfied by any namespace manager in the neighborhood set.

Routing via the namespace manager closest to the namespace manger originating the lookup request results in improved network throughput and dynamic load balancing, since lookup requests get automatically and efficiently partitioned across the neighborhood namespace managers from the lookup request satisfaction perspective. To facilitate routing, the algorithm for mapping namespace IDs specified in lookup requests can be essentially the same as the algorithm for mapping namespace IDs specified in registration requests. For example, a 1:1 mapping from the value domain of the namespace identities to the namespace managers can be used to map namespace IDs for both lookup and registration requests.

Embodiments of the invention include routing, migrating, and processing namespace lookup requests. Methods similar to those used for namespace registration requests can also be used for namespace lookup requests.

Embodiments of the invention include a resource participating in multiple namespaces. A resource participating in multiple namespaces can include an act of establishing a unique resource identifier for a resource, including establishing a path portion of a URI that corresponds to the resource. For example, an identifier of "printer 2903" can be established for a printer.

A resource participating in multiple namespaces can include an act publishing the availability of the resource in a first namespace. For example, printer 2903 can publish its availability in namespace tree 2901. A resource participating in multiple namespaces can include an act of linking the unique resource identifier to a first namespace node resource in the first namespace such that the first namespace can be traversed to identify the resource. For example, namespace segment 2931 can be established to link printer 2903 to the "Dev Team" namespace node resource. Accordingly, namespace tree 2901 (and the "Dev Team" namespace node resource) can be traversed to identify printer 2903.

A resource participating in multiple namespaces can include an act publishing the availability of the resource in a second namespace. For example, printer 2903 can publish its availability in namespace tree 2902. A resource participating in multiple namespaces can include an act of linking the unique resource identifier to a second namespace node resource in the second namespace such that the second namespace can be traversed to identify the resource. For example, namespace segment 2932 can be established to link printer 2903 to the "Room 1226" namespace node resource. Accordingly, namespace tree 2902 (and the "Room 1226" namespace node resource) can also be traversed to identify printer 2903.

Embodiments of the invention include identifying a subset of resources in the namespace federation infrastructure. Identifying a subset of resources in the namespace federation infrastructure can include an act receiving a query from a device. For example, a provider for namespace tree 2902 can receive a query from a device that is network connectable to the provider. The query includes a first query portion identifying a first portion of resources that satisfies first query criteria at a first level in a namespace hierarchy. For example, a first query portion can identify a first portion of resources that satisfies first query criteria after traversing namespace segment "Floor 2" (in namespace tree 2902). A first portion of resources can be, for example, employees, and first criteria can also include, for example, assigned to the "Messaging Team". Thus, the first query portion can identify all the employees assigned to the "Messaging Team" that work on Floor 2 (of Bldg 42). In some embodiments, the first query criteria are utilized to navigate through the properties of resources that reference the first portion of resources.

The query includes a second query portion identifying a second portion of resources selected from among the resources included in the first portion of resources. For example, a second query portion can identify a second portion of resources that satisfies second query criteria after traversing namespace segment "Room 2005" (in namespace tree 2902). A second portion of resources can be, for example, administrators, and second criteria can be, for example, devices. Thus, the second query portion can identify printer administrators with office cubicles in Room 2005. In some embodiments, the second query criteria are utilized the to navigate through the properties of the first portion of resources that reference the second portion of resources.

Accordingly, providing the resources identified from the first query portion as input to the second query portion, the results of the received query can (depending on the field definitions in the resources schemas) identify printer administrators with offices in $2^{nd}$ floor, Room 2005, and assigned to Messaging Team.

Identifying a subset of resources in the namespace federation infrastructure can include an act of returning the identity of the second portion of resources to the device. For example, the provider for namespace tree 2902 can return the identity of administrators of devices in ConfRoom 2005 that are owned by Messaging Team employees on Floor 2 to the network connectable device.

Embodiments of the invention include organizing a plurality of resources. Organizing a plurality of resources can include an act of determining that a new resource is to be included in one or more namespaces, each of the one or more namespaces being configured to organize one or more resources. For example, it can be determined that printer 2903 is to be included in namespace 2901 and/or namespace 2902. Organizing a plurality of resources can include an act of identifying a first resource within a first namespace of the one more namespaces that is to be related to the new resource. For example, it can be identified that room 1226 in namespace 2902 is to be related to printer 2903. Similarly, it can be identified that Dev Team in namespace 2901 is to be related to printer 2903.

Organizing a plurality of resources can include an act of using a first namespace segment to link the new resource to the first resource such that the namespace segment can be traversed to navigate from the existing resource to the new resource within the namespace. For example, namespace segment 2932 can be used to link printer 2903 to Room 1226 such that namespace segment 2932 can be traversed to navigate form Room 1226 to printer 2903. Similarly, namespace segment 2931 can be used to link printer 2903 to Dev Team such that namespace segment 2931 can be traversed to navigate form Dev Team to printer 2903.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system in a federation infrastructure comprising a ring of federated nodes, the computer system including one or more processors and system memory, a method for providing optimized access to a federation infrastructure resource, the method comprising:

an act of receiving a user request to access a federation infrastructure resource that is hosted at a first node in the ring of federated nodes, the user request having been sent from a requesting user component;

an act of detecting that the user request is not directed to an optimized location within the ring of federated nodes for accessing the federation infrastructure resource at the first node, the detecting being based on analyzing processing information for providing optimized access to federation infrastructure resources and one or more of: one or more characteristics of the requesting user component and one or more characteristics of the user request, the processing information including redirection information and priority information for optimizing requests for the federation infrastructure resource;

an act of determining an appropriately optimized location within the ring of federated nodes for the requesting user component to access the federation infrastructure resource, including:

when (i) the redirection information identifies a second node in the ring of federated nodes not hosting the federation infrastructure resource for lower-priority requests and (ii) the priority information identifies the request as a lower-priority request, determining that the appropriately optimized location is the second node not hosting the federation infrastructure resource, and when (i) the redirection information identifies the first node for higher-priority requests and (ii) the priority information identifies the request as a higher-priority request, determining that the appropriately optimized location is the first node at which the federation infrastructure resource is hosted; and an act of sending an indication of the appropriately optimized location within the ring of federated nodes for the requesting user component to access the federation infrastructure resource based on analyzing the processing information.

2. The method as recited in claim 1, wherein the act of receiving a user request to access a federation infrastructure resource comprises an act of a node in the ring of federated nodes receiving the user request to access a federation infrastructure resource directly from the requesting user component.

3. The method as recited in claim 1, wherein the act of sending an indication of an appropriately optimized location within the ring of federated nodes for the requesting user component to access the federation infrastructure resource comprise an act of the node sending an indication of the appropriately optimized location directly to the requesting user component.

4. The method as recited in claim 1, wherein the act of receiving a user request to access a federation infrastructure resource comprises an act of a node in the ring of federated nodes receiving the user request to access a federation infrastructure resource from a communication intermediary, the communication intermediary sending the user request on behalf of the requesting user component.

5. The method as recited in claim 4, wherein the act of detecting that the user request is not directed to an optimized location within the ring of federated nodes for accessing the federation infrastructure resource comprises an act of detecting that the node is not the optimized location for accessing the federation infrastructure resource.

6. The method as recited in claim 5, wherein the act of sending an indication of an appropriately optimized location within the ring of federated nodes for the requesting user component to access the federation infrastructure resource comprise an act of the node sending an indication of the appropriately optimized location directly to the communication intermediary.

7. The method as recited in claim 1, wherein the act of receiving a user request to access a federation infrastructure resource comprises an act of a communication intermediary receiving a user request to access a federation infrastructure resource, the user request directed to a node in the ring of federated nodes.

8. The method as recited in claim 7, wherein the act of detecting that the user request is not directed to an optimized location within the ring of federated nodes for accessing the federation infrastructure resource comprises an act of the communication intermediary detecting that the node is not the optimized location for accessing the federation infrastructure resource.

9. The method as recited in claim 8, wherein the act of sending an indication of an appropriately optimized location within the ring of federated nodes for the requesting user component to access the federation infrastructure resource comprise an act of the communication intermediary sending an indication of the appropriately optimized location to the user component.

10. The method as recited in claim 1, wherein the act of sending an indication of an appropriately optimized location within the ring of federated nodes for the requesting user component to access the federation infrastructure resource comprises an act of sending a destination address for the appropriately optimized location to the requesting user component.

11. At a computer system in a federation infrastructure comprising a ring of federated nodes, the computer system including one or more processors and system memory, a method for optimizing access to a federation infrastructure resource, the method comprising:
  an act of detecting a component request to optimize access to one or more federation infrastructure resources associated with the ring of federated nodes so as to reduce inter-node communication costs between nodes on the ring of federated nodes when providing access to the one or more federation infrastructure resources;
  an act of determining that a hosting location of an associated federation infrastructure resource, selected from among the one or more federation infrastructure resources, is not optimized on the ring of federated nodes for providing one or more users that are associated with a component that sent the component request access to the associated federation infrastructure resource;
  in response to the component request, an act of indicating that the hosting location of the associated federation infrastructure resource on the ring of federated nodes is to be optimized to reduce inter-node communication costs between nodes on the ring of federated nodes when providing access to the associated federation infrastructure resource; and
  in response to the component request, an act of updating processing information for providing optimized access to the associated federation infrastructure resource, the processing information including redirection information and priority information for optimizing requests for the associated federation infrastructure resource, the redirection information identifying a node in the ring of federated nodes hosting the associated federation infrastructure resource for higher-priority requests and one or more nodes in the ring of federated nodes not hosting the associated federation infrastructure resource for lower-priority requests, the priority information usable for identifying priority level of requests.

12. The method as recited in claim 11, wherein the act of detecting a component request to optimize access to one or more federation infrastructure resources comprises an act of receiving a request to optimize access to a federation infrastructure resource from a communication service layer component.

13. The method as recited in claim 12, wherein the act of receiving a request to optimize access to a federation infrastructure resource from a communication service layer component comprises an act of receiving a request to optimize access to a federation infrastructure resource for one or more users having a common interest in the federation infrastructure resource.

14. The method as recited in claim 11, wherein the act of detecting a component request to optimize access to one or more federation infrastructure resources comprises an act of detecting that an application system has an application context associated with a resource hosted on the ring of federated nodes.

15. The method as recited in claim 14, wherein the act of indicating that the hosting location of the associated federation infrastructure resource on the ring of federated nodes is to be optimized to reduce inter-node communication costs comprise an act of sourcing an event to the application system.

16. The method as recited in claim 11, wherein the act of determining that the hosting location of an associated federation infrastructure resource is not optimized comprises:
  an act of determining that the federation infrastructure resource is currently hosted at a first node on the ring of federated nodes; and
  an act of determining that inter-node communication cost between nodes on the ring of federated nodes could be reduced if hosting of the federation infrastructure resource was moved to second different node on the ring of federated nodes.

17. The method as recited in claim 11, wherein the act of indicating that the hosting location of the associated federation infrastructure resource on the ring of federated nodes is to be optimized comprises an act of indicating that the hosting location is to be moved from a first node on the ring of federated nodes to a second node on the ring of federated nodes.

18. The method as recited in claim 11, further comprising an act of optimizing the hosting location of the associated federation infrastructure resource on the ring of federated nodes in accordance with the indication that the hosting location is to be optimized.

19. A system, the system comprising:
  one or more processors;
  system memory; and
  one or more computer storage media having stored there one computer-executable instructions for participating in a federation infrastructure, the federation infrastructure including a ring of federated nodes and one or more higher service layers, wherein the federation infrastructure is configured to provide optimized access to a federation infrastructure resource, by being configured to:
    receive a user request to access a federation infrastructure resource that is hosted at a first node in the ring of federated nodes, the user request having been sent from a requesting user component;
    detect that the user request is not directed to an optimized location within the ring of federated nodes for accessing the federation infrastructure resource, the detecting being based on analyzing processing information and one or more of: one or more characteristics of the requesting user component and one or more characteristics of the user request, the processing information including redirection information and priority information for optimizing requests for the federation infrastructure resource;

determine an appropriately optimized location within the ring of federated nodes for the requesting user component to access the federation infrastructure resource, including:

when (i) the redirection information identifies a second node in the ring of federated nodes not hosting the federation infrastructure resource for lower-priority requests and (ii) the priority information identifies the request as a lower-priority request, determining that the appropriately optimized location is the second node not hosting the federation infrastructure resource, and when (i) the redirection information identifies the first node for higher-priority requests and (ii) the priority information identifies the request as a higher-priority request, determining that the appropriately optimized location is the first node at which the federation infrastructure resource is hosted; and send an indication of the appropriately optimized location within the ring of federated nodes for the requesting user component to access the federation infrastructure resource based on analyzing the processing information; and wherein the federation infrastructure is configured to optimize access to a federation infrastructure resource, by being configured to:

detect a component request to optimize access to one or more federation infrastructure resources associated with the ring of federated nodes so as to reduce inter-node communication costs between nodes on the ring of nodes when providing access to the one or more federation infrastructure resources;

determine that at least one of: a hosting location of or an access location for an associated federation infrastructure resource, selected from among the one or more federation infrastructure resources, is not optimized on the ring of federated nodes for providing one or more users that are associated with a component that sent the component request access to the associated federation infrastructure resource; and in response to the component request, indicate that the at least one of the hosting location of or the access location for the associated federation infrastructure resource on the ring of federated nodes is to be optimized to reduce inter-node communication costs between nodes on the ring federated nodes in when providing access to the associated federation infrastructure resource.

20. A computer system comprising a federated node in a federation infrastructure, the federated node including:
one or more processors; and
one or more computer-readable media storing computer-executable instructions that, when executed by the one or more processors, cause the federated node to provide optimized access to a federation infrastructure resource, including the following:

receiving a user request to access a federation infrastructure resource that is hosted at a first node in the ring of federated nodes, the user request having been sent from a requesting user component;

detecting that the user request is not directed to an optimized location within the ring of federated nodes for accessing the federation infrastructure resource at the first node, the detecting being based on analyzing processing information for providing optimized access to federation infrastructure resources and one or more of: one or more characteristics of the requesting user component and one or more characteristics of the user request, the processing information including redirection information and priority information for optimizing requests for the federation infrastructure resource;

determining an appropriately optimized location within the ring of federated nodes for the requesting user component to access the federation infrastructure resource, including:

when (i) the redirection information identifies a second node in the ring of federated nodes not hosting the federation infrastructure resource for lower-priority requests and (ii) the priority information identifies the request as a lower-priority request, determining that the appropriately optimized location is the second node not hosting the federation infrastructure resource, and when (i) the redirection information identifies the first node for higher-priority requests and (ii) the priority information identifies the request as a higher-priority request, determining that the appropriately optimized location is the first node at which the federation infrastructure resource is hosted; and sending an indication of the appropriately optimized location within the ring of federated nodes for the requesting user component to access the federation infrastructure resource based on analyzing the processing information.

21. A computer system comprising a federated node in a federation infrastructure, the federated node including:
one or more processors; and
one or more computer-readable media storing computer-executable instructions that, when executed by the one or more processors, cause the federated node to optimize access to a federation infrastructure resource, including the following:

detecting a component request to optimize access to one or more federation infrastructure resources associated with the ring of federated nodes so as to reduce inter-node communication costs between nodes on the ring of federated nodes when providing access to the one or more federation infrastructure resources;

determining that a hosting location of an associated federation infrastructure resource, selected from among the one or more federation infrastructure resources, is not optimized on the ring of federated nodes for providing one or more users that are associated with a component that sent the component request access to the associated federation infrastructure resource;

in response to the component request, indicating that the hosting location of the associated federation infrastructure resource on the ring of federated nodes is to be optimized to reduce inter-node communication costs between nodes on the ring of federated nodes when providing access to the associated federation infrastructure resource; and in response to the component request, updating processing information for providing optimized access to the associated federation infrastructure resource, the processing information including redirection information and priority information for optimizing requests for the associated federation infrastructure resource, the redirection information identifying a node in the ring of federated nodes hosting the associated federation infrastructure resource for higher-priority requests and one or more nodes in the ring of federated nodes not hosting the associated federation infrastructure resource for lower-priority requests, the priority information usable for identifying priority level of requests.

* * * * *